United States Patent
Todorokihara

(10) Patent No.: US 8,521,673 B2
(45) Date of Patent: Aug. 27, 2013

(54) PARALLEL PROCESSING DEVICE AND PARALLEL PROCESSING METHOD

(75) Inventor: Masayoshi Todorokihara, Shimosuwa (JP)

(73) Assignee: Seiko Epson Corporation (JP)

(*) Notice: Subject to any disclaimer, the term of this patent is extended or adjusted under 35 U.S.C. 154(b) by 699 days.

(21) Appl. No.: 12/358,341

(22) Filed: Jan. 23, 2009

(65) Prior Publication Data

US 2009/0192958 A1    Jul. 30, 2009

(30) Foreign Application Priority Data

Jan. 25, 2008   (JP) ................. 2008-014945

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/04 | (2006.01) |

(52) U.S. Cl.
USPC .......................................................... 706/27

(58) Field of Classification Search
USPC .......................................................... 706/27
See application file for complete search history.

(56) References Cited

U.S. PATENT DOCUMENTS

| | | | |
|---|---|---|---|
| 6,539,114 B1* | 3/2003 | Shimazawa | 382/195 |
| 7,028,271 B2* | 4/2006 | Matsugu et al. | 716/107 |
| 2008/0069151 A1* | 3/2008 | Satoh et al. | 370/503 |

FOREIGN PATENT DOCUMENTS

| | | |
|---|---|---|
| JP | 6-195454 | 7/1994 |
| JP | 2006-39790 | 2/2006 |

* cited by examiner

*Primary Examiner* — Kakali Chaki
*Assistant Examiner* — Ababacar Seck
(74) *Attorney, Agent, or Firm* — Harness, Dickey & Pierce, P.L.C.

(57) ABSTRACT

A parallel processing device that computes a hierarchical neural network includes: a plurality of units identified by a characteristic unit numbers; a control section that outputs control data, including an input value and a selection unit number, to the plurality of units; and a storage section that stores a plurality of coupling weights, each of the coupling weights being associated with layer information. Each of the units includes: a data input section that receives control data from the control section; a unit number match judgment section that judges whether the selection unit number matches the characteristic unit number; a unit processing section that computes the output value; and a data output section that outputs the output value to the control section when the unit number judgement section judges that the selection unit number matches the characteristic unit number.

4 Claims, 69 Drawing Sheets

| Protocol | A | Operation (unless otherwise specified) | Operation (in the case of P=Q) |
|---|---|---|---|
| A | 0 | Set product-sum value stored in Product-sum calculation first value storage section to 0. | – |
| ACDE | 1 | Calculate product-sum first value as X=C, 1=D, i=E and add and store the same. | – |
| AD | 2 | Calculate output value as 1=D, and store in unit output storage section. | – |
| ABD | 3 | – | Output output value read from unit output storage section as 1=D. |

FIG. 18

Self-organizing map

| Protocol | A | Operation (unless otherwise specified) | Operation (in the case of B=I) |
|---|---|---|---|
| ABW1, W2, W3… | 4 | – | Set Wj1=w1, wj2=w2, wj3=w3, … (where j=B) |
| ACD | 5 | Set learning speed η to C, and neighborhood distance d to D | – |
| AN | 6 | Set dimension n of real number vector to N | – |
| AX1, X2… | 7 | Set x1=X1, x2=X2, …, and calculate norm | – |
| AB | 8 | – | Output calculation result (already calculated with A=7) |
| AB | 9 | Judge as to whether unit network coordinates I is included in neighborhood distance d of input network coordinates B, and modify wl | Same as the left |
| AB | 10 | – | Output wj1, wj2, wj3, … (where j=B) |

FIG. 23

Self-organizing map

| Protocol | A | Operation (unless otherwise specified) | operation (in the case of B=I) |
|---|---|---|---|
| ABW1,W2,W3 ... | 4 | — | Set wj1=w1,wj2=w2,wj3=w3,··· (where j=B) |
| ACD | 5 | Set learning speed $\eta$ to C,and neighborhood distance d to D | — |
| AN | 6 | Set dimension n of real number vector to N | — |
| AX1,X2 ... | 7 | Set x1=X1,x2=X2, ··· , and calculate norm | — |
| AB | 8 | — | Output calculation result (already calculated with A=7) |
| AB | 9 | Judge as to whether unit network coordinates I is included neighborhood distance d of input network coordinates B, and modify wI | Same as the left |
| AB | 10 | — | Output wj1,wj2,wj3, ··· (where j=B) |
| A | 11 | Indicate to start winner unit decision slgorithm. Starting units: pass self-unit norm and self-unit network coordinates to a succeeding unit. Other units:compare norm input from a preceding unit with self-unit norm,and pass a winner unit norm decided and its unit network coordinates to a succeeding unit. | |

FIG. 32

Backpropagation

| Protocol | A | Operation (unless otherwise specified) | Operation (in the case of B=I) |
|---|---|---|---|
| AH | 111 | Set learning coefficient η to H | – |
| A | 112 | Storage section: set value of Σ in Formula 7 to 0. | – |
| ABDLa | 113 | – | Set $d_j = D$, $L=La$, calculate Formula 4, and output calculation result $\delta_j$ (L+2) (where j=I). |
| AΔLaJ | 114 | Set $L=La$, $\delta_j$ (L+2)=Δ, j=J, and calculate Formula 6 (where i=I). | – |
| ABLaJ | 115 | – | Set $L=La$, j=J, and output $W_{ji}(L)$ (where i=I). |
| ABWLaE | 116 | – | Set $L=La$, $W_{ji}(L)=W_i=E$ (where i=I). |
| AΔLaK | 117 | Set $l=La$, $\delta_j$ (l+2)=Δ, k=K, and calculate Σ (Product-sum) of Formula 7 (where j=I). | – |
| ALa | 118 | Set $l=La$, and calculate Formula 7 (where i=I). | – |
| ABLa | 119 | – | Set $l=La$, and output calculation result of Formula 7 (already calculated with A=118) (where i=I). |
| AΔLaJ | 120 | Set $l=La$, $\delta_j$ (l+1)=Δ, j=J, and calculate Formula 9 (where i=I). | – |

FIG. 41

| $w_{ji}^{(2)}$ | i=1 | 2 | 3 | 4 |
|---|---|---|---|---|
| j=1 | $w_{11}^{(2)}$ | $w_{12}^{(2)}$ | $w_{13}^{(2)}$ | $w_{14}^{(2)}$ |
| 2 | $w_{21}^{(2)}$ | $w_{22}^{(2)}$ | $w_{23}^{(2)}$ | $w_{24}^{(2)}$ |
| 3 | $w_{31}^{(2)}$ | $w_{32}^{(2)}$ | $w_{33}^{(2)}$ | $w_{34}^{(2)}$ |
| 4 | $w_{41}^{(2)}$ | $w_{42}^{(2)}$ | $w_{43}^{(2)}$ | $w_{44}^{(2)}$ |
| 5 | $w_{51}^{(2)}$ | $w_{52}^{(2)}$ | $w_{53}^{(2)}$ | $w_{54}^{(2)}$ |
| 6 | $w_{61}^{(2)}$ | $w_{62}^{(2)}$ | $w_{63}^{(2)}$ | $w_{64}^{(2)}$ |
| 7 | $w_{71}^{(2)}$ | $w_{72}^{(2)}$ | $w_{73}^{(2)}$ | $w_{74}^{(2)}$ |
| 8 | $w_{81}^{(2)}$ | $w_{82}^{(2)}$ | $w_{83}^{(2)}$ | $w_{84}^{(2)}$ |
| 9 | $w_{91}^{(2)}$ | $w_{92}^{(2)}$ | $w_{93}^{(2)}$ | $w_{94}^{(2)}$ |
| 10 | $w_{101}^{(2)}$ | $w_{102}^{(2)}$ | $w_{103}^{(2)}$ | $w_{104}^{(2)}$ |

FIG. 57

| $w_{ki}^{(3)}$ | k=1 | 2 | 3 | 4 |
|---|---|---|---|---|
| j=1 | $w_{11}^{(3)}$ | $w_{21}^{(3)}$ | $w_{31}^{(3)}$ | |
| 2 | $w_{12}^{(3)}$ | $w_{22}^{(3)}$ | $w_{32}^{(3)}$ | |
| 3 | $w_{13}^{(3)}$ | $w_{23}^{(3)}$ | $w_{33}^{(3)}$ | |
| 4 | $w_{14}^{(3)}$ | $w_{24}^{(3)}$ | $w_{34}^{(3)}$ | |
| 5 | $w_{15}^{(3)}$ | $w_{25}^{(3)}$ | $w_{35}^{(3)}$ | |
| 6 | $w_{16}^{(3)}$ | $w_{26}^{(3)}$ | $w_{36}^{(3)}$ | |
| 7 | $w_{17}^{(3)}$ | $w_{27}^{(3)}$ | $w_{37}^{(2)}$ | |
| 8 | $w_{18}^{(3)}$ | $w_{28}^{(3)}$ | $w_{38}^{(3)}$ | |
| 9 | $w_{19}^{(3)}$ | $w_{29}^{(3)}$ | $w_{39}^{(3)}$ | |
| 10 | $w_{110}^{(3)}$ | $w_{210}^{(3)}$ | $w_{310}^{(3)}$ | |

FIG. 58

|   | 1 | 2 | 3 | 4 |
|---|---|---|---|---|
| 1 | $w_{11}^{(2)}, w_{11}^{(3)}$ | $w_{12}^{(2)}, w_{21}^{(3)}$ | $w_{13}^{(2)}, w_{31}^{(3)}$ | $w_{14}^{(2)}$ |
| 2 | $w_{21}^{(2)}, w_{12}^{(3)}$ | $w_{22}^{(2)}, w_{22}^{(3)}$ | $w_{23}^{(2)}, w_{32}^{(3)}$ | $w_{24}^{(2)}$ |
| 3 | $w_{31}^{(2)}, w_{13}^{(3)}$ | $w_{32}^{(2)}, w_{23}^{(3)}$ | $w_{33}^{(2)}, w_{33}^{(3)}$ | $w_{34}^{(2)}$ |
| 4 | $w_{41}^{(2)}, w_{14}^{(3)}$ | $w_{42}^{(2)}, w_{24}^{(3)}$ | $w_{43}^{(2)}, w_{34}^{(3)}$ | $w_{44}^{(2)}$ |
| 5 | $w_{51}^{(2)}, w_{15}^{(3)}$ | $w_{52}^{(2)}, w_{25}^{(3)}$ | $w_{53}^{(2)}, w_{35}^{(3)}$ | $w_{54}^{(2)}$ |
| 6 | $w_{61}^{(2)}, w_{16}^{(3)}$ | $w_{62}^{(2)}, w_{26}^{(3)}$ | $w_{63}^{(2)}, w_{36}^{(3)}$ | $w_{64}^{(2)}$ |
| 7 | $w_{71}^{(2)}, w_{17}^{(3)}$ | $w_{72}^{(2)}, w_{27}^{(3)}$ | $w_{73}^{(2)}, w_{37}^{(3)}$ | $w_{74}^{(2)}$ |
| 8 | $w_{81}^{(2)}, w_{18}^{(3)}$ | $w_{82}^{(2)}, w_{28}^{(3)}$ | $w_{83}^{(2)}, w_{38}^{(3)}$ | $w_{84}^{(2)}$ |
| 9 | $w_{91}^{(2)}, w_{19}^{(3)}$ | $w_{92}^{(2)}, w_{29}^{(3)}$ | $w_{93}^{(2)}, w_{39}^{(3)}$ | $w_{94}^{(2)}$ |
| 10 | $w_{101}^{(2)}, w_{110}^{(3)}$ | $w_{102}^{(2)}, w_{210}^{(3)}$ | $w_{103}^{(2)}, w_{310}^{(3)}$ | $w_{104}^{(2)}$ |

FIG. 59

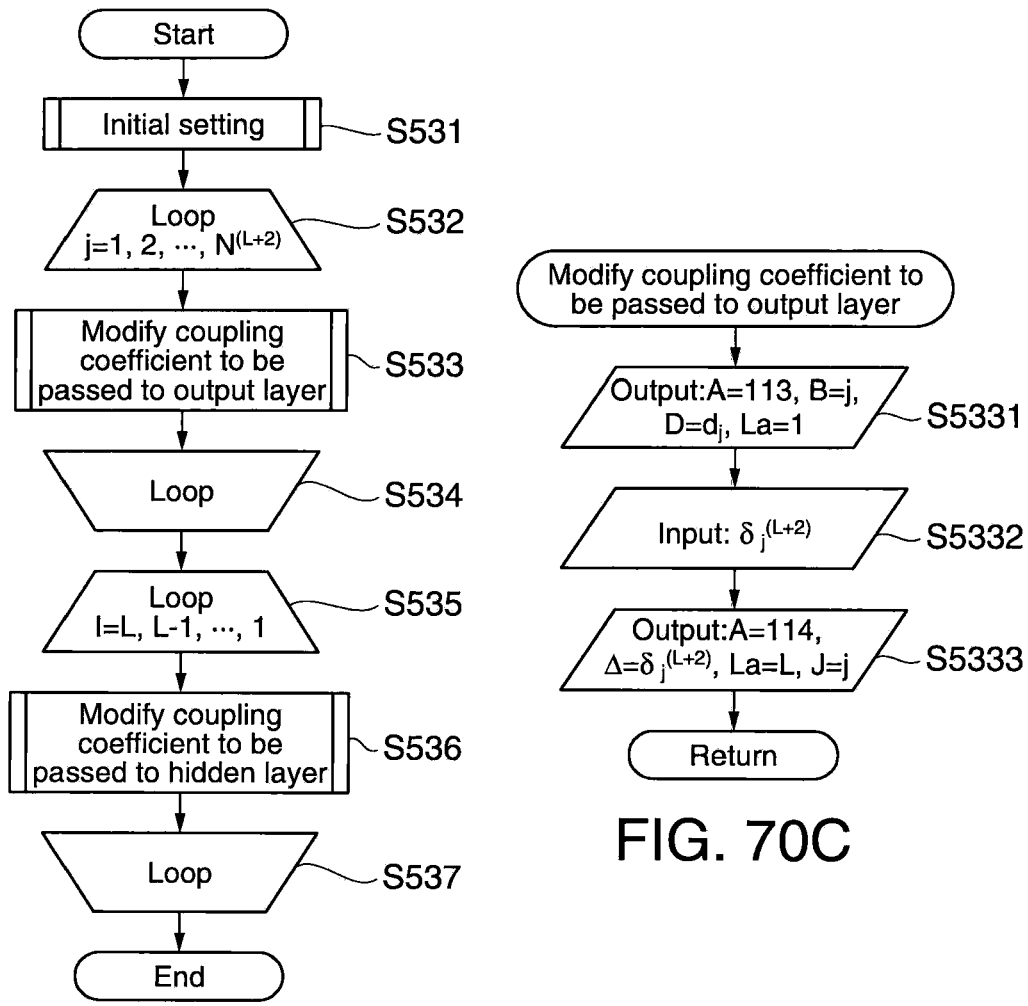
FIG. 70A
FIG. 70C
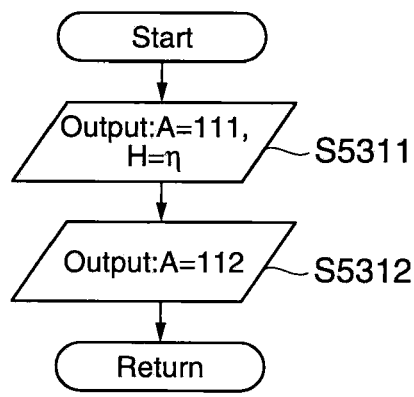
FIG. 70B

PARALLEL PROCESSING DEVICE AND PARALLEL PROCESSING METHOD

The entire disclosure of Japanese Patent Application No. 2008-014945 filed Jan. 25, 2008 is expressly incorporated by reference herein.

BACKGROUND

1. Technical Field

The present invention relates to parallel processing devices having a plurality of parallel processing units and, more particularly, to parallel processing devices that can facilitate connection among the plurality of parallel processing units.

2. Related Art

Neural networks are known as one of the applications with which parallel processing can exhibit its true performance. A neural network is a mathematical model aiming at expressing some of the characteristics that can be observed in the brain functions. With processing by a neural network, it is possible to reduce the amount of information of input data, and therefore favorable solutions may often be obtained with a relatively small amount of computation for multidimensional data and linearly inseparable problems such as image data and statistic data. For this reason, neural networks are applied in a variety of fields, such as, pattern recognition, data mining and the like.

When a large scale neural network is to be realized, the amount of its computation becomes enormous, and processing in a practical time span becomes difficult. Some of the methods for solving the problem include: (1) a method to increase the computing power of each single processor, (2) a method to use a parallel computing technique using a plurality of processors, (3) a method to implement the functions by hardware such as LSI, and the like. The aforementioned methods (1) and (2) are intended to cope with enormous amounts of computation by improving the power of the processor, and can handle a variety of neural network algorithms by changing programs.

According to the aforementioned method (1), conventionally, the computing power of single unit processors has been increased by increasing the clock frequency of single unit processors. However, in recent years, Moor's law is failing because higher speeds of clock frequencies increased calorific value, and dimensions obtainable by microprocessing are reaching the physical limits, such that it is becoming more difficult to increase the computing power of single unit processors per se. For this reason, developments on methods to increase the computing power of processors have shifted from the method (1) toward the method (2), and are focusing more on larger caches and multiple computation cores in order to promote higher speeds through increased computing powers and suppression of heat generation. The developments of processors are also being made toward operations with lower clock frequencies and thus lower power consumption.

However, the method (2) entails essential problems in that it is difficult to improve methods for effectively operating an enormous number of processors, in other words, to increase the degree of parallelism, and it is difficult to construct networks that enable communications of enormous amounts of data among multiple processors. Therefore, it is difficult to increase the efficiency in parallel processing of a large scale neural network by using the method (2), namely, a parallel computing technique that uses multiple processors.

On the other hand, according to the method (3) using hardware implementation, although there are limitations in neural network algorithms that can be realized by hardware, the method (3) can achieve performances at incommensurable processing speeds even at lower frequencies in specific applications, compared to the methods (1) and (2). Examples of related art that pertains to technologies that implement parallel processing by hardware are Japanese Laid-open Patent Applications 06-195454 (Document 1) and 2006-039790 (Document 2).

However, the technologies described in Document 1 and Document 2 concerning hardware implementation according to the method (3) entail problems of wirings, whereby the circuit scale becomes enormous due to wirings, or wirings between circuits cannot be made. For example, in a multilayer neural network, an output from any of the nodes in an output layer needs to be inputted in inputs of the entire nodes of an input layer, such that, when the number of nodes in each layer increases, the amount of wiring therefore drastically increases.

Also, for example, while neurons are disposed in a three-dimensional space and interconnected in the case of the neural network of the actual brain, components in a hardware neural network structure such as LSI are basically disposed two-dimensionally, and therefore the problem of wiring cannot be essentially solved. The problem of wiring remains even when components are disposed three-dimensionally by laminate structure or the like, and therefore its application is limited to uses where limited wirings (connections only among adjacent components) suffice for the uses.

Also, the problem of wiring among multiple processing units is not limited to neural networks, but also poses problems when it is necessary for computation to input an output of a processing unit in multiple processing units at once. Besides general neural networks such as hierarchical neural networks and self organizing maps, for example, the wiring problem has impacts on gravitational many-body problems, simulation of charged many-particle, filtering of signals and the like.

SUMMARY

In accordance with an advantage of some aspects of the invention, parallel processing devices and parallel processing methods which are capable of facilitating wirings among a plurality of processing units can be provided.

In accordance with an embodiment of the invention, a parallel processing device that computes a hierarchical neural network, the parallel processing device includes: a plurality of units that are identified by characteristic unit numbers that are predetermined identification numbers, respectively; a distribution control section that, in response to input as an input value of an output value outputted from one of the plurality of units through a unit output bus, outputs control data including the input value inputted and a selection unit number that is an identification number to select one unit among the plurality of units to the plurality of units through the unit input bus; and a common storage section that stores in advance coupling weights for a plurality of layers of the hierarchical neural network, the coupling weights being shared by plural ones of the plurality of units, wherein each of the units includes: a data input section that receives control data as an input from the distribution control section through the unit input bus; a unit number match judgment section that judges as to whether a selection unit number included in the control data inputted in the data input section matches the characteristic unit number; a unit processing section that, based on an input value included in the control data inputted in the data input section, computes by a computing method predetermined for each of the units; and a data output section that, when the unit number match judgment section provides a judgment result indicating matching, outputs a computation result computed by the unit processing section as the output value to the distribution control section through the unit output bus, wherein, based on the coupling weights stored in the common weight storage section, the unit processing section executes computation in a forward direction that is a direction from an input layer to an output layer in the hierarchical neural network, and executes computation in a backward direction that is a direction from the output layer to the input layer, thereby updating the coupling weights.

According to the above-described embodiment of the invention, the parallel processing device includes the common storage section that stores in advance coupling weights in a plurality of layers of the hierarchical neural network, the coupling weights, wherein the coupling weights are shared by plural ones of the plurality of units. Based on the coupling weights stored in the common weight storage section, the parallel processing device executes computation in a forward direction that is a direction from an input layer to an output layer in the hierarchical neural network, and also executes computation in a backward direction that is a direction from the output layer to the input layer, thereby updating the coupling weights and thus performing learning, which is therefore effective in executing a hierarchical neural network computation at higher speeds.

Also, in accordance with an aspect of the invention, the common weight storage section may store the coupling weights, associated with layer information that identifies each hierarchical layer in the hierarchical neural network, output node information that identifies each node that outputs an output value in the hierarchical neural network, and input node information that identifies each node that receives the output value as an input in the hierarchical neural network, wherein the common storage section includes a plurality of storage units each storing the coupling weights corresponding to one value of the input node information and one value of the output node information for each of different values of the layer information, each of the storage units stores the coupling weights in a manner that the one value of the input node information and the one value of the output node information are alternated in the order defined by the layer information, and each of the storage units is shared by each two units among the plurality of units, based on input node information and output node information of coupling weights stored in the storage unit and nodes computed by the units in the hierarchical neural network.

According to the aspect described above, the common weight storage section has a plurality of storage units that sore coupling weights, such that the plurality of units can read coupling weights in parallel from the respective corresponding storage units or update the coupling weights, and thus parallel processing is made possible in the parallel processing device. Also, each of the storage units is shared by corresponding two of the units, such that, when the values of coupling weights stored in the shared storage unit are updated, the processing for adjusting the consistency of the values of coupling weights shared by the two units becomes unnecessary, and thus the overall processing can be done at higher speeds.

In accordance with another aspect of the invention, the plurality of storage units may be arranged in a row direction and a column direction in a lattice configuration based on input node information and output node information of coupling weights stored in the storage units, and the common weight storage section may include a row switch that connects the storage unit in the row direction to one of the two units, a column switch that connects the storage unit in the column direction to the other of the two units, and a switch control section that, based on computation in the hierarchical neural network, controls the row switch and the column switch to be in a connected state or a unconnected state.

According to the aspect described above, the storage unit is connectable to one of the two units by the row switch, and to the other of the two units by the column switch, and the row switch and the column switch are controlled by the switch control section. Therefore, the storage unit is connected at most one of the two units, such that input and output of the coupling weights can be done without the two units colliding against each other between the storage unit and the units.

Also, in accordance with another aspect of the invention, the switch control section may control to set, based on computation in the hierarchical neural network, a row active state in which, among the plurality of storage units arranged in rows and columns in the lattice configuration, plural ones of the plurality of storage units arranged in one of the rows are controlled to output the coupling weights for the hierarchical layer, and the column switches are controlled to be in the connected state and the row switches are controlled to be in the unconnected state, and a column active state in which, among the plurality of storage units arranged in rows and columns in the lattice configuration, plural ones of the plurality of storage units arranged in one of the columns are controlled to output the coupling weights for the hierarchical layer, and the column switches are controlled to be in the unconnected state and the row switches are controlled to be in the connected state.

According to the aspect described above, the switch control section controls the row switches and the column switches, and also controls outputs of the storage units, such that input and output of the coupling weights can be done without colliding against one another among the storages unit and the units.

In accordance with another aspect of the invention, when the input layer in the hierarchical neural network is defined as the first layer, and layers from the input layer to the output layer are sequentially numbered, the switch control section may control, in computation in the hierarchical neural network, to set the row active state when an odd number layer whose value representative of a layer order is an odd number is on the output side, and an even number layer whose value representative of a layer order is an even number is on the input side, and controls to set the column active state when the even number layer is on the output side and the odd number layer is on the input side.

According to the aspect described above, the switch control section controls the row switches, the column switches and the storage units according to each layer that is executing computation in the hierarchical neural network, such that hierarchical neural network computation can be executed without collision among the storage units and the units.

Furthermore, in accordance with an aspect of the invention, the switch control section may control based on control data inputted from the distribution control section.

According to the aspect described above, the switch control section can perform control based on control data outputted to the units by the distribution control section.

In accordance with still another aspect of the invention, any one of the plurality of units corresponding to a storage unit that stores coupling weights in which the value of input node information and the value of output node information are identical is connected to the corresponding storage unit, or includes the corresponding storage unit therein.

According to the aspect described above, among the plurality of units, any unit corresponding to a storage unit that stores coupling weights in which the value of input node information and the value of output node information are identical may be connected to the corresponding storage unit, or may have the corresponding storage unit built therein, which is effective in that the number of row switches and column switches can be reduced, wirings can be readily made, or the number of storage units can be reduced.

Furthermore, in accordance with another aspect of the invention, two of the units that share the storage unit that stores the coupling weights whose values of input node information and output node information are identical are an identical unit.

According to the aspect described above, two units that share a storage unit are the same unit, such that, where storage units are arranged in a lattice configuration, it is possible to make those of the storage units and units diagonally arranged correspond with one another, which is effective in that wirings can be more readily made, and the number of row switches and column switches can be reduced.

Also, in accordance with another aspect of the invention, where the input layer in the hierarchical neural network is defined as the first layer, and layers from the input layer to the output layer are sequentially numbered, the common weight storage section may include, as storage units in one of the row direction and the column direction, storage units at least in a number equal to the maximum value of the number of nodes in an even number layer in the hierarchical neural network, and as storage units in the other of the row direction and the column direction, storage units at least in a number equal to the maximum value of the number of nodes in an odd number layer in the hierarchical neural network.

According to the aspect described above, according to hierarchical layers of the hierarchical neural network and the number of nodes in each of the layers, the number of storage units required in the common weight storage section can be minimized, which is effective in reducing the number of storage units.

Moreover, in accordance with an aspect of the invention, the parallel processing device has, as the plurality of units described above, units equal to at least the maximum number of nodes per layer among the entire layers in the hierarchical neural network.

According to the aspect described above, according to hierarchical layers of the hierarchical neural network and the number of nodes in each of the layers, the number of units required can be minimized, which is effective in reducing the number of units.

Furthermore, another embodiment of the invention pertains to a parallel processing method to be used in a parallel processing device that computes a hierarchical neural network, the parallel processing device including: a plurality of units that are identified by characteristic unit numbers that are predetermined identification numbers, respectively; a distribution control section that, in response to input as an input value of an output value outputted from one of the plurality of units through a unit output bus, outputs control data including the input value inputted and a selection unit number that is an identification number to select one unit among the plurality of units to the plurality of units through the unit input bus; and a common storage section that stores in advance coupling weights in a plurality of layers of the hierarchical neural network, the coupling weights being shared by plural ones of the plurality of units, wherein each of the units includes: a data input section that receives control data as an input from the distribution control section through the unit input bus; a unit number match judgment section that judges as to whether a selection unit number included in the control data inputted in the data input section matches the characteristic unit number; a unit processing section that, based on an input value included in the control data inputted in the data input section, computes by a computing method predetermined for each of the units; and a data output section that, when the unit number match judgment section provides a judgment result indicating matching, outputs a computation result computed by the unit processing section as the output value to the distribution control section through the unit output bus, the parallel processing method, wherein, based on the coupling weights stored in the common weight storage section, the unit processing section executes computation in a forward direction that is a direction from an input layer to an output layer in the hierarchical neural network, and executes computation in a backward direction that is a direction from the output layer to the input layer, thereby updating the coupling weights.

BRIEF DESCRIPTION OF THE DRAWINGS

FIG. 18 is a table of protocols in the hierarchical neural network shown in FIG. 14.

FIG. 23 is a table of protocols in the self-organizing map in FIG. 22.

FIG. 32 is a table of protocols in a self-organizing map in accordance with a fifth embodiment of the invention.

FIG. 41 is a table of protocols in accordance with the sixth embodiment.

FIG. 57 is a table 1 showing coupling coefficients to be used in the hierarchical neural network shown in FIG. 55.

FIG. 58 is a table 2 of coupling coefficients to be used in the hierarchical neural network shown in FIG. 55.

FIG. 59 is a table showing coupling coefficients stored in storage units shown in FIG. 56.

FIG. 70 is a flow chart 1 for describing operations of a distribution control section 8 in accordance with a seventh embodiment.

DESCRIPTION OF EXEMPLARY EMBODIMENTS

First Base Structure

Figure 1:
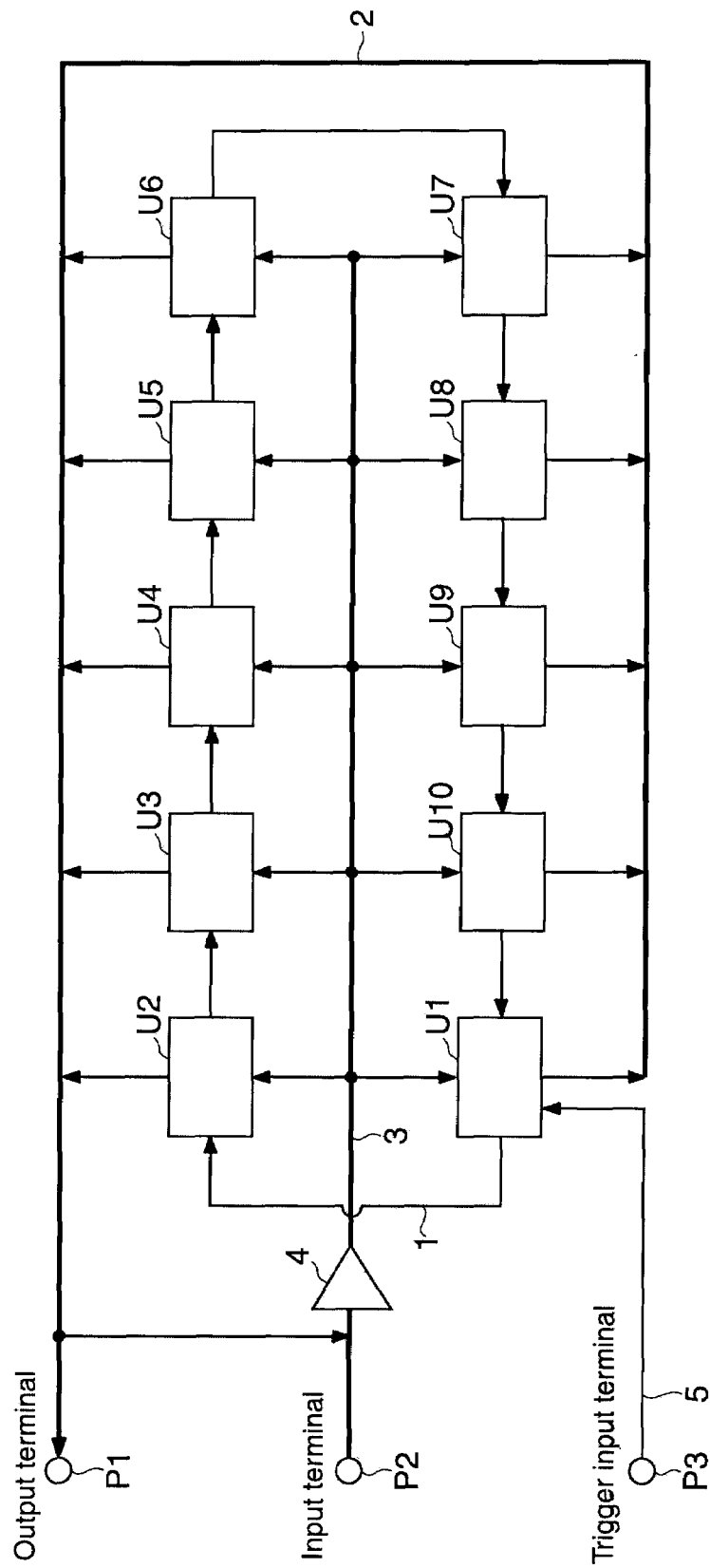
FIG. 1 is a block diagram showing the structure of a parallel processing device in accordance with an embodiment of the invention.

Preferred embodiments of the invention are described below with reference to the accompanying drawings. FIG. 1 is a schematic block diagram showing the structure of a parallel processing device in accordance with an embodiment of the invention (first base structure). In this example, the parallel processing device is described as having ten units, Units U1 through U10. Details of the units shall be described below.

The multiple units U1 through U10 are daisy chained through a daisy chain control bus 1 according to a daisy chain order that is a predetermined order. The daisy chain order in this example shall be described as having Unit U1, Unit U2, Unit U3, . . . and Unit U10 set in advance in this order. Also, the daisy chain control bus 1 connects adjacent ones of the units in the daisy chain order. For example, the daisy chain control bus 1 connects Unit U1 and Unit U2, Unit U2 and Unit U3, . . . and Unit U10 and Unit U1. Also, the daisy chain control bus 1 cyclically connects the units, Unit U1 through Unit 10, in the daisy chain order. For this reason, Unit U10 and Unit U1 are also connected through the daisy chain control bus 1.

The respective units, Unit U1 through Unit U10 transmit and receive a token among the units in the daisy chain order through the daisy chain control bus 1. One of units Unit U1 through Unit U10 daisy chained has the token, and the unit having the token signals to serve as an output unit. Only the unit having the token serves as an output unit, and all of the units can serve as input units.

Each of the units performs processing by a processing method predetermined for each of the units based on an input value inputted from an amplifier 4 through a unit output bus 2. Also, in response to input of the token from a preceding unit passed in the daisy chain order through the daisy chain control bus 1, each of the units outputs the token to a next unit in the daisy chain order through the daisy chain control bus 1, and outputs the processing result as an output value to the amplifier 4 through the unit output bus 2.

The amplifier (a relay) 4 receives an output value outputted from any one of the multiple units Unit U1 through Unit U10, and the output value inputted is outputted from the amplifier 4 as an input value to each of the multiple units Unit U1 through Unit U10 through a unit input bus 3. Also, the amplifier 4 electrically amplifies the signal of the inputted output value, and outputs as an input value.

Furthermore, one end of the unit output bus 2 is connected to an output terminal P1 of a parallel processing device. Also, an input terminal of the amplifier 4 is connected to an input terminal P2 of the parallel processing device. The unit U1 is connected to a trigger input terminal P3 through a trigger input line 5. Also, the output terminal P1, the input terminal P2 and the trigger input terminal P3 are connected to a control device provided externally of the parallel processing device. The control device inputs data in the parallel processing device through the output terminal P1, the input terminal P2 and the trigger input terminal P3, obtains calculation results from the parallel processing device, and controls the parallel processing device.

Figure 2:
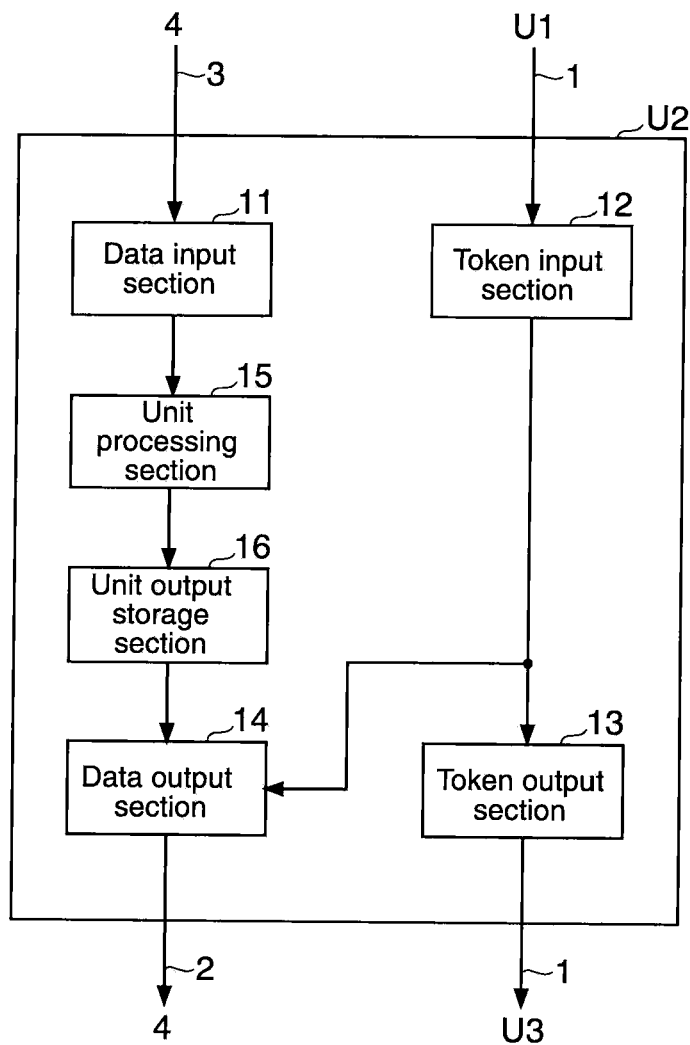
FIG. 2 is a block diagram showing the structure of a unit of the parallel processing device in accordance with an embodiment of the invention.

Next, referring to FIG. 2, the structure of each of the units is described. It is noted that the units from Unit U1 through Unit U10 have the same structure, and therefore only the structure of Unit U2 is described here. The unit U2 has a token input section 12, a token output section 13, a data input section 11, a data output section 14, a unit processing section 15, and a unit output storage section 16.

The token input section 12 receives a token as an input from its one preceding unit in the daisy chain order through the daisy chain control bus 1. For example, the token input section 12 of Unit U2 receives through the daisy chain control bus 1 a token as an input from Unit 1 that is one preceding unit in the daisy chain. It is noted that the token input section 12 of the Unit U1 not only receives a token as an input from Unit U10 through the token daisy chain control bus 1, but also receives a token as an input from the control device through the trigger input terminal P3 and the trigger input line 5.

In response to input of a token in the token input section, the token output section 13 outputs a token to one succeeding unit in the daisy chain order through the daisy chain control bus 1. For example, the token output section 13 of Unit U2 outputs a token to Unit U3 that is one succeeding unit in the daisy chain order through the daisy chain control bus 1.

The data input section 11 receives an input value as an input from the amplifier 4 through the unit output bus 2. The unit output storage section 16 stores a processing result that is the result of processing by the unit processing section 15. The unit processing section 15 performs processing by a processing method predetermined for each of the units, based on the input value inputted in the data input section 11. Also, the unit processing section 15 stores a processing result that is the result of its processing in the unit output storage section 16.

In response to input of the token in the token input section 12, the data output section 14 outputs the processing result that is the result of processing by the unit processing section 15 as an output value to the amplifier 4 through the unit output bus 2. Also, in response to input of the token in the token input section 12, the data output section 14 reads the processing result from the unit output storage section 16, and outputs the readout processing result as an output value to the amplifier 4 through the unit output bus 2.

As described below, the parallel processing device inputs a token as a trigger in Unit U1 through the trigger input terminal P3, and the parallel processing device executes processing at each of the units through sequentially passing the token from Unit U1 through the units. The operations of the parallel processing device are described with reference to an example to be described next in which the parallel processing device is applied to a hierarchical neural network.

First Embodiment

Structure of Unit When Applied to Hierarchical Neural Network

Next, a structure in which the parallel processing device is applied to a hierarchical neural network is described. The entire structure of the parallel processing device in the hierarchical neural network has generally the same structure as that of the parallel processing device in FIG. 1, only except that its components are different. Accordingly, referring to FIG. 3, the structure of the unit in which the parallel processing device is applied to a hierarchical neural network is described.

The unit has a data input section 101, a token input section 102, a token output section 103, and a data output section 104. Also, the unit has a weight storage section 130, a layer information storage section 133, a unit number storage section 134, a product-sum calculation first value storage section 131, a function storage section 132, a unit output storage section 135, a data output flag storage section 136, and a unit identification information storage section 137. Also, the unit has a counter 114, a product-sum calculation first value calculation section 111, a layer information calculation section 113, and a unit output calculation section 112.

Figure 3:
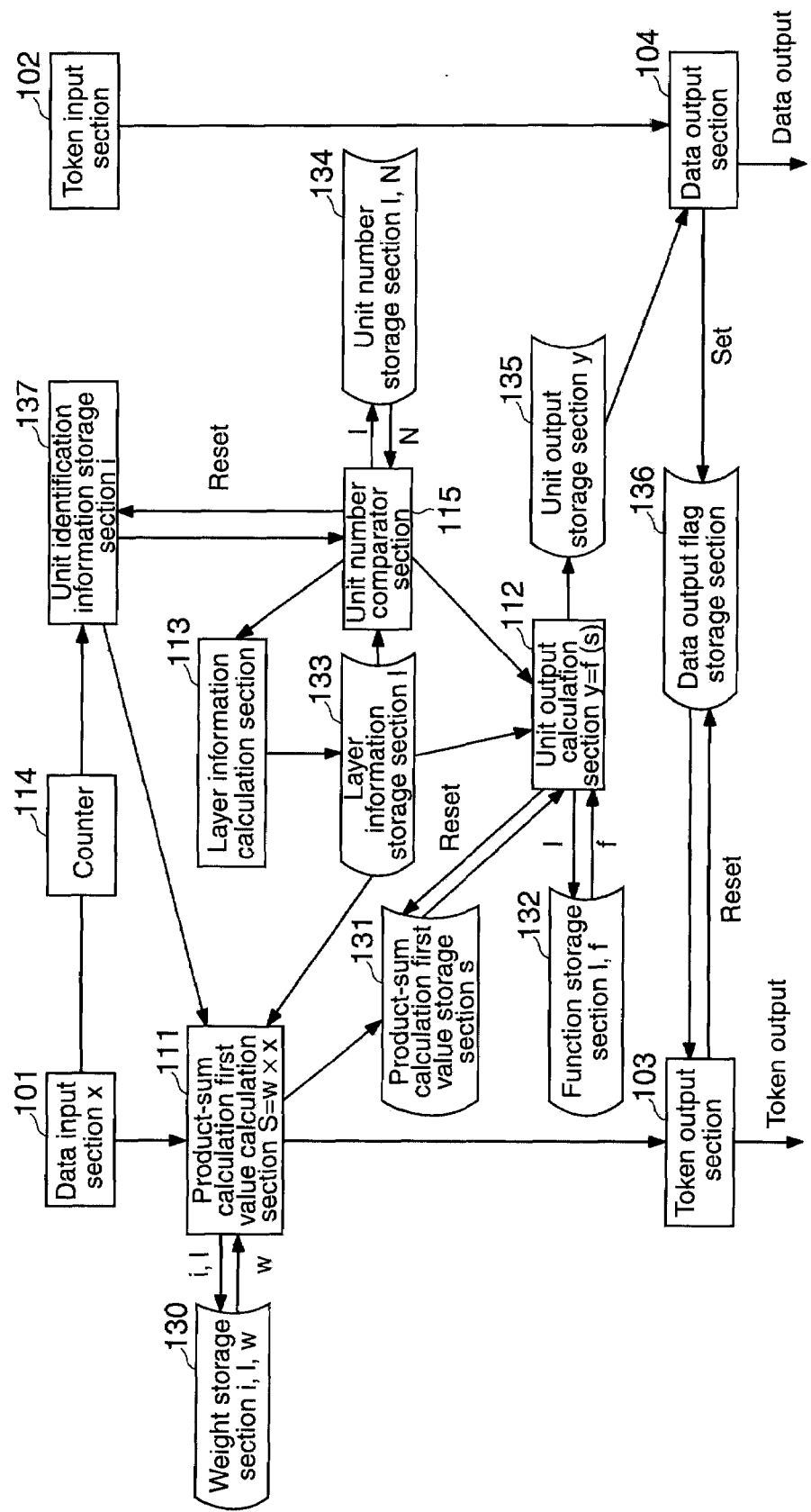
FIG. 3 is a block diagram showing the structure of the unit in FIG. 2 in a hierarchical neural network.

Here, the data input section 101, the token input section 102, the token output section 103 and the data output section 104 in FIG. 3 correspond to the data input section 11, the token input section 12, the token output section 13 and the data output section 14 in FIG. 2, respectively. Also, the unit output storage section 135 in FIG. 3 corresponds to the unit output storage section 16 in FIG. 2. Among the corresponding components in FIG. 2 and FIG. 3, descriptions of their common functions shall not be duplicated.

Also, the weight storage section 130, the layer information storage section 133, the unit number storage section 134, the product-sum calculation first value storage section 131, the function storage section 132, the data output flag storage section 136, the unit identification information storage section 137, the counter 114, the product-sum calculation first value calculation section 111, the layer information calculation section 113 and the unit output calculation section 112 in FIG. 3 correspond to the unit processing section 15 in FIG. 2.

The layer information storage section 133 stores layer information that identifies an active layer (output layer) among the hierarchical layers of the hierarchical neural network. The unit identification information storage section 137 stores unit identification information indicating as to which one of the units is outputting among the units belonging to the active layer. The function storage section 132 stores in advance an output function of units associated with the layer information. The output function is a predetermined function that may be, for example, a sigmoid function, a step function, a piecewise linear function and the like.

The weight storage section 130 stores a predetermined coupling weight to be multiplied with an output value from a unit of the active layer that is identified by the layer information, associated with the layer information. Also, the weight storage section 130 also stores a predetermined coupling weight to be multiplied with an output value from a unit of a layer identified by the layer information and the unit identification information, associated with the layer information and the unit identification information.

The unit number storage section 134 stores layer information and a unit number of the hierarchical neural network belonging to a hierarchal layers identified by the layer information associated with the layer information. The product-sum calculation first value storage section 131 stores product-sum calculation first value information obtained by multiplying an input value from a unit identified as a preceding stage unit and a coupling weight. The data output flag storage section 136 stores a data output flag indicating as to whether the data output section 104 has outputted output data. The counter 114 increments the value of the unit identification information stored in the unit identification information storage section 137 each time an input value is inputted in the data input section 101.

The unit number comparator section 115 reads layer information from the layer information storage section 133, reads a unit number from the unit number storage section 134 corresponding to the layer information read out, reads unit identification information from the unit identification information storage section 137, compares the value of the unit identification information read out and the unit number read out, and, when the compared values match each other, outputs a comparison matching signal indicating that the value of unit identification information read out matches the unit number read out. When the value of the unit identification information readout and the unit number readout are compared, and the compared values match each other, the unit number comparator section 115 resets the value of the unit identification information stored in the unit identification information storage section 137.

The product-sum calculation first value calculation section 111 reads a coupling weight corresponding to the layer information read out from the layer information storage section 133, multiplies the coupling weight read out with the input value inputted in the data input section 101, and adds the resultant multiplication value to product-sum calculation first value information stored in the product-sum calculation first value storage section 131, which is to be stored therein.

Also, the product-sum calculation first value calculation section 111 reads a coupling weight from the weight storage section 130, corresponding to unit identification information readout from the unit identification information storage section 137 and layer information readout from the layer information storage section 133, multiplies the coupling weight read out with the input value inputted in the data input section 101, and adds the resultant multiplication value to product-sum calculation first value information stored in the product-sum calculation first value storage section 131, which is to be stored therein.

The unit output calculation section 112 reads product-sum calculation first value information from the product-sum calculation first value storage section 131, reads an output function from the function storage section 132 corresponding to layer information readout from the layer information storage section 133, substitutes the product-sum calculation first value information readout in the output function readout thereby calculating an output value, and stores the calculated output value in the unit output storage section 135.

Also, in response to input of a comparison matching signal from the unit number comparator section 115, the unit output calculation section 112 reads product-sum calculation first value information from the product-sum calculation first value storage section 131, reads an output function from the function storage section 132 corresponding to the layer information readout from the layer information storage section 133, substitutes the product-sum calculation first value information readout in the output function readout thereby calculating an output value, and stores the calculated output value in the unit output storage section 135. After reading out the product-sum calculation first value information from the product-sum calculation first value storage section 131, the unit output calculation section 112 resets the value of the product-sum calculation first value information stored in the product-sum calculation first value storage section 131 to 0.

In response to input of a comparison matching signal from the unit number comparator section 115, the layer information calculation section 113 increments the value of the layer information stored in the layer information storage section 133. In response to input of a token in the token input section 102, the data output section 104 sets the data output flag of the data output flag storage section 136 as having being outputted.

In response to input of an input value in the data input section 101, the token output section 103 reads the data output flag from the data output flag storage section 136, and outputs a token (token output step), when the readout data output flag is set as having been read out. Also, while outputting the token, the token output section 103 sets the data output flag in the data output flag storage section 136 as unoutputted.

It is noted that, instead of performing the token output step, in which, in response to input of an input value in the data input section 101, the token output section 103 reads the data output flag from the data output flag storage section 136 and outputs a token when the data output flag read out is set as having been outputted, the token output section 103 may read the data output flag from the data output flag storage section 136 in response to input of an input value in the product-sum calculation first value calculation section 111 from the data input section 101, and may output a token when the readout data output flag is set as having been outputted.

Operations of Units when Applied to Hierarchical Neural Network

Figure 4:
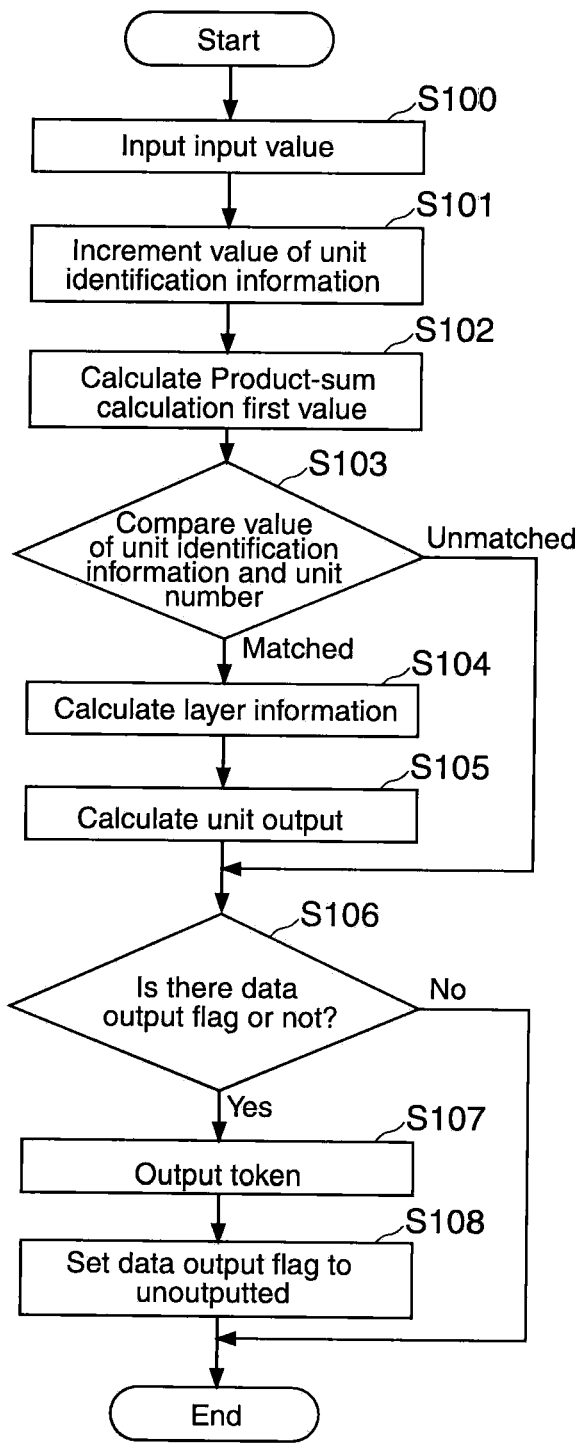
FIG. 4 is a first flow chart showing operations of the unit in FIG. 3.
Figure 5:
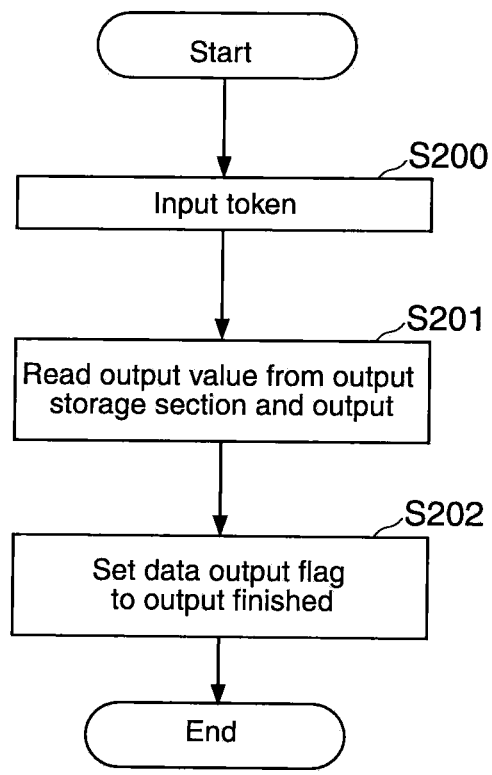
FIG. 5 is a second flow chart showing operations of the unit shown in FIG. 3.

Next, with reference to FIG. 4 and FIG. 5, operations of the unit when applied to the hierarchical neural network of FIG. 3 are described. First, operations to be executed upon input of an input value in the unit are described with reference to FIG. 4.

First, an input value is inputted in the data input section 101 from the amplifier 4 through the unit input bus 3 (step S100). Then, in response to input of the input value in the data input section 101 in step S100, the counter 114 increments the value of the unit identification information stored in the unit identification information storage section 137 by one (step S101).

In response to input of the input value in the data input section 101 in step S100, the product-sum calculation first value calculation section 111 reads a coupling weight from the weight storage section 130 corresponding to the unit identification information readout from the unit identification information storage section 137 and the layer information readout from the layer information storage section 133, multiplies the coupling weight readout and the input value inputted in the data input section 101, and adds the multiplication value to product-sum calculation first value information stored in the product-sum calculation first value storage section 131, which is then stored therein.

Next, the unit number comparator section 115 reads the layer information from the layer information storage section 133, reads a unit number from the unit number storage section 134 corresponding to the layer information readout, reads unit identification information from the unit identification information storage section 137, compares the value of the unit identification information readout and the unit number read out, and outputs a comparison matching signal when the compared values coincide each other which indicates that the value of the unit identification information readout and the unit number coincide each other (step S103). Also, when the unit number comparator section 115 compares the value of the unit identification information readout and the unit number readout, and the compared values coincide each other, the unit number comparator section 115 resets the unit identification information stored in the unit identification information storage section 137.

Next, when the compared values coincide each other in step S103, in response to input of the comparison matching signal from the unit number comparator section 115, the layer information calculation section 113 increments the value of the layer information stored in the layer information storage section 133 (step S104).

Next, when the compared values coincide each other in step S103, in response to input of the comparison matching signal from the unit number comparator section 115, the unit output calculation section 112 reads product-sum calculation first value information from the product-sum calculation first value storage section 131, reads an output function from the function storage section 132 corresponding to the layer information readout from the layer information storage section 133, substitutes the product-sum calculation first value information readout in the output function readout thereby calculating an output value, and stores the calculated output value in the unit output storage section 135 (step S101). Next, after reading out the product-sum calculation first value information from the product-sum calculation first value storage section 131, the unit output calculation section 112 resets the value of the product-sum calculation first value information stored in the product-sum calculation first value storage section 131 to 0.

Next, alternatively, when the compared values do not coincide each other in step S103, the token output section 103, in response to input of the input value in the data input section 101 in step S100, reads a data output flag from the data output flag storage section 136, detects as to whether the data output flag readout is set as having been outputted (step S106), and outputs a token, when the data output flag is set as having been outputted (step S107).

Also, while outputting the token in step S107, the token output section 103 sets the data output flag at the data output flag storage section 136 as being unoutputted (step S108), and ends the process. On the other hand, when the data output flag is set as being unoutputted in step S106, the token output section 103 ends the process.

Next, with reference to FIG. 5, operations to be executed when a token is inputted in the unit are described. First, a token is inputted in the token input section 102 through the daisy chain control bus 1 from one preceding unit in the daisy chain order (step S200).

Next, in response to input of the token in the token input section 102, the data output section 104 reads an output value (processing result) from the unit output storage section 135, and outputs the output value (processing result) readout as an output value to the amplifier 4 through the unit output bus 2 (step S201). Next, in response to input of the token in the token input section 102, the data output section 104 sets the data output flag of the data output flag storage section 136 as having been outputted (step S202), and ends the process.

Overall Structure of Hierarchical Neural Network

Next, the overall structure of a hierarchical neural network in accordance with an embodiment of the invention is described.

The embodiment is described here with reference to a case where the hierarchical neural network is composed of three layers, an input layer L1, a hidden layer L2 and an output layer L3. Each of the layers is identified by layer information, and the layer information for the hierarchical layers identifies each of the layers in a manner that the layer information sequentially increases one by one in the order of the hierarchical layers. For example, the input layer L1 is identified by layer information as being 1, the hidden layer L2 is identified by layer information as being 2, and the output layer L3 is identified by layer information as being 3.

The embodiment is described as to a case where the input layer L1 has three nodes, P101, P102 and P103, the hidden layer L2 has ten nodes, P201, P202, P203, P204, P205, P206, P207, P208, P209 and P210, and the output layer L3 has three nodes, P301, P302 and P303. An output of each of the nodes of the input layer L1 is inputted in each of the nodes of the hidden layer L2, and an output of each of the nodes of the hidden layer L2 is inputted in each of the nodes of the output layer L3.

Each of the nodes in each of the layers is identified by unit identification information, and the unit identification information for each of the nodes is set in a manner that the unit identification information sequentially increases one by one in a node arrangement order that is determined in advance. For example, the unit identification information of P101 is 1, the unit identification information of P102 is 2, and the unit identification information of P103 is 3.

In accordance with the present embodiment, each of the units functions as one of the nodes of the hidden layer L2 and the output layer L3. In this example, it is noted that Unit U1 through Unit U3 function as the nodes of the hidden layer L2 and the output layer L3, and Unit U4 through Unit U10 function as the nodes of the hidden layer L2. The control device as the input layer L1 sequentially outputs an output value to each of the units as the hidden layer L2 through the amplifier 4 and the unit output bus 2. Therefore, in this example, each of the units functions as the hidden layer L2 and the output layer L3. For example, Unit U1 functions as the node P201 of the hidden layer L2 and the node P301 of the output layer L3. Also, Unit U3 functions as the node P203 of the hidden layer L2, and the node P303 of the output layer L3. Also, Unit U4 functions as the node P204 of the hidden layer L2.

When a value is inputted in any of the units, a judgment is made as to which of the layers, the input layer L1, the hidden layer L2 or the output layer L3, provides the input according to the layer information stored in the layer information storage section 133 of each of the units.

Overall Operations of Hierarchical Neural Network

Next, an example of overall operations of the hierarchical neural network in accordance with an embodiment of the invention is described. The example is described here as to a case where each of the units functions as one of the nodes of the output layer L3, and one of the units in which a token is inputted functions as an active node of the hidden layer L2. In this case, each of the units functions as a node of the output layer L3, and the hidden layer L2 is an active layer, such that 2 is stored as the value of layer information in the layer information storage section 133 of each of the units.

First, upon input of a token by the control device, Unit U1 as being the node P201 reads an output value from the unit output storage section 135, outputs the output value, and sets the data output flag in the data output flag storage section 136 as having been outputted (procedure A100). Next, the output value from the node P201 is inputted in the data input section 101 of each of the units, Unit U1 through Unit U10, through the unit output bus 2, the amplifier 4 and the unit input bus 3.

Next, at each of the units, Unit U1 through Unit U10, based on the input value from the Unit U1, the product-sum calculation first value calculation section 111 reads a coupling weight from the weight storage section 130 corresponding to the unit identification information readout from the unit identification information storage section 137 and the layer information readout from the layer information storage section 133, multiplies the readout coupling weight with the input value inputted in the data input section 101, and adds the resultant multiplied value to product-sum calculation first value information stored in the product-sum calculation first value storage section 131, which is then stored therein (procedure A101).

It is noted here that, as the product-sum calculation first value calculation section 111 of each of the units reads a coupling weight from the weight storage section 130 corresponding to the unit identification information readout from the unit identification information storage section 137 and the layer information readout from the layer information storage section 133, each of the units can function as a node of the output layer L3 based on the layer information, and identify the layer to which the active unit belongs as the hidden layer L2 based on the layer information, further identify each of the nodes in the hidden layer L2 that becomes active based on the unit identification information, and multiply the coupling weight corresponding to the node that becomes active in the hidden layer L2 with the output value from the node of the hidden layer L2 that has become active.

As the data output flag in the data output flag storage section 136 of the unit U1 is set as having been outputted, the token output section 103 of the unit U1 outputs a token, in response to input of the input value in the data input section 101, and sets the data output flag of the data output flag storage section 136 as being unoutputted (procedure A102).

Next, the token outputted from the unit U1 is inputted through the daisy chain control bus 1 in the token input section 12 of the unit U2 that is one succeeding unit in the daisy chain order (procedure A103).

In response to input of the token in the token input section 12, the unit U2 reads an output value from the unit output storage section 135, outputs the output value, and sets the data output flag in the data output flag storage section 136 as having being outputted (procedure A104), in a similar manner as in the case where Unit U1 as being the node P101 executes upon input of a token described above.

Hereafter, procedure A101 through procedure A103 are similarly repeated, unit U10 as being the node P210 of the hidden layer L2 outputs an output value, and sets the data output flag in the data output flag storage section 136 as having been outputted.

Next, at each of the units U1 through U3 corresponding to the nodes P301 through P303 of the output layer L3, like the procedure A101, based on the input value from the unit U10, the product-sum calculation first value calculation section 111 of each of the units reads a coupling weight from the weight storage section 130 corresponding to unit identification information readout from the unit identification information storage section 137 and layer information readout from the layer information storage section 133, multiplies the readout coupling weight with the input value inputted in the data input section 101, and adds the multiplied value to product-sum calculation first value information stored in the product-sum calculation first value storage section 131, which is then stored therein (procedure A105).

Here, in response to input of the input value from Unit U10 in the data input section 101 of each of the units, the counter 114 of each of the units increments the value of the unit identification information stored in the unit identification information storage section 137, whereby the value of the unit identification information becomes to be 3 (procedure A106).

It is noted that the unit number storage section 134 of each of the units stores in advance layer information and the number of units in the hierarchical neural network which belong to a hierarchical layer identified by the layer information, associated with the layer information. For example, in the case of the hierarchical neural network of FIG. 6, the unit number storage section 134 stores in advance layer information of the input layer L1 that is a value 1, and the unit number of corresponding units in the hierarchical neural network, in other words, the number of nodes of the input layer L1 that is 3, associated with each other. Also, for example, in the case of the hierarchical neural network in FIG. 6, the unit number storage section 134 stores in advance layer information of the hidden layer L2 that is a value 2 and the number of corresponding units in the hierarchical neural network, in other words, the number of nodes of the hidden layer L2 that is 10, associated with each other.

Next, the unit number comparator section 115 of each of the units reads layer information from the layer information storage section 133, reads the unit number from the unit number storage section 134 corresponding to the layer information readout, reads unit identification information from the unit identification information storage section 137, compares the value of the unit identification information readout and the unit number, and, when the compared values match each other, outputs a comparison matching signal indicating that the value of the unit identification information readout coincides with the unit number readout, and resets the value of the unit identification information stored in the unit identification information storage section 137 (procedure A107).

Next, in response to input of the comparison matching signal from the unit number comparator section 115, the unit output calculation section 112 of each of the units reads product-sum calculation first value information from the product-sum calculation first value storage section 131, reads an output function from the function storage section 132 corresponding to the layer information readout from the layer information storage section 133, substitutes the product-sum calculation first value information readout in the output function readout thereby calculating an output value, and stores the calculated output value in the unit output storage section 135 (process A108).

Because the unit output calculation section 112 of each of the units reads the output function from the function storage section 132 corresponding to the layer information readout from the layer information storage section 133, the unit output calculation section 112 can calculate an output value of the unit with the output function set for each of the units corresponding to the output layer L3. Also, the unit output storage section 135 of each of the units stores the output value calculated as the node of the output layer L3, such that each of the units, when a token is inputted, can output an output value as an active node of the output layer L3.

Also, in response to input of the comparison matching signal from the unit number comparator section 115, the layer information calculation section 113 of each of the units increments the value of the layer information stored in the layer information storage section 133, whereby the value of the layer information becomes to be 3. Therefore, among the units, thereafter, one of the units in which a token is inputted outputs an output value as an active node of the output layer L3.

In the operation described above, the token is outputted from Unit U3 at the output layer L3 to Unit 4, and then, Unit U4 in which the token is inputted outputs an output value as a node of the output layer L3. However, in this example of the hierarchical neural network, a node corresponding to Unit U4 does not exist as a node of the output layer L3, it is desirable that Unit U4 does not output an output value as a node of the output layer L3. Alternatively, Unit U4, as a node of the output layer L3, may output 0 as an output value. Alternatively, at each of the units, the weight storage section 130 may store in advance a coupling weight of 0 to be multiplied with an output value from Unit U4 as belonging to the output layer L3.

By setting in advance an output value of Unit U4, or a coupling weight of each of the units that receive an output value from Unit U4, according to the number of nodes in each of the layers of the hierarchical neural network, even when a certain unit does not have a node corresponding to the unit in a certain layer, the parallel processing device in accordance with the present embodiment can operate without a problem as the hierarchical neural network.

As described above, when the present embodiment is applied to a hierarchical neural network, the number of neurons that fire at once is limited to one, in other words, the node that outputs an output value in the output layer is limited to one unit in which a token is inputted, whereby it is effective in suppressing an increase in wirings among the units.

Furthermore, because an output value from the unit that is one of the nodes in the output layer is distributed through the unit input bus 3 and inputted at once in all the units that are nodes of the input layer, it is effective in reducing the time required for distribution. Also, multiple ones of the units perform processing in parallel within the units, such that processing as a whole can be executed at higher speeds.

For example, in the case of processing with a hierarchical neural network, when a processor in related art is used, its calculation time may be approximated as follows: Calculation time=(the number of synapses×the number of steps required for each processing÷clock frequency). In contrast, when the parallel processing device in accordance with the present embodiment is used, the calculation time can be approximated as follows: Calculation time=(the number of neurons×the fire cycle of one neuron). Here, as the number of synapses is proportional to the square of the number of neurons, the calculation time can be considerably reduced by a hierarchical neural network that uses the parallel processing device in accordance with the present embodiment, compared to a hierarchical neural network using a processor in related art.

Also, the units can switch the layers in the hierarchical neural network, and function as nodes of an input side layer and nodes of an output side layer, such that processing by nodes of many layers can be executed with a fewer number of units.

In the first embodiment described above, the control device as the input layer L1 sequentially outputs an output value, and therefore the respective units function as nodes of the hidden layer L2 and the output layer L3. However, each of the units may be made to function as a node of the input layer L1. For example, the control device may sequentially output an output value corresponding to the nodes of the input layer L1, and each of the units, as the nodes of the input layer L1, may sequentially store the output value from the control device in the unit output storage section 135. Then, one of the units in which a token is inputted outputs an output value as an active unit of the input layer L1. In this manner, the respective units can function as units of the input layer L1, the hidden layer L2 and the output layer L3.

In the first embodiment described above, the case where the hierarchical neural network has three layers, the input layer L1, the hidden layer L2 and the output layer L3 is described. However, in accordance with the present embodiment, the hierarchical layers of the hierarchical neural network are not limited to three layers, but the present embodiment is also applicable to any arbitrary number of hierarchical layers.

Second Embodiment

Structure of Units when Applied to Self-Organizing Map

Next, an example in which the parallel processing device in accordance with the present embodiment is applied to a self-organizing map is described. A self-organizing map learns statistical characteristics of data composed of multivariable, arranges similar data to be close to one another, and enables visualization of data, by executing processings to be described below.

Each of the units has a coupling weight vector of the unit. First, when an input data vector is inputted in each of the units, and each of the units calculates a norm that is a difference between the input data vector inputted and the coupling weight vector (procedure A200). Next, one of the units with the smallest norm is selected as a winner unit (procedure A201). Then, the value of the coupling weight vector is modified by a predetermined function in a manner that the selected winner unit and its neighboring units become much closer to the input data vector, thereby performing learning (procedure A203). The procedures A200 through A203 are repeated.

When the parallel processing device in accordance with the present embodiment is applied to a self-organizing map, data to be inputted in each of the units is different in the aforementioned procedures, procedure A200, procedure A201 and procedure A202, respectively. Therefore, in accordance with the present embodiment, data to be inputted in each of the units is paired with identification information that identifies each of the aforementioned procedures procedure A200, procedure A201 and procedure A202, respectively, whereby the data can be identified.

Figure 9A:
FIG. 9 is a graph for describing a data structure in a self-organizing map.
Figure 9B:
Figure 9C:
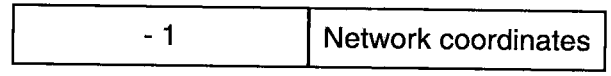
Figure 9D:
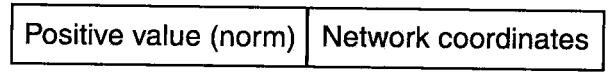

As shown in FIG. 9A, an input value from the unit input bus 3 has a norm section and a data section. Also, as shown in FIG. 9B, when the value of the norm section is −2, the norm section of the input value provides an identifier indicating that "the value of the data section is an input vector," and the data section contains an input vector. Also, as shown in FIG. 9C, when the value of the norm section is −1, the norm section indicates "neighborhood judgment identification information," and its data section contains network coordinates. Also, as shown in FIG. 9D, when the value of the norm section is zero or a positive value, the value of the norm section indicates a norm, and the data section contains network coordinates. Details of the above shall be described below.

Figure 7:
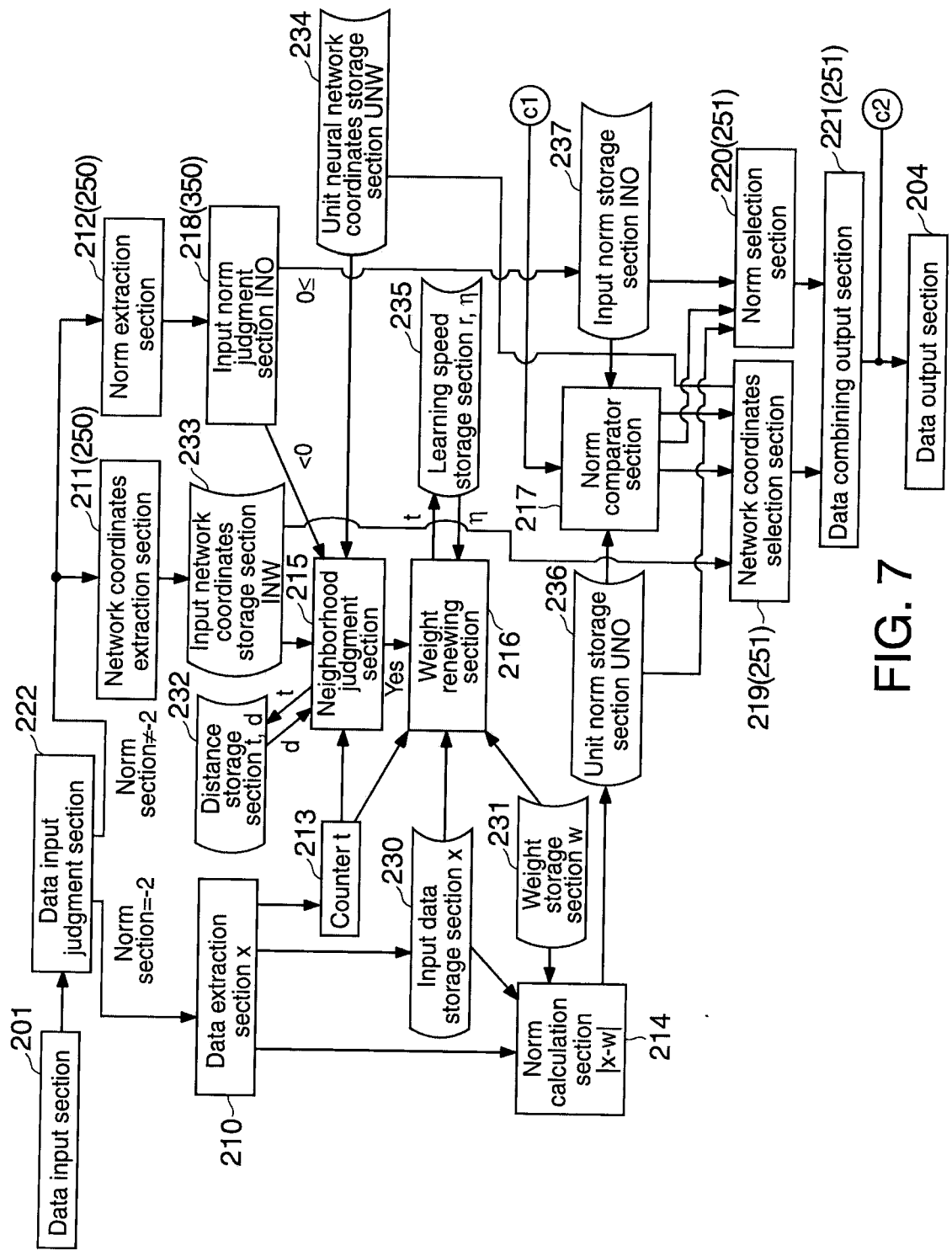
FIG. 7 is a first block diagram showing the structure of the unit shown in FIG. 2 in a self-organizing map.
Figure 8:
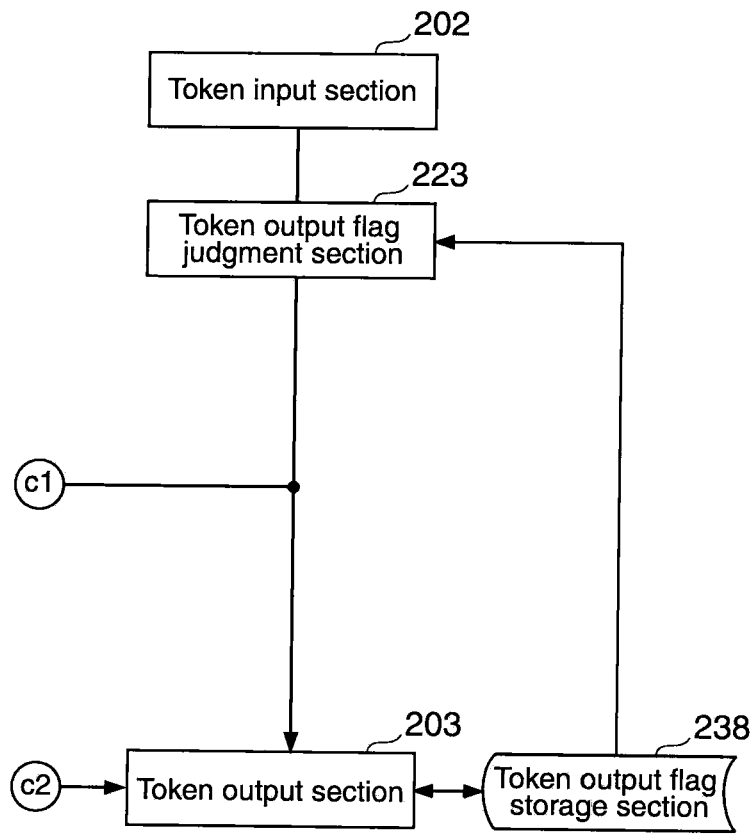
FIG. 8 is a second block diagram showing the structure of the unit shown in FIG. 2 in a self-organizing map.

With reference to FIG. 7 and FIG. 8, the structure of the units of the parallel processing device when applied to a self-organizing map is described. Here, each of the plurality of units is identified in advance by coordinates identified by network coordinates. It is noted that the units have a common structure, like the first embodiment, and therefore the structure of only one of the units is described.

In the structure of the unit shown in FIG. 7 and FIG. 8, a data input section 201 corresponds to the data input section 11, a data output section 204 corresponds to the data output section 14, a token input section 202 corresponds to the token input section 12, and a token output section 203 corresponds to the token output section 13. Also, a unit norm storage section 236, an input norm storage section 237, a unit network coordinates storage section 234, and an input network coordinates storage section 233 correspond to the unit output storage section 16. Also, the other compositions correspond to the unit processing section 15.

The unit network coordinates storage section 234 stores in advance unit network coordinates that are network coordinates of the unit. The input network coordinates storage section 233 stores input network coordinates that are network coordinates inputted. A weight storage section 231 stores in advance a coupling weight vector of the unit. An input data storage section 230 stores input data vector inputted. The unit norm storage section 236 stores a norm of the unit. The input norm storage section 237 stores a norm inputted.

A learning speed storage section 235 stores in advance a learning speed coefficient that determines a learning speed. Also, the learning speed storage section 235 stores in advance the number of learning steps indicating learning iterations, associated with the learning speed coefficient. A distance storage section 232 stores in advance a reference distance that is a reference to judge as to whether the distance between network coordinates are in neighborhood or not. Also, the distance storage section 232 stores the number of leaning steps and the reference distance associated in advance with each other.

A data input judgment section 222 judges as to whether an input value inputted in the data input section 201 is an input data vector, outputs an input data vector that is an input value in a data extraction section 210 when the input value is an input data vector, and outputs an input value to a network coordinates extraction section 211 and a norm extraction section 212 when the input value is not an input data vector.

The data input judgment section 222 judges as to whether an input value inputted in the data input section 201 is an input data vector by judging as to whether the norm value of the input value is −2 that is a value indicating that the input value is an input data vector.

When an input value inputted in the data input section 201 is an input data vector, the data extraction section 210 stores the inputted input data vector in the input data storage section 230. Also, the data extraction section 210 outputs the input data vector inputted to a norm calculation section 214. Also, the data extraction section 210 outputs a count-up signal to a counter 213 each time an input data vector is inputted.

Each time an input data vector is inputted in the unit, the counter 213 counts up the step number that is the number of times at which an input data vector is inputted in the unit. Also, the counter 213 counts up the step number each time a count up signal is inputted from the data extraction section 210.

When an input value inputted in the data input section 201 is an input data vector, the norm calculation section 214 calculates a norm between the input data vector inputted and a coupling weight vector readout from the weight storage section 231, and stores the calculated norm in the unit norm storage section 236 as a unit norm.

When an input value inputted in the data input section 201 is a pair of network coordinates and a norm, an input norm section 250 stores the inputted network coordinates in the input network coordinates storage section 233 as input network coordinates, and stores the inputted norm in the input norm storage section 237 as an input norm. The input norm section 250 is composed of the network coordinates extraction section 211, the norm extraction section 212 and an input norm judgment section 218.

The network coordinates extraction section 211 extracts network coordinates from an inputted input value, and stores the extracted network coordinates in the input network coordinates storage section 233 as input network coordinates. The norm extraction section 212 extracts a norm from an input value inputted, and outputs the extracted norm to the input norm judgment section 218.

The input norm judgment section 218 judges based on the value of the norm inputted from the norm extraction section 212 as to whether the norm inputted is a norm, or neighborhood judgment identification information that is identification information indicating to execute a neighborhood judgment with network coordinates, and stores an inputted norm in the input norm storage section 237 as an input norm when the inputted norm is a norm. On the other hand, when the inputted norm is neighborhood judgment identification information, the input norm judgment section 218 outputs the neighborhood judgment identification information to a neighborhood judgment section 215. For example, when the value of a norm inputted from the norm extraction section 212 is −1, the input norm judgment section 218 judges that the inputted norm is neighborhood judgment identification information. When the value of a norm inputted from the norm extraction section 212 is not −1, the input norm judgment section 218 judges that the inputted norm is a norm.

A norm comparator section 217 compares, in response to input of a token through the token input section 202, a unit norm readout from the unit norm storage section 236 and an input norm readout from the input norm storage section 237.

When the comparison result of the norm comparator section 217 indicates that the unit norm readout is smaller than the input norm, the selection output section 251 pairs the unit norm readout from the unit norm storage section 236 and the unit network coordinates readout from the unit network coordinates storage section 234, outputs the same through the data output section 204. When the unit norm readout is greater than the input norm, the selection output section 251 pairs the input norm readout from the input norm storage section 237 and the input network coordinates readout from the input network coordinates storage section 233, and outputs the same through the data output section 204. The selection output section 251 is composed of a network coordinates selection section 219, a norm selection section 220 and a data combining output section 221.

When the comparison result provided by the norm comparator section 217 indicates that the unit norm readout is smaller than the input norm, the norm selection section 220 reads the unit norm from the unit norm storage section 236, and outputs the unit norm readout to the data combining output section 221. Also, when the comparison result provided by the norm comparator section 217 indicates that the unit norm readout is greater than the input norm, the network coordinates selection section 219 reads the input norm from the input norm storage section 237, and outputs the input norm readout to the data combining output section 221.

When the comparison result provided by the norm comparator section 217 indicates that the unit norm readout is smaller than the input norm, the network coordinates selection section 219 reads network coordinates from the unit network coordinates storage section 234, and outputs the unit network coordinates readout to the data combining output section 221. When the comparison result provided by the norm comparator section 217 indicates that the unit norm readout is more than the input norm, the network coordinates selection section 219 reads input network coordinates from the input network coordinates storage section 233, and outputs the input network coordinates readout to the data combining output section 221.

The data combining output section 221 combines a norm that may be a unit norm inputted from the norm selection section 220 or an input norm with network coordinates that may be unit network coordinates inputted from the network coordinates selection section 219 or input network coordinates as a pair, and outputs the norm and the network coordinates combined as a pair through the data output section 204.

When an input value inputted in the data input section 201 is a pair of network coordinates and neighborhood judgment identification information that is identification information indicating to execute a neighborhood judgment step, the neighborhood judgment section 215 judges as to whether the unit network coordinates readout from the unit network coordinates storage section 234 are in neighborhood of input network coordinates that are inputted network coordinates.

Also, in response to input of neighborhood judgment identification information from the input norm section 250 or the input norm judgment section 218, the neighborhood judgment section 215 judges as to whether unit network coordinates readout from the unit network coordinates storage section 234 are in neighborhood of input network coordinates that are inputted network coordinates.

Also, when an input value inputted in the data input section 201 is a pair of network coordinates and neighborhood judgment identification information that is identification information indicating to execute a neighborhood judgment, the neighborhood judgment section 215 reads a reference distance from the distance storage section 232, and judges as to whether the distance between the unit network coordinates readout from the unit network coordinates storage section 234 and the input network coordinates that are inputted network coordinates is less than the reference distance readout, thereby judging as to whether the unit network coordinates are in neighborhood of the input network coordinates.

Also, the neighborhood judgment section 215 reads a reference distance associated with the number of learning steps that matches with the number of steps readout from the counter 213, and judges based on the reference distance as to whether the unit network coordinates are in neighborhood of the input network coordinates.

A weight update section 216 updates the value of the coupling weight vector stored in the weight storage section 231, when the result of judgment made by the neighborhood judgment section 215 indicates neighborhood. Also, the weight update section 216 calculates a difference between an input data vector readout from the input data storage section 230 and a coupling weight vector readout from the weight storage section 231, multiplies the calculated difference with a learning speed coefficient readout from the learning speed storage section 235 and adds the resultant multiplication value to a coupling weight vector stored in the weight storage section 231, thereby updating the value of the coupling weight vector stored in the weight storage section 231.

Also, the weight update section 216 reads from the learning speed storage section 235 a learning speed coefficient associated with the learning step number matching with the step number readout from the counter 213, and updates the coupling weight vector stored in the weight storage section 231 based on the learning speed coefficient readout.

A token output flag storage section 238 stores a token output flag that indicates as to whether the token output section 203 has already outputted a token. A token output flag judgment section 223 reads, in response to input of a token in the token input section 202, the token output flag from the token output flag storage section 238. When the token output flag readout indicates that a token has not been outputted, the token output flag judgment section 223 outputs the token inputted to the norm comparator section 217, and outputs the inputted token through the token output section 203.

In response to input of a token in the token input section 202, the token output section 203 outputs the token. Also, in response to an event that the data combining output section 221 or the selection output section 251 outputs the unit norm readout from the unit norm storage section 236 and the unit network coordinates readout from the unit network coordinates storage section 234 as a pair through the data output section 204, or outputs the input norm readout from the input norm storage section 237 and the input network coordinates readout from the input network coordinates storage section 233 as a pair through the data output section 204, the token output section 203 outputs a token. Also, after outputting the token, the token output section 203 updates the token output flag stored in the token output flag storage section 238 as having been outputted.

Operation of Unit when Applied to Self-Organizing Map

Figure 10:
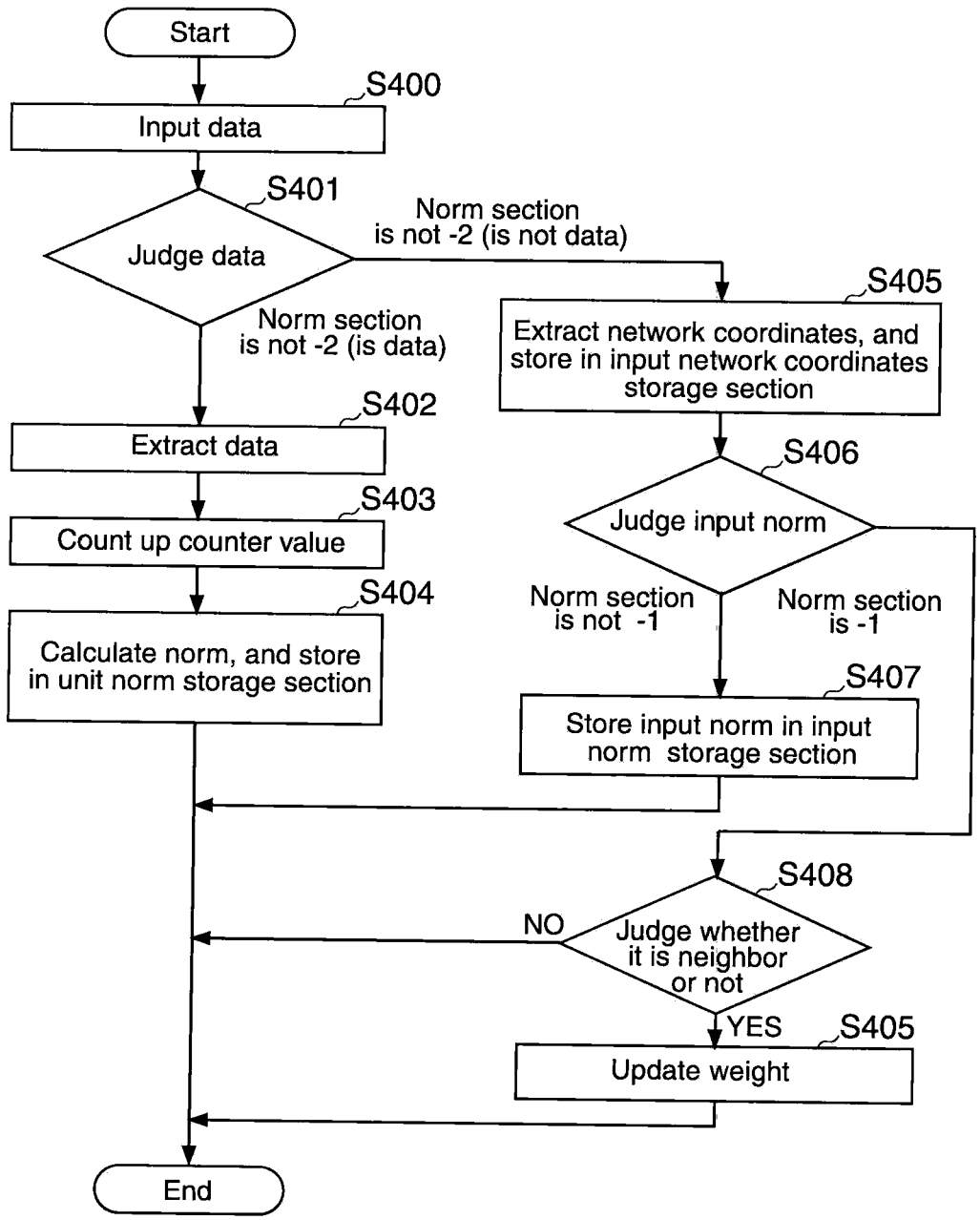
FIG. 10 is a first flow chart showing operations of the unit shown in FIG. 7 and FIG. 8.
Figure 11:
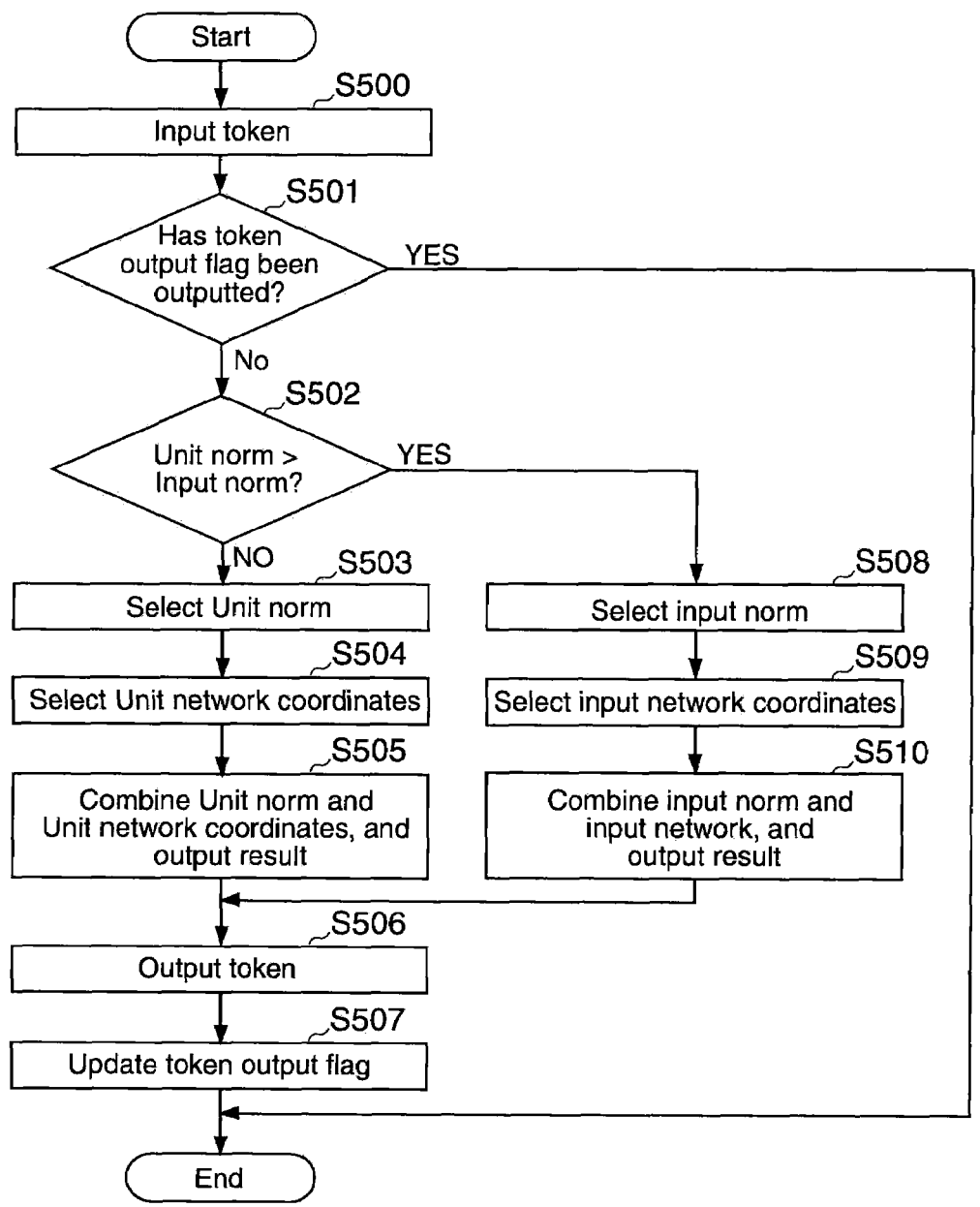
FIG. 11 is a second flow chart showing operations of the unit shown in FIG. 7 and FIG. 8.

Next, with reference to FIG. 10 and FIG. 11, operations of the units of the parallel processing device when applied to a self-organizing map are described. First, with reference to FIG. 10, operations executed when an input value is inputted in the data input section of the unit are described.

First, data that is an input value is inputted in the data input section 201 (step S400). Next, the data input judgment section 222 judges as to whether an input value inputted in the data input section 201 is an input data vector by judging as to whether the norm value of the input value is −2 that is a value indicating that the input value is an input data vector (step S401).

Next, when the result of judgment in step S401 indicates that the value of the norm is −2 and thus an input data vector, the data extraction section 210 stores the inputted input data vector in the input data storage section 230 (step S402), and also outputs a count-up signal to a counter 213. Next, the counter 213 counts up the step number, in response to input of the count-up signal from the data extraction section 210 (step S403).

Next, the norm calculation section 214 calculates a norm between the input data vector inputted through the data extraction section 210 and a coupling weight vector readout from the weight storage section 231, and stores the calculated norm in the unit norm storage section 236 as a unit norm (step S404), and ends the process.

On the other hand, when the result of judgment in step S401 indicates that the value of the norm is not −2, and thus not an input data vector, the network coordinates extraction section 211 extracts network coordinates from the input value inputted, and stores the extracted network coordinates in the input network coordinates storage section 233 as input network coordinates (step S405), and the norm extraction section 212 extracts a norm from the input value inputted, and outputs the extracted norm to the input norm judgment section 218.

Next, the input norm judgment section 218 judges as to whether the value of the norm inputted from the norm extraction section 212 is −1 (step S406), judges that it is a norm when the result of judgment indicates that the value of the norm inputted from the norm extraction section 212 is not −1, stores the inputted norm in the input norm storage section 237 as an input norm (step S407), and ends the process.

On the other hand, when the result of judgment in step S406 indicates that the value of the norm inputted from the norm extraction section 212 is −1, the input norm judgment section 218 judges that the norm inputted is neighborhood judgment identification information, and outputs the neighborhood judgment identification information to the neighborhood judgment section 215. Next, in response to input of the neighborhood judgment identification information from the input norm judgment section 218, the neighborhood judgment section 215 judges as to whether the unit network coordinates readout from the unit network coordinates storage section 234 are in neighborhood of input network coordinates that are inputted network coordinates (step S408).

When the result of judgment in step S408 indicates that they are in neighborhood, the weight update section 216 updates the value of the coupling weight vector stored in the weight storage section 231 (step S409), and ends the process. On the other hand, when the result of judgment in step S408 indicates that they are not in neighborhood, the process is ended.

Next, with reference to FIG. 11, operations to be executed when a token is inputted in the token input section of the unit are described. First, a token is inputted in the token input section 202 (step S500). Then, the token output flag judgment section 223 reads, in response to input of the token in the token input section 202, the token output flag from the token output flag storage section 238, and judges as to whether the token output flag readout indicates that a token has not been outputted (step S501). When the token output flag readout indicates that a token has not been outputted, the token output flag judgment section 223 outputs the inputted token to the norm comparator section 217, and also outputs the inputted token through the token output section 203.

Next, in response to input of a token through the token input section 202, the norm comparator section 217 compares the unit norm readout from the unit norm storage section 236 with the input norm readout from the input norm storage section 237 (step S502).

When the result of comparison by the norm comparator section 217 indicates that the unit norm readout is smaller than the input norm, the norm selection section 220 reads the unit norm from the unit norm storage section 236, and outputs the readout unit norm to the data combining output section 221 (step S503), and the network coordinates selection section 219 reads the unit network coordinates from the unit network coordinates storage section 234, and outputs the unit network coordinates readout to the data combining output section 221 (step S504).

Next, the data combining output section 221 combines the unit norm inputted from the norm selection section 220 and the unit network coordinates inputted from the network coordinates selection section 219 as a pair, and outputs the combined unit norm and unit network coordinates through the data output section 204 (step S505).

On the other hand, the result of comparison given by the norm comparator section 217 in step S502 indicates that the unit norm readout is more than the input norm, the norm selection section 220 reads the input norm from the input norm storage section 237, and outputs the readout input norm to the data combining output section 221 (step S508), and the network coordinates selection section 219 reads the input network coordinates from the input network coordinates storage section 233, and outputs the readout input network coordinates to the data combining output section 221 (step S509).

Next, the data combining output section 221 combines the input norm inputted from the norm selection section 220 and the input network coordinates inputted from the network coordinates selection section 219 as a pair, and outputs the combined input norm and network coordinates through the data output section 204 (step S510).

Next, in response to an event in step S505 in which the data combining output section 221 outputs the unit norm readout from the unit norm storage section 236 and the unit network coordinates readout from the unit network coordinates storage section 234 combined as a pair through the data output section 204, or in response to an event in step S510 in which the data combining output section 221 outputs the input norm readout from the input norm storage section 237 and the input network coordinates readout from the input network coordinates storage section 233 combined as a pair through the data output section 204, the token output section 203 outputs a token (step S506).

Next, after outputting the token, the token output section 203 updates the token output flag stored in the token output flag storage section 238 as having been outputted (step S507).

Overall Operation of Parallel Processing Device when Applied to Self-Organizing Map Next, overall operations of the parallel processing device when it is applied to a self-organizing map are described. First, the control device inputs an input value composed of a pair of an input vector and a norm having a value of −2 in all of the units through the unit input bus 3 (procedure A300).

Next, the norm calculation section 214 of each of the units in which the input vector is inputted calculates a norm between the input vector inputted and a coupling weight vector of each of the units, respectively, and stores the calculated norm in the unit norm storage section 236 (procedure A301).

Then, the control device inputs a token in Unit U1 (procedure A302). Next, in response to input of the token through the token input section 202 of Unit U1, the norm comparator section 217 of Unit U1 compares the unit norm readout from the unit norm storage section 236 and the input norm readout from the input norm storage section 237 (procedure A303).

It is noted here that the following description shall be made, assuming that the input norm storage section 237 of Unit U1 stores in advance a norm having a substantially large value compared to the norm calculated by Unit U1 in procedure A301.

In this case, as the unit norm readout from the unit norm storage section 236 is smaller than the input norm readout from the input norm storage section 237, the selection output section 251 of Unit U1 outputs the unit norm readout from the unit norm storage section 236 and the unit network coordinates readout from the unit network coordinates storage section 234 as a pair through the data output section 204 (procedure A304).

Next, the pair of norm and network coordinates outputted from the data output section 204 of Unit U1 is inputted through the unit output bus 2, the amplifier 4 and the unit input bus 3 in the data input section 201 of each of the units (procedure A305).

Next, as the value of the norm of the input value inputted in the data input section 201 is not −1, the input norm section 250 of each of the units stores the inputted network coordinates in the input network coordinates storage section 233 as input network coordinates, and stores the inputted norm in the input norm storage section 237 as an input norm (procedure A306). It is noted that the network coordinates stored in the input network coordinates storage section 233 and the norm stored in the input norm storage section 237 are the network coordinates and the norm of Unit U1.

Next, in response to an event in which the data combining output section 221 or the selection output section 251 outputs the unit norm readout from the unit norm storage section 236 and the unit network coordinates readout from the unit network coordinates storage section 234 as a pair through the data output section 204, the token output section 203 of Unit U1 outputs a token through the daisy chain control bus 1 to Unit U2 (procedure A307).

Next, like Unit U1 in procedure A303, in response to input of the token from Unit U1 through the token input section 202 of Unit U2, the norm comparator section 217 of Unit U2 compares the unit norm readout from the unit norm storage section 236 with the input norm readout from the input norm storage section 237 (procedure A308).

It is noted here that the input norm stored in the input norm storage section 237 is the norm of Unit U1, and the unit norm readout from the unit norm storage section 236 is the norm of Unit U2, such that the norm comparator section 217 of Unit U2 compares the norm of Unit U2 with the norm of Unit U1. Hereafter, based on the result of comparison of the norm comparator section 217 of Unit U2, the processing from procedure A304 through procedure A306 is similarly executed (procedure A309).

Accordingly, the token is inputted in Unit U2, the norms of Unit 1 and Unit 2 are compared, one of the units having a smaller norm is selected as a winner unit, and a norm and unit network coordinates of the winner unit are stored in the input norm storage section 237 and the input network coordinates storage section 233 of each and all of the units (procedure A310).

Next, like procedure A307, the token is transmitted from Unit U2 to Unit U3, and Unit U3 executes the processing from procedure A303 to procedure A307, whereby the norm of the winner unit between Unit U1 and Unit U2 is compared with a norm of Unit U3, and a winner unit among these units Unit U1 through Unit U3 is selected (procedure A311).

Hereafter, each time a token is passed onto other units in the daisy chain order, a winner unit is selected in a unit in which the token is inputted (procedure A312). Then, when a token is inputted in Unit U10 that is the last unit in the daisy chain order, the data output section 204 of Unit U10 outputs a norm and network coordinates of a winner unit among the units Unit U1 through Unit U10 (procedure A313).

The control device receives the norm and the network coordinates outputted from the data output section 204 of Unit U10 as a norm and network coordinates of the winner unit (procedure A314). By this, the control device can receive the norm and the network coordinates of the winner unit for the input vector.

Next, the control device inputs an input value composed of a pair of the network coordinates received from the data output section 204 of Unit U10 and a norm having a value of −1 in all of the units through the unit input bus 3 (procedure A315).

Next, upon receiving the input value composed of a pair of the network coordinates and the norm having a value being −1 at each of the units, the network coordinates extraction section 211 of each of the units extracts the network coordinates from the input value inputted, and stores the extracted network coordinates in the input network coordinates storage section 233 as input network coordinates (procedure A316), and the input norm judgment section 218 of each of the units judges that the norm inputted is neighborhood judgment identification information because the value of the norm inputted from the norm extraction section 212 is −1, and outputs the neighborhood judgment identification information to the neighborhood judgment section 215 (procedure A317).

Next, in response to input of the neighborhood judgment identification information from the input norm section 250 or the input norm judgment section 218, the neighborhood judgment section 215 of each of the units judges as to whether unit network coordinates readout from the unit network coordinates storage section 234 are in neighborhood of the input network coordinates readout from the input network coordinates storage section 233 (procedure A318).

When the result of judgment by the neighborhood judgment section 215 of the unit indicates that they are in neighborhood, the weight update section 216 of each of the units updates the value of the coupling weight vector stored in the weight storage section 231 of the unit (procedure A319). By this, the coupling weight vector of the unit in neighborhood of the network coordinates of the winner unit is updated, whereby learning is performed.

In the parallel processing device when applied to a self-organizing map described above, the entire units are connected to the unit input bus 3, such that, as the control device inputs an input vector in the unit input bus 3 once, the input vector can be inputted in the entire units. Also, each of the units can calculate a norm in parallel for an input vector inputted, the entire units can calculate the norms in a short time.

Also, the entire units are connected to the unit input bus 3, such that, as the control device inputs network coordinates of a winner unit in the unit input bus 3 once, the network coordinates of the winner unit can be inputted in the entire units. Also, each of the units judges and learns in parallel as to whether they are in neighborhood of the network coordinates of the winner unit, such that the entire units can learn in a short time.

Furthermore, by passing a token among the units through the daisy chain control bus 1, winner units can be decided sequentially in the daisy chain order. In other words, decisions on winner units can be made through the daisy chain control bus 1, which is a simple wiring.

Parallel Processing Device with Redundancy

Figure 12:
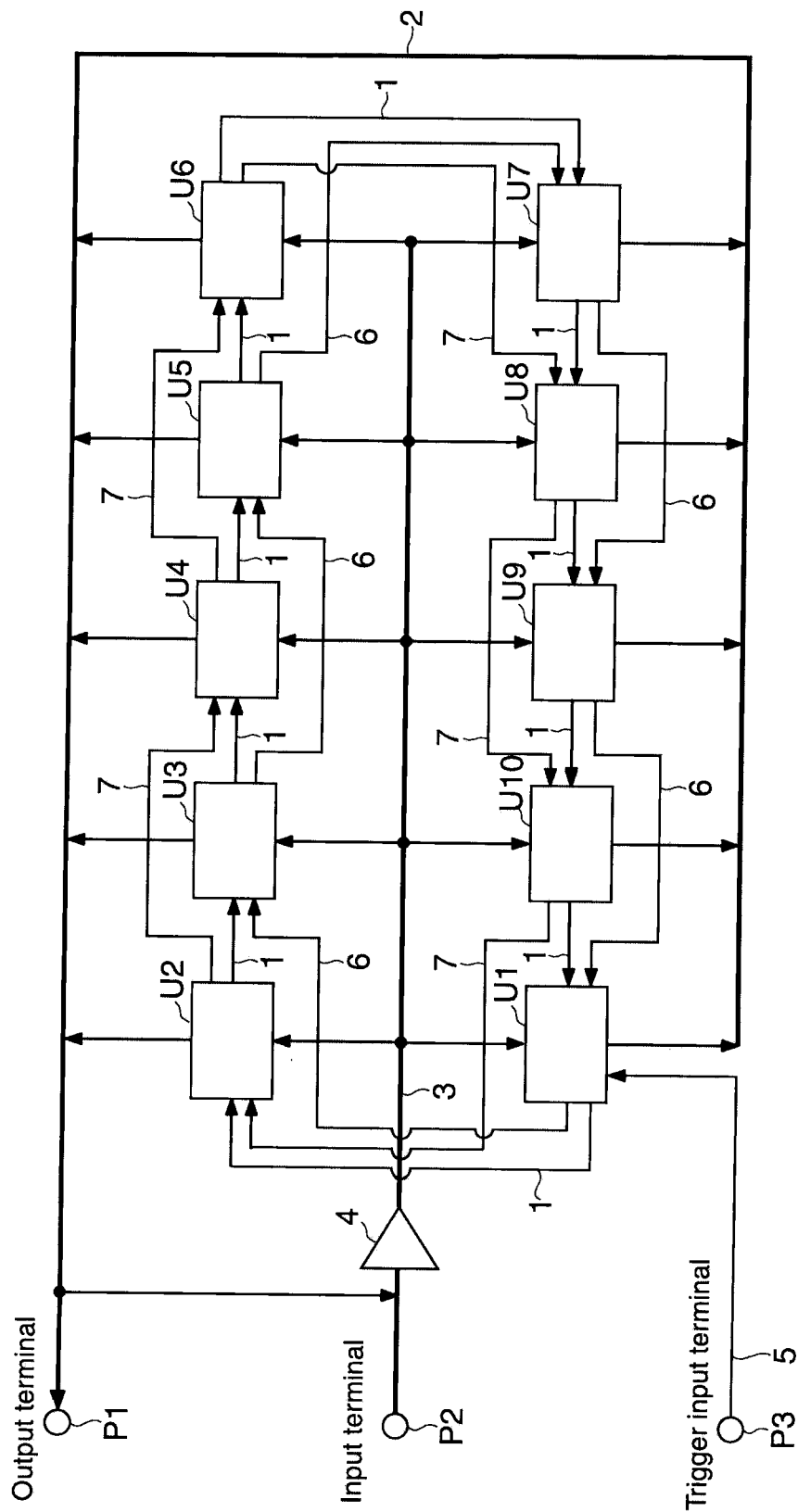
FIG. 12 is a block diagram showing the structure of a parallel processing device having a redundancy circuit.

Next, with reference to FIG. 12, the structure of a parallel processing device with redundancy provided for the daisy chain control bus shall be described. Among plural units, a half of the units are daisy chained by a first redundancy daisy chain control bus 6 in a first redundancy order that alternately skip one unit in a daisy chain order that is a predetermined order. For example, Unit U1, Unit U3, Unit U5, Unit U7 and Unit 9 are daisy chained by the first redundancy daisy chain control bus 6.

Also, in the daisy chain order that is a predetermined order, the remaining half of the units among the plural units which are not daisy chained by the first redundancy daisy chain control bus 6 are daisy chained by a second redundancy daisy chain control bus 7 in an alternately skipping order. For example, Unit U2, Unit U4, Unit U6, Unit U8 and Unit U10 are daisy chained by the second redundancy daisy chain control bus 7.

Figures 13A, 13B:
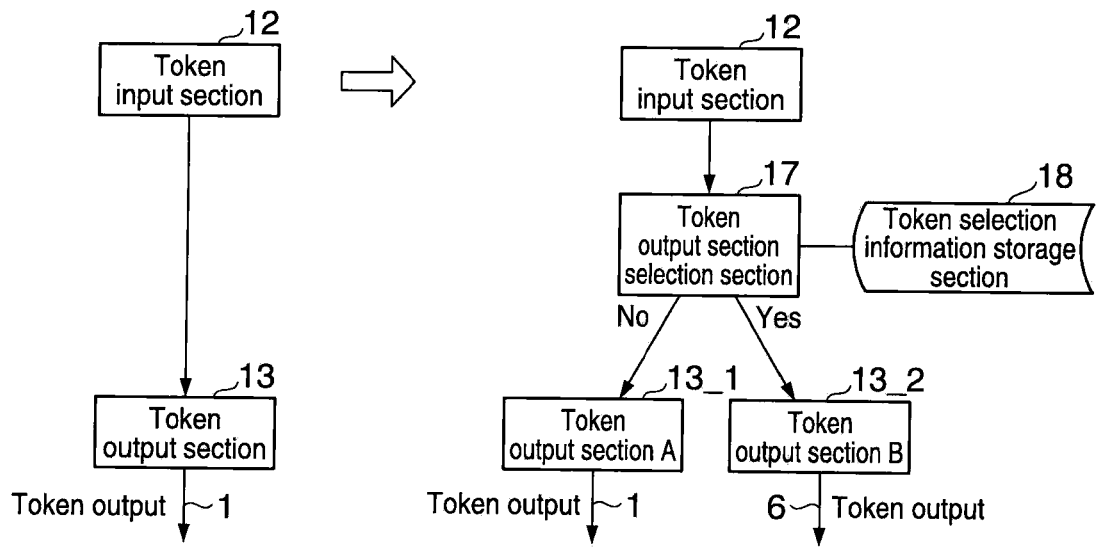
FIGS. 13A-13D are block diagrams of the structure of the unit shown in FIG. 12.

Next, referring to FIGS. 13A-3D, the structure of the units that are daisy chained by the first redundancy daisy chain control bus 6 is described. In other words, for example, the structure of Unit U1, Unit U3, Unit U5, Unit U7 and Unit 9 is described. It is noted that only portions of the structure that may be modified due to the redundancy shall be described, and therefore only portions in the structure of the unit shown in FIG. 2 are described below.

Figures 13C, 13D:
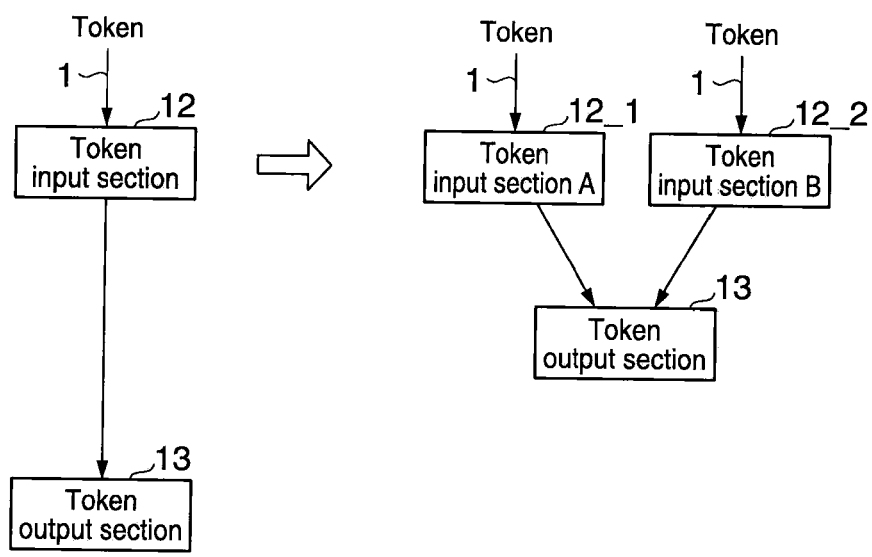

Among FIGS. 13A-13D, FIGS. 13A and 13C show the structures of the units shown in FIG. 2 before modification. Because the parallel processing device is provided with redundancy, the structure of the unit shown in FIG. 13A is modified to the one shown in FIG. 13B. Furthermore, the structure of the unit shown in FIG. 13C is modified to the one shown in FIG. 13D.

As shown in FIG. 13B, the unit has a token output section A13_1, a token output section B13_2, a token output section selection section 17, and a token selection storage section 18. In here, the token output section A13_1 corresponds to the token output section 13 in FIG. 2.

In response to input of a token in the token input section 12, the token output section B13_2 (redundancy token output section) outputs a token to one succeeding unit in the redundancy order through the first redundancy daisy chain control bus 6. The token selection information storage section 18 stores token output selection information that indicates which one of the token output sections, the token output section A13_1 or the token output section B13_2, is to be selected.

In response to input of a token in the token input section 12, the token output section selection section 17 selects one of the token output section A13_1 and the token output section B13_2 based on the token output selection information readout from the token selection information storage section 18, and outputs a token through the selected token output section A13_1 or token output section B13_2.

Also, as shown in FIG. 13D, the unit has a token input section A12_1 and a token input section B12_2 (redundancy token input section). Here, the token input section A12_1 corresponds to the token input section 12 in FIG. 2.

The token input section B12_2 receives a token as an input from one preceding unit in the units that are daisy chained in the redundancy order through the first redundancy daisy chain control bus 6. Also, in response to input of the token in the token input section A12_1 or the token input section B12_2, the token output section 13 outputs a token.

Also, like the units daisy chained through the first redundancy daisy chain control bus 6, each of the units daisy chained through the second redundancy daisy chain control bus 7 has a token output section B13_2 (redundancy token output section), a token selection information storage section 18, a token output section selection section 17, and a token input section B12_2 (redundancy token input section).

It is noted that, in the example described above, the token selection information storage section 18 stores token output selection information that indicates which one of the token output sections, the token output section A13_1 or the token output section B13_2, is to be selected. However, the token output selection information may be, for example, information that indicates whether the next unit in the daisy chain order has a defect.

When the token output selection information is information that indicates whether the next unit in the daisy chain order has a defect, the token output section selection section 17 outputs a token through selecting the token output section A13_1, when the next unit in the daisy chain order does not have a defect, based on the token output selection information readout from the token selection information storage section 18, or conversely outputs a token through selecting the token output section B13_2 when the next unit has a defect.

Defect Checking Method

Next, a defect checking method is described. In this example, a case where the parallel processing device forms a hierarchical neural network is described. First, the parallel processing device of the neural network executes processing as a hierarchical neural network having two layers composed of an input layer and an output layer without an intermediate layer, with the entire coupling coefficients being identical, and the control device obtains an output value as a processing result. The control device judges on the output value, and ends the processing if the output value is normal. The control device judges on the output value, and when an abnormality is detected, writes defect information to the token selection information storage section 18 of a preceding stage unit preceding to the abnormal unit.

Next, a judgment method and its processings to be executed by the control device in the case of a normal case and an abnormal case are described in detail. First, the control device judges an event as being normal when the same outputs are obtained from the entire units. Next, the control device judges an event as being abnormal when the output from a unit stops halfway, or the output value from a unit has a portion different from the expected value. In this case, the control device writes defect information to the token selection information storage section 18 of one preceding unit in the daisy chain order with respect to an abnormal unit that is the unit detected as being abnormal, executes defect checking again, and executes defect checking until the judgment result becomes normal. In this instance, for preparation against an occurrence of necessity to electrically cut off because of defects, a high impedance switch may be provided at an input/output section of each unit, thereby providing a mechanism to electrically cut off the circuit.

As described above, as the parallel processing device is provided with redundancy by the first redundancy daisy chain control bus 6 and the second redundancy daisy chain control bus 7, the parallel processing device can be operated without a problem even when defects occur in the daisy chain control bus 1 or any of the units.

It is noted that the description is made above as to the case where the redundancy wiring is composed of the first redundancy daisy chain control bus 6 and the second redundancy daisy chain control bus 7 in which every other unit is skipped in the daisy chain order. Furthermore, another redundancy daisy chain control bus of a two-unit skipping in the daisy chain order may be added.

Second Base Structure

Next, a second base structure of the parallel processing device in accordance with an embodiment of the invention is described with reference to a schematic block diagram of FIG. 14. Compositions identical with those of the first base structure in FIG. 1 shall be appended with the same reference numerals, and their description shall be omitted. Here, a case where the parallel processing device is provided with ten units, Unit AU1 to Unit AU10, is described. The units shall be described in detail below.

The parallel processing device in accordance with the second base structure includes a plurality of units (AU1-AU10) that are identified by characteristic unit numbers that are predetermined identification numbers, respectively, and a distribution control section 8 that, in response to input of an output value outputted from one of the units among the multiple units through the unit output bus 2, outputs a control data containing the input value inputted and a selection unit number that is an identification number identifying one of the units selected among the multiple units to the plurality of units through the unit input bus 3. It is noted that the control data includes the input value, the selection unit number and a control code for selecting a processing method or a control method of the units.

Figure 15:
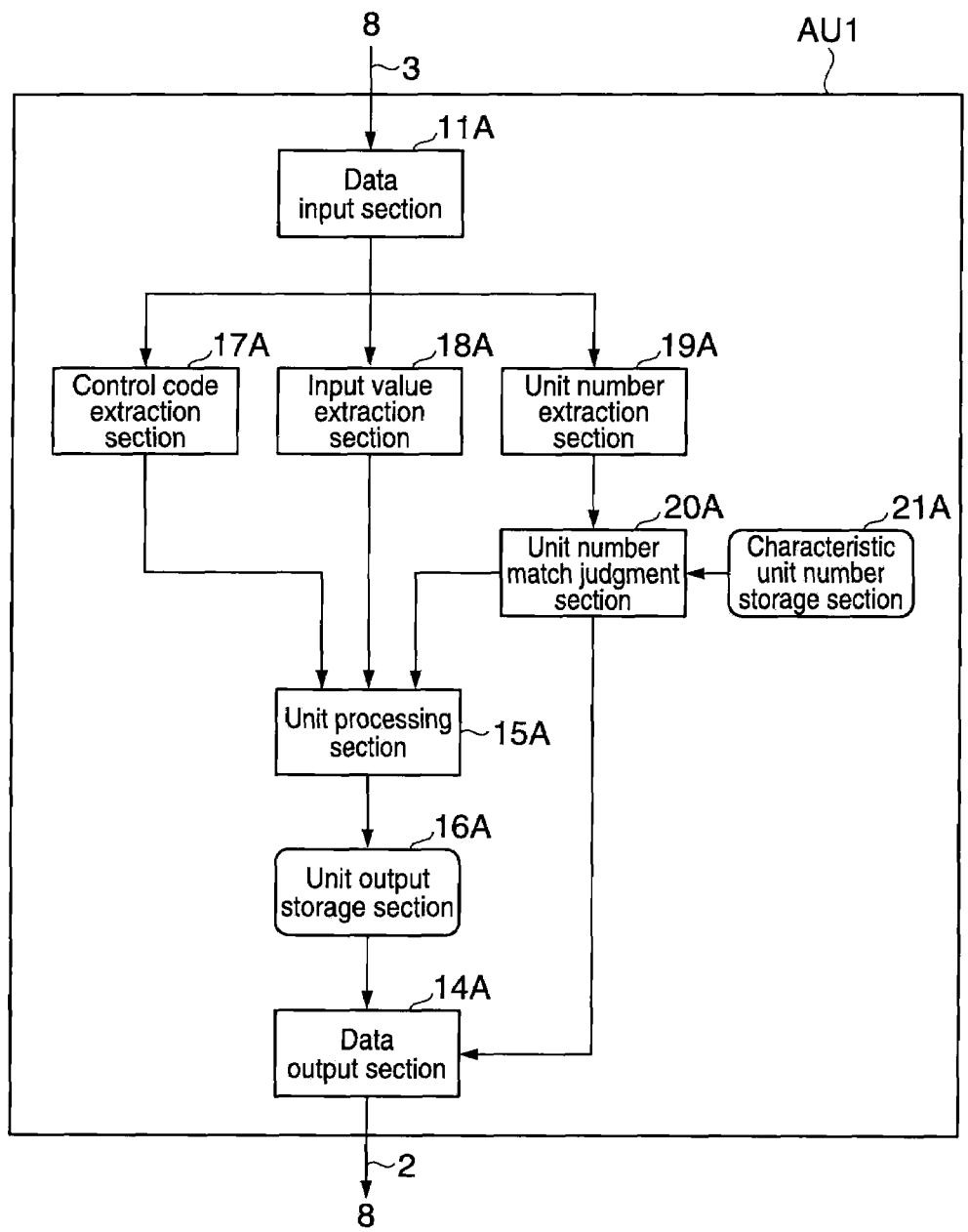
FIG. 15 is a block diagram of the structure of the unit shown in FIG. 14.

Referring to FIG. 15, the structure of each of the units is described. It is noted that the units Unit AU1 through Unit AU10 have an identical structure, and therefore the structure of only Unit AU1 is described. Unit AU1 has a data input section 11A, a data output section 14A, a unit processing section 16A, a unit output storage section 16A, a control code extraction section 17A, an input value extraction section 18A, a unit number extraction section 19A, a unit number match judgment section 20A, and a characteristic unit number storage section 21A.

The characteristic unit number storage section 21A stores in advance a characteristic unit number that is an identification number for identifying each of the units. The unit output storage section 16A stores a processing result that is a result of processing executed by the unit processing section 16A. The data input section 11A inputs a control data sent from the distribution control section 8 through the unit input bus 3. The input value extraction section 18A extracts an input value from control data inputted in the data input section 11A. The selection unit number extraction section 19A extracts a selection unit number from the control data inputted in the data input section 11A. The control code extraction section 17A extracts a control code from the control data inputted in the data input section 11A.

The unit number match judgment section 20A judges as to whether an output unit number contained in control data inputted in the data input section 11A matches the characteristic unit number. The unit number match judgment section 20A judges as to whether the selection unit number extracted by the selection unit number extraction section 19A and the characteristic unit number readout from the characteristic unit number storage section 21A.

The unit processing section 15A performs processing based on an input value contained in control data inputted in the data input section 11A by a processing method predetermined for each of the units. The unit processing section 15A performs processing based on an input value extracted by the input value extraction section 18A by a processing method predetermined for each of the units. Also, the unit processing section 15A selects a processing method among predetermined processing methods based on a control code extracted by the control code extraction section 17A, and performs processing by the selected processing method. Also, the unit processing section 15A stores a processing result that is the result of processing in the unit output storage section 16A.

When the result of judgment made by the unit number match judgment section 20A indicates matching, the data output section 14A outputs the processing result that is the result of processing by the unit processing section 15A as an output value to the distribution control section 8 through the unit output bus 2. Also, when the result of judgment made by the unit number match judgment section 20A indicates matching, the data output section 14A reads the processing result from the unit output storage section 16A, and outputs the processing result readout as an output value to the distribution control section 8 through the unit output bus 2.

Figure 16:
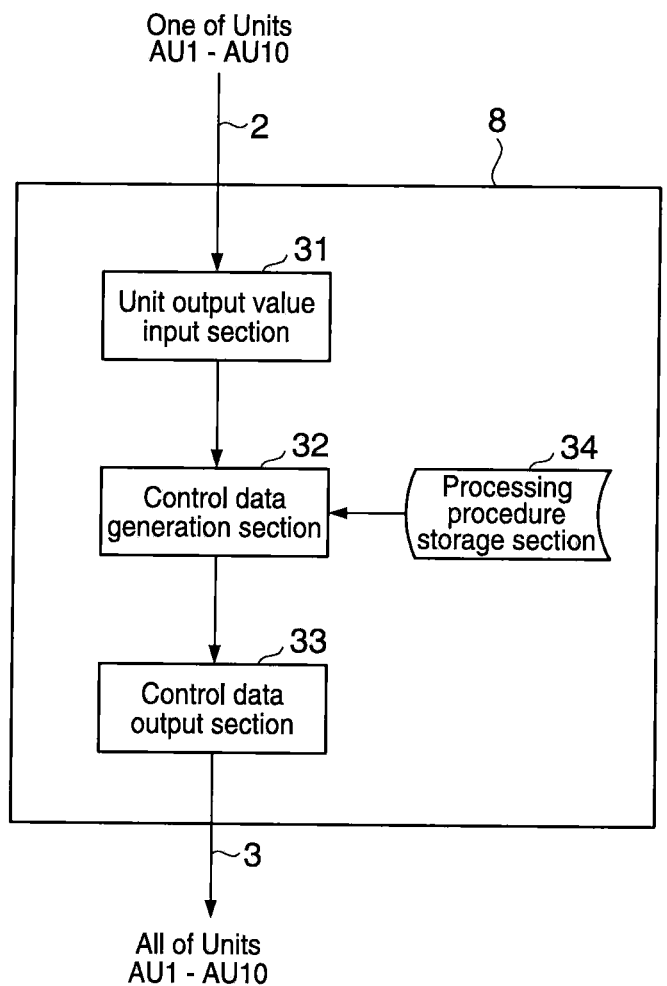
FIG. 16 is a block diagram of the structure of a distribution control section 8 shown in FIG. 14.

Next, referring to FIG. 16, the structure of the distribution control section 8 is described. The distribution control section 8 has a unit output value input section 31, a control data generation section 32, a control data output section 33, and a processing procedure storage section 34. The unit output value input section 31 receives as an input an output value outputted from one of the units among the plural units through the unit output bus 2. The control data generation section 32 generates control data according to a predetermined processing procedure based on the output value inputted in the unit output value input section 31. The control data output section 33 outputs the control data generated by the control data generation section 32 to each of the multiple units through the unit input bus 3. It is noted that the control data output section 33 may internally have an amplifier that electrically amplifies control data to be outputted.

The processing procedure storage section 34 stores in advance a processing procedure to execute processing. The control data generation section 32 sequentially reads the processing procedure from the processing procedure storage section 34, and inserts an output value inputted in the unit output value input section 31 in the processing procedure readout if necessary, thereby generating control data according to the predetermined processing procedure.

In response to input of an output value in the unit output value input section 31, or after a predetermined time has passed since the control data output section 33 outputs control data, the control data generation section 32 of the distribution control section 8 generates control data. Therefore, in response to input of an output value in the unit output value input section 31, or after a predetermined time has elapsed since the control data output section 33 outputs control data, the distribution control section 8, more specifically, the control data output section 33 of the distribution control section 8 outputs the control data.

Also, the distribution control section 8 sets, as an input value that is data such as an initial value is inputted from outside through the input terminal P2, the inputted input value at each of the units through the unit input bus 3, thereby executing parallel processing using each of the units. Also, the distribution control section 8 receives the processing result calculated by each of the units as an input sent from each of the units through the unit output bus 2, and outputs the inputted processing result to outside through the output terminal P1. It is noted that the term "outside" refers to a control device, a computer or the like provided outside the parallel processing device.

According to the second base structure of the parallel processing device described with reference to FIGS. 14 through 16, the distribution control section 8 controls each of the units with control data, and therefore it is effective in that processing by each of the units becomes easier, compared to the first base structure of the parallel processing device shown in FIG. 1, and the daisy chain control bus 1 that connects the units in the daisy chain order becomes unnecessary.

Third Embodiment

Structure of Unit when Applied to Hierarchical Neural Network

Next, the structure of a parallel processing device in accordance with the second base structure when applied to a hierarchical neural network is described. In the hierarchical neural network, the overall structure of the parallel processing device is generally the same as the structure of the parallel processing device shown in FIG. 14, and only the structure of each of the units is different. Therefore, referring to FIG. 17, only the structure of the unit when applied to a hierarchical neural network is described.

The unit includes a data input section 101A, a data output section 104A, a weight storage section 130, a product-sum calculation first value storage section 131, a layer information storage section 133, a function storage section 132, a unit output storage section 135A, a preceding stage unit output storage section 138B, a preceding stage unit number storage section 139B, a selection unit number storage section 141B, and a characteristic unit number storage section 140B. Also, the unit has a product-sum calculation first value calculation section 111A, a unit output calculation section 112A, a comparator section 115B, a unit control section 116B, a function number extraction section 150B, a function number storage section 151B, an operand extraction section 152B, and a general purpose buffer storage section 153B.

Figure 17:
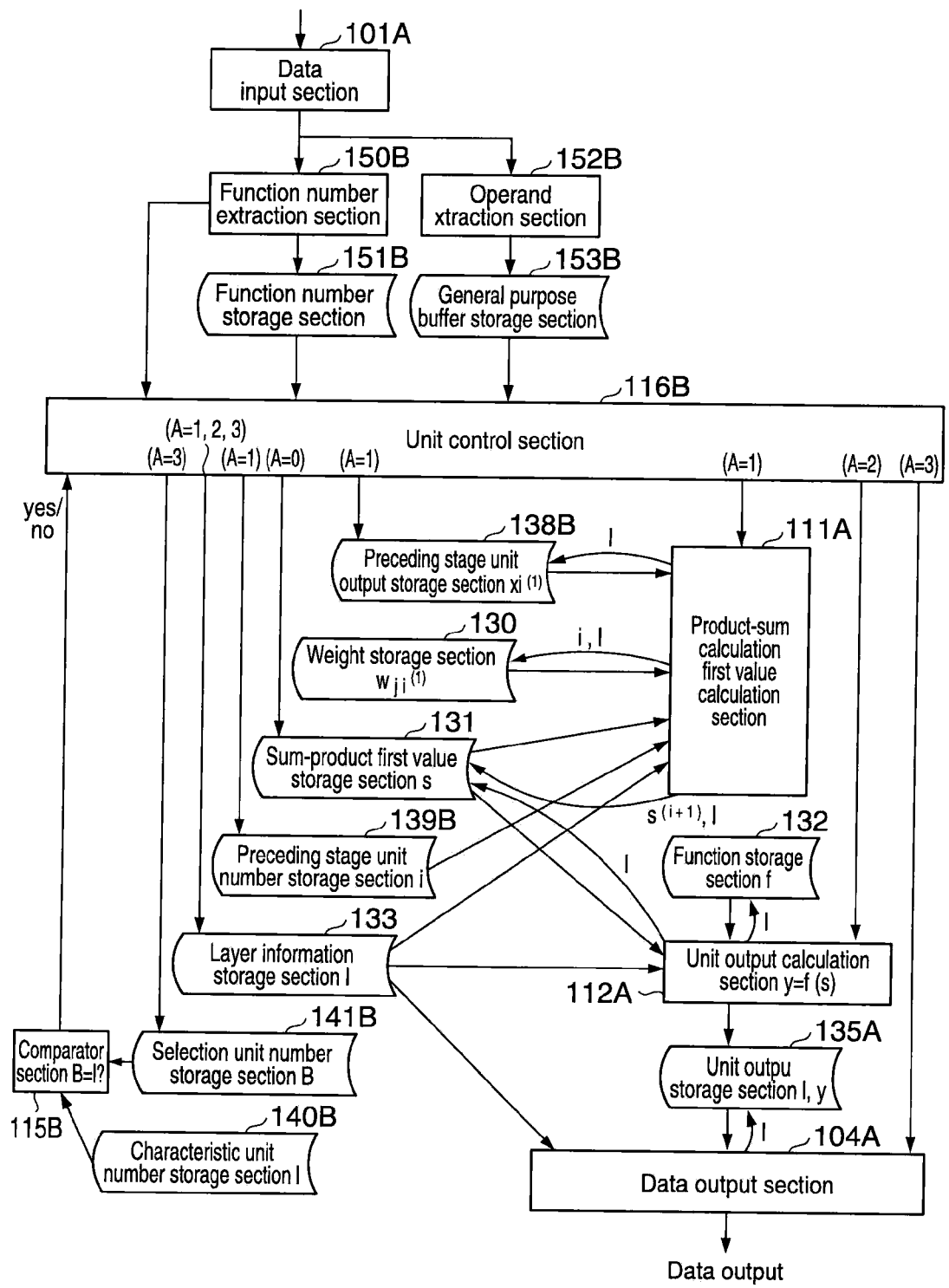
FIG. 17 is a block diagram of the structure of the unit shown in FIG. 14 in a hierarchical neural network.

It is noted that the data input section 101A, the data output section 104A and the unit output storage section 135A of FIG. 17 correspond to the data input section 11A, the data output section 14A and the unit output storage section 16A of FIG. 15, respectively. Also, the characteristic unit number storage section 140B and the comparator section 115A of FIG. 17 correspond to the characteristic unit number storage section 21A and the unit number match judgment section 20A of FIG. 15, respectively. For those components corresponding to one another in FIG. 17 and FIG. 15, the description of their common functions shall be omitted.

Also, the function number extraction section 150B and the function number storage section 151B of FIG. 17 correspond to the control code extraction section 17A of FIG. 15. Also, the operand extraction section 152B and the general purpose buffer storage section 153B of FIG. 17 correspond to the input value extraction section 18A or the selection unit number extraction section 19A of FIG. 15.

Also, the weight storage section 130, the layer information storage section 133, the product-sum calculation first value storage section 131, the function storage section 132, the product-sum calculation first value calculation section 111A, the unit output calculation section 112A, and the preceding unit number storage section 139B of FIG. 17 correspond to the unit processing section 15A of FIG. 15.

Also, in the structure of the unit shown in FIG. 17, components that are generally the same as those of the unit of the parallel processing device as applied to a hierarchical neural network in accordance with the first base structure shown in FIG. 3 are appended with the same reference numerals, or reference numerals that are the same reference numerals added with A, and their description shall be omitted.

Description of Each Component of Unit in Accordance with Third Embodiment

The function number storage section 151B stores control code (function number) included in control data. The general purpose buffer storage section 153B stores information other than control code A (function number) included in the control data, for example, selection unit number B, output value C, distribution layer information D, or distribution unit identification information E, to be describe below. Hereafter, information other than control code A (function number) included in the control data, for example, selection unit number B, output value C, distribution layer information D to be described below shall be described as general purpose data. Details of the control data shall be described with reference to FIG. 18 below.

The function number extraction section 150B extracts control code included in the control data inputted in the data input section 101A, and stores the extracted control code in the function number storage section 151B. The operand extraction section 152B extracts general purpose data included in the control data inputted in the data input section 101A, and stores the extracted general purpose data in the general purpose buffer storage section 153B.

The unit control section 116B executes processing based on the control data inputted in the data input section 101A and the result of judgment made by the comparator section 115B, or has one of the processing sections selectively execute processing. The control data inputted in the data input section 101A refers to the control code readout from the function number storage section 151B and general purpose data readout from the general purpose buffer storage section 153B.

When the control code included in the control data inputted in the data input section 101A indicates to initialize the product-sum calculation first value, the unit control section 116B initializes the value of the product-sum calculation first value information stored in the product-sum calculation first value storage section 131 to 0.

When the control code included in the control data inputted in the data input section 101A indicates calculation, addition and storage of a product-sum calculation first value, and the control data includes an output value and distribution unit identification information that is unit identification information of a unit that outputs the output value, the unit control section 116B stores the distribution unit identification information in the preceding unit output storage section 138B, and selectively executes processing using the product-sum calculation first value calculation section 111A based on the output value.

When the control code included in the control data inputted in the data input section 101A indicates to execute unit output processing, the unit control section 116B selectively executes the processing by using the unit output calculation section 112A.

Also, when the control code included in the control data inputted in the data input section 101A indicates to output an output value as an active unit, and the control data includes selection unit number, and the result of judgment by the comparator section 115B (unit number match judgment section) indicates matching, the unit control section 116B selectively executes processing by using processing of the data output section 104A, reads the result of processing from the unit output storage section 135A, and outputs the result of processing as an output value to the distribution control section 8 through the data output section 104A and the unit output bus 2.

It is noted that, when layer information and processing result are stored associated with each other in the unit output storage section 135A, and when the control code included in the control data inputted in the data input section 101A indicates to output an output value as an active unit, and the control data includes selection unit number, and the result of judgment by the comparator section 115B indicates matching, the unit control section 116B selectively executes the processing of the data output section 104, reads a processing result corresponding to the layer information readout from the layer information storage section 133 from the unit output storage section 135, and outputs the processing result readout as an output value to the distribution control section 8 through the data output section 104A and the unit output bus 2.

Also, when the control data inputted in the data input section 101A includes distribution layer information, the unit control section 116B stores the distribution layer information included in the control data inputted in the data input section 101A in the layer information storage section 133. More specifically, when the control data inputted in the data input section 101A includes distribution layer information, the unit control section 116B extracts the distribution layer information from the control data inputted in the data input section 101A, and stores the extracted distribution layer information in the layer information storage section 133. Also, the unit control section 116B reads the distribution layer information from the general purpose buffer storage section 153B, thereby extracting the distribution layer information from the control data inputted in the data input section 101A.

Also, when the control data inputted in the data input section 101A includes distribution unit identification information that is unit identification information of a unit that outputs an output value, the unit control section 116B stores the distribution unit identification information included in the control data inputted in the data input section 101A in the preceding unit output storage section 138B. More specifically, when the control data inputted in the data input section 101A includes distribution unit identification information that is unit identification information of a unit that outputs an output value, the unit control section 116B extracts the distribution unit identification information from the control data inputted in the data input section 101A, and stores the extracted distribution unit identification information in the unit number storage section 139B. Also, the unit control section 116B reads the distribution unit identification information from the general purpose buffer storage section 153B, thereby extracting the distribution unit identification information from the control data inputted in the data input section 101A.

In response to selection by the unit control section 116B, the product-sum calculation first value calculation section 111A reads coupling weight from the weight storage section 130 corresponding to the layer information readout from the layer information storage section 133, multiplies the coupling weight readout with the input value inputted in the data input section 101A, and adds the multiplied value to product-sum calculation first value information stored in the product-sum calculation first value storage section 131 which is stored therein.

Also, in response to selection by the unit control section 116B, the product-sum calculation first value calculation section 111A reads coupling weight from the weight storage section 130 corresponding to the unit identification information readout from the preceding unit output storage section 138B and the layer information readout from the image information storage section 133, multiplies the coupling weight readout with the input value inputted in the data input section 101A, and adds the multiplied value to product-sum calculation first value information stored in the product-sum calculation first value storage section 131, which is stored therein.

In response to selection by the unit control section 116B, the unit output calculation section 112A reads product-sum calculation first value information from the product-sum calculation first value storage section 131, reads an output function from the function storage section 132 corresponding to the layer information readout from the layer information storage section 133, substitutes the readout product-sum calculation first value information in the readout output function thereby calculating an output value, and stores the calculated output value in the unit output storage section 135A. When storing the calculated output value in the unit output storage section 135A, the unit output calculation section 112A associates the calculated output value with the layer information readout from the layer information storage section 133, stores the calculated output value in the unit output storage section 135A.

Protocol of Control Data in Accordance with Third Embodiment

Next, referring to FIG. 18, examples of protocols of control data are described. The control data includes control code A, selection unit number B, and output value C, and further includes distribution layer information D, and distribution unit identification information E. The distribution layer information D is layer information of a unit that outputs output value C, and the distribution unit identification information E is unit identification information of a unit that outputs output value C. Protocols of control code are predetermined by values of the control code as follows.

Selection Process 0

When the value of control code A included in the control data is "0" indicating to "initialize product-sum calculation first value," the control data does not includes other information (general purpose data). All units that receive control data with the value of control code A being "0" initialize the value of product-sum calculation first value stored in their product-sum calculation first value calculation section 111A.

Selection Process 1

When the value of control code A included in the control data is "1" indicating to "multiply product-sum calculation first value, add and store," the control data includes output value C, distribution layer information D and distribution unit identification information E. All units that receive control data with the value of control code A being "1" calculates a product-sum calculation first value, using the distribution layer information D as the layer information 1, the distribution unit identification information E as the unit identification information i, and the output value C as the value of the input value.

Selection Process 2

When the value of control code A included in the control data is "2" indicating to "execute unit output processing," the control data includes distribution layer information D. All units that receive control data with the value of control code A being "2" execute unit output processing, using the distribution layer information D as the layer information 1, and outputs the result of processing executed as an output value associated with the layer information 1 to the unit output storage section 135A.

Selection Process 3

When the value of control code A included in the control data is "3" indicating to "output an output value as an active unit," the control data includes selection unit number B and distribution layer information D. All units that receive control data with the value of control code A being "3" judge as to whether the selection unit number B included in the received control data matches the characteristic unit number I of its own, and when the result of judgment indicates that they match each other, sets the layer information I as the value of the distribution layer information D, and outputs an output value readout from the unit output storage section 135A corresponding to the layer information I.

Based of the protocols of control data shown in FIG. 18, the distribution control section 9 outputs the control code indicating to initialize product-sum calculation first value, the control code including output value and distribution unit identification information and indicating to calculate product-sum calculation first value and add and store, the control code indicating to execute unit output processing, the control code indicating to output an output value as an active unit, or the control code including the distribution layer information in a predetermined order according to the number of hierarchical layers of the hierarchical neural network and the number of nodes of the hierarchical layers.

Operation of Unit in Accordance with Third Embodiment

Figure 19:
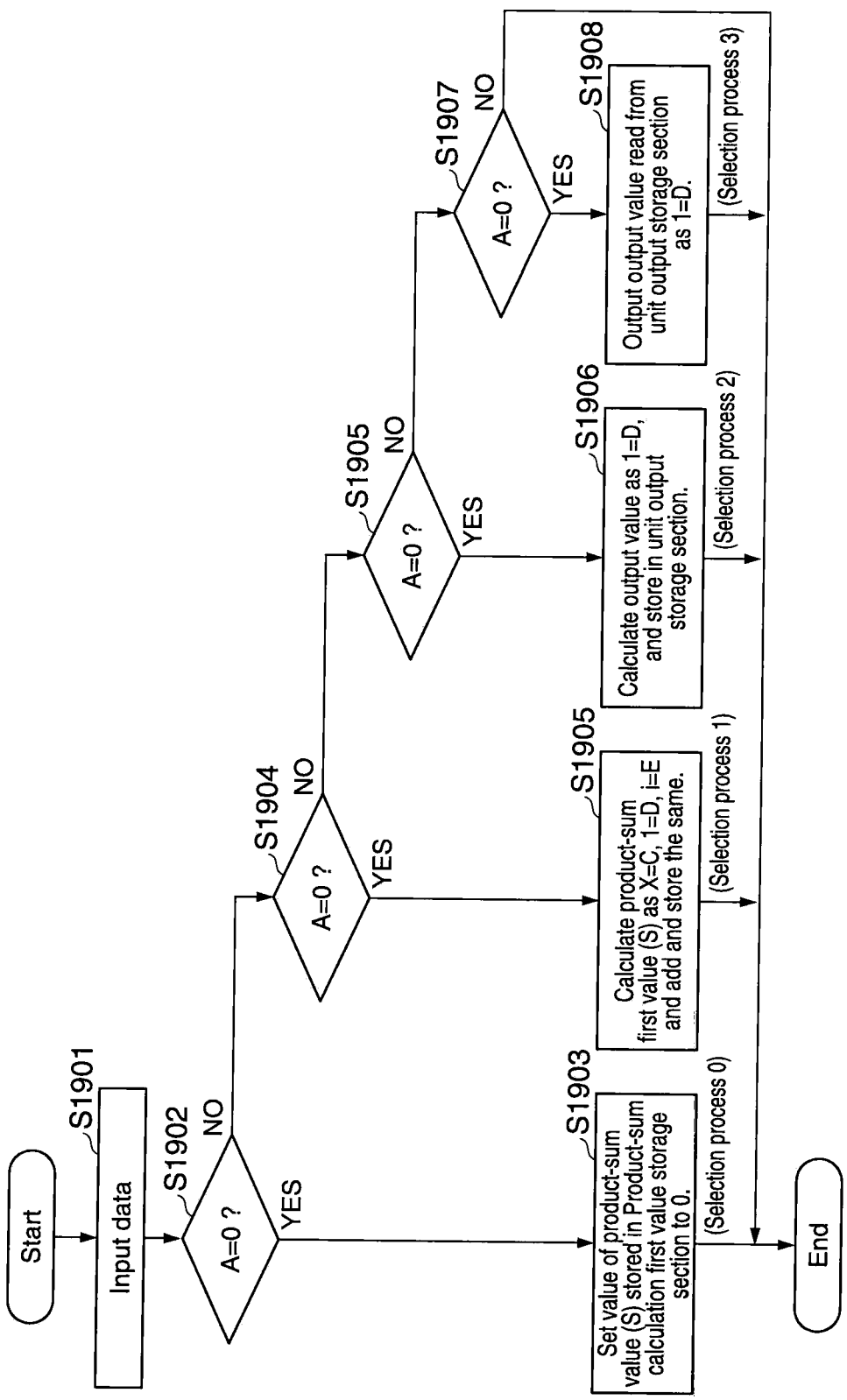
FIG. 19 is a flow chart for describing operations of each unit shown in FIG. 14.

Next, referring to FIG. 19, operations of the unit, in particular, operations of the unit control section 116 of the unit, to be executed upon receiving protocols of control data described above with reference to FIG. 18, are described. First, in response to input of control data in the data input section 101A, the unit starts processing (step S1901). Next, the function number extraction section 150B extracts control code from the control data inputted in the data input section 101A, and stores the extracted control code in the function number storage section 151B.

Also, the operand extraction section 152B extracts, from the control data inputted in the data input section 101A, information being operands other than the control code, for example, selection unit number B, output value C, distribution layer information D and distribution unit identification information E, and stores the extracted operands in the general purpose buffer storage section 153B.

Next, in response to extraction of the control code by the function number extraction section 150B, the unit control section 116B selectively executes, based on the values of the control code readout from the function number storage section 151B, the processing according to steps S1902 through S1098 to be described below.

First, the unit control section 116B judges as to whether the value of the control code A readout is "0" (step S1902). When the result of judgment in step S1902 indicates that the value of the control code A readout is "0," the unit control section 116B executes the selection process 0 described above (step S1903), and ends the process.

On the other hand, when the result of judgment in step S1902 indicates that the value of the control code A readout is not "0," the unit control section 116B judges as to whether the value of the control code A readout is "1" (step S1904). When the result of judgment in step S1904 indicates that the value of the control code A readout is "1," the unit control section 116B executes the selection process 1 described above (step S1905), and ends the process.

On the other hand, when the result of judgment in step S1904 indicates that the value of the control code A readout is not "1," the unit control section 116B judges as to whether the value of the control code A readout is "2" (step S1905). When the result of judgment in step S1905 indicates that the value of the control code A readout is "2," the unit control section 116B executes the selection process 2 described above (step S1906), and ends the process.

On the other hand, when the result of judgment in step S1905 indicates that the value of the control code A readout is not "2," in other words, when the value of the control code A readout is "3," the comparator section 115B judges as to whether selection unit number readout from the selection unit number storage section 141B matches characteristic unit number readout from the characteristic unit number storage section 140B (step S1907). When the result of judgment in step S1907 indicates that the selection unit number and the characteristic unit number match each other, the unit control section 116B executes the selection process 3 described above (step S1908), and ends the process. On the other hand, when the result of judgment in step S1907 indicates that the selection unit number and the characteristic unit number do not match each other, the unit control section 116B ends the process.

Figure 6:
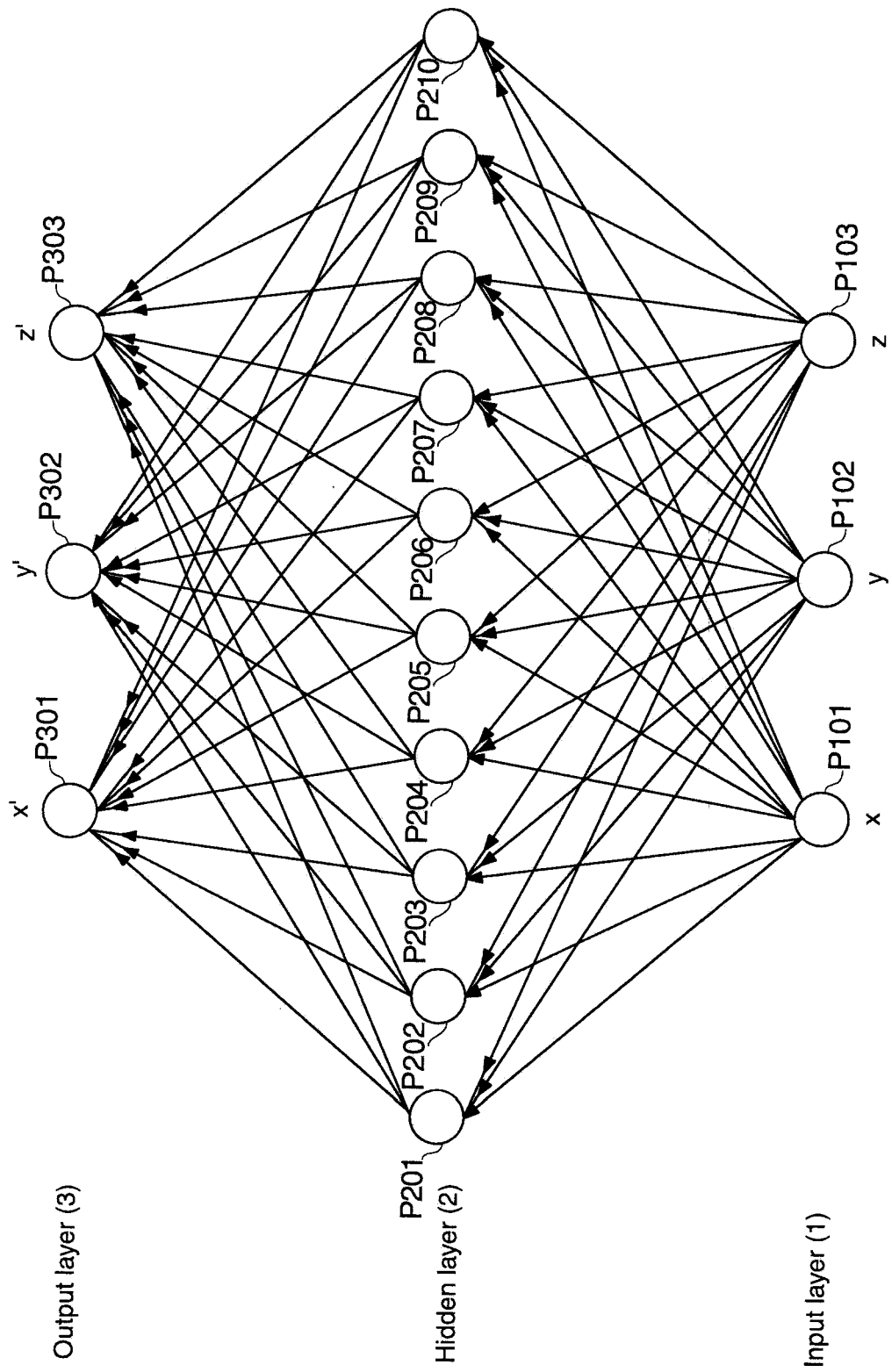
FIG. 6 is a graph for describing a neural network.

Operations of Distribution Control Section 8 in Accordance with Third Embodiment Next, referring to FIG. 20 and FIG. 21, operations of the distribution control section 8 to be executed when the parallel processing device in accordance with the second base structure is applied to a hierarchical neural network are described. It is noted that operations of each of the units according to the values of the control code included in control data outputted from the distribution control section 8 have already been described with reference to FIGS. 17 through 19, and therefore only operations of the distribution control section 8 are described here. It is noted that a case in which a parallel processing device in accordance with the second base structure is applied to the hierarchical neural network of FIG. 6 is also described here.

Figure 20A:
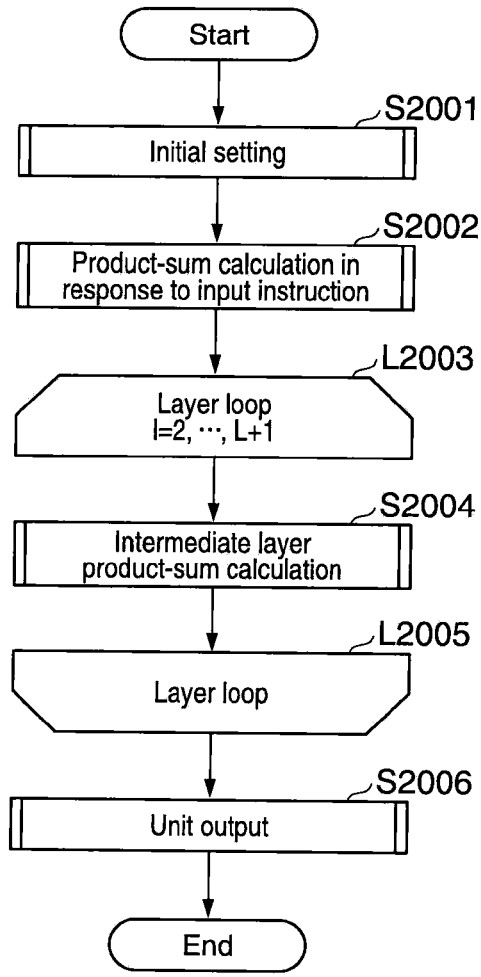
FIG. 20 is a flow chart 1 for describing operations of the distribution control section 8 shown in FIG. 14.

First, referring to FIG. 20A, operations of the distribution control section 8 when applied to a hierarchical neural network are briefly described. First, each of the units is initialized (initialization) (step S2001). Next, in response to indication of inputting input data (pattern input) for a node of the input layer L1 through the input terminal P2 from outside, the distribution control section 8 as being an input layer L1 distributes the received input to each of the units as the nodes of each intermediate layer (hidden layer) L2, whereby product-sum calculation in the intermediate layer L2 is executed in parallel by using each of the units (step S2002). In steps S2002, the distribution control section 8 as being the node of the input layer L1 outputs an output value to each of the units that act as the nodes of the intermediate layer L2.

Next, the intermediate layer product-sum calculation (step S2004) processing is repeated for all intermediate layers (with layer information counter variable l=2, ... L+1) in the hierarchical neural network (layer loop processing from step S2002 to step L2005). Here, L is a value of the total number of intermediate layers (the total number of intermediate layers). In the hierarchical neural network having three hierarchical layers in FIG. 6, the value of the total number of intermediate layers L is 1. The intermediate layer product-sum calculation in step S2004 shall be described in detail below with reference to FIG. 21A.

By the layer loop processing from step L2002 to step L2005, the processes at the nodes in the intermediate layers in the hierarchical neural network are sequentially executed in the hierarchical network layers in a direction from the input layer L1 to the output layer L3, and finally, a value as the result of processing as the output layer L3 is stored in each of the units. It is noted that, in the loop from step L2002 to step L2005, one of the units functions as an active unit as the output layer, and all of the units function as the nodes of the layer that receives inputs.

Next, by outputting output values from units as the nodes of the output layer L3 in the order the units are identified by unit identification information (step S2006), the processing results from all units that function as the nodes belonging to the output layer L3 of the hierarchical neural network are sequentially received. Also, the processing results sequentially received are sequentially outputted as processing results of the hierarchical neural network for the inputted pattern input to outside through the output terminal P1.

By the processing from step S2001 to step S2006 described above, the parallel processing device, in response to input of input data (pattern input) inputted from outside, can execute processing of the hierarchical neural network in parallel using a plurality of units, and can output the processing results executed to outside.

Next, referring to FIG. 20B, FIG. 20C, FIG. 21A and FIG. 21B, the processing of FIG. 20A shall be described in detail.

It is noted here that the processing shown in each of FIG. 20B, FIG. 20C, FIG. 21A and FIG. 21B is described as a function or a sub routine for each of the processes of FIG. 20A.

Figure 20B:
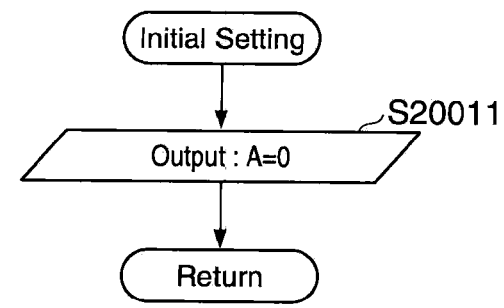

First, referring to FIG. 20B, the processing in step S2001 of FIG. 20A is described in detail. First, control data with the value of control code A being "0" is outputted (step S2011), and then the process is returned.

Figure 20C:
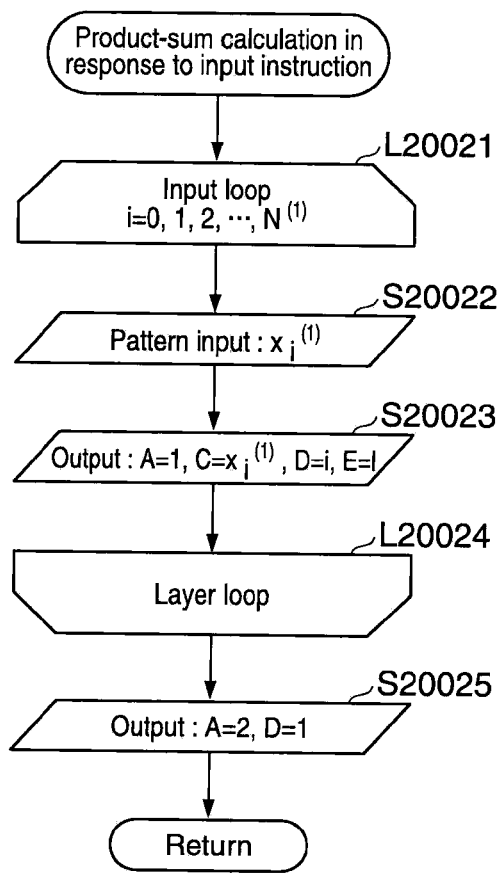

Next, referring to FIG. 20C, step S2002 of FIG. 20A is described in detail. First, while sequentially increasing the value of the counter variable i from 0, 1, 2, . . . through $N^{(1)}$, the processes in the following steps, step S20022 and step S20023, are repeated (input loop between step L20021 and step L20024). $N^{(1)}$ is a value of the number of nodes of a layer with the value of layer identification information being 1, in other words, a value of the number of nodes of the input layer L1. For example, in the hierarchical neural network shown in FIG. 6, the value of the number of nodes of the input layer L1 is 3.

In step S20022, a pattern input $x_i^{(1)}$ is inputted from outside. Next, in step S20023, control data with the value of control code A being "1," the value of output value C being the pattern input $x_i^{(1)}$ that is inputted from outside in step S20022, the value of distribution layer information D being a counter variable i, and the value of distribution unit identification information E being 1 is outputted to each of the units. Next, control data with the value of control code A being "2" and the value of distribution layer information D being 1 is outputted to each of the units (step S20025), and the process is returned.

Figure 21A:
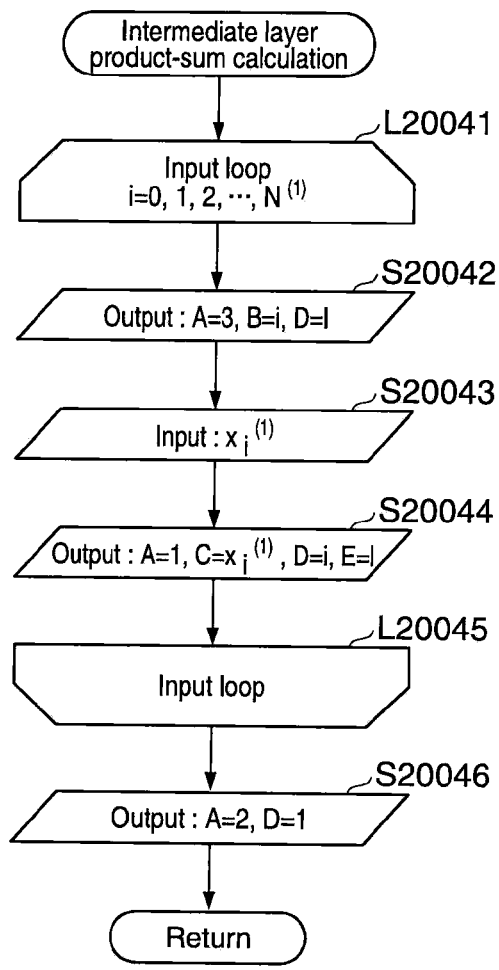
FIG. 21 is a flow chart 2 for describing operations of the distribution control section 8 shown in FIG. 14.

Next, referring to FIG. 21A, step S2004 of FIG. 20A is described in detail. First, while sequentially increasing the value of the counter variable i from 0, 1, 2, . . . through $N^{(1)}$, the processing in the following steps, step S20042 to step S20044, is repeated (input loop between step L20041 and step L20045). $N^{(1)}$ is a value of the number of nodes of a layer with the value of layer identification information being layer information counter variable 1.

In step S20042, control data with the value of control code A being "3," the selection unit number B being a counter variable i, and the value of distribution layer information D being a layer information counter variable 1 is outputted to each of the units. In step S20043, the output value $X_i^{(1)}$ outputted from a unit in which the counter variable i being the selection unit number B outputted in step S20042 matches the characteristic unit number is inputted. Also, in this step S20044, control data with the value of control code A being "2," the output value C being the output value $X_i^{(1)}$ inputted from a unit in step S20043, the distribution layer information D being a counter variable i, and the distribution unit identification information E being a layer information counter variable 1 is outputted to each of the units. Next, control data with the value of control code A being "2" and the distribution layer information D being a layer information counter variable 1 is outputted to each of the units (step S20046), and the process is returned.

Figure 21B:
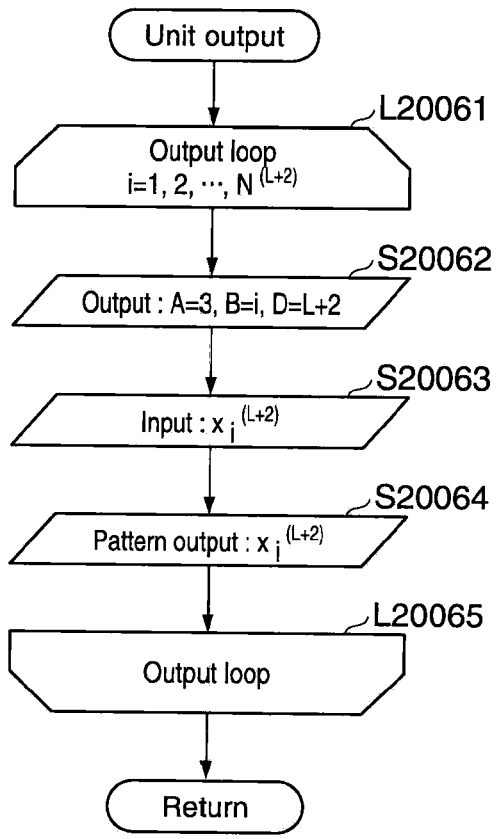

Next, referring to FIG. 21B, the processing of step S2006 of FIG. 20A is described in detail. First, while sequentially increasing the value of the counter variable i from 0, 1, 2, . . . through $N^{(L+2)}$, the processes in the following steps, step S20062 to step S20064, are repeated (output loop between step L20061 and step L20065), and the process is returned. It is noted that $N^{(L+2)}$ is a value of the number of nodes of a layer with the value of layer identification information being (the total number of intermediate layers L+2), in other words, a value of the number of nodes of the output layer L3. For example, in the hierarchical neural network shown in FIG. 6, the value of the number of nodes of the output layer L3 is 3.

In step S20062, control data with the value of control code A being "3," the selection unit number B being a counter variable i, and the value of distribution layer information D being (the total number of intermediate layers L+2) is outputted to each of the units. In step S20063, the output value $X_i^{(L+2)}$ outputted from a unit in which the counter variable i being the selection unit number B outputted in step S20062 matches the characteristic unit number is inputted. Also, in step S20064, the output value $X_i^{(L+2)}$ inputted from a unit in step S20063 is outputted through the output terminal P1 to outside.

By the processes described above, the parallel processing device when applied to a hierarchical neural network in accordance with the third embodiment can execute the hierarchical neural network, in a similar manner as the parallel processing device applied to a hierarchical neural network in accordance with the first embodiment, and can exhibit effects similar to those of the hierarchical neural network in accordance with the first embodiment.

Fourth Embodiment

Structure of Unit when Applied to Self-Organizing Map

Next, the structure of the parallel processing device in accordance with the second base structure when applied to a self-organizing map is described. It is noted that the overall structure of the parallel processing device in a self-organizing map is also generally the same as the structure of the parallel processing device shown in FIG. 14, and only the structure of each of the units is different. Therefore, with reference to FIG. 22, only the structure of the unit when applied to a self-organizing map is described.

In the parallel processing device of the self-organizing map in accordance with the first base structure, each of the units calculates a norm, and then the norms are successively compared between the units, in order to decide a unit having a smaller norm. In contrast, in the parallel processing device in a self-organizing map in accordance with the second base structure, after each of the units calculates a norm, the norms calculated by the respective units are successively outputted based on control by the distribution control section 8 to the distribution control section 8 through the unit output bus 2. Then, the distribution control section 8 selects a smallest norm among the inputted norms, thereby deciding the smallest norm.

Also, in the parallel processing device of the self-organizing map in accordance with the first base structure, each of the units stores in advance learning speed and neighborhood distance associated with learning frequency in internal storage sections (the learning speed storage section and the neighborhood distance storage section). In contrast, in the parallel processing device of the self-organizing map in accordance with the second base structure, the distribution control section 8 stores learning speed and neighborhood distance associated with learning frequency in its internal learning speed storage section and neighborhood distance storage section. Also, each of the units stores leaning speed and neighborhood distance each having one value in internal storage sections (a learning speed storage section and a neighborhood distance storage section). Also, the distribution control section 8 distributes, to each of the units, control data with learning speed and neighborhood distance included therein according to the learning frequency. Each of the units updates the learning speed and the neighborhood distance stored in its own internal storage sections (learning speed storage section and neighborhood distance storage section) with the learning speed and the neighborhood distance included in the control data received from the distribution control section 8.

Accordingly, because the distribution control section 8 distributes learning speed and neighborhood distance included in control data to each of the units, according to a learning frequency, such that the entire units do not need to store in advance learning speed and neighborhood distance associated with learning frequency in its own storage section. Also, when manners of changing learning speed and neighborhood distance associated with learning frequency are to be changed, such as, for example, when the magnitude of the change in learning speed and neighborhood distance is made faster or slower according to learning frequency, it merely needs to change only the information stored in the internal storage section of the distribution control section that stores learning speed and neighborhood distance associated with learning frequency, whereby the change can readily be made.

Also, the units when applied to a self-organizing map are identified in advance by coordinates identified by network coordinates, like the second embodiment. Therefore, in accordance with the fourth embodiment, characteristic unit numbers are described as network coordinates. It is noted that the units have an identical structure, like the second embodiment and the third embodiment, and therefore only the structure of one of the units is described herewith reference to FIG. 22.

The unit has a data input section 201A, a data output section 204A, a distance storage section 232A, a weight storage section 231A, a norm calculation section 214A, a neighborhood judgment section 215A, a weight update section 216A, a unit network coordinates storage section 234A, an input network coordinates storage section 233A, a learning speed storage section 235A, a unit norm storage section 236A, an input data storage section 230A, a real number vector dimension number storage section 242B, a comparator section 215B, a unit control section 216B, a function number extraction section 250B, a function number storage section 251B, an operand extraction section 252B, and a general purpose buffer storage section 252B.

Figure 22:
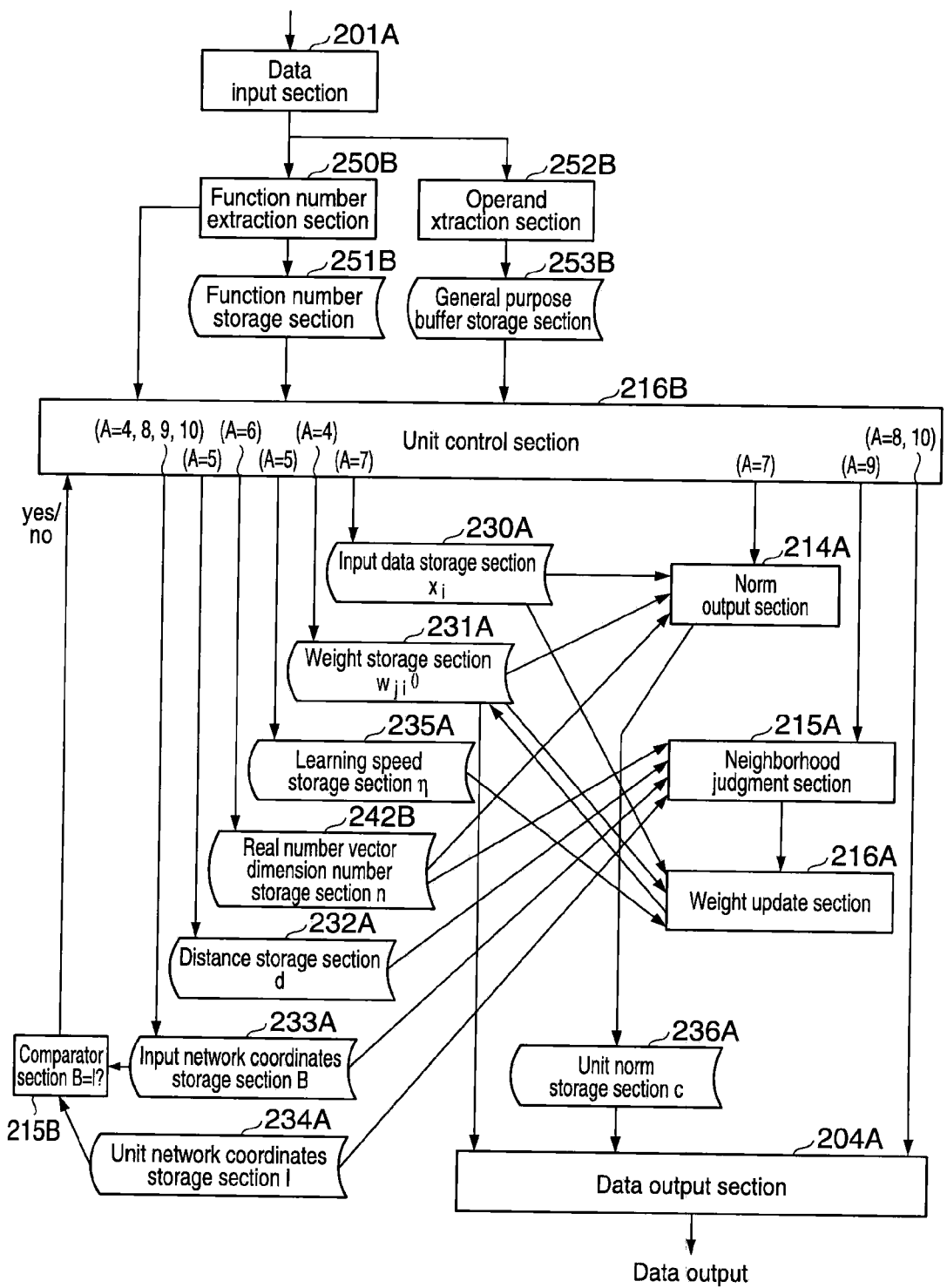
FIG. 22 is a block diagram of the structure of the unit shown in FIG. 14 in a self-organizing map.

The data input section 201A, the data output section 204A, and the unit norm storage section 236A and the weight storage section 231A of FIG. 22 correspond to the data input section 11A, the data output section 14A, and the unit output storage section 16A of FIG. 15, respectively. Further, the unit network coordinates storage section 234A, and the comparator section 215B of FIG. 22 correspond to the characteristic unit number storage section 21A, and the unit number match judgment section 20A of FIG. 15, respectively. For the corresponding components in FIG. 22 and FIG. 15, description of their common functions shall be omitted.

Also, the function number extraction section 250B and the function number storage section 251B of FIG. 22 correspond to the control code extraction section 17A of FIG. 15. Also, the operand extraction section 252B and the general purpose buffer storage section 253B of FIG. 22 correspond to the input value extraction section 18A or the selection unit number extraction section 19A of FIG. 15.

Also, in the structure of the unit shown in FIG. 22, components that are generally the same as those of the unit of the parallel processing device as applied to a self-organizing map in accordance with the first base structure shown in FIG. 7 and FIG. 8 are appended with the same reference numerals, or reference numerals that are the same reference numerals added with A, and their description shall be omitted.

Description of Each Component of Unit in Accordance with Fourth Embodiment

The function number storage section 251B stores control code (function number) included in control data. The general purpose buffer storage section 253B stores information other than control code A (function number) included in the control data, for example, input network coordinates B, input learning speed C, input neighborhood distance D, input weight W, input dimension number N or input value X, to be describe below.

Hereafter, information other than control code A (function number) included in the control data, for example, input network coordinates B, input learning speed C, input neighborhood distance D, input weight W, input dimension number N or input value X, to be described below shall be described as general purpose data. Details of the control data shall be described with reference to FIG. 23 below.

The function number extraction section 250B extracts control code included in the control data inputted in the data input section 201A, and stores the extracted control code in the function number storage section 251B. The operand extraction section 252B extracts general purpose data included in the control data inputted in the data input section 201A, and stores the extracted general purpose data in the general purpose buffer storage section 253B.

The unit control section 216B executes processing based on the control data inputted in the data input section 201A and the result of judgment made by the comparator section 215B, or has one of predetermined processing sections selectively execute processing. The control data inputted in the data input section 201A refers to the control code readout from the function number storage section 251B and general purpose data readout from the general purpose buffer storage section 253B.

Also, the distance storage section 232A, the norm calculation section 214A, the neighborhood judgment section 215A, the weight update section 216A, the input network coordinates storage section 233A, the learning speed storage section 235A, the input data storage section 230A, the real number vector dimension number storage section 242B, and the unit control section 216B of FIG. 22 correspond to the unit processing section 15A of FIG. 15. It is noted that the weight storage section 231A of FIG. 22 corresponds to the unit processing section 15A and the unit output storage section 16A of FIG. 15.

Also, details of the unit control section 216B and the other components are described with reference next to FIG. 23 together with protocols of control data as an example.

Protocols of Control Data in Accordance with Fourth Embodiment

Next, referring to FIG. 23, examples of protocols of control data are described. The control data includes control code A, input network coordinates B, input learning speed C, input neighborhood distance D, input coupling weight vector W (W1, W2, ...), input dimension number N, and input vector X (X1, X2, ...). Protocols of control data are predetermined as follows according to the values of the control code.

Selection Process 4

When the value of control code A included in the control data is "4" indicating to "set weight," the control data includes input network coordinates B and input coupling weight vector W (W1, W2, ...). In all units that receive control data with the value of control code A being "4" indicating to "set weight," the unit control section 216B of each of the units updates the value of input network coordinates stored in the input network coordinates storage section 233A with the input network coordinates B included in the received control data, and the comparator section 215B judges as to whether the updated input network coordinates match the unit network coordinates readout from the unit network coordinates storage section 234A. Then, when the result of judgment by the comparator section 215B indicates matching, the unit control section 216B updates the coupling weight vector stored in the weight storage section 231A with the input coupling weight vector W (W1, W2, . . . ) included in the received control data.

Selection Process 5

When the value of control code A included in the control data is "5" indicating to "set learning speed and neighborhood distance," the control data includes input learning speed C and input neighborhood distance D. In all units that receive control data with the value of control code A being "5" indicating to "set learning speed and neighborhood distance," the unit control section 216B of each of the units updates the learning speed stored in the learning speed storage section 235A with the input learning speed C included in the control data, and updates the reference distance stored in the distance storage section 232A with the input neighborhood distance D included in the control data received.

Selection Process 6

When the value of control code A included in the control data is "6" indicating to "set the number of dimension of real number vector," the control data includes input dimension number N. In all units that receive control data with the value of control code A being "6" indicating to "set the number of dimension of real number vector," the unit control section 216B of each of the units updates the number of dimension stored in the real number vector dimension number storage section 242B with the input dimension number N included in the received control data.

Selection Process 7

When the value of control code A included in the control data is "7" indicating to "calculate a norm," the control data includes input vector X (X1, X2, . . . ). In all units that receive control data with the value of control code A being "7" indicating to "calculate a norm," the unit control section 216B of each of the units updates the input data vector stored in the input data storage section 230A with the input vector X (X1, X2, . . . ). Then, the norm calculation section 214A calculates a norm between the updated input vector X (X1, X2, . . . ) and the coupling weight vector readout from the weight storage section 231A, and stores the calculated norm as a unit norm in the unit norm storage section 236A.

Selection Process 8

When the value of control code A included in the control data is "8" indicating to "output a norm," the control data includes input network coordinates B. In all units that receive control data with the value of control code A being "8" indicating to "output a norm," the unit control section 216B of each of the units updates the value of input network coordinates stored in the input network coordinates storage section 233A with the input network coordinates B included in the received control data, and the comparator section 215B judges as to whether the updated input network coordinates match the unit network coordinates readout from the unit network coordinates storage section 234A. Then, when the result of judgment by the comparator section 215B indicates matching, the unit control section 216B outputs the unit norm readout from the unit norm storage section 236A to the distribution control section 8 through the data output section 204A and the unit output bus 2.

Selection Process 9

When the value of control code A included in the control data is "9" indicating to "learn," the control data includes input network coordinates B. In all units that receive control data with the value of control code A being "9" indicating to "learn," the unit control section 216B of each of the units updates the value of input network coordinates stored in the input network coordinates storage section 233A with the input network coordinates B included in the control data. Then, the neighborhood judgment section 215A of each of the units calculates a distance between the unit network coordinates readout from the unit network coordinates storage section 234A and the input network coordinates readout from the input network coordinates storage section 233A, and judges as to whether the calculated distance is less than the distance readout from the distance storage section 232A, thereby judging as to whether the unit network coordinates readout from the unit network coordinates storage section 234A are in neighborhood of the input network coordinates readout from the input network coordinates storage section 233A. Then, when the result of judgment by the neighborhood judgment section 215A indicates neighborhood, the weight update section 216A calculates a difference between the input data vector readout from the input data storage section 230A and the coupling weight vector readout from the weight storage section 231A, multiplies the calculated difference with a learning speed coefficient readout from the learning speed storage section 235A thereby obtaining a multiplied value, adds the multiplied value to the coupling weight vector stored in the weight storage section 231A, thereby updating the coupling weight vector stored in the weight storage section 231A, thereby learning is performed.

Selection Process 10

When the value of control code A included in the control data is "10" indicating to "output the result of learning," the control data includes input network coordinates B. In all units that receive control data with the value of control code A being "10" indicating to "output the result of learning," the unit control section 216B of each of the units updates the value of input network coordinates stored in the input network coordinates storage section 233A with the input network coordinates B included in the received control data, and the comparator section 215B judges as to whether the updated input network coordinates match the unit network coordinates readout from the unit network coordinates storage section 234A. Then, when the result of judgment by the comparator section 215B indicates matching, the unit control section 216B outputs the coupling weight vector readout from the weight storage section 231A to the distribution control section 8 through the data output section 204A and the unit output bus 2.

Operation of Unit in Accordance with Fourth Embodiment

Figure 24:
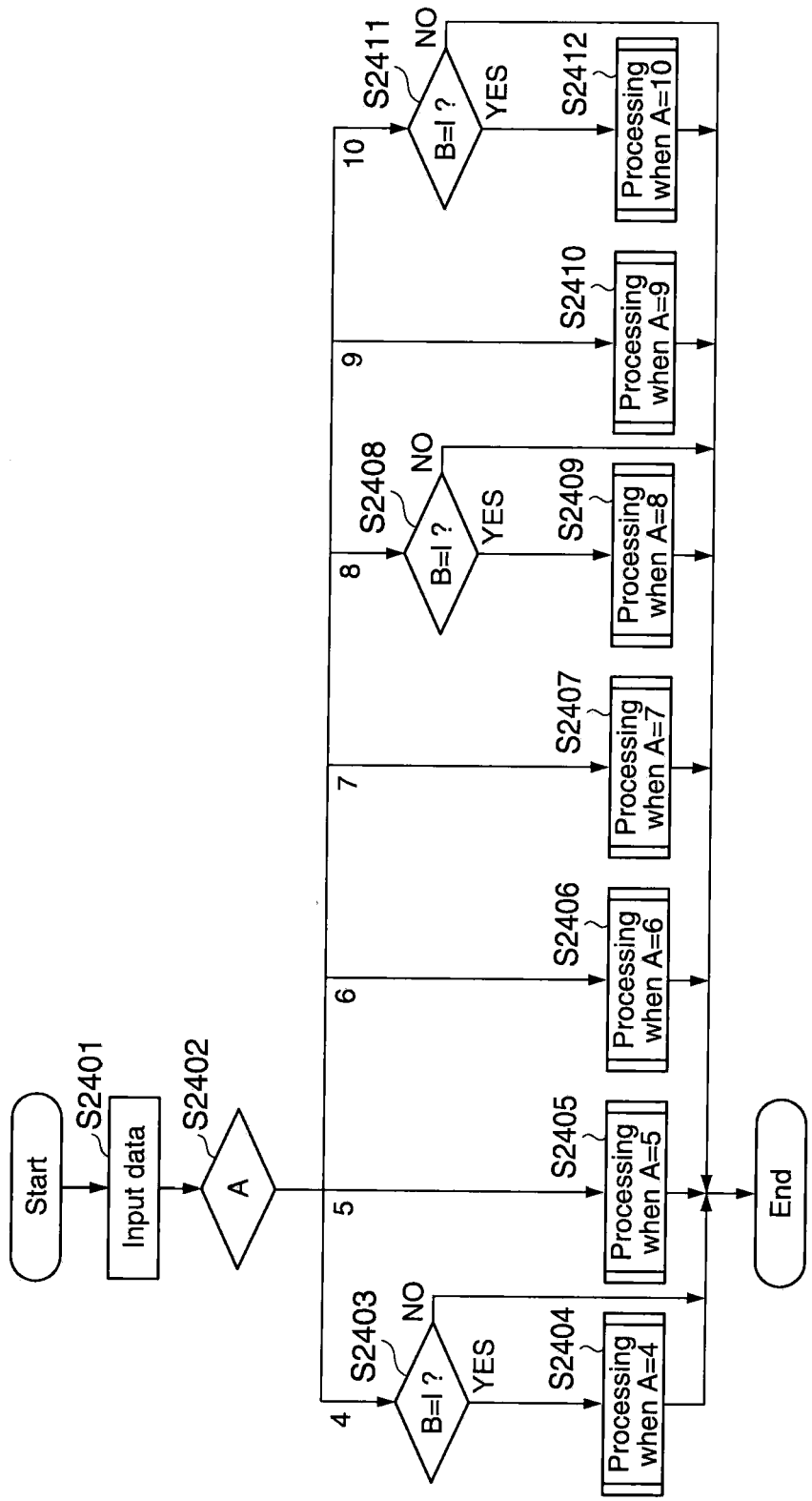
FIG. 24 is a flow chart for describing operations of each unit shown in FIG. 22.

Next, referring to FIG. 24, operations of the unit, in particular, operations of the unit control section 216B of the unit, to be executed upon receiving protocols of control data described above with reference to FIG. 23, are described. It is noted that the description shall be made hereafter, using values of control code A, for simplification of the description. The values of the control code A have the same meanings as those described with reference to FIG. 23 above.

First, in response to input of control data in the data input section 201A, the unit starts processing (step S2401). Next, the function number extraction section 250B extracts control code from the control data inputted in the data input section 201A, and stores the extracted control code in the function number storage section 251B.

Also, the operand extraction section 252B extracts information other than control code that is operand included in the control data inputted in the data input section 201A, and stores the extracted information in the general purpose buffer storage section 253B.

Next, in response to extraction of the control code by the function number extraction section 250B, the unit control section 216B selectively execute processing in the unit according to step S2402 through step S2412 to be described below, based on the value of the control code readout from the function number storage section 251B (step S2402).

When the value of control code A readout in step S2402 is "4," the comparator section 215B judges as to whether the unit network coordinates readout from the unit network coordinates storage section 234A match the input network coordinates readout from the input network coordinates storage section 233A (step S2403). When the result of judgment in step S2403 indicates that the selection unit number matches the characteristic unit number, the unit control section 216B executes the selection process 4 described above (step S2404), and ends the process. On the other hand, when the result of judgment in step S2403 indicates that the selection unit number and the characteristic unit number do not match, the unit control section 216B ends the process.

When the value of control code A readout in step S2402 is "5," the unit control section 216B executes the selection process 5 described above (step S2405), and ends the process. On the other hand, when the value of control code A readout in step S2402 is "6," the unit control section 216B executes the selection process 6 described above (step S2406), and ends the process. On the other hand, when the value of control code A readout in step S2402 is "7," the unit control section 216B executes the selection process 7 described above (step S2407), and ends the process.

On the other hand, when the value of control code A readout in step S2402 is "8," the comparator section 215B judges as to whether the unit network coordinates readout from the unit network coordinates storage section 234A matches the input network coordinates readout from the input network coordinates storage section 233A (step S2408). When the result of judgment in step S2408 indicates that the selection unit number matches the characteristic unit number, the unit control section 216B executes the selection process 8 described above (step S2409), and ends the process. On the other hand, when the result of judgment in step S2408 indicates that the selection unit number and the characteristic unit number do not match, the unit control section 216B ends the process.

When the value of control code A readout in step S2402 is "9," the unit control section 216B executes the selection process 9 described above (step S2410), and ends the process.

On the other hand, when the value of control code A readout in step S2402 is "10," the comparator section 215B judges as to whether the unit network coordinates readout from the unit network coordinates storage section 234A matches the input network coordinates readout from the input network coordinates storage section 233A (step S2411). When the result of judgment in step S2411 indicates that the selection unit number matches the characteristic unit number, the unit control section 216B executes the selection process 10 described above (step S2412), and ends the process. On the other hand, when the result of judgment in step S2411 indicates that the selection unit number and the characteristic unit number do not match, the unit control section 216B ends the process.

As described above with reference to FIG. 24, at each of the units, the unit control section 216B of each unit selectively executes predetermined processing based on the value of control code included in input data inputted.

Operation of Distribution Control Section 8 in Accordance with Fourth Embodiment Next, referring to FIG. 25 and FIG. 26, operations of the parallel processing device to be executed when the parallel processing device in accordance with the second base structure is applied to a self-organizing map are described. It is noted that the parallel processing device has a distribution control section 8 and a plurality of units, and operations of each of the units executed in response to values of control code included in control data outputted from the distribution control section 8 have already been described with reference to FIG. 22 to FIG. 24. Accordingly, only operations of the distribution control section 8 shall be described below.

Figure 25A:
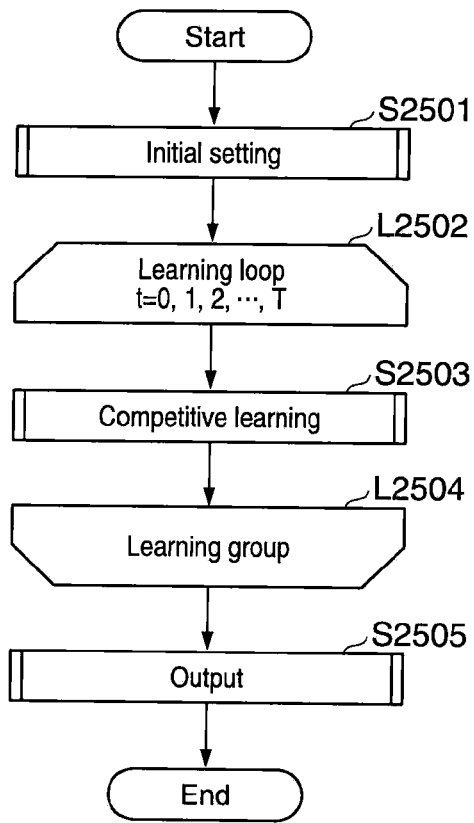
FIG. 25 is a flow chart 1 for describing operations of a distribution control section 8 shown in FIG. 22.

First, referring to FIG. 25A, operations of the distribution control section 8 of the parallel processing device when applied to a self-organizing map are described. First, an initial setting of each of the units is performed (step S2501). The initial setting shall be described in detail below with reference to FIG. 25B.

Next, competitive learning (step S2503) is repeated (learning loop processing from step L2502 to step L2504) for learning frequency variable t=0, 1, 2, ... T. T is the number of learning iterations of competitive learning. Also, the competitive learning in step S2502 shall be described in detail below with reference to FIG. 26A.

Then, the result of learning is outputted (step S2505). The output step shall be described in detail below with reference to FIG. 26C.

Next, with reference to FIG. 25B, and FIGS. 26A through 26C, each of the processes in FIG. 25A is described in detail. It is noted that each of the processes shown in FIG. 25B and FIGS. 26A through 26C shall be described as a function or a sub-routine of each of the processings shown in FIG. 20A.

Figure 25B:
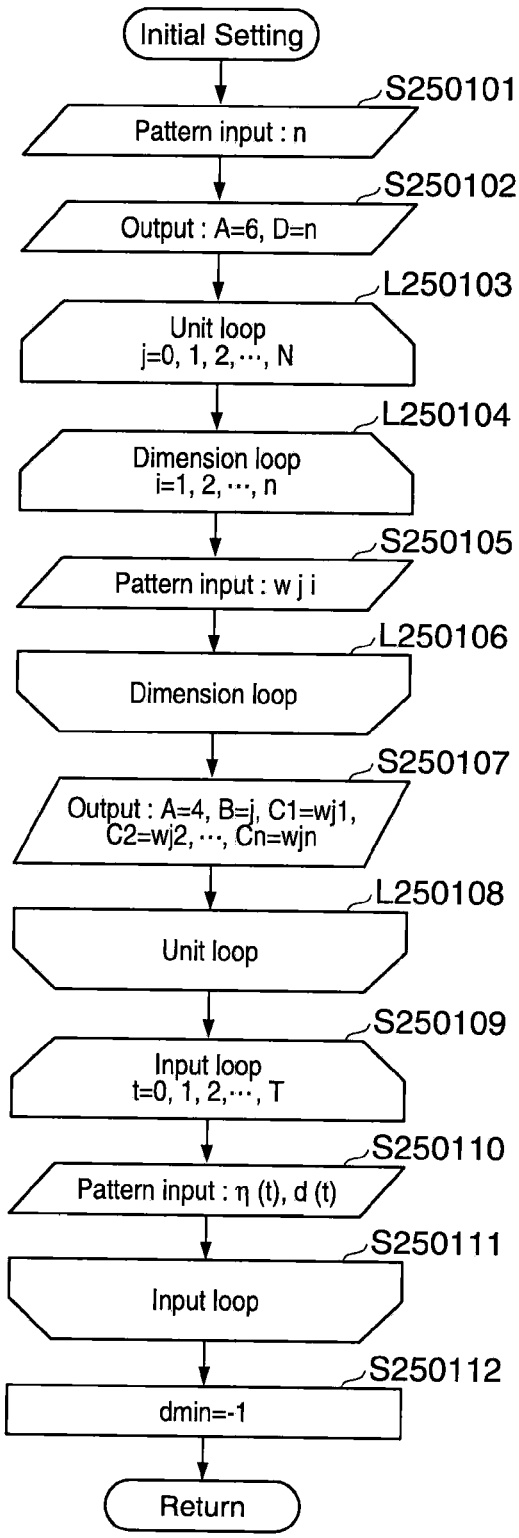

First, referring to FIG. 25B, the processing of initial setting in step S2501 shown in FIG. 25A is described. First, a pattern input n is inputted from outside (step S250101). Next, control data with the value of control code A being "6" and the value of output value D being the pattern input n is outputted to each of the units (steps S250102).

Next, a dimension loop from the next step L250104 through step L250106 and a processing in step S250107 are repeated in the order of units indicated by unit loop variable j=1, 2, ... N (unit loop from step L250103 through step L250108). It is noted that N is a value of the total number of the units.

In the dimension loop from step L250104 through step L250106, the processing of the next step S250105 is repeated in the order of the number of dimension of input vectors indicated by the input vector dimension number i=1, 2, ... n. In this step S250105, an input pattern wji is inputted from outside. Here, n is the dimension number of input vector.

In the processing of step S250107, control data with the value of control code A being "4," the value of input network coordinates B being a unit loop variable j, and the output value C (C1, C2, ... Cn) being an input pattern wji (wj1, wj2, ... wjn) is outputted to each of the units.

By the processing in step L250103 through step L250108 described above, at each of the units, initial setting of the coupling weight vector of the weight storage section 231A in each of the units is performed.

Next, the processing in step S250110 is repeated for the learning frequency variable t=0, 1, 2, ... T (an input loop from step L250109 through step L250111). In step S250110, a learning speed η (t) and a neighborhood distance d (t) are inputted from outside, the inputted learning speed η (t) is stored, associated with the learning frequency variable t, in the internal learning speed storage section, and the neighborhood distance d (t) is stored, associated with the learning frequency variable t, in the internal neighborhood distance storage section. Then, the value of norm minimum value dmin that is a dummy variable to be used for minimum norm judgment to be described below with reference to FIG. 26B is set to −1 (step S250112), and the process is returned.

Figure 26A:
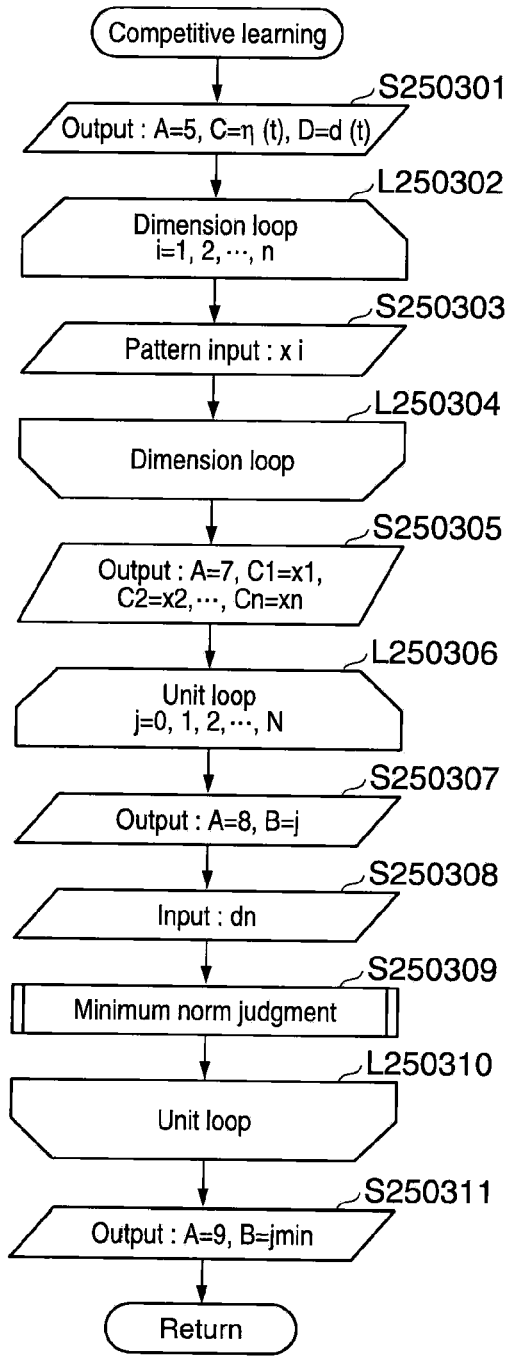
FIG. 26 is a flow chart 2 for describing operations of the distribution control section 8 shown in FIG. 22.
Figure 26B:
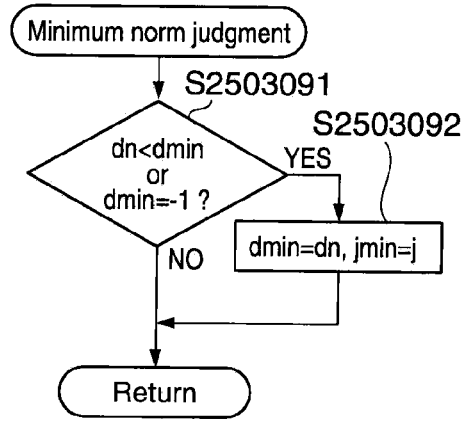

Next, referring to FIG. 26A, the competitive learning process in step S2503 in FIG. 25A is described. First, control data with the value of control code A being "5," the value of input learning speed C being the learning speed η (t) readout from the internal learning speed storage section, and the value of input neighborhood distance D being the neighborhood distance d (t) readout from the internal neighborhood distance storage section is outputted to each of the units (step S250301).

Next, the processing in the next step S250303 is repeated for the dimension loop variable i=0, 1, 2, . . . n (a dimension loop from step L250302 through step L250304). In step S250303, a pattern input xi is inputted from outside.

Next, control data with the value of control code A being "7" and the value of input vector C (C1, C2, . . . Cn) being the pattern input x (x1, x2, . . . xn) inputted from outside in step L250302 through step L250304 is outputted to each of the units (step S250305).

Next, the processing in the following steps, step S250307, step S250308 and step S250309 is repeated for the unit loop variable j=0, 1, 2, . . . N (a unit loop from step L250306 through step L250310). In step S250307, control data with the value of control code A being "8" and the value of input network coordinates B being the unit loop variable j is outputted to each of the units. In step S250308, a norm outputted from a unit whose unit network coordinates match the unit loop variable j being the input network coordinates B is inputted as a norm dn, in response to the control data with the value of control code A being "8" and the value of input network coordinates B being the unit loop variable j in step S250307.

In step S250309, minimum norm judgment processing is executed based on the inputted norm dn in step S250308. The minimum norm judgment processing in step S250309 shall be described below in detail with reference to FIG. 26B.

By the processings executed in the steps L250306 through L250310, the norm calculated in each of the units is sequentially inputted from the entire units, and the norms inputted in steps S250309 are sequentially compared, thereby selecting the minimum norm among the norms outputted from the entire units, and unit network coordinates that are identification information to identify a unit that has outputted the minimum norm as being minimum unit network coordinates jmin.

Then, control data with the value of control code A being "9" and the value of input network coordinates B being the norm minimum unit coordinates jmin is outputted to each of the units. By this, each of the units learns the neighborhood unit, based on the inputted norm minimum unit coordinates jmin.

Next, referring to FIG. 26B, the minimum nor judgment processing in step S250309 is described. First, it is judged as to whether the norm dn inputted in step S250308 is smaller than the norm minimum value dmin, or the value of norm minimum value dmin is −1 (step S2503091). When the result of judgment in step S2503091 indicates that the inputted norm dn is smaller than the norm minimum value dmin, or the value of the norm minimum value dmin is −1, the norm minimum value dmin is set to the inputted norm dn, and the value of norm minimum unit network coordinates jmin is set to the unit loop variable j (step S2503092), and the process is returned.

On the other hand, when the result of judgment in step S2503091 indicates that the inputted norm dn is not smaller than the norm minimum value dmin, and the value of the norm minimum value dmin is not −1, the process is returned.

Figure 26C:
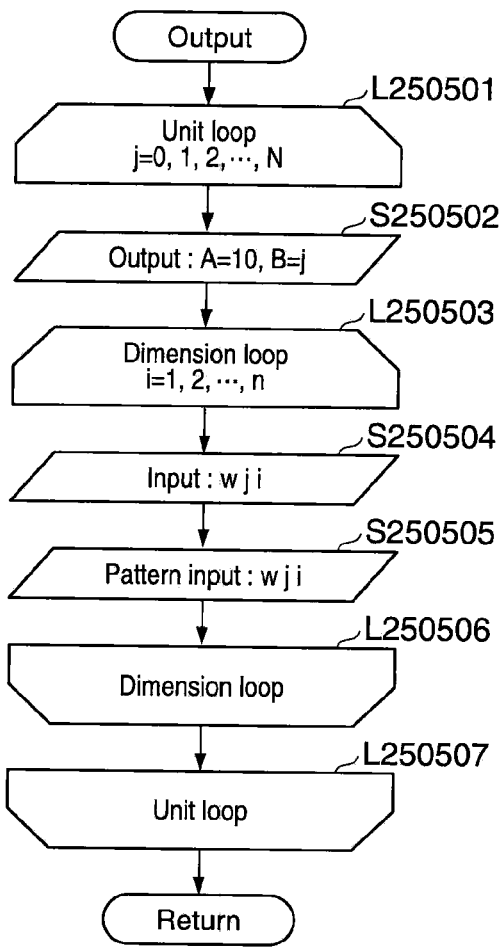

Next, referring to FIG. 26C, the output processing in step S2505 in FIG. 25A is described. First, a processing in the next step S250502, and a dimension loop processing from step S250503 through step L250506 are repeated for the unit loop variable j=0, 1, 2, . . . N (a unit loop from step L250501 through step L250507).

In step S250502, control data with the value of control code A being "10" and the value of input network coordinates B being the unit loop variable j is outputted to each of the units.

Also, in the dimension loop processing from step S250503 through step L250506, the processing in the next step S250504 and step S250505 is repeated for the dimension loop variable i=0, 1, 2, . . . n. In step S250504, a coupling weight vector that is an output from a unit corresponding to the control data outputted in step S250502 is inputted as a coupling weight vector wji. Next, in step S250505, the coupling weight vector wji inputted from the unit in step S250504 is outputted outside.

By the processing from step L250501 through step L250507, first, a coupling weight vector is successively outputted from each of the units (step S250502), and then, in response to step S250502, each of the units sequentially receives as an input the outputted coupling weight vector sequentially outputted from each of the units (step S250504). Then, the coupling weight vector inputted sequentially from each of the units in step S250504 is outputted outside as a calculation result of a self-organizing map (step S250505).

The parallel processing device when applied to a self-organizing map in accordance with the second base structure described above with reference to FIG. 22 through FIG. 26 is capable of executing the processing of self-organizing map, and outputting the result of execution outside, like the parallel processing device when applied to a self-organizing map in accordance with the first base structure.

Also, in the case of the parallel processing device when applied to a self-organizing map in accordance with the second base structure, it is effective in that its structure is relatively simpler, compared to the parallel processing device when applied to a self-organizing map in accordance with the first base structure. It is also effective in that design and modification of values of many variables in self-organizing maps, such as, changes in the number of dimension of input vectors, learning speed and neighborhood distance, can be readily made.

Separable Structure

Figure 14:
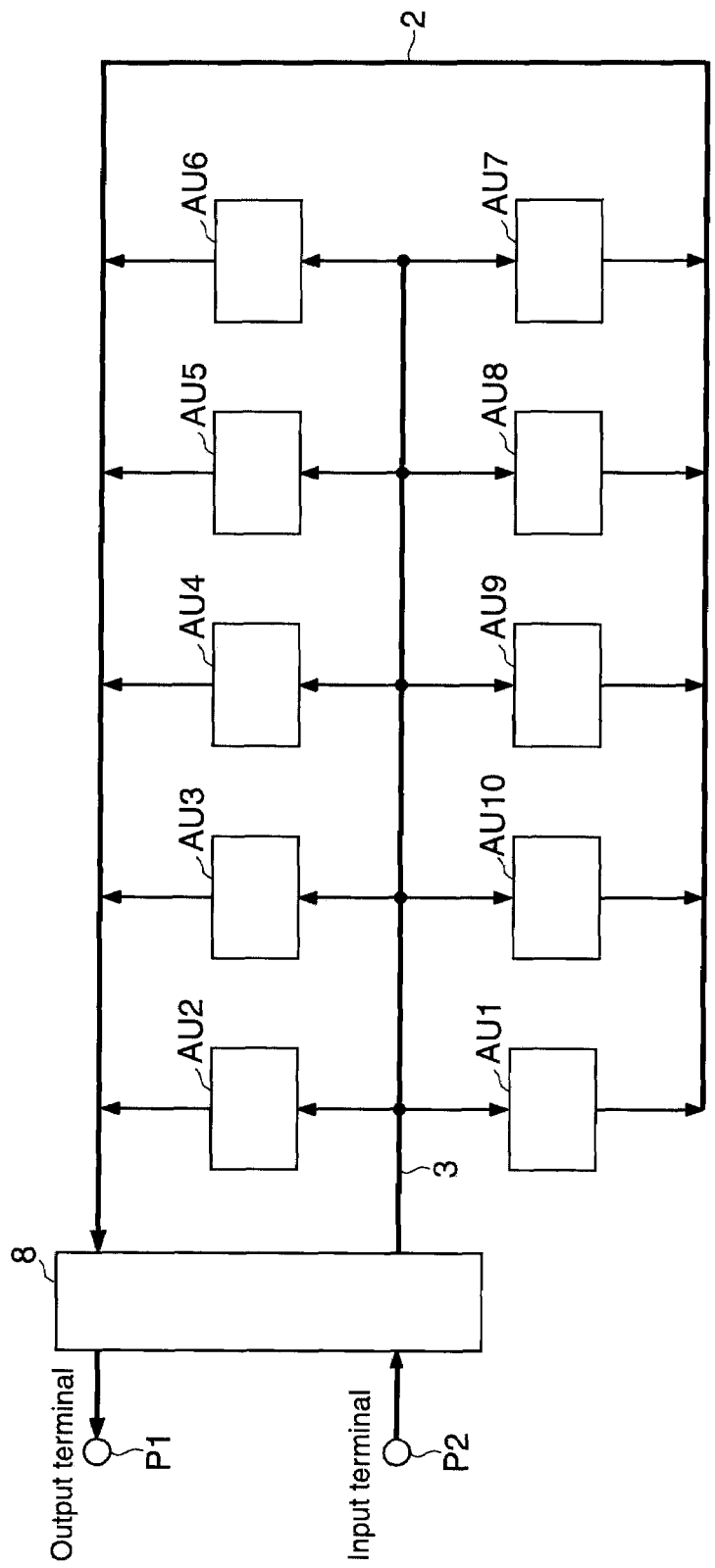
FIG. 14 is a block diagram of the structure of a parallel processing device in accordance with a second base structure.
Figure 27:
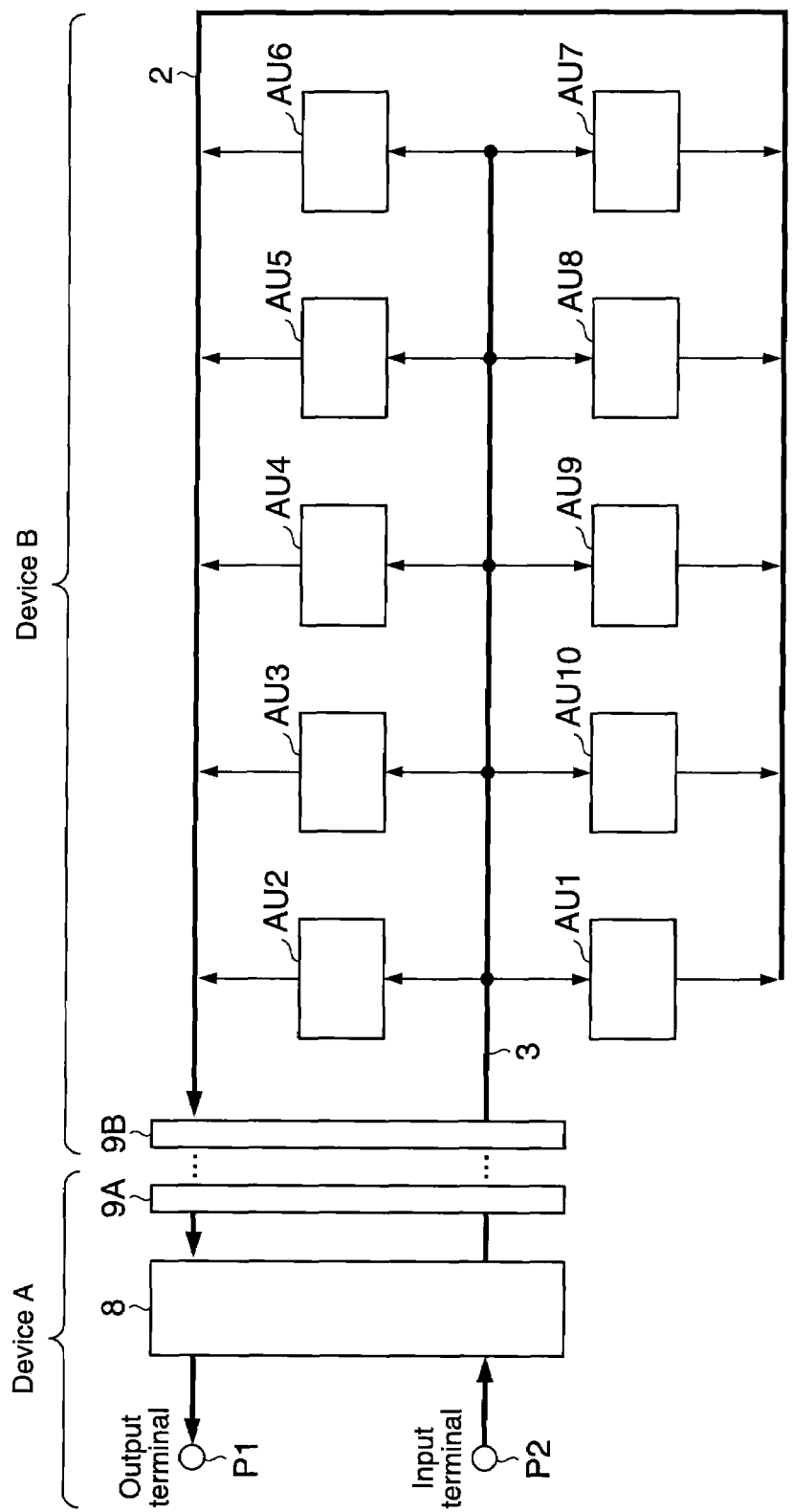
FIG. 27 is a block diagram of the structure of a parallel processing device in which the parallel processing device shown in FIG. 14 has a separable structure.

Next, with reference to FIG. 27, the structure of a parallel processing device having a separable structure is described, in which each of the units can be separated from the distribution control device 8 of the parallel processing device in accordance with the second base structure in FIG. 14.

The parallel processing device in FIG. 27 has mutually connectable connecting section 9A and connecting section 9B, in addition to the parallel processing device shown in FIG. 14. The entire units from unit AU1 through unit AU10 and the distribution control device 8 can be connected to each other by the unit output bus 2 and the unit input bus 3 through the connecting section 9A and the connecting section 9B. For example, the connecting section 9A and the connecting section 9B may preferably be mutually couplable members.

Also, as shown in FIG. 27, by means of the mutually connectable connecting section 9A and connecting section 9B, the entire units from unit AU1 through unit AU10 and the connecting section 9B may be used as one device (device B), and the distribution control device 8 and the connecting section 9A may be used as another device (device A).

In this case, for example, the connecting section 9A and the connecting section 9B may be USB (Universal Serial Bus) (trade mark) male and female connectors, the device B may be an USB apparatus, and the device A may be a personal computer. In this manner, the units and the distribution control device 8 may be composed as independent devices, and the distribution control device 8 may be formed from a personal computer, whereby the parallel processing device can have a simpler overall structure, and can be manufactured at low costs.

Also, by forming the distribution control device 8 from a personal computer, predetermined control procedures may be computer-programmed, whereby the control procedures can be more readily created. Also, the personal computer that functions as the distribution control device 8 also has a keyboard as an input device, and a monitor as a display device or an output device, whereby the users can more readily use the parallel processing device.

It is noted that the connecting section 9A and the connecting section 9B are not limited to USB connectors, but connectors of other standards can be used, or connectors for communication networks may be used. In the case of connectors for communication networks, the connection between the units from unit AU1 through unit AU10 and the distribution control device 8 may be implemented by a communication connection using communication protocols through the connecting section 9A and the connecting section 9B, or the connecting section 9A and the connecting section 9B may control the communication protocols.

Also, the device B may be formed from an expansion board device, and the expansion board device may be connected to an expansion slot of the distribution control device 8 that may be a personal computer. For example, the device B that is composed in the form of an expansion board device may be a board that complies with the PCI (Peripheral Component Interconnect) standard or the PCI-Express standard. Also, in this case, the personal computer that is the device A may have, as the connecting section 9A, for example, an expansion slot that complies with the PCI standard or the PCI-Express standard.

Fifth Embodiment

Embodiment to Speed Up Comparison of Norm Among Units

Principle of Tournament Method

Next, an embodiment that makes comparison of norms among units at higher speed in the parallel processing device applied to a self-organizing map in accordance with the second or fourth embodiment is described as a fifth embodiment.

In the parallel processing device which is applied to a self-organizing map in accordance with the second embodiment, each of the units outputs a token together with a norm in a predetermined order, and each of the units, having received the norm inputted, compares its own calculated norm with the inputted norm, and outputs a smaller one of the norms. This process is sequentially repeated among the entire units, whereby a minimum norm among the entire units is calculated. For this reason, when there are N number of units (N is an arbitrary natural number), norms need to be compared (N−1) times, and the time for (N−1) times of comparisons is required.

Also, in the parallel processing device applied to a self-organizing map in accordance with the fourth embodiment, each of the units sequentially outputs a calculated norm, and the distribution control device section sequentially compares the inputted norms, and selects the minimum norm. In this case, the units sequentially output norms to the distribution control device section. Therefore, when there are N number of units, in order for the entire units to output norms, (N−1) times of outputs are required, and the time for (N−1) times of comparisons is required. Also, in the comparison processing by the distribution control device section, norms inputted in the distribution control device section are sequentially compared, such that the norms need to be compared (N−1) times, and the time for (N−1) times of comparisons is required.

In the parallel processing device applied to a self-organizing map in accordance with the fifth embodiment, when selecting the minimum norm among norms calculated by the units, a tournament method is used, whereby the time for comparing norms can be made shorter than the time for comparing norms N times.

Figure 28:
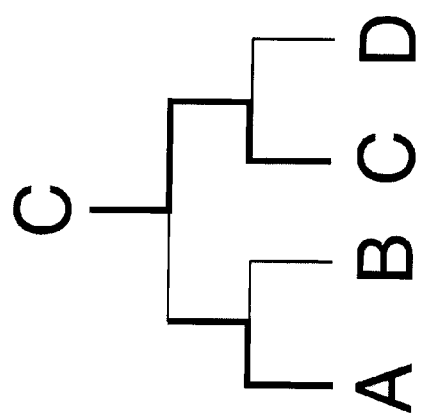
FIG. 28 is a diagram for describing a tournament method.

The tournament method may be performed as follows. For example, as shown in FIG. 28, when there are four units A, B, C and D, norms of Unit A and Unit B are compared, and norms of Unit C and Unit D are compared, in parallel. Next, a smaller norm in the norms of Unit A and Unit B and a smaller norm in the norms of Unit C and Unit D are compared.

By this, in the case of the four units shown in FIG. 28, a unit with the minimum norm can be selected from the four (=N) units in a comparison time for two comparisons, compared to the method according to the second embodiment or the fourth embodiment in which units are sequentially compared one by one, and therefore requires a comparison time for three times (N−1) comparisons.

In general, as shown in FIG. 28, in the case of a tournament method that compares norms of two units by two units in parallel, the time required for the comparison is $\log_2(N)$ times, which can considerably reduce the time required for comparison, compared to the method that sequentially compares norms of units one by one like the second embodiment or the fourth embodiment. It is noted that, the greater the number N of units, the more the time required for comparison in the tournament method can be reduced. For example, in the case of 512 units, while it takes a comparison time for 511 times of comparisons according to the method in which norms of units are sequentially compared one by one like the second embodiment or the fourth embodiment, the tournament method needs only a comparison time for 8 times of comparisons.

First Example of Arrangement of Units

Figure 29:
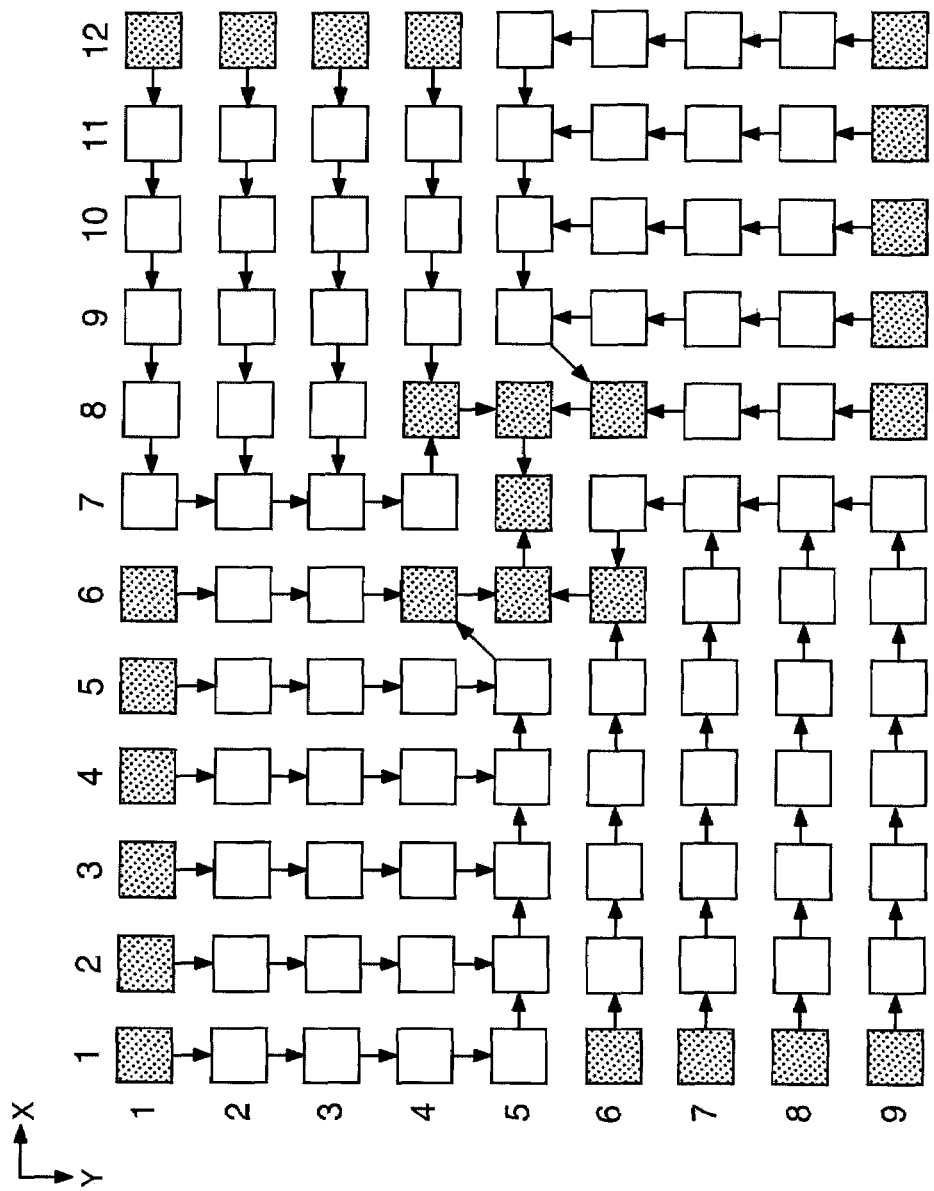
FIG. 29 is a comparison order diagram showing an example of comparison order in comparing norms when norms are not inputted in a unit at the same time.

Next, referring to FIG. 29, a method for selecting a minimum unit from among units arranged in a two dimensional plane by the tournament method described above is described. In this example, as shown in FIG. 29, in a direction of an X axis that is a horizontal axis, units whose X axis coordinate is 1 through 12 are arranged, and in a direction of a Y axis that is a vertical axis, units whose Y axis coordinate is 1 through 9 are arranged, namely, 108 (=12×9) units are arranged in a plane.

In the description to be made with reference to FIG. 29, for simplification of expressing units, the units are expressed using coordinates. For example, a unit U whose X axis coordinate is m and Y axis coordinate is n shall be expressed as U (m, n). For example, a unit whose X axis coordinate is 5 and Y axis coordinate is 3 shall be expressed as U (5, 3).

Also, in FIG. 29, norms of the units are compared in orders indicated by arrows in the figure. For example, first, a norm calculated by U (1, 1) is outputted to U (1, 2). Next, in response to input of the norm from U (1, 1), U (1, 2) compares a norm calculated by U (1, 2) with the norm inputted from U (1, 1), and selects a smaller norm between the two norms. Then, U (1, 2) outputs the smaller norm selected to U (1, 3).

Here, in parallel with the event in which U (1, 1) outputs the norm calculated by itself to U (1, 2), U (2, 1) outputs a norm calculated by itself according to an arrow in the figure to U (2, 2). Also, in parallel with U (1, 1) and U (2, 1), U (3, 1), U (4, 1), U (5, 1), and the like output norms calculated by the respective units according to arrows in the figure in parallel.

Next, in response to input of the norm from U (1, 1), U (1, 2) compares the inputted norm and a norm calculated by itself. In parallel with the comparison being performed by U (1, 2), U (2, 2) also compares, in response to input of the norm from U (2, 1), the inputted norm and a norm calculated by itself. Also, in parallel with the comparison being performed by U (1, 2) and U (2, 2), each of U (3, 2), U (4, 2), U (5, 2) and the like also compares, in response to input of a norm, the inputted norm and a norm calculated by itself, respectively.

According to the units shown in FIG. 29, norms are inputted in U (7, 5) from U (6, 5) and U (8, 5) in the order according to the arrows. Next, at U (7, 5), the smallest norm among the norms inputted from U (6, 5) and U (8, 5) and a norm calculated by U (7, 5), and unit identification information having such a norm is selected. By the steps described above, the value of the minimum norm and one of the units having the minimum norm among the entire units can be selected.

In the example shown in FIG. 29, each norm inputted in each unit is compared with a norm calculated by the unit itself, and therefore the maximum number of comparisons is, for example, 11 times, when comparison starts from U (1, 1), i.e., at U (1, 2), U (1, 3), U (1, 4), U (1, 5), U (5, 2), U (5, 3), U (5, 4), U (5, 5), U (6, 4), U (6, 5) and U (7, 5) in this order. Here, comparisons of norms are executed in parallel, such that, in the case of the example shown in FIG. 29, to find the minimum norm among the entire norms, only 11 times of comparisons are required. Therefore, because comparisons are executed in parallel, the minimum norm can be selected through a very few number of comparisons.

As shown in FIG. 29, the multiple units are classified in advance into leaf units, a root unit and trunk units. The leaf units refer to a plurality of units predetermined among the multiple units as units that start comparison for selecting the minimum norm among norms calculated by the multiple units. The root unit is a single unit predetermined as a unit that outputs the minimum norm selected from among the norms calculated by the respective units and unit network coordinates of a unit having the minimum norm to the distribution control section. Also, the trunk units are a plurality of units predetermined for connecting the leaf units and the root unit.

In FIG. 29, the leaf units, such as, U (1, 1), U (2, 1) and the like are colored darker. The root unit that outputs the result is a single unit, which is U (7, 5) in FIG. 29, and this root unit is also colored darker in FIG. 29. The trunk units are the remaining other units, and shown in FIG. 29 as white units.

It is noted that, in FIG. 29, in the case where the leaf units start outputting norms for start of the units generally at the same timing, all of the trunk units and the root unit are given predetermined orders indicated by arrows in the figure such that a norm is inputted in each of them from only one of the units generally at a given moment.

For example, norms are inputted in U (2, 5) from U (1, 5) and U (2, 4), and the timing at which the norm is inputted in U (2, 5) from U (1, 5) and the timing at which the norm is inputted in U (2, 5) from U (2, 4) are set in advance at different timings. For example, from the moment when U (1, 1) and U (2, 1) output norms generally at the same time, U (1, 5) outputs a norm to U (2, 5) in about 4 step times, and the U (2, 4) outputs a norm to U (2, 5) in about 3 step times. It is noted that the step time is defined here as a time required from input of a norm in a unit to output of a smaller norm compared by the unit.

In the example shown in FIG. 29, the trunk units and the root unit are connected in advance in a manner that norms are not inputted generally at the same time from units connected thereto.

Figure 30:
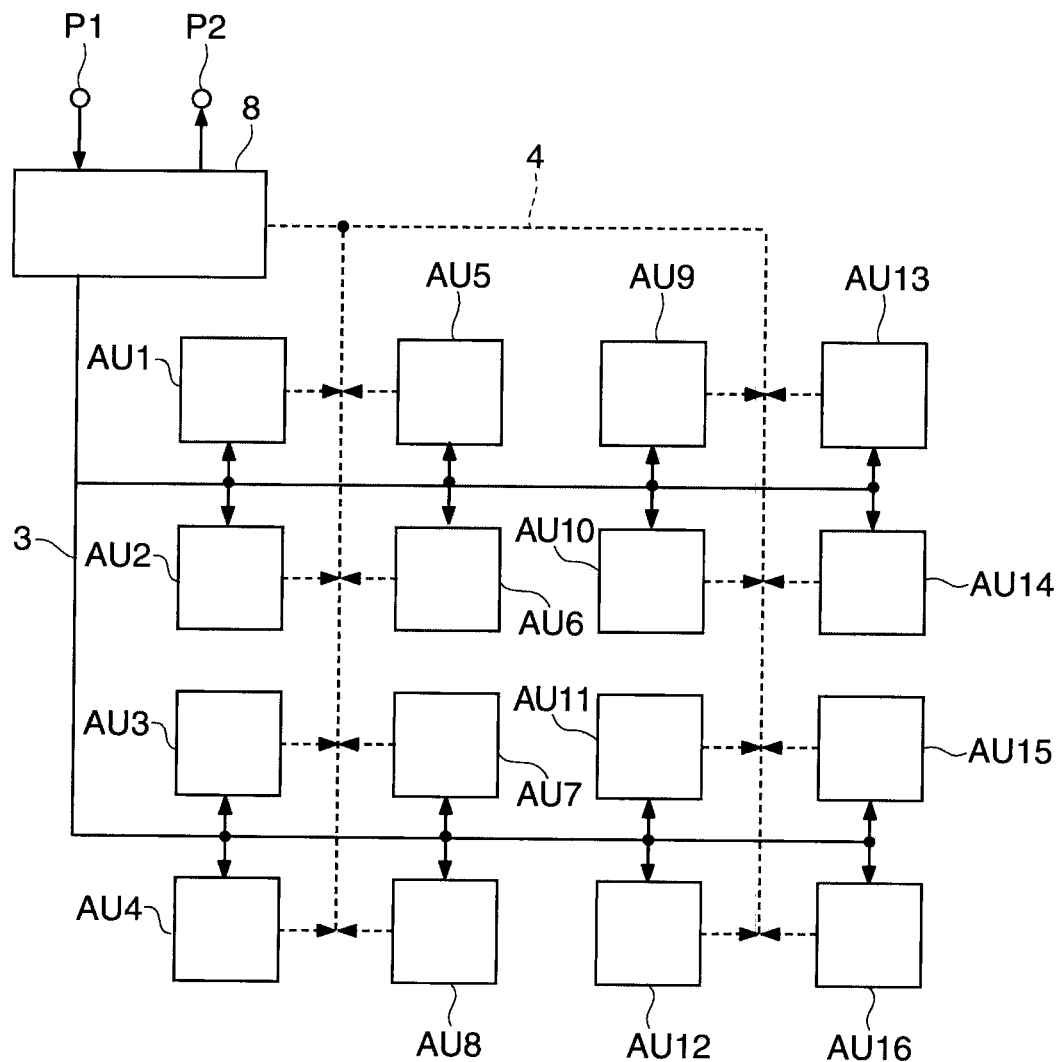
FIG. 30 is a unit connection diagram 1 when a tournament method is used.
Figure 31:
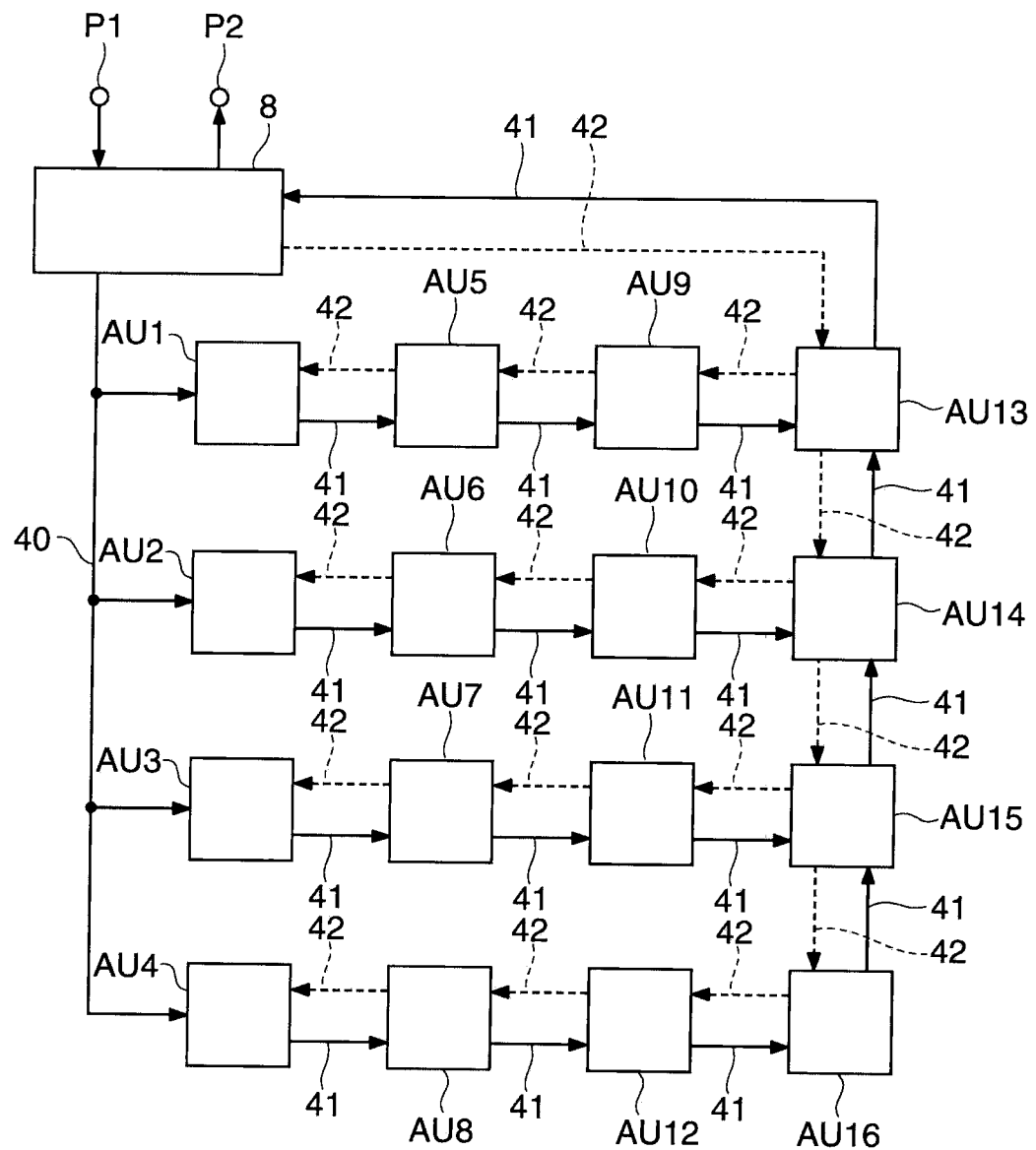
FIG. 31 is a unit connection diagram 2 when a tournament method is used.

Overall Structure of Parallel Processing Device in Accordance with Fifth Embodiment Next, referring to FIG. 30 and FIG. 31, the overall structure of the parallel processing device in accordance with the fifth embodiment is described. As shown in FIG. 30 or FIG. 31, the example described here has 16 units, unit AU1 through unit AU16. The parallel processing device in accordance with the fifth embodiment has a structure shown in FIG. 30, and in addition, a structure shown in FIG. 31.

The parallel processing device in accordance with the fifth embodiment shall be described hereafter as having the structure of the parallel processing device applied to a self-organizing map in accordance with the second base structure described with reference to FIG. 14 through FIG. 16, and FIG. 22, and the structure that executes comparison processings by a tournament method described above added to the above structure. Also, the structure of the parallel processing device in accordance with the fifth embodiment and its operations are generally the same as those of the parallel processing device in which a parallel processing device in accordance with the second base structure is applied to a self-organizing map, and therefore their description is omitted. Also, components in FIG. 30 and FIG. 31 that are generally the same as those shown in FIG. 14 shall be appended with the same reference numerals, and their description is omitted.

First, as shown in FIG. 30, the parallel processing device that processes a self-organizing map in accordance with the fifth embodiment has a plurality of units (AU1 through AU16) that are identified by unit network coordinates that are predetermined identification information, and a distribution control section 8 that outputs, in response to input of an output value outputted from one of the plural units through a unit output bus 2, control data including the inputted input value and selection unit network coordinates being identification information for selecting one unit among the plural units, through a unit input bus 3 to each of the plural units. The structure of the parallel processing device in accordance with the fifth embodiment shown in FIG. 30 is generally the same as the structure of the parallel processing device shown in FIG. 14.

Next, as shown in FIG. 31, in the parallel processing device that processes a self-organizing map in accordance with the fifth embodiment, the plural units, unit AU1 through AU16 and AU1 through AU16, are connected in predetermined orders through a norm comparison bus 41 and a unit busy flag bus 42, respectively, in addition to the structure shown in FIG. 30. In FIG. 31, units AU1, AU2, AU3 and AU4 are leaf units. Also, units AU5 through AU12, and units AU14 through AU16 are trunk units. Moreover, unit AU13 is a root unit. Adjacent ones of the leaf units, the trunk units and the root unit are mutually connected through the norm comparison bus 41 such that comparison results can be transmitted from the leaf units to the root unit in predetermined orders, and the root unit (AU13) is connected to the distribution control section 8 through the norm comparison bus 41.

The orders from the leaf units to the root unit shown in FIG. 31 includes a first order defined by AU1, AU5, AU9 and AU13 in this order, a second order defined by AU2, AU6, AU10 and AU14 in this order, a third order defined by AU3, AU7, AU11, AU15, AU14 and AU13 in this order, and a fourth order defined by AU4, AU8, AU12, AU16, AU15, AU14 and AU13 in this order. Adjacent ones of the units are mutually connected through the norm comparison bus 41, and connected through the unit busy flag bus 42 in the predetermined orders, the first order, the second order, the third order and the fourth order.

Also, in FIG. 31, the leaf units AU1, AU2, AU3 and AU4 are connected to the distribution control section 8 through a norm comparison start signal line 40. For example, when the distribution control section 8 outputs a signal indicating to start comparison of norms through the norm comparison start signal line 40 to the leaf units that are AU1, AU2, AU3 and AU4, comparison of norms is executed with the leaf units as being starting units in parallel in the first order, the second order, the third order and the fourth order. Then, the results of comparison in the respective orders are inputted in the root unit, AU13. The root unit selects the minimum norm, and unit network coordinates of a unit having the minimum norm among the entire units, and outputs the selected norm and the unit network coordinates to the distribution control section 8 through the norm comparison bus 41.

It is noted that, in the description above, the leaf units AU1, AU2, AU3 and AU4 and the distribution control section 8 are connected to one another by the norm comparison start signal line 40, and a signal indicating to start comparison of norms is outputted from the distribution control section 8 through the norm comparison start signal line 40 to the leaf units. However, in accordance with an aspect of the embodiment to be described below, without using the norm comparison start signal line 40, control data with the value of control code A being "11" indicating to "start comparison for selection of the minimum norm among norms calculated by the respective plural units", as shown in FIG. 32 to be described below, may be outputted by the distribution control section 8 to the leaf units through the unit input bus 3. It is noted that the distribution control section 8 outputs the control data with the value of control code A being "11" indicating to "start comparison for selection of the minimum norm among norms calculated by the respective plural units" through the unit input bus 3 not only to the leaf units but to the entire units.

It is noted that, in FIG. 31, a connection with relatively simple comparison orders is used in order to describe the principle of parallel norm comparison orders. However, in an actual connection, a root unit may preferably be located, with respect to the entire units, generally at the center thereof, and plural leaf units may preferably be located, with respect to the entire units, generally at the peripheral thereof. When the root unit is located generally at the center of the entire units, and the plural units are located generally at the periphery of the entire units, the number of units between the leaf units to the root unit, in other words, the number of norm comparisons can be reduced, and it is thus effective in that the norms can be compared at high speeds.

Outline of Structure of Units in Accordance with Fifth Embodiment

Next, an outline of the structure of the units in accordance with the fifth embodiment described above with reference to FIG. 30 and FIG. 31 is described. First, as described with reference to FIG. 22, each of the multiple units has a unit norm storage section 236A that stores a norm calculated by itself based on control data inputted from the distribution control section 8, and a unit network coordinates storage section 234A that stores unit network coordinates of own unit.

Each of the leaf units has a leaf norm information output section. In response to input from the distribution control section 8 of a signal indicating to start comparison for selecting a minimum norm among norms calculated by plural units, the leaf norm information output section of each leaf unit outputs a norm readout from the unit norm storage section 236A of own unit and unit network coordinates readout from the unit network coordinates storage section 234A of own unit to a succeeding stage unit connected to own unit through the norm comparison bus 41.

Each of the trunk unit and the root unit has a winner norm information storage section, a norm information input section, a winner norm information setting section, and a norm information output section. The winner norm information storage section of any of the aforementioned units stores the minimum norm among norms inputted in the unit and a norm stored in the unit norm storage section of own unit, and unit network coordinates that identify a unit having the minimum norm associated with the minimum norm as winner norm information. The norm information input section receives a norm and unit network coordinates associated with each other as norm information through the norm comparison bus from a preceding unit that is an adjoining unit closer to the leaf unit in the order of comparing norms.

The winner norm information setting section, in response to input of norm information in the norm information input section, compares the norm inputted in the norm information input section with a norm readout from the winner norm information storage section of own unit or the unit number storage section of own unit, and stores a minimum one of the norms and unit network coordinates associated with the minimum norm as winner norm information in the winner norm information storage section. The norm information output section outputs winner norm information readout from the winner norm information storage section through the norm comparison bus to a succeeding stage unit that is an adjoining unit closer to the root unit in the order of comparing norms.

Also, the trunk units and the root unit are connected in advance to a plurality of trunk units or a plurality of leaf units as preceding stage units, respectively, and each of the trunk units and the root unit has a preceding stage connection number storage section, an input frequency storage section, and a preceding stage connection number comparing section, respectively. The preceding stage connection number storage section stores in advance a preceding stage connection number that is the total number of preceding units that are connected to own unit. The input frequency storage section counts up the frequency of inputs each time a norm and unit network coordinates are inputted in the norm information input section and stores the same. The preceding stage connection number comparing section compares the preceding stage connection number readout from the preceding stage connection number storage section with the input frequency readout from the input frequency storage section. Also, when the result of comparison by the preceding stage connection number comparing section indicates that the preceding stage connection number matches the input frequency, the norm information output section outputs winner norm information readout from the winner norm information storage section.

Moreover, each of the trunk units and the root unit has a unit busy flag storage section that stores unit busy flag information that indicates as to whether a norm and unit network coordinates from its preceding unit can be inputted. Also, each of the units has a busy flag judgment section that judges, based on unit busy flag information outputted from the unit busy flag storage section of a succeeding unit of own unit, as to whether a norm and unit network coordinates are to be outputted to the succeeding unit. Also, the norm information output section of own unit outputs, based on the result of judgment of the busy flag judgment section of own unit, winner norm information readout from the winner norm information storage section.

Also, the norm information input section sets, in response to input of norm information, the unit busy flag information stored in the unit busy flag storage section as being incapable of receiving from a preceding unit of own unit. Also, the preceding stage connection number comparison section sets, when the result of comparison indicates that the preceding stage connection number and the input frequency do not match, the unit busy flag information stored in the unit busy flag storage section as being capable of receiving from a preceding stage unit of own unit.

Also, each of the trunk units and the root unit has a unit control section. The unit control section sets, in response to input from the distribution control section of a signal indicating to start comparison for selection of a minimum norm among norms calculated by multiple units, the unit busy flag information stored in the unit busy flag storage section as being capable of inputting. Also, the preceding stage connection number comparison section sets, when the result of comparison indicates that the preceding stage connection number matches the input frequency, the unit busy flag information stored in the unit busy flag storage section as being incapable of inputting from a preceding stage unit of own unit.

Protocols of Control Data in Accordance with Fifth Embodiment

Next, with reference to FIG. 32, examples of protocols of control data in accordance with the fifth embodiment are described. The protocols of control data shown in FIG. 32 includes the value of control code A being "11" in addition to the protocols of control data shown in FIG. 23. Protocols of control data with the values of control data being 4 through 10 shown in FIG. 32 are the same as the protocols of control data with the values of control data being 4 through 10 shown in FIG. 23, and therefore their description is omitted.

Selection Process 11

When value of control code A included in control data is "11" which indicates to "signal to start winner unit deciding algorithm," in other words, "start comparison for selecting a minimum norm among norms calculated by plural units," the control data includes only control code A whose value is "11." In all units that receive control data with the value of control code A being "11," each leaf unit (starting unit) outputs and passes its own unit norm and own unit network coordinates to a succeeding unit. Each of the other units including the root unit and trunk units compares an input from a preceding stage, and outputs and passes a decided winner unit norm and its unit network coordinates to a succeeding stage.

As for units that receive control data with the value of control code A being "11" indicating to "start comparison for selecting a minimum norm among norms calculated by plural units," the structure and operations of each of the leaf units, the root unit and the trunk units shall be described with reference to FIGS. 33 through 36.

Structure of Leaf Unit

Figure 33:
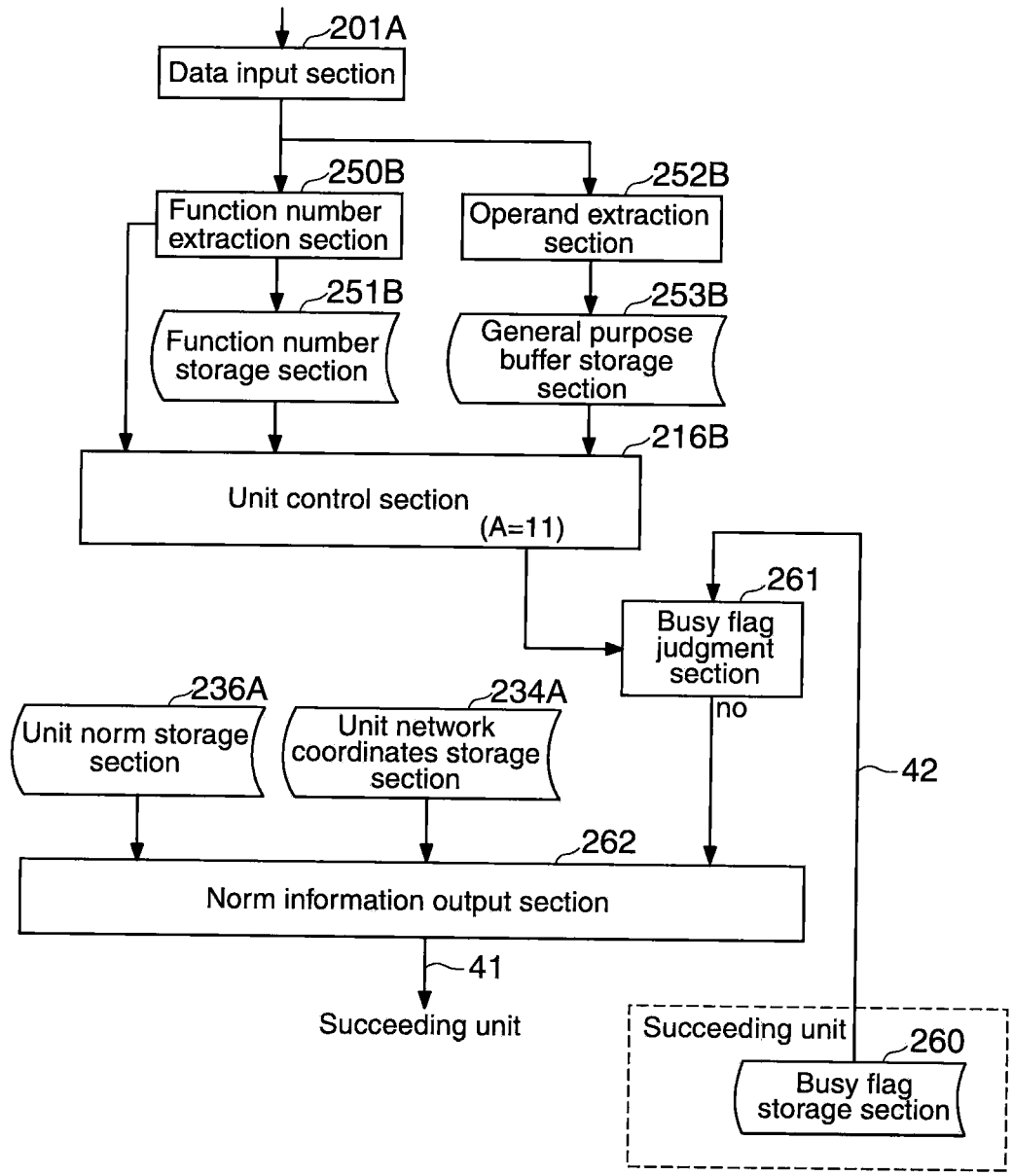
FIG. 33 is a block diagram of the structure of a leaf unit in accordance with the fifth embodiment.

Referring to FIG. 33, the structure of the leaf unit in accordance with the fifth embodiment is described. It is noted that the leaf unit in accordance with the fifth embodiment has the entire compositions of the unit in accordance with the fourth embodiment shown in FIG. 22. Therefore, in this example, the added structure in the leaf unit in the fifth embodiment, which is added to the structure of the unit in accordance with the fourth embodiment shown in FIG. 22, is described. Components of the unit in accordance with the fifth embodiment shown in FIG. 33 that are generally the same as those of the unit in accordance with the fourth embodiment shown in FIG. 22 shall be appended with the same reference numerals, and their description shall be omitted.

The leaf unit has a unit control section 216B, a busy flag judgment section 261, and a norm information output section 262. It is noted that description of the other components shall be omitted. Also, a busy flag storage section 260 shown in FIG. 33 is a component provided in a succeeding stage unit.

It is noted that the following components in the structure of the leaf unit correspond to the components described above in "Outline of Structure of Unit In Accordance With Fifth Embodiment," respectively. First, the norm information output section 262 corresponds to the leaf norm information output section. The unit control section 216B corresponds to the unit control section. The busy flag judgment section 261 corresponds to the busy flag judgment section.

Next, each of the components shall be described. The unit control section 216B, upon receiving control data with the value of control code being "11," outputs a signal indicative of executing the processing indicated by the value of control code being "11" to the busy flag judgment section 261.

In response to input of the signal indicative of executing the processing indicated by the value of control code being "11" from the unit control section 216B, the busy flag judgment section 261 reads a busy flag from the busy flag storage section 260 of a preceding stage unit through the unit busy flag bus 42 as a preceding stage busy flag for judgment, and outputs the result of judgment to the norm information output section 262.

When the result of judgment inputted from the busy flag judgment section 261 indicates that the succeeding stage busy flag is not set, the norm information output section 262 outputs a unit norm readout from the unit norm storage section 236A and unit network coordinates readout from the unit network coordinates storage section 234A as norm information to a succeeding stage unit through the norm comparison bus 41.

Structure of Trunk Unit or Root Unit

Figure 34:
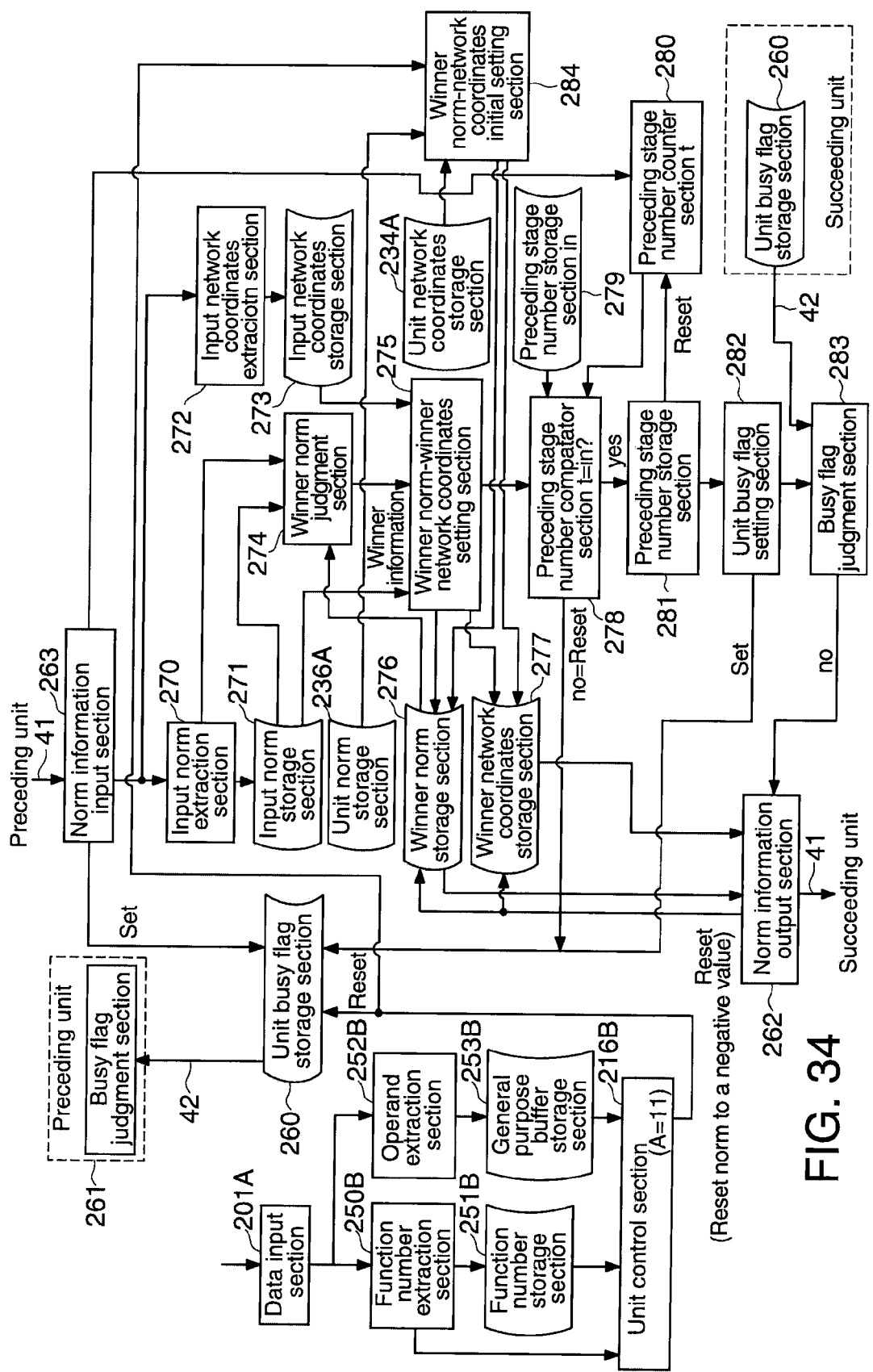
FIG. 34 is a block diagram of the structure of a trunk unit or a root unit in accordance with the fifth embodiment.

Next, with reference to FIG. 34, the structure of the trunk unit or the root unit in accordance with the fifth embodiment shall be described. It is noted that, like the description of the structure of the leaf unit in accordance with the fifth embodiment described with reference to FIG. 33, only compositions modified or added to the structure of the unit in accordance with the fourth embodiment of FIG. 22 shall be described. Also, components of the unit in accordance with the fifth embodiment shown in FIG. 34 that are generally the same as those of the unit in accordance with the fourth embodiment shown in FIG. 22 shall be appended with the same reference numerals, and their description shall be omitted.

Each of the trunk units and the root unit has busy flag storage section 260, a busy flag judgment section 261, a norm information output section 262, a norm information input section 263, an input norm extraction section 270, an input norm storage section 271, an input network coordinates extraction section 272, an input network coordinates storage section 273, a winner norm judgment section 274, a winner norm-winner network coordinates set section 275, a winner norm storage section 276, a winner network coordinates storage section 277, a preceding stage connection comparison section 278, a preceding stage connection storage section 279, a preceding stage connection number counter section 280, a preceding stage connection number counter reset section 281, and a unit busy flag set section 282.

It is noted that the following components in the structure of the trunk unit or the root unit correspond to the components described above in "Outline of Structure of Unit In Accordance With Fifth Embodiment," respectively. First, the busy flag storage section 260 corresponds to the unit busy flag storage section. The busy flag judgment section 261 corresponds to the busy flag judgment section. The norm information extraction section 262 corresponds to the norm information extraction section. The norm information input section 263 corresponds to the norm information input section. The input norm extraction section 270, the input norm storage section 271, the input network coordinates extraction section 272, the input network coordinates storage section 273, the winner norm judgment section 274 and the winner norm-winner network coordinates set section 275 correspond to the winner norm information setting section. The winner norm storage section 276 and the winner network coordinates storage section 277 corresponds to the winner norm information storage section. The preceding stage connection number comparison section 278, the preceding stage connection number counter reset section 281 and the unit busy flag set section 282 correspond to the preceding stage connection number comparison section. The preceding stage connection number storage section 279 corresponds to the preceding stage connection number storage section. Also, the preceding stage connection number counter section 280 corresponds to the input frequency storage section.

Next, each of the components is described. The unit control section 216B, upon receiving control data with the value of control code being "11," outputs a signal indicative of executing the processing indicated by the value of control code being "11" to the winner norm-network coordinates initial set section 284. Also, upon receiving control data with the value of control code being "11," the unit control section 216B resets the busy flag at the unit busy flag storage section 260.

In response to receiving the input of the signal indicative of executing the processing indicated by the value of control code being "11" from the unit control section 216B, the winner norm-network coordinates initial set section 284 stores and sets the unit norm readout from the unit number storage section 236A as a winner norm in the winner norm storage section 276, and stores and sets the unit network coordinates readout from the unit network coordinates storage section 234A as winner network coordinates in the winner network coordinates storage section 277.

In response to input of the norm information from a preceding unit through the norm comparison bus 41, the norm information input section 263 sets a busy flag at the unit busy flag storage section 260, counts up the value (t) of the preceding stage connection number counter stored in the preceding stage connection number counter section 280, and outputs the inputted norm information to the input norm extraction section 270 and the input network coordinates extraction section 272.

In response to input of the norm information from the norm information input section 263, the input norm extraction section 270 extracts a norm from the inputted norm information, and stores the extracted norm as an input norm in the input norm storage section 271. In response to input of the norm information from the norm information input section 263, the input network coordinates extraction section 272 extracts network coordinates from the inputted norm information, and stores the extracted network coordinates as input network coordinates in the input network coordinates storage section 273.

In response to storage of the extracted norm in the input norm storage section 271 by the input norm extraction section 270, the winner norm judgment section 274 compares the input norm readout from the input norm storage section 271 with the winner norm readout from the winner norm storage section 276, and outputs the result of comparison as winner information to the winner norm-winner network coordinates set section 275.

When the winner information inputted from the winner norm judgment section 274 indicates that the input norm is smaller than the winner norm, the winner norm-winner network coordinates set section 275 stores and sets the input norm readout from the input norm storage section 271 as a winner norm in the winner norm storage section 276, and stores and sets the input network coordinates readout from the input network coordinates storage section 273 as winner network coordinates in the winner network coordinates storage section 277.

In response to completion of the processing by the winner norm-winner network coordinates set section 275 with the winner information inputted from the winner norm judgment section 274, the winner norm-winner network coordinates set section 275 outputs to the preceding stage connection number comparison section 278 a signal indicative of completion of the processing by the winner norm-winner network coordinates set section 275 with the winner information inputted from the winner norm judgment section 274.

The preceding stage connection number storage section 279 stores in advance a value of the preceding stage connection number (in) that is the total number of preceding units to which own unit is connected. In response to input of the signal indicative of completion of the processing by the winner norm-winner network coordinates set section 275 with the winner information inputted from the winner norm judgment section 274, the preceding stage connection number comparison section 278 compares the value (t) of the preceding stage connection number counter readout from the preceding stage connection number counter section with the value of the preceding stage connection number (in) readout from the preceding stage connection number storage section 279. When the result of comparison indicates that the value (t) of the preceding stage connection number counter and the value (in) of the preceding stage connection number do not match, the preceding stage connection number comparison section 278 resets a busy flag in the unit busy flag storage section 260.

Upon matching of the value (t) of the preceding stage connection number counter and the value (in) of the preceding stage connection number as indicated by the result of comparison by the preceding stage connection number comparison section 278, the preceding stage connection number counter reset section 281 resets the value (t) of the preceding stage connection number counter stored in the preceding stage connection number counter section 280 to 0. In response to resetting by the preceding stage connection number counter reset section 281 of the value (t) of the preceding stage connection number counter stored in the preceding stage connection number counter section 280 to 0, the unit busy flag set section 282 sets the unit busy flag in the unit busy flag storage section 260.

In response to setting by the unit busy flag set section 282 of the unit busy flag in the unit busy flag storage section 260, the busy flag judgment section 261 reads the busy flag from the busy flag storage section 260 of a succeeding unit through the unit busy flag bus 42 as a succeeding stage busy flag, judges as to whether the succeeding stage busy flag is set, and outputs the result of comparison to the norm information output section 262.

In response to indication by the result of judgment inputted from the busy flag judgment section 261 that the succeeding stage busy flag is not set, the norm information output section 262 outputs the winner norm readout from the winner norm storage section 276 and the winner network coordinates readout from the winner network coordinates storage section 277 as norm information to a succeeding stage unit through the norm comparison bus 41. Also, in response to indication by the result of judgment inputted from the busy flag judgment section 261 that the succeeding stage busy flag is not set, the norm information output section 262 stores a norm that is a predetermined negative value stored in the winner norm storage section 276 thereby resetting the value, and resets the winner network coordinates stored in the winner network coordinates storage section 277.

Operations of Units in Accordance with Fifth Embodiment

Figure 35:
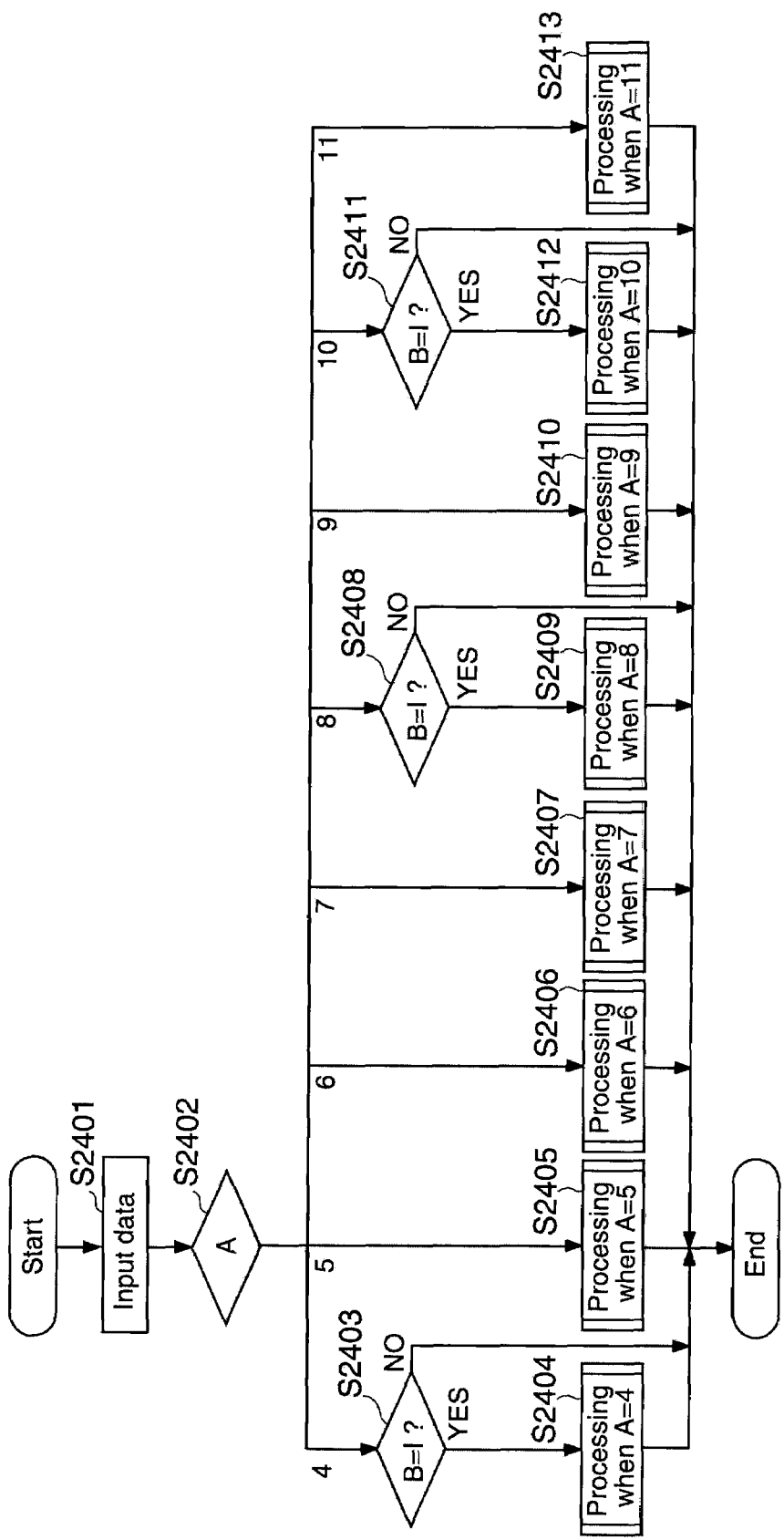
FIG. 35 is a flow chart for describing operations of each unit in accordance with the fifth embodiment.

Next, referring to FIG. 35, operations of the unit, in particular, operations of the unit control section 216 of the unit, to be executed upon receiving the protocols of control data described above with reference to FIG. 32, are described. It is noted that the description shall be made hereafter, using values of control code A, for simplification of the description.

Operations of the unit control section 216B in accordance with the fifth embodiment shown in FIG. 35 that are generally the same as those of the unit control section 216B in accordance with the fourth embodiment shown in FIG. 24 shall be appended with the same step numbers, and their description shall be omitted. It is noted that, here, only operations of the unit control section 216B in accordance with the fifth embodiment shown in FIG. 35, which are different from those of the unit control section 216B in accordance with the fourth embodiment shown in FIG. 24, shall be described.

In step S2402, when the value of control code readout is "11," the unit control section 216B executes the selection process 11 described above (step S2413), and ends the process. In other words, the operation of the unit control section 216B in accordance with the fifth embodiment shown in FIG. 35 is different from the operation of the unit control section 216B in accordance with the fourth embodiment shown in FIG. 24 in that step S2413 of an operation to be executed when the value of the readout control code is "11" is added next to step S2402.

Next, operations of the unit in accordance with the fifth embodiment are described with reference to FIG. 36. It is noted that, since the leaf units are different in their structure from the trunk units or the root unit, as indicated in FIGS. 33 and 34, the units are divided into a group of the leaf units and a group of the trunk units or the root unit, and operations of these divided groups are described.

Operations of Leaf Unit

Figure 36A:
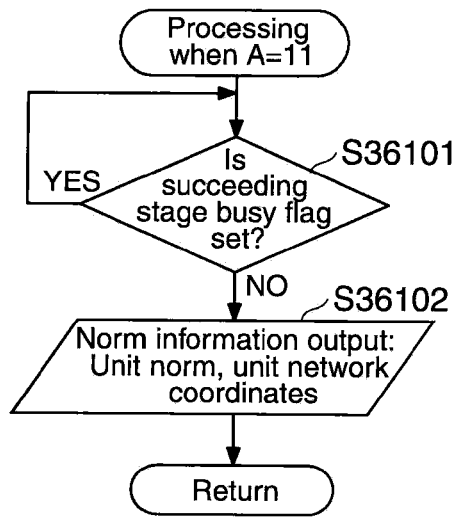
FIG. 36 is a flow chart for describing operations of the unit in accordance with the fifth embodiment.

First, referring to FIG. 36A, operations of the leaf units are described. When the unit control section 216B judges to execute the processing indicated by the value of control code being "11," first, the busy flag judgment section 261 reads the busy flag from the busy flag storage section 260 of a succeeding stage unit through the unit busy flag bus 42 as a succeeding stage busy flag and judges as to whether the succeeding stage busy flag is set (step S36101). When the result of judgment in step S36101 indicates that the succeeding stage busy flag is set, the processing in step S36101 is repeated until the succeeding stage busy flag becomes unflagged.

On the other hand, when the result of judgment in step S36101 indicates that the succeeding stage busy flag is not set, the norm information output section 262 outputs the unit norm readout from the unit norm storage section 236A and the unit network coordinates readout from the unit network coordinates storage section 234A as norm information to a succeeding stage unit through the norm comparison bus 41 (step S36102), and returns the process.

Operations of Trunk Unit or Root Unit

Figure 36B:
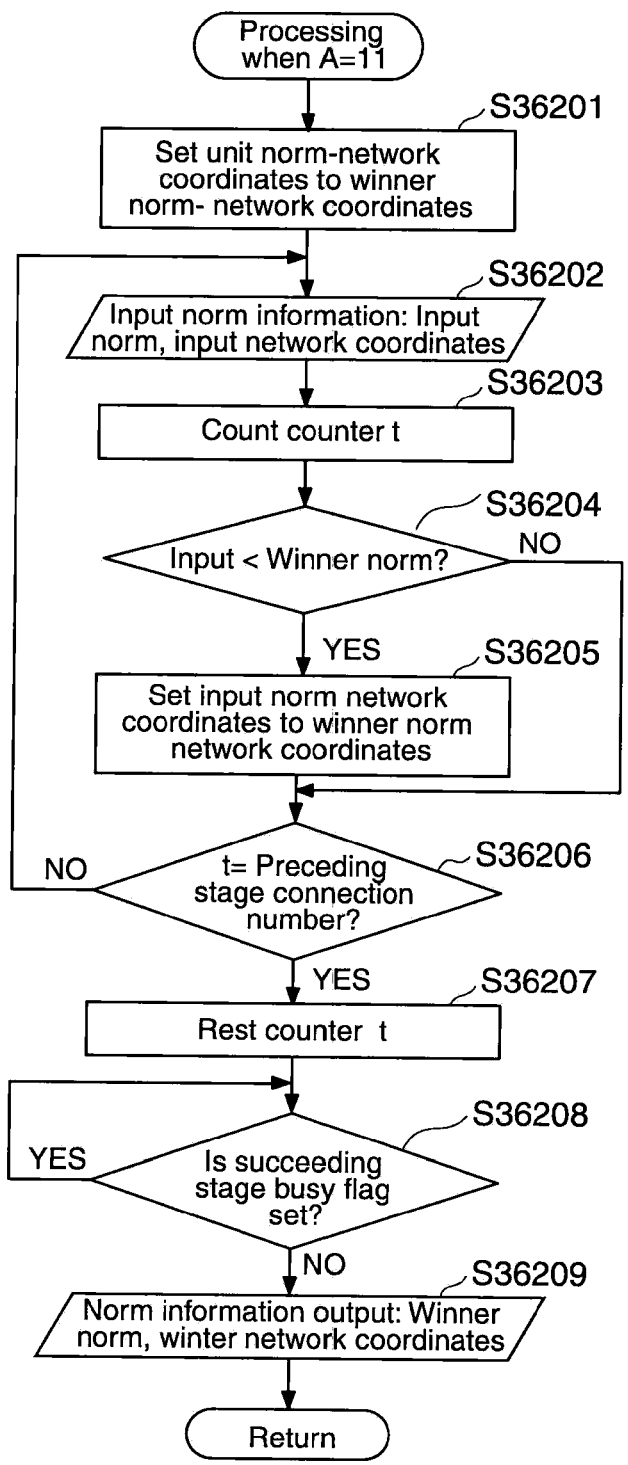

Next, referring to FIG. 36B, operations of the trunk units or the root unit are described. When the unit control section 216B judges to execute the processing indicated by the value of control code being "11," the unit control section 216B resets the busy flag in the busy flag storage section 260. Next, in response to judgment to execute the processing indicated by the value of control code being "11," the winner norm-network coordinates initial set section 284 stores and sets the unit norm readout from the unit norm storage section 236A as a winner norm in the winner norm storage section 276, and stores and sets the unit network coordinates readout from the unit network coordinates storage section 234A as winner network coordinates in the winner network coordinates storage section 277 (steps S36201). Then, the norm information input section 263 waits until norm information is inputted from the preceding stage unit.

Next, in response to input of the norm information from a preceding unit through the norm comparison bus 41 (step S36202), the norm information input section 263 sets a busy flag at the unit busy flag storage section 260. Also, the norm information input section 263 counts up the value (t) of the preceding stage connection number counter stored in the preceding stage connection number counter section 280 (step S36203), and the norm information input section 263 outputs the inputted norm information to the input norm extraction section 270 and the input network coordinates extraction section 272.

Next, the input norm extraction section 270 in which the norm information is inputted extracts a norm from the inputted norm information, and stores the extracted norm as an input norm in the input norm storage section 271. Also, the input network coordinates extraction section 272 in which the norm information is inputted extracts network coordinates from the inputted norm information, and stores the extracted network coordinates as input network coordinates in the input network coordinates storage section 273.

Next, in response to storage of the extracted norm in the input norm storage section 271 extracted by the input norm extraction section 270, the winner norm judgment section 274 compares the input norm readout from the input norm storage section 271 with the winner norm readout from the winner norm storage section 276 (step S36204).

When the result of comparison in step S36204 indicates that the input norm is smaller than the winner norm, the winner norm-winner network coordinates set section 275 stores and sets the input norm readout from the input norm storage section 271 as a winner norm in the winner norm storage section 276, and stores and sets the input network coordinates readout from the input network coordinates storage section 273 as winner network coordinates in the winner network coordinates storage section 277 (step S36205).

On the other hand, when the result of comparison in step S36204 indicates that the input norm is not smaller than the winner norm, or after step S36205, in other words, in response to execution by the winner norm-winner network coordinates set section 275 of the processing upon input of the winner information that is the result of comparison inputted from the winner norm judgment section 274, the preceding stage connection number comparison section 278 compares the value (t) of the preceding stage connection number counter readout from the preceding stage connection number counter section with the value (in) of the preceding stage connection number readout from the preceding stage connection number storage section 279 (step S36206).

When the result of comparison in step S36206 indicates that the value (t) of the preceding stage connection number counter and the value (in) of the preceding stage connection number do not match, the preceding stage connection number comparison section 278 resets the busy flag in the unit busy flag storage section 260, and the processing is repeated from step S36202. On the other hand, when the result of comparison in step S36206 indicates that the value (t) of the preceding stage connection number counter and the value (in) of the preceding stage connection number match, the preceding stage connection number counter reset section 281 resets the value (t) of the preceding stage connection number counter stored in the preceding stage connection number counter section 280 to 0 (step S36207).

Then, the unit busy flag set section 282 sets the unit busy flag in the unit busy flag storage section 260. Next, the busy flag judgment section 261 reads the busy flag from the busy flag storage section 260 of a succeeding unit through the unit busy flag bus 42 as a succeeding stage busy flag, and judges as to whether the succeeding stage busy flag is set (step S36208). When the result of judgment in step S36208 indicates that the busy flag is set, the processing is repeated from step S36208 until the succeeding stage busy flag is unflagged.

On the other hand, when the result of judgment in step S36208 indicates that the busy flag is not set, the norm information output section 262 outputs the winner norm readout from the winner norm storage section 276 and the winner network coordinates readout from the winner network coordinates storage section 277 as norm information to a succeeding stage unit through the norm comparison bus 41 (step S36209), and the process is returned. Also, when the result of judgment in step S36208 indicates that the busy flag is not set, the norm information output section 262 stores a norm that is a predetermined negative value in the winner norm storage section 276 thereby resetting the value, and resets the winner network coordinates stored in the winner network coordinates storage section 277.

Figure 37:
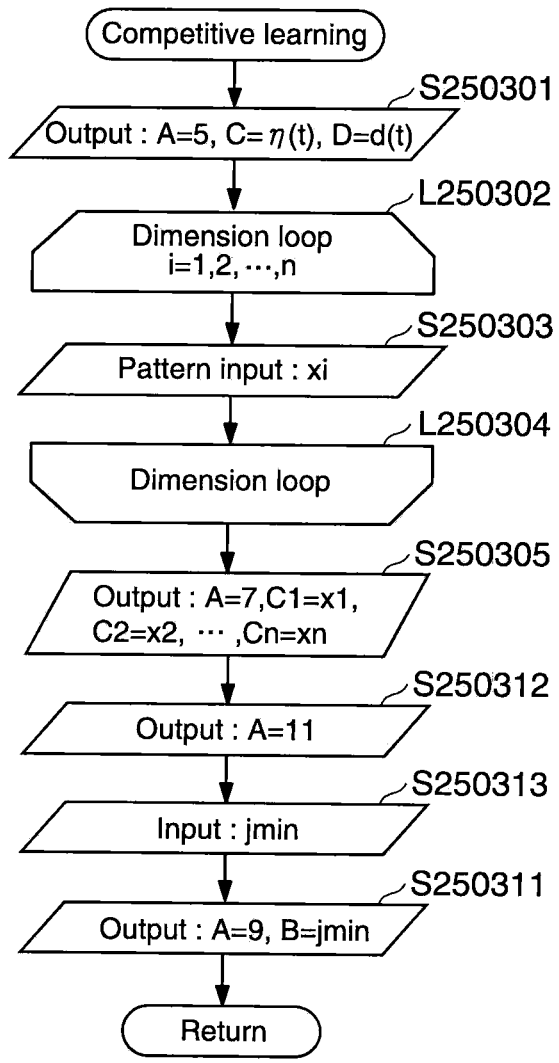
FIG. 37 is a flow chart for describing operations of a distribution control section 8 in accordance with the fifth embodiment.

Operations of Parallel Processing Device (Operations of Distribution Control Section 8) in Accordance with Fifth Embodiment Next, referring to FIG. 37, operations of the parallel processing device in accordance with the fifth embodiment, in other words, operations of the parallel processing device when the parallel processing device in accordance with the second embodiment is applied to a self-organizing map are described. It is noted that, here, only operations added or modified in the operations of the parallel processing device in accordance with the fourth embodiment described with reference to FIGS. 22 through 26 shall be described.

Steps to be changed from the operations of the distribution control section 8 in FIG. 26 to the operations of the distribution control section 8 in FIG. 37 relate to the processing of competitive learning described with reference to FIG. 26A. More specifically, steps S250306 through S250310 of the distribution control section 8 in FIG. 26 are changed to steps S250312 through S250313 of the distribution control section 8 in FIG. 37.

In step S250312, the distribution control section 8 outputs control data with the value of control code A being "11" to each of the units. Then, in steps S250313, the distribution control section 8 receives as an input unit network coordinates included in norm information outputted by the root unit through the norm comparison bus 41 as norm minimum unit network coordinates jmin.

According to the distribution control section 8 in accordance with the fourth embodiment, in steps S250306 through S250310, the distribution control section 8 sequentially receives norms inputted from the entire units, and the distribution control section 8 selects unit network coordinates of the minimum norm among the norms inputted from the entire units. In contrast, the distribution control section 8 in accordance with the fifth embodiment requires only to output control data with the value of control code A being "11" to each of the units, and receive unit network coordinates outputted from the root unit as an input. Accordingly, compared to the processing executed by the distribution control section 8 in accordance with the fourth embodiment, the processing by the distribution control section 8 in accordance with the fifth embodiment is simpler, and comparison of norms is executed by each of the units in parallel such that the comparison becomes faster.

Second Example of Arrangement of Units

Figure 38:
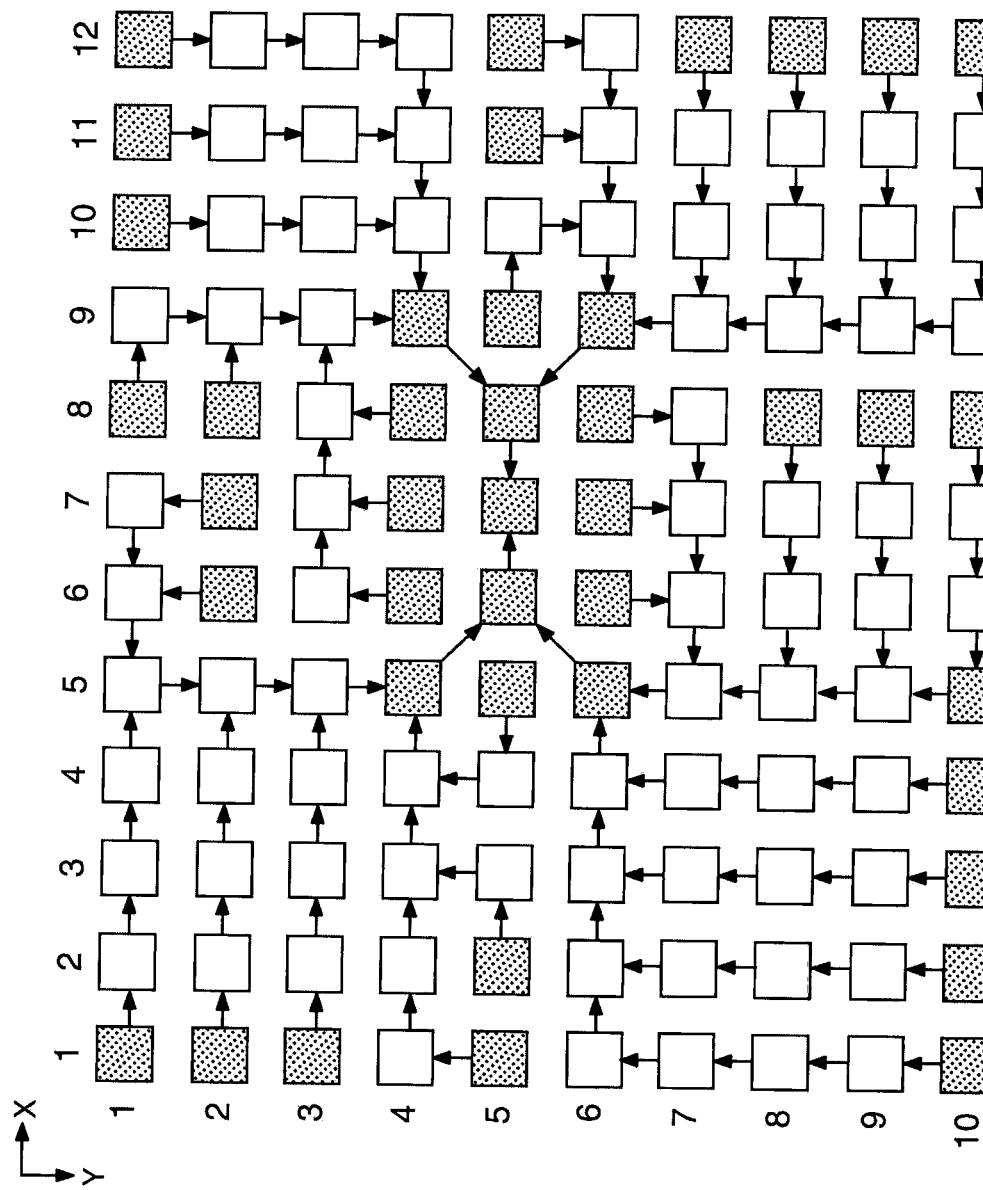
FIG. 38 is a comparison order diagram showing an example of comparison order in comparing norms where concurrent input of norms in a unit occurs.

Next, referring to FIG. 38, a second example of a method for selecting a minimum unit from among units arranged in a two dimensional plane by the tournament method described above is described. In FIG. 38, the root unit is U (7, 5), the leaf units are units that are colored, and the trunk units are units without shading. Also, comparisons are executed in orders indicated by arrows in the figure. Comparison of norms in the units in FIG. 38 is generally the same as the comparison of norms in the units in FIG. 29.

In the arrangement of units and the order of comparison described with reference to FIG. 29, the order of comparison is set in advance in a manner that norms are not inputted in a unit generally at the same timing. In contrast, in the arrangement of units and the order of comparison exemplified in FIG. 38, the order of comparison is set in advance in a manner that there may be units in which norms are inputted in each of such units generally at the same timing.

In general, by enabling input of norms in a single unit generally at the same timing, the order can be set in a manner to reduce the number of comparisons in each order of comparison, such that the time required for comparing norms in the entire units can be shortened.

Changes in Structure of Units

Figure 39A:
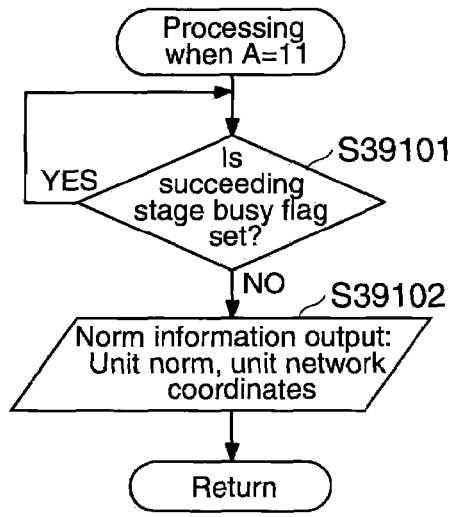
FIG. 39 is a flow chart for describing operations of the unit in accordance with the fifth embodiment, when concurrent input of norms in a unit occurs.

To enable input of norms in a single unit generally at the same timing, changes are made to the leaf units, or the trunk units and the root unit described with reference to FIGS. 33 through 37, and therefore only the changes made in the structure and operations of the units shall be described. The structure of the leaf units is not changed, and remains the same. Also, as shown in FIG. 39A, operations of the leaf units are the same as those shown in FIG. 36A.

Next, each of the trunk units and the root unit may store norm information inputted and the value (t) of the preceding stage connection number counter associated therewith, and may successively read and compare the norm information based on the value (t) of the preceding stage connection number counter, thereby enabling input of norms generally at the same timing.

Only changed components in the structure of the trunk units or the root unit shall be described. In response to input of the norm information from the norm information input section 263, the input norm extraction section 270 extracts a norm from the inputted norm information, and stores the extracted norm as an input norm, associated with the value (t) of the preceding stage connection number counter readout from the preceding stage connection number counter section 280, in the input norm storage section 271.

In response to input of the norm information from the norm information input section 263, the input network coordinates extraction section 272 extracts network coordinates from the inputted norm information, and stores the extracted network coordinates as input network coordinates, associated with the value (t) of the preceding stage connection number counter readout from the preceding stage connection number counter section 280, in the input network coordinates storage section 273.

In response to storage of the extracted norm in the input norm storage section 271 by the input norm extraction section 270, or in response to non-matching of the value (t) of the preceding stage connection number counter and the value (in) of the preceding stage connection number as indicated by the result of comparison by the preceding stage connection number comparison section 278, the winner norm judgment section 274 reads input norm from the input norm storage section 271 corresponding to the value (t) of the preceding stage connection number counter readout from the preceding stage connection number counter section 280, compares the input norm readout with the winner norm readout from the winner norm storage section 276, and outputs the result of comparison as winner information to the winner norm-winner network coordinates set section 275.

Changes in Operations of Trunk Unit or Root Unit

Figure 39B:
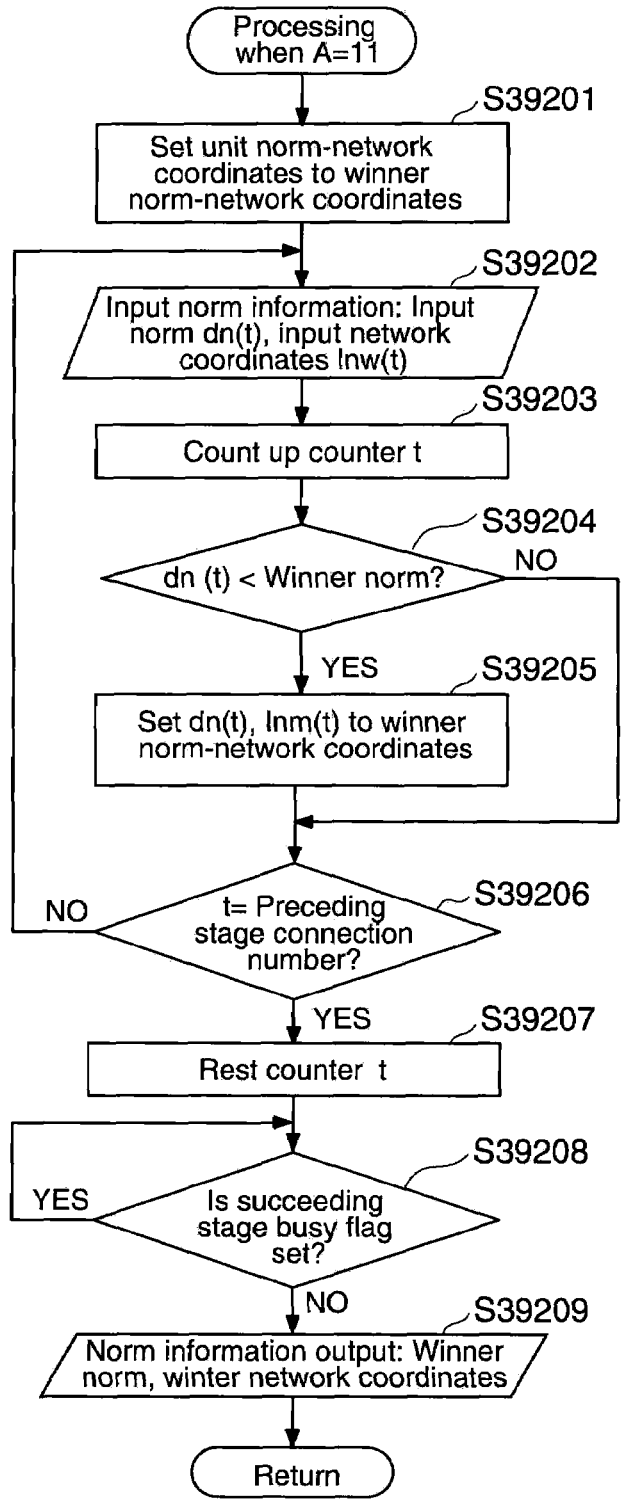

Next, referring to FIG. 39B, operations of the trunk units or the root unit are described. It is noted that the steps S36201 through S36209 in FIG. 36B correspond to the steps S39201 through S39209 in FIG. 39B, respectively. Here, differences in processing between the processing in the steps in FIG. 36B and the processing in the steps in FIG. 39B are mainly described.

When the unit control section 216B judges to execute the processing indicated by the value of control code being "11," the unit control section 216B resets the busy flag in the busy flag storage section 260. Next, in response to judgment to execute the processing indicated by the value of control code being "11," the winner norm-network coordinates initial set section 284 stores and sets the unit norm readout from the unit norm storage section 236A as a winner norm in the winner norm storage section 276, and stores and sets the unit network coordinates readout from the unit network coordinates storage section 234A as winner network coordinates in the winner network coordinates storage section 277 (steps S39201). Then, the norm information input section 263 waits until norm information is inputted from the preceding stage unit.

Next, in response to input of the norm information from a preceding unit through the norm comparison bus 41 (step S39202), the norm information input section 263 sets a busy flag at the unit busy flag storage section 260. Also, the norm information input section 263 counts up the value (t) of the preceding stage connection number counter stored in the preceding stage connection number counter section 280 (step S39203), and the norm information input section 263 outputs the inputted norm information to the input norm extraction section 270 and the input network coordinates extraction section 272.

Next, the input norm extraction section 270 in which the norm information is inputted extracts a norm from the inputted norm information, and stores the extracted norm as an input norm, associated with the value (t) of the preceding stage connection number counter readout from the preceding stage connection number counter section 280, in the input norm storage section 271. Also, the input network coordinates extraction section 272 in which the norm information is inputted extracts network coordinates from the inputted norm information, and stores the extracted network coordinates as input network coordinates, associated with the value (t) of the preceding stage connection number counter readout from the preceding stage connection number counter section 280, in the input network coordinates storage section 273.

In response to storage of the extracted norm in the input norm storage section 271 by the input norm extraction section 270, the winner norm judgment section 274 reads an input norm from the input norm storage section 271 corresponding to the value (t) of the preceding stage connection number counter readout from the preceding stage connection number counter section 280, and compares the input norm readout with the winner norm readout from the winner norm storage section 276 (step S39204).

When the result of comparison in step S39204 indicates that the input norm is smaller than the winner norm, the winner norm-winner network coordinates set section 275 stores and sets the input norm readout from the input norm storage section 271 as a winner norm in the winner norm storage section 276, and stores and sets the input network coordinates readout from the input network coordinates storage section 273 as winner network coordinates in the winner network coordinates storage section 277 (step S39205).

On the other hand, when the result of comparison in step S39204 indicates that the input norm is not smaller than the winner norm, or after step S39205, in other words, in response to execution by the winner norm-winner network coordinates set section 275 of the processing upon input of the winner information that is the result of comparison inputted from the winner norm judgment section 274, the preceding stage connection number comparison section 278 compares the value (t) of the preceding stage connection number counter readout from the preceding stage connection number counter section with the value (in) of the preceding stage connection number readout from the preceding stage connection number storage section 279 (step S39206).

When the result of comparison in step S39206 indicates that the value (t) of the preceding stage connection number counter and the value (in) of the preceding stage connection number do not match, the preceding stage connection number comparison section 278 resets the busy flag in the unit busy flag storage section 260, and the processing is repeated from step S39202. On the other hand, when the result of comparison in step S39206 indicates that the value (t) of the preceding stage connection number counter and the value (in) of the preceding stage connection number match, the preceding stage connection number counter reset section 281 resets the value (t) of the preceding stage connection number counter stored in the preceding stage connection number counter section 280 to 0 (step S39207).

The processings to be executed hereafter are the same as those in the steps shown in FIG. 39B, and therefore description thereof is omitted.

Sixth Embodiment

Backpropagation

Next, the parallel processing device in which a hierarchical neural network is applied to the second base structure described according to the third embodiment is modified to be capable of executing learning by backpropagation, which is described herein below as a sixth embodiment.

First, backpropagation is described. In general, neural networks may be classified, based on the coupling configuration of neurons, into a hierarchical neural network without feedback coupling and a recurrent neural network with feedback coupling.

Here, an example of a hierarchical neural network that has no feedback connections which performs supervised learning is described. When a neural network feeds signals forward, each unit receives an input from one-preceding unit coupled thereto, refers to a coupling coefficient between the units and performs product-sum calculation, and passes the output of output function to units in the next layer connected thereto. The processing is repeated, and an output layer finally outputs the processing result. In this instance, in order to obtain a desired output for a given input, appropriate coupling coefficients need to be set. However, such appropriate coupling coefficients may not often be self-evident.

A backward error propagation (or backpropagation) method is one of supervised learning algorithms in which, by giving teacher data, coupling coefficients of the hierarchical neural network can be trained toward appropriate values. When correcting coupling coefficients of an intermediate layer, it is difficult to obtain immediately errors between given teacher data and values to be outputted. For this reason, errors between teacher data and calculated output values are calculated sequentially from the output layer toward the input layer based on given teacher data, and output errors are sequentially propagated toward preceding layers. An algorithm that realizes such processing is a backpropagation method.

Here, the algorithm of a hierarchical neural network using the backpropagation method is summarized. First, a forward-propagation processing is executed according to the following steps Step C1 through Step C2.

(Step C1) An input pattern for learning is inputted in an input layer (first layer) of the neural network; and (Step C2) Next, states of units in each of the layers from the input layer to the output layer are computed based on the following formulas, Formula 1 through Formula 3 (l=1, 2, ..., L+1). More specifically, a product-sum calculation is performed using a currently given coupling coefficient by Formula 1. Next, based on the result of product-sum calculation computed using Formula 1, an output of the neural network is calculated by Formula 2. It is noted that the coupling coefficient corresponds to a coupling weight.

[Form 1]

$$s_{pj}^{(l+1)} = \sum_{i=0}^{N(l)} w_{ji}^{(l)} x_{pi}^{(l)} \quad \text{(Formula 1)}$$

$$y_{pj}^{(l+1)} = f_j^{(l+1)}(s_{pj}^{(l+1)}) \text{ (where } j = 1, 2, \ldots, N^{(l+1)}) \quad \text{(Formula 2)}$$

$$x_{pj}^{(l)} = \begin{cases} u_{pi} & i \in I \\ y_{pi}^{(l)} & i \in H \cup O \end{cases} \quad \text{(Formula 3)}$$

It is noted that, in Formula 1 through Formula 3, $N^{(l)}$ is the number of units in l layer, and $x^{(l)}_{pi}$ is the output of i-th unit in l layer. Also, $s^{(l+1)}_{pj}$ is the internal state of j-th unit in (l+1) layer. Further, $w(l)_{ji}$ is a coupling coefficient from j-th unit in l layer to j-th unit in (l+1) layer. Also, $f^{(l)}_j$ is a nonlinear output function in i-th unit in l layer. It is noted that the suffix p indicates the number of a teacher pattern presented for an input pattern, I and O are sets of input units and output units, respectively, and H is a set of other units.

Next, backward error propagation (or backpropagation) is computed. For computing backward error propagation, first, by the following steps Step C3 through Step C5, errors from the output layer to the hidden layer are calculated, and coupling coefficients from the output layer to (L+2) layer are corrected.

(Step C3) Upon forward propagation in Step C1 and Step C2, an expected output value (teacher data) is inputted for an input pattern, thereby calculating a difference with respect to the actual output value.

(Step C4) The difference (an error in the output value) between the teacher data and the output value is assumed to have been generated because of the value given by multiplying the output value from the preceding unit with the coupling coefficient (i.e., a product-sum=an input to output layer unit), and an error in the product sum (local error) is inversely computed by the following Formula 4, using the error in the output value, the output function of the unit and the actual input value.

[Form 2]

$$\delta_{pj}^{(L+2)} = g_j^{(L+2)}(s_{pj}^{(L+2)})(y_{pj}^{(L+2)} - d_{pj}) \quad \text{(Formula 4)}$$

(Step 5) Learning speed is taken into account, and each of the coupling coefficients is corrected by the following formulas, Formula 5 and Formula 6 so as to reduce the error in the product sum.

[Form 3]

$$\Delta_p w_{ji}^{(L+1)} = -\eta \delta_{pj}^{(L+2)} x_{pj}^{(L+1)} \quad \text{(Formula 5)}$$

$$w_{ji}^{(L+1)NEW} = w_{ji}^{(L+1)OLD} + \Delta_p w_{ji}^{(L+1)} \quad \text{(Formula 6)}$$

$$\begin{pmatrix} \text{where,} \\ i = 0, 1, 2, \ldots, N^{(L+1)}, j = 1, 2, \ldots, N^{(L+2)}, \\ g_j^{(l+1)}(x) = f_j^{(l+1)'}(x) \end{pmatrix}$$

Here, $d_{pj}$ is a teacher pattern corresponding to a p-th presented input pattern, and $\eta$ is a learning coefficient.

Next, for computing backward error propagation, the processing according to the following steps from Step C6 through Step C8 is executed to correct coupling coefficients sequentially from the hidden layer that is (L+1)-th layer to the input layer that is the 1st layer.

(Step C6) An error in the product sum (local error) is inversely computed by the following Formula 7, in a manner similar to Step C4.

[Form 4]

$$\delta_{pj}^{(l+1)} = g_j^{(l+1)}(s_{pj}^{(l+1)}) \left( \sum_{k=1}^{N^{(l+2)}} \delta_{pk}^{(l+2)} w_{kj}^{(l+1)} \right) \quad \text{(Formula 7)}$$

It is noted that the difference in Step C6 with respect to Step C4 is that, in the output layer, error information for each output value is inversely computed for each unit and propagated to a preceding stage, while, in the hidden layer, the sum of plural error information sets for each unit (due to the fact that there are a plurality of preceding units in coupling relation) is used as error information for the output value of the hidden layer, and inversely computed.

(Step C7) Learning speed is taken into account, and each of the coupling coefficients is corrected by the following formulas, Formula 8 and Formula 9 so as to reduce the error in the product sum.

[Form 5]

$$\Delta_p w_{ji}^{(l)} = -\eta \delta_{pj}^{(l+1)} x_{pj}^{(l)} \quad \text{(Formula 8)}$$

$$w_{ji}^{(l)NEW} = w_{ji}^{(l)OLD} + \Delta_p w_{ji}^{(l)} \quad \text{(Formula 9)}$$

(where, i=0, 1, 2, ..., $N^{(l)}$, j=1, 2, ..., $N^{(l)}$)

(Step C8) Where there are multiple hidden layers, the processing is repeated from step C6 with the layer moved to one preceding stage.

(Step C9) The input pattern for learning inputted in the input layer of the neural network is changed, and the processing is repeated from Step C1. Here, after all input patterns for learning are outputted, an error metric is computed by the following Formula 10.

[Form 6]

$$E = \sum_p E_p = \frac{1}{2} \sum_p \sum_j (y_{pj}^{(L+2)} - d_{pj})^2 \qquad \text{(Formula 10)}$$

When the calculated error metric is less than a predetermined value set in advance, the learning algorithm using the backpropagation method. On the other hand, if the calculated error metric is not less than the predetermined value set in advance, an input pattern for learning is inputted again, and the processing is repeated from Step C1.

It is noted that the processing in Step C1 through Step C2 is executed according to the first embodiment or the third embodiment. The sixth embodiment has a structure that executes the processing in Step C3 through Step C8, in addition to the structure of the third embodiment that executes the processing in Step C1 through Step C2.

Hereunder, description is made as to the case where one pattern data is inputted in the parallel processing device in accordance with the sixth embodiment, then teacher data that is an expected value for the one pattern data is inputted, and the coupling coefficient is corrected only once based on the teacher data.

Structure of Units in Accordance with Sixth Embodiment

Figure 40:
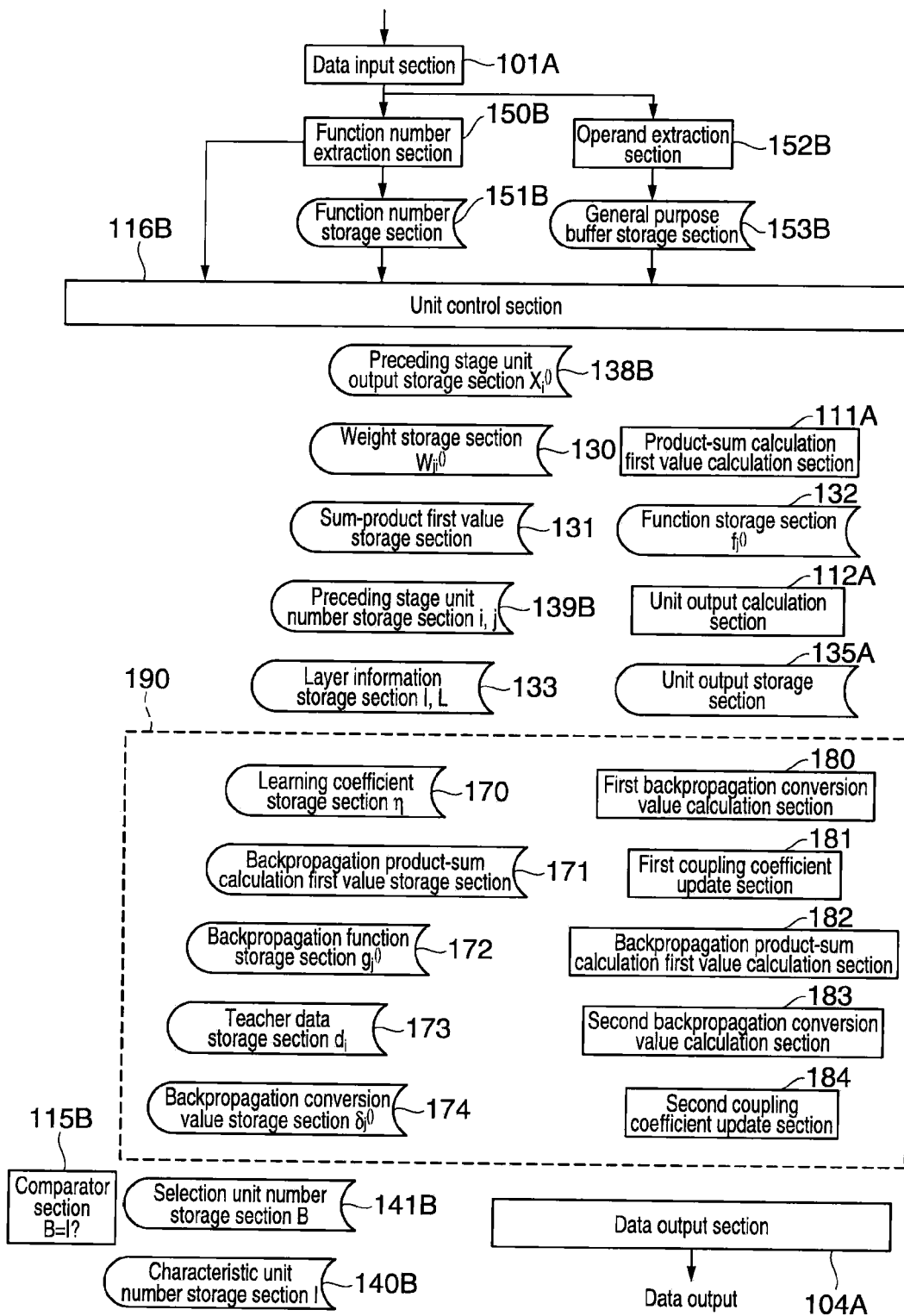
FIG. 40 is a block diagram of the structure of the unit shown in FIG. 14 in accordance with a sixth embodiment.

Next, referring to FIG. 40, the structure of units in accordance with the sixth embodiment is described. The units in accordance with the sixth embodiment shown in FIG. 40 have the structure of the units in accordance with the third embodiment described with reference to FIG. 17, in other words, the structure of the units in which the parallel processing device in accordance with the second base structure is applied to a hierarchical neural network, and further includes a structure to execute backpropagation.

The unit in accordance with the sixth embodiment includes the same structure and operations as those of the unit described with reference to FIG. 17, and therefore these common structure and operations shall be omitted. Hereafter, the structure and operations to execute backpropagation in the units in accordance with the sixth embodiment shall be described. Also, the structure and operations of the entire units are identical, and therefore only the structure and operations of one of the units shall be described.

The unit includes a learning section 190, as shown in FIG. 40, which calculates an error between teacher data inputted from the unit control section 116B and an output value stored in the unit output storage section 135A, and changes, based on the calculated error, the coupling weight stored in the weight storage section 130 sequentially from the output layer to the input layer. The learning section 190 includes a learning coefficient storage section 170, a backpropagation product-sum calculation first value storage section 171, a backpropagation function storage section 172, a teacher data storage section 173, a backpropagation conversion value storage section 174, a first backpropagation conversion value calculation section 180, a first coupling coefficient update section 181, a backpropagation product-sum calculation first value calculation section 182, a second backpropagation conversion value calculation section 183, and a second coupling coefficient update section 184.

Outline of each component of the learning section 190 is described. The learning coefficient storage section 170 stores a learning coefficient that is a coefficient used in learning in backpropagation computation. The learning coefficient corresponds to the learning coefficient η used in Formula 5 in Step C5 or in Formula 8 in Step C7 described above. The backpropagation product-sum calculation first value storage section 171 stores a backpropagation product-sum calculation first value that is a temporary value to be used in the backpropagation computation. The backpropagation product-sum calculation first value is a term product-sum calculated by summation Σ in Formula 7 in Step C6 described above.

The backpropagation function storage section 172 stores in advance a backpropagation function to be used for computation of backpropagation associated with layer information. The backpropagation function corresponds to the function g used in Formula 4 in Step C4 or Formula 7 in Step C6 described above. The function g that is a backpropagation function is, for example, a differential function of the output function f.

The teacher data storage section 173 stores teacher data for an input pattern. The teacher data corresponds to the p-th presented input pattern $d_{pj}$ in Step C5 described above. The backpropagation conversion value storage section 174 stores a backpropagation conversion value. The backpropagation conversion value corresponds to δ to be calculated by Formula 4 in Step C4 described above.

The first backpropagation conversion value calculation section 180 calculates a first backpropagation conversion value ($\delta_{pj}^{(L+2)}$ in Formula 4) by executing computation based on Formula 4 in Step C4 described above, stores the calculated first backpropagation conversion value in the backpropagation conversion value storage section 174, and outputs the same through the data output section 104A to the distribution control section 8. The first coupling coefficient update section 181 executes computation based on Formula 6 and Formula 7 in Step C5 described above, whereby the coupling weight stored in the weight storage section 130 is corrected and updated.

The backpropagation product-sum calculation first value calculation section 182 executes a computation based on Formula 7 in Step C6 described above, thereby calculating the backpropagation product-sum calculation first value that is a term product-sum calculated by summation Σ in Formula 7, and stores the calculated backpropagation product-sum calculation first value in the backpropagation product-sum calculation first value storage section. The second backpropagation conversion value calculation section 183 executes a computation based on Formula 7 in Step C6 described above, thereby calculating a backpropagation conversion value, and stores the calculated backpropagation conversion value in the backpropagation conversion value storage section 174.

The second coupling coefficient update section 184 executes computation based on Formula 8 and Formula 0 in Step C7 described above, thereby correcting and updating the coupling weight stored in the weight storage section 130.

The first backpropagation conversion value calculation section 180, the first coupling coefficient update section 181, the backpropagation product-sum calculation first value calculation section 182, the second backpropagation conversion value calculation section 183, and the second coupling coefficient update section 184 are described in greater detail for each value of control code A, with reference to a protocol table in FIG. 41 and FIGS. 42 through 52. It is noted that the unit control section 216B executes predetermined processes, based on values of control code A inputted, as described above with reference to FIG. 19 (or FIG. 24 and FIG. 35).

Selection Process 111

Figure 42:
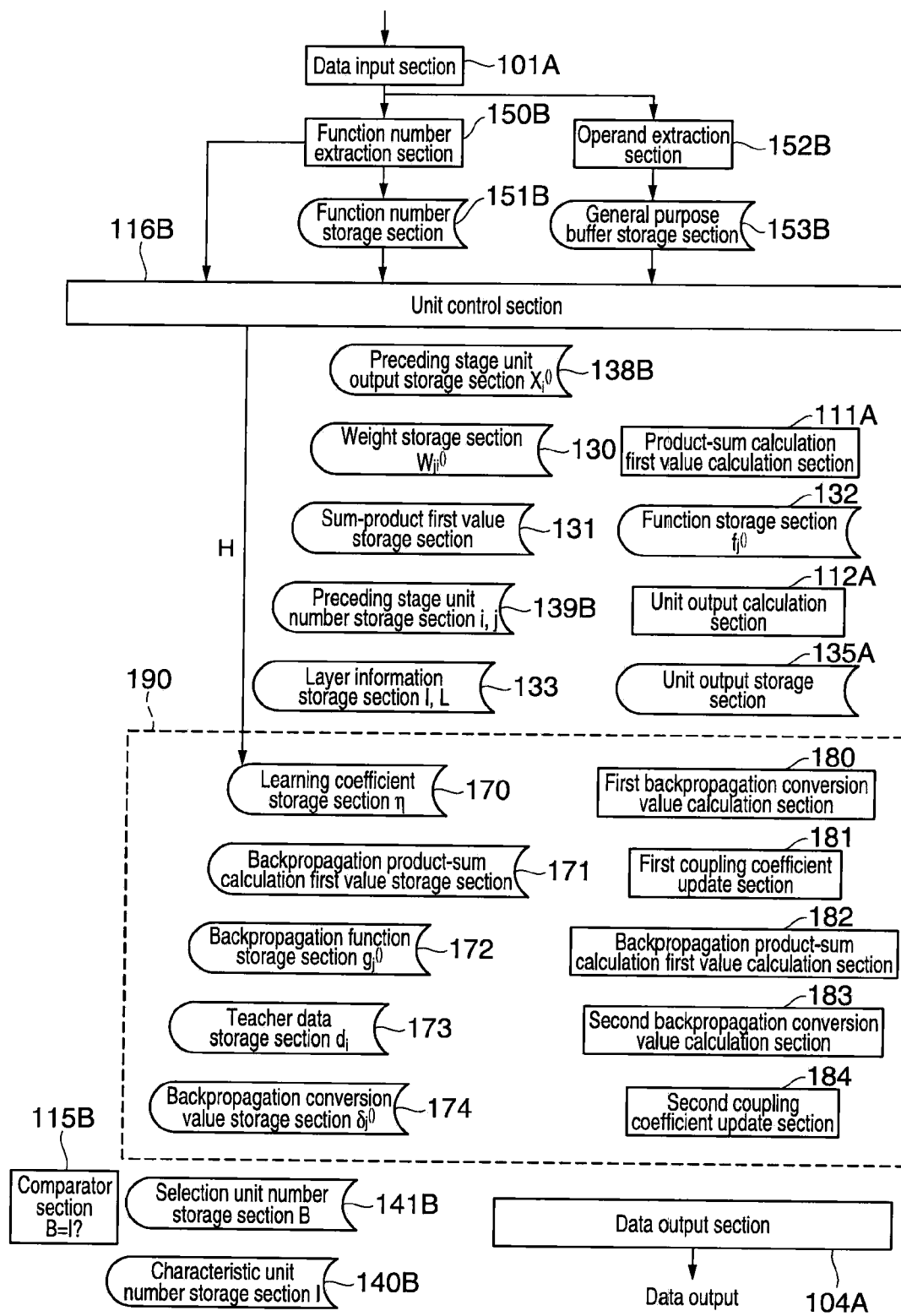
FIG. 42 is an operation diagram for describing operations of the unit having the structure shown in FIG. 40 when the value of control code A is 111.

First, referring to the protocol table in FIG. 41 and FIG. 42, the case in which the value of control code A is "111" is described. When the value of control code A included in control data is "111" indicating to "set learning coefficient," the control data includes a learning coefficient H. In all units that receive control data with the value of control code A being "111" indicating to "set learning coefficient," the unit control section 116B of each of the units stores and sets the learning coefficient H included in the control data in the learning coefficient storage section 170.

Selection Process 112

Figure 43:
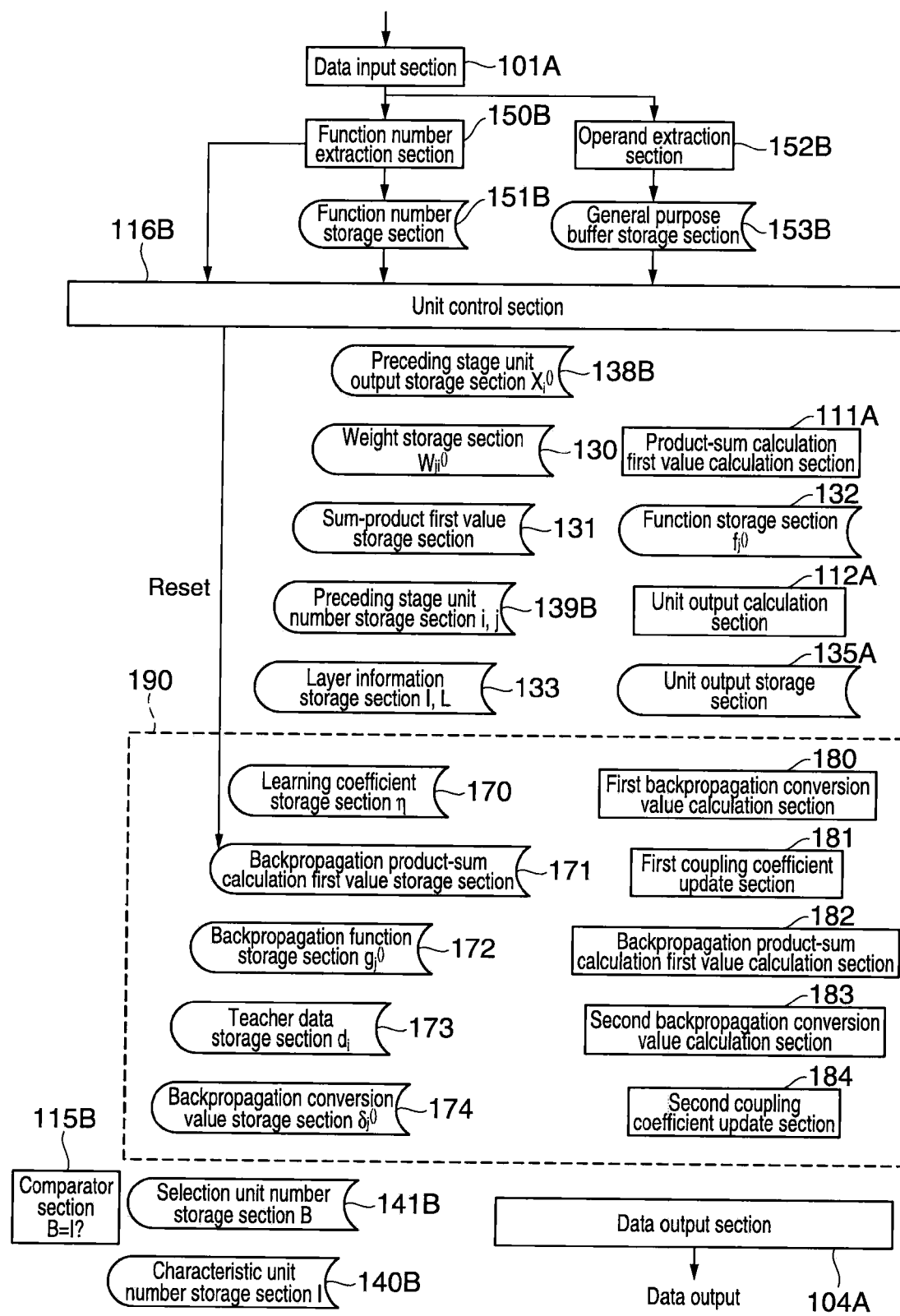
FIG. 43 is an operation diagram for describing operations of the unit having the structure shown in FIG. 40 when the value of control code A is 112.

Next, referring to the protocol table in FIG. 41 and FIG. 43, the case in which the value of control code A is "112" is described. When the value of control code A included in control data is "112" indicating to "initialize the value of the backpropagation product-sum calculation first value to 0," the control data includes the control code A only. In all units that receive control data with the value of control code A being "112" indicating to "initialize the value of the backpropagation product-sum calculation first value to 0," the unit control section 116 of each of the units initializes the value of the backpropagation product-sum calculation first value stored in the backpropagation product-sum calculation first value storage section 171 to 0.

Selection Process 113

Figure 44:
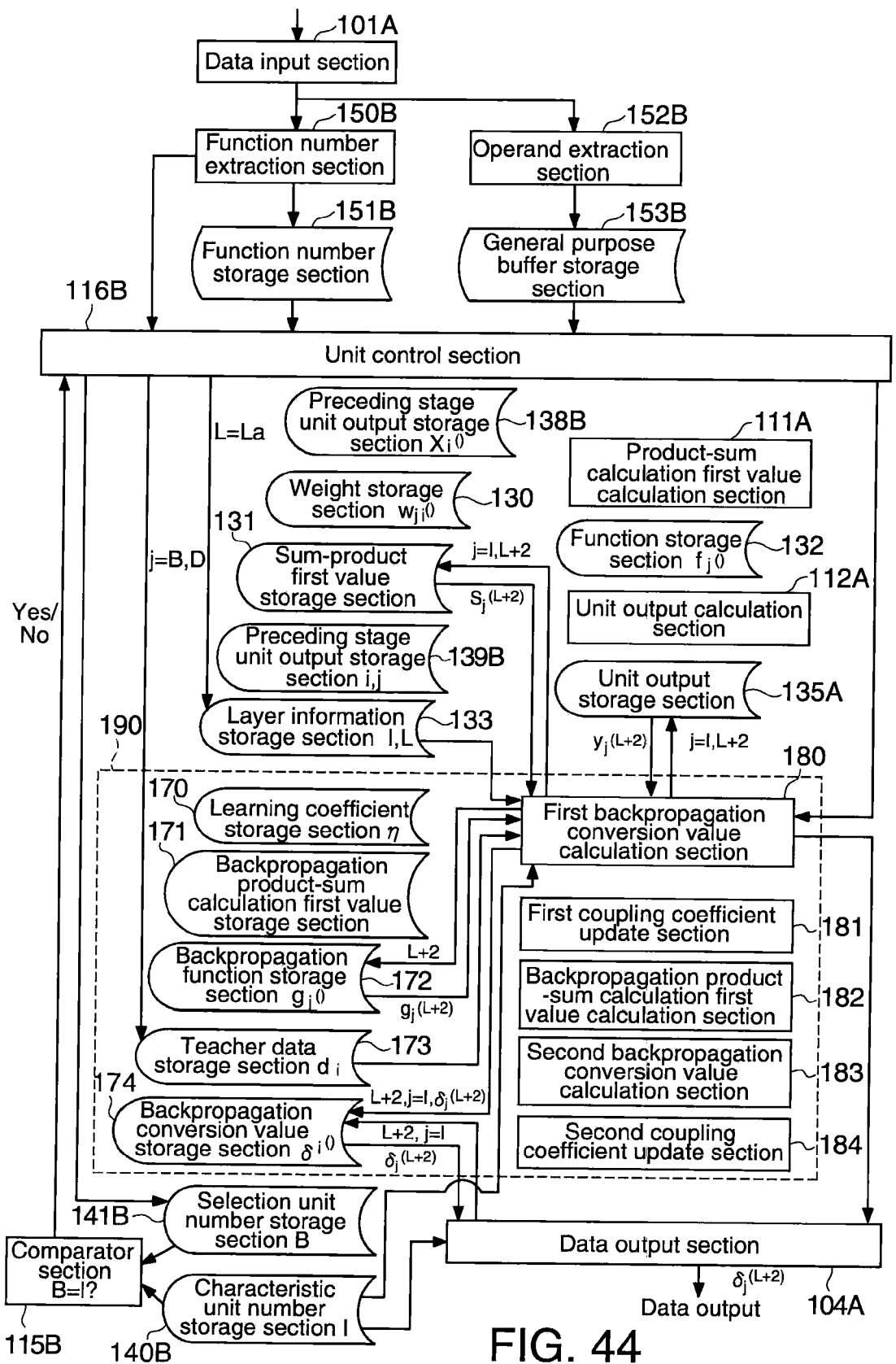
FIG. 44 is an operation diagram for describing operations of the unit having the structure shown in FIG. 40 when the value of control code A is 113.

Next, referring to the protocol table in FIG. 41 and FIG. 44, the case in which the value of control code A is "113" is described. When the value of control code A included in control data is "113" indicating to "calculate local error," the control data includes selection unit number B, layer index La, and teacher data D being a value that is supposed to have been outputted by a unit in the output layer identified by the layer index La and the selection unit number B. In all units that receive control data with the value of control code A being "113" indicating to "calculate local error," when the selection unit number B included in the control data matches the characteristic unit number I stored in the characteristic unit number storage section 140B of own unit, the first backpropagation conversion value calculation section 180 calculates, based on the teacher data D, a first backpropagation conversion value corresponding to the layer based on the layer index La, and outputs the calculated first backpropagation conversion value to the distribution control section 8 through the data output section 104A.

More specifically, first, the comparator section 115B judges as to whether the selection unit number included in the control data matches the characteristic unit number readout from the characteristic unit number storage section 140B. It is noted that, in response to storing the selection unit number extracted from the control data by the unit control section 116B in the selection unit number storage section 141B, the comparator section 115B reads a selection unit number from the selection unit number storage section 141B, and judges as to whether the readout selection unit number matches the characteristic unit number readout from the characteristic unit number storage section 140B.

Next, when the result of judgment by the comparator section 115B indicates matching, the unit control section 116B stores the teacher data D extracted from the control data in the teacher data storage section 173, stores the layer index La extracted from the control data in the layer information storage section 133, and has the first backpropagation conversion value calculation section 180 selectively execute the processing.

Next, the first backpropagation conversion value calculation section 180 calculates a first backpropagation conversion value by executing the computation based on Formula 4 in Step C4 described above, stores the calculated first backpropagation conversion value in the backpropagation conversion value storage section 174, and outputs the same to the distribution control section 8 through the data output section 104A.

The processing by the first backpropagation conversion value calculation section 180 is described in greater detail. First, based on the layer index La readout from the layer information storage section 133 and the characteristic unit number I readout from the characteristic unit number storage section 140B, the first backpropagation conversion value calculation section 180 reads an output value (the term $y_{pj}^{(L+2)}$ in Formula 4) corresponding to layer information of the layer index La plus 2 and the characteristic unit number I from the unit output storage section 135A, and calculates an error (the term $(y_{pj}^{(L+2)} - d_{pj})$ in Formula 4) between the output value readout and the teacher data (the term $d_{pj}$ in Formula 4) readout from the teacher data storage section 173. Then, the first backpropagation conversion value calculation section 180 reads product-sum calculation first value information (the term $s_{pj}^{(L+2)}$ in Formula 4) from the product-sum calculation first value storage section 131 corresponding to layer information of the layer index La plus 2 and the characteristic unit number I, and reads a backpropagation function (the term $g_j^{(L+2)}$ in Formula 4) from the backpropagation function storage section 172 corresponding to layer information of the layer index La plus 2, and substitutes the readout product-sum calculation first value information in the readout backpropagation function. Next, the first backpropagation conversion value calculation section 180 multiplies the value obtained by substituting the readout product-sum calculation first value information in the readout backpropagation function with the error calculated above, thereby computing a first backpropagation conversion value (the term $\delta_{pj}^{(L+2)}$ in Formula 4). Next, the first backpropagation conversion value calculation section 180 stores the calculated first backpropagation conversion value, associated with the layer information of the layer index La plus 2 and the characteristic unit number I, in the backpropagation conversion value storage section 174, and outputs the same to the distribution control section 8 through the data output section 104A.

Selection Process 114

Figure 45:
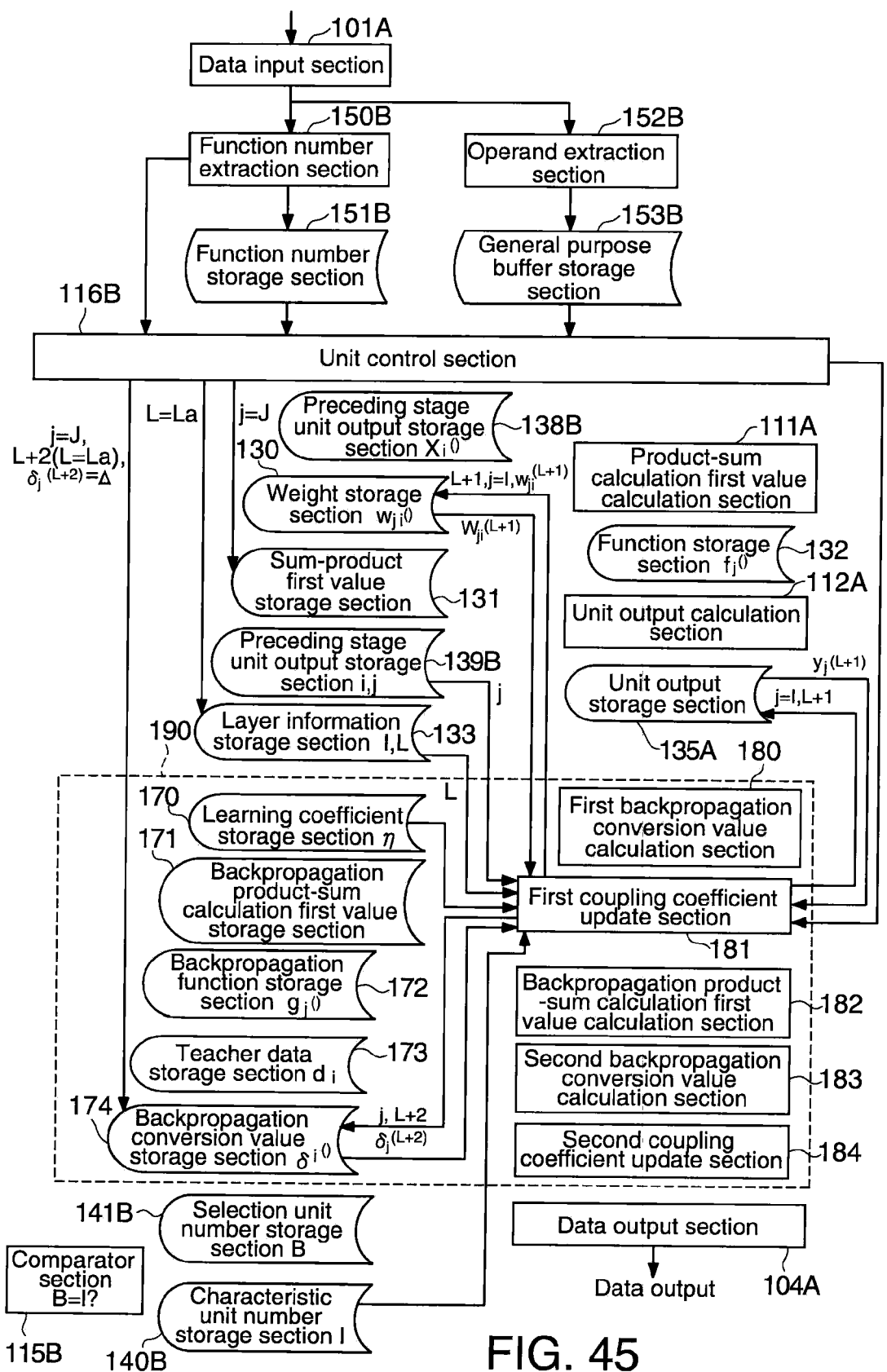
FIG. 45 is an operation diagram for describing operations of the unit having the structure shown in FIG. 40 when the value of control code A is 114.

Next, referring to the protocol table in FIG. 41 and FIG. 45, the case in which the value of control code A is "114" is described. When the value of control code A included in control data is "114" indicating to "correct coupling coefficient," the control data includes a backpropagation conversion value Δ, unit information J and layer index La. In all units that receive control data with the value of control code A being "114" indicating to "correct coupling coefficient," the first coupling coefficient update section 181 of each of the units updates and corrects, based on the backpropagation conversion value Δ, a coupling weight stored in the weight storage section 130 corresponding to the unit information J and the layer index La included in the control data. It is noted that the backpropagation conversion value Δ is the first backpropagation conversion value (the term $\delta_{pj}^{(L+2)}$) in Formula 4) described above in conjunction with the selection process 113.

More specifically, the unit control section 116B stores the backpropagation conversion value Δ extracted from the control data, associated with the layer index La and the unit information J extracted from the control data, in the backpropagation conversion value storage section 174, stores the layer index La extracted from the control data in the layer information storage section 133, stores the unit information J extracted from the control data in the preceding stage unit number storage section 139B, and has the first coupling coefficient update section 181 selectively execute the processing.

Next, the first coupling coefficient update section 181 executes, based on the backpropagation conversion value Δ, the processing based on Formula 5 and Formula 6 in Step C5 described above, thereby updating and correcting the coupling weight stored in the weight storage section 130 corresponding to the unit information J and the layer index La included in the control data.

The processing by the first coupling coefficient update section 181 is described in greater detail. First, based on the layer index La readout from the layer information storage section 133 and the characteristic unit number I readout from the characteristic unit number storage section 140B, the first coupling coefficient update section 181 reads, from the unit output storage section 135A, an output value (the term $x_{pj}^{(L+1)}$ in Formula 5) corresponding to layer information of the layer index La plus 1 and the characteristic unit number I. Also, the first coupling coefficient update section 181 reads the first backpropagation conversion value corresponding to the layer information of the layer index La plus 2 and the characteristic unit number I, in other words, the backpropagation conversion value Δ included in the control data, from the backpropagation conversion value storage section 174. Also, the first coupling coefficient update section 181 reads a learning coefficient from the learning coefficient storage section 170.

Next, the first coupling coefficient update section 181 multiplies the output value readout (the term $x_{pj}^{(L+1)}$ in Formula 5), the backpropagation conversion value Δ readout (the term $\delta_{pj}^{(L+2)}$ in Formula 5) and the learning coefficient (the term η in Formula 5) thereby calculating a learning coefficient update value (the term $\Delta_p w_{ji}^{(L+1)}$ in Formula 5). Next, the first coupling coefficient update section 181 reads a coupling weight (the term $w_{ji}^{(L+1)OLD}$ in Formula 6) corresponding to layer information of the layer index La plus 1, the characteristic unit number I and the unit information J from the weight storage section 130, and adds the learning coefficient update value calculated above (the term $\Delta_p w_{ji}^{(L+1)}$ in Formula 5 or Formula 6) to the coupling weight readout, thereby calculating a new coupling weight ($w_{ji}^{(L+1)NEW}$ in Formula 6). Then, the first coupling coefficient update section 181 stores the new coupling weight calculated, associated with the layer information of the layer index La plus 1, the characteristic unit number I and the unit information J, in the weight storage section 130, thereby updating the coupling weight.

Selection Process 115

Figure 46:
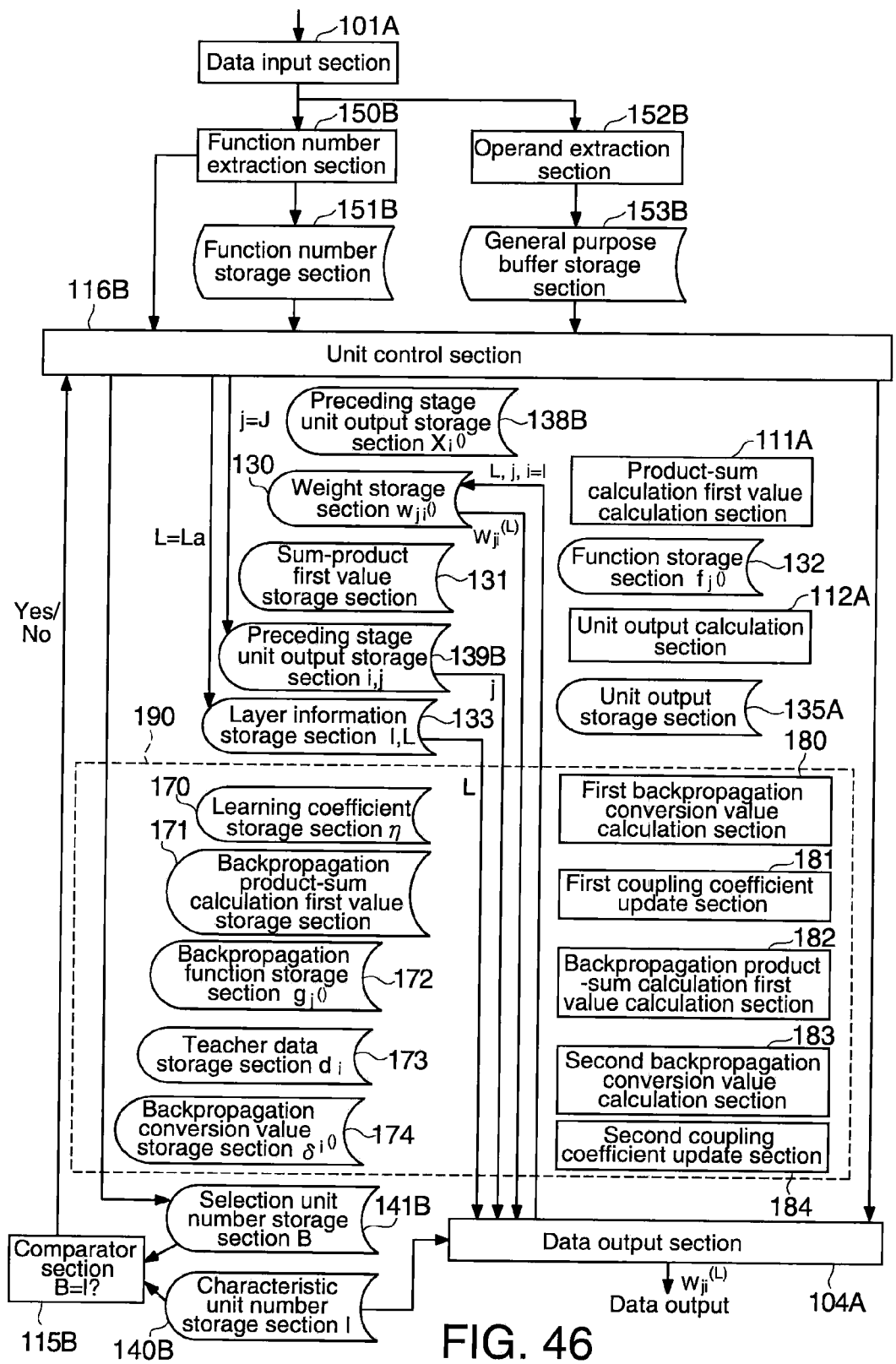
FIG. 46 is an operation diagram for describing operations of the unit having the structure shown in FIG. 40 when the value of control code A is 115.

Next, referring to the protocol table in FIG. 41 and FIG. 46, the case in which the value of control code A is "115" is described. When the value of control code A included in control data is "115" indicating to "obtain coupling coefficient," the control data includes selection unit number B, unit information J and a layer index La. In all units that receive control data with the value of control code A being "115" indicating to "obtain coupling coefficient," when the selection unit number B included in the control data matches the characteristic unit number I stored in the characteristic unit number storage section 140B of own unit, the unit control section 116B of each of the units reads a coupling weight from the weight storage section 130 corresponding to the unit information J and the layer index La included in the control data, outputs the coupling weight readout to the distribution control section 8 through the data output section 104A. It is noted that the suffix i of $W_{ji}$ that is the coupling weight refers to the characteristic unit number I stored in the characteristic unit number storage section 140B of own unit.

Selection Process 116

Figure 47:
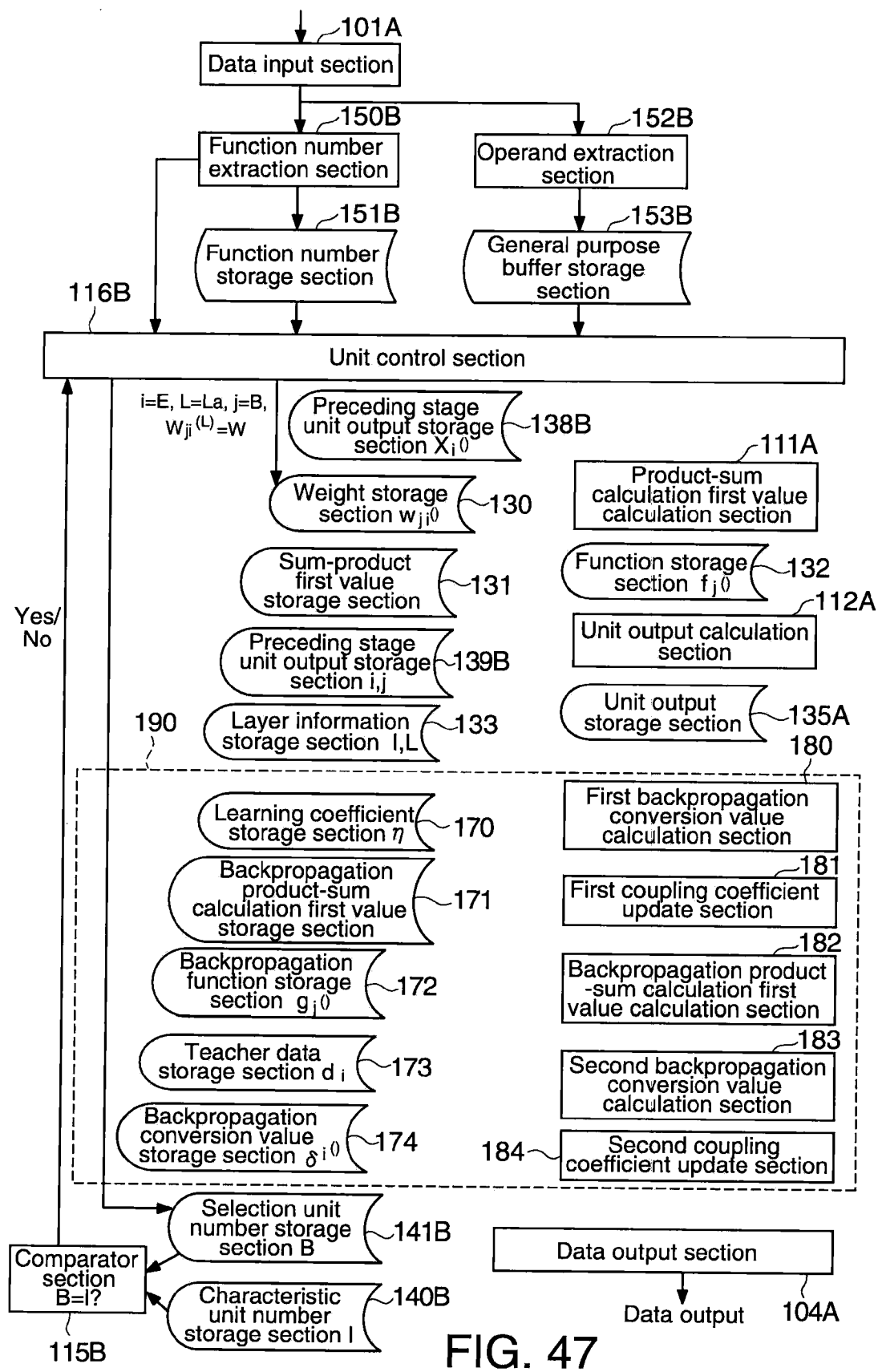
FIG. 47 is an operation diagram for describing operations of the unit having the structure shown in FIG. 40 when the value of control code A is 116.

Next, referring to the protocol table in FIG. 41 and FIG. 47, the case in which the value of control code A is "116" is described. When the value of control code A included in control data is "116" indicating to "update coupling coefficient," the control data includes selection unit number B, update coupling weight W, layer index La and unit information E. In all units that receive control data with the value of control code A being "116" indicating to "update coupling coefficient," when the selection unit number B included in the control data matches the characteristic unit number I stored in the characteristic unit number storage section 140B of own unit, the unit control section 116B of each of the units updates the coupling weight $w_{ji}^{(La)}$ stored in the weight storage section 130 corresponding to the layer index La and the unit information E included in the control data and the characteristic unit number I stored in the characteristic unit number storage section 140B with the update coupling weight W.

It is noted that the update coupling weight W is the coupling weight outputted by each unit in the selection process 115. It is noted that the suffix j of $W_{ji}$ that is the coupling weight is the characteristic unit number I stored in the characteristic unit number storage section 140B of own unit.

Selection Process 117

Figure 48:
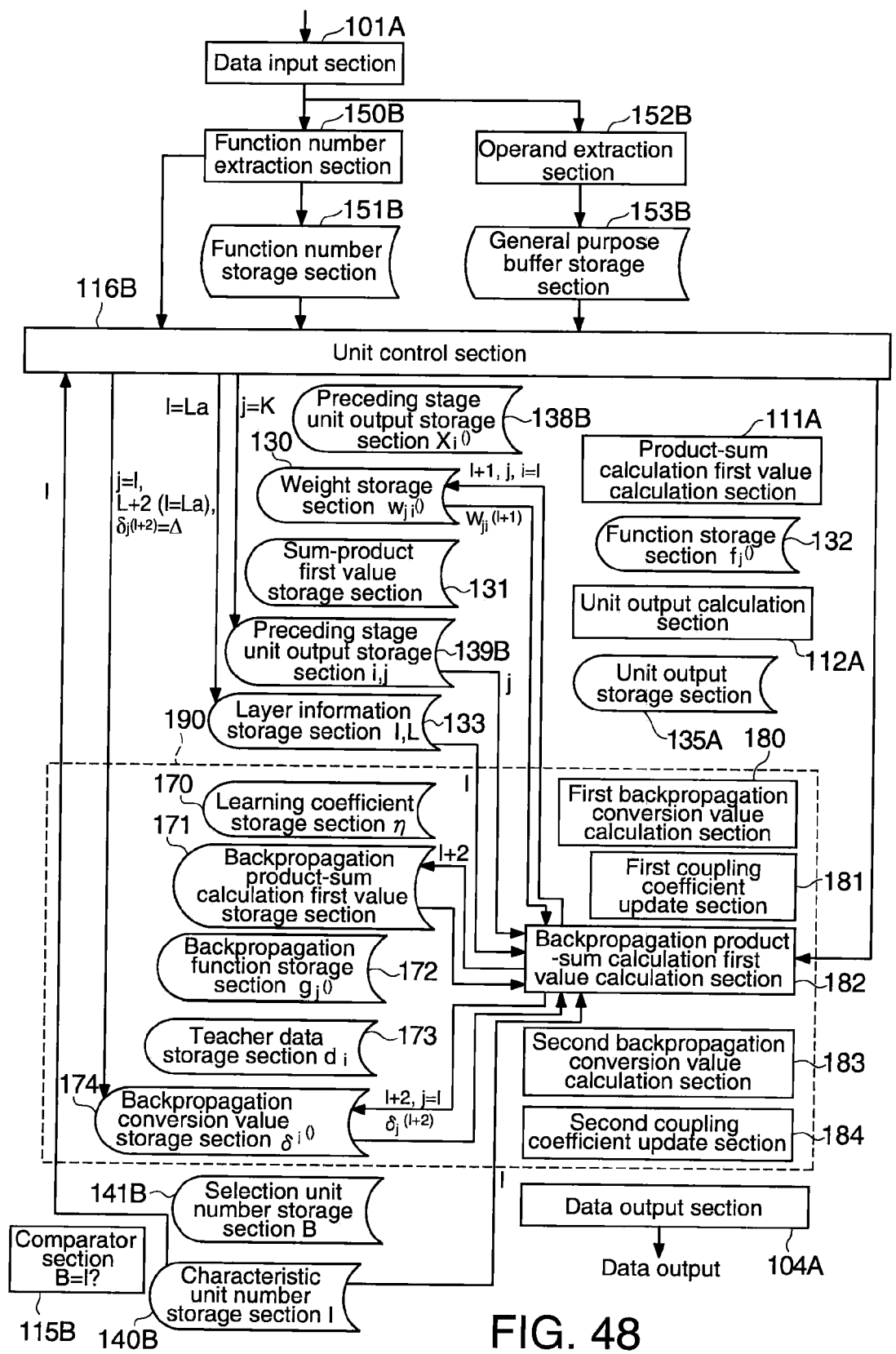
FIG. 48 is an operation diagram for describing operations of the unit having the structure shown in FIG. 40 when the value of control code A is 117.

Next, referring to the protocol table in FIG. 41 and FIG. 48, the case in which the value of control code A is "117" is described. When the value of control code A included in control data is "117" indicating to "do product-sum calculation of error information," the control data includes backpropagation conversion value Δ, layer index La and unit information K. When the value of control code A included in control data is "117" indicating to "do product-sum calculation of error information," the backpropagation product-sum calculation first value calculation section 182 of each of the units calculates, based on the backpropagation conversion value Δ, the layer index La and the unit information K included in the control data, a backpropagation product-sum calculation first value which is the term $\delta_{pk}^{(l+2)} w_{kj}^{(l+1)}$ in Σ in Formula 7 described above, and adds and stores the calculated backpropagation product-sum calculation first value in the backpropagation product-sum calculation first value storage section 171.

More specifically, the unit control section 116B stores the backpropagation conversion value Δ extracted from the control data, associated with the layer index La extracted from the control data and the characteristic unit information I readout from the characteristic unit information storage section 140B, in the backpropagation product-sum calculation first value storage section 171. Also, the unit control section 116B stores the layer index La extracted from the control data in the layer information storage section 133, and has the backpropagation product-sum calculation first value calculation section 182 selectively executes the processing.

Next, based on the layer index I readout from the layer information storage section 133 and the unit information j readout from the preceding stage unit number storage section 139B, the backpropagation product-sum calculation first value calculation section 182 multiplies the coupling weight $w_{kj}^{(l+1)}$ readout from the weight storage section 138B and the backpropagation conversion value $\delta_{pk}^{(l+2)}$ readout from the backpropagation conversion value storage section 174, thereby calculating a backpropagation product-sum calculation first value, and adds and stores the calculated backpropagation product-sum calculation first value in the backpropagation product-sum calculation first value storage section 171, based on the layer index l+2.

Selection Process 118

Figure 49:
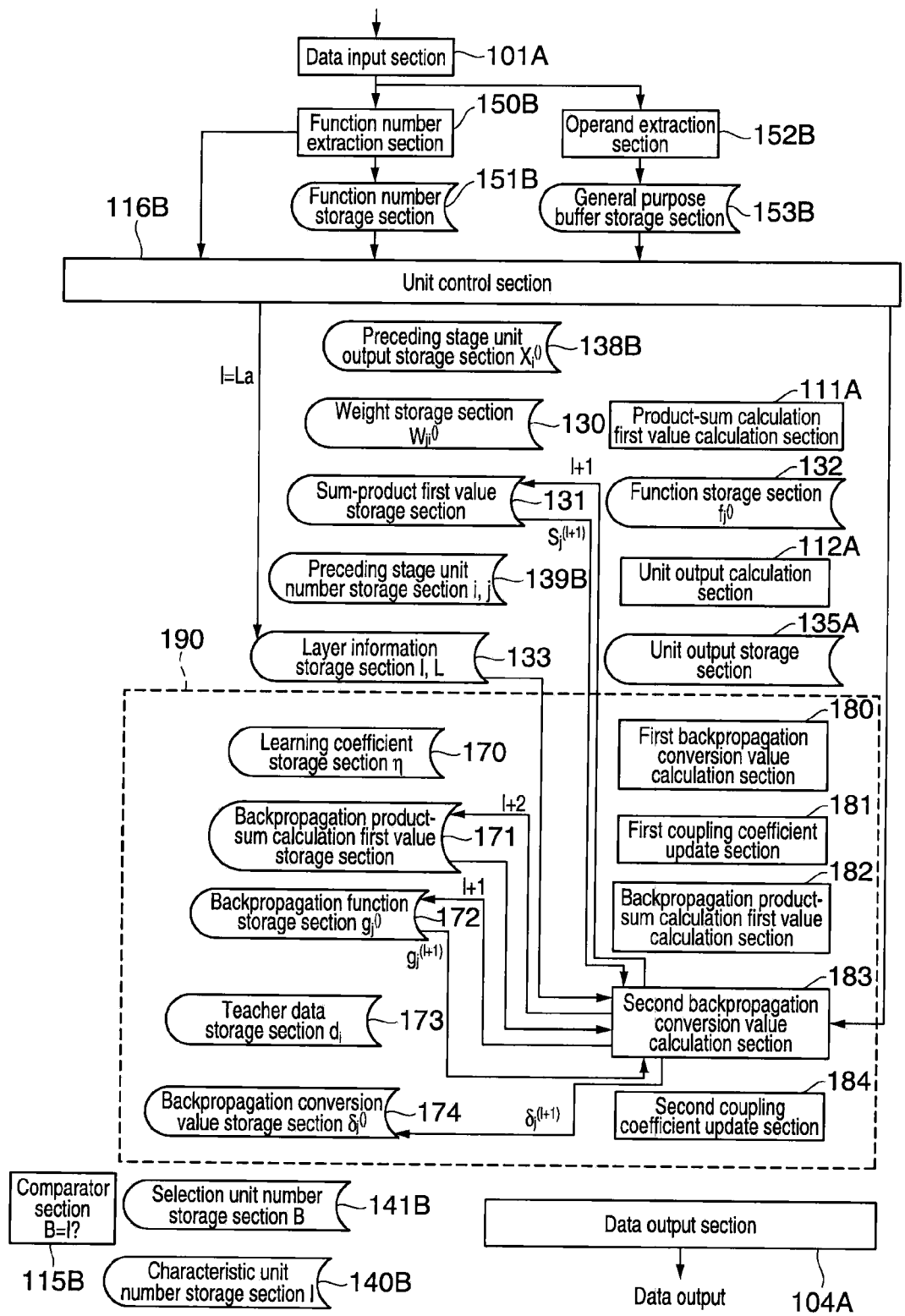
FIG. 49 is an operation diagram for describing operations of the unit having the structure shown in FIG. 40 when the value of control code A is 118.

Next, referring to the protocol table in FIG. 41 and FIG. 49, the case in which the value of control code A is "118" is described. When the value of control code A included in control data is "118" indicating to "do product-sum calculation of error information," the control data includes backpropagation conversion value Δ, layer index La and unit information K. When the value of control code A included in control data is "118" indicating to "do inverse calculation of error in product-sum of input from preceding stage and coupling coefficient," the control data includes layer index La. In all units that receive control data with the value of control code A "118" indicating to "do inverse calculation of error in product-sum of input from preceding stage and coupling coefficient," the second backpropagation conversion value calculation section 183 of each of the units, based on the layer index La included in the control data, calculates a second backpropagation conversion calculation value which is the term $\delta_{pj}^{(l+1)}$ in Formula 7 described above, and stores the calculated second backpropagation conversion calculation value, associated with the layer index La+1, in the backpropagation conversion value storage section 174. It is noted that the suffix j in Formula 7 refers, in this case, to the characteristic unit number I stored in the characteristic unit number storage section 140B of own unit.

More specifically, first, the comparator section 115B stores the layer index La extracted from the control data in the layer information storage section 133, and the processing by the second backpropagation conversion value calculation section 183 is electively executed.

Next, the second backpropagation conversion value calculation section 183 executes the processing based on Formula 7 in Step C6 described above, thereby calculating a second backpropagation conversion value, and stores the calculated second backpropagation conversion value in the backpropagation conversion value storage section 174.

The processing by the second backpropagation conversion value calculation section 183 is described in greater detail. First, the second backpropagation conversion value calculation section 183, based on the layer index l readout from the layer information storage section 133, reads product-sum calculation first value information (the term $s_{pj}^{(l+1)}$ in Formula 7) corresponding to layer information of the layer index 1 plus 1 from the product-sum calculation first value storage section 131, reads a backpropagation conversion function (the function $g_j^{(l+1)}$ in Formula 7) corresponding to the layer information of the layer index 1 plus 1 from the backpropagation function storage section 172, and substitutes the readout product-sum calculation first value information in the readout backpropagation conversion function. Next, the second backpropagation conversion value calculation section 183 reads a backpropagation product-sum calculation first value corresponding to layer information of the layer index 1 plus 2 from the backpropagation product-sum calculation first value storage section 171, multiplies the backpropagation product-sum calculation first value readout and the value obtained by substituting the product-sum calculation first value information readout in the backpropagation function readout, thereby calculating a second backpropagation conversion value (the term $\delta_{pj}^{(l+1)}$ in Formula 7), and stores the second backpropagation conversion value, associated with the information of the layer index plus 1, in the backpropagation conversion value storage section 174.

Selection Process 119

Figure 50:
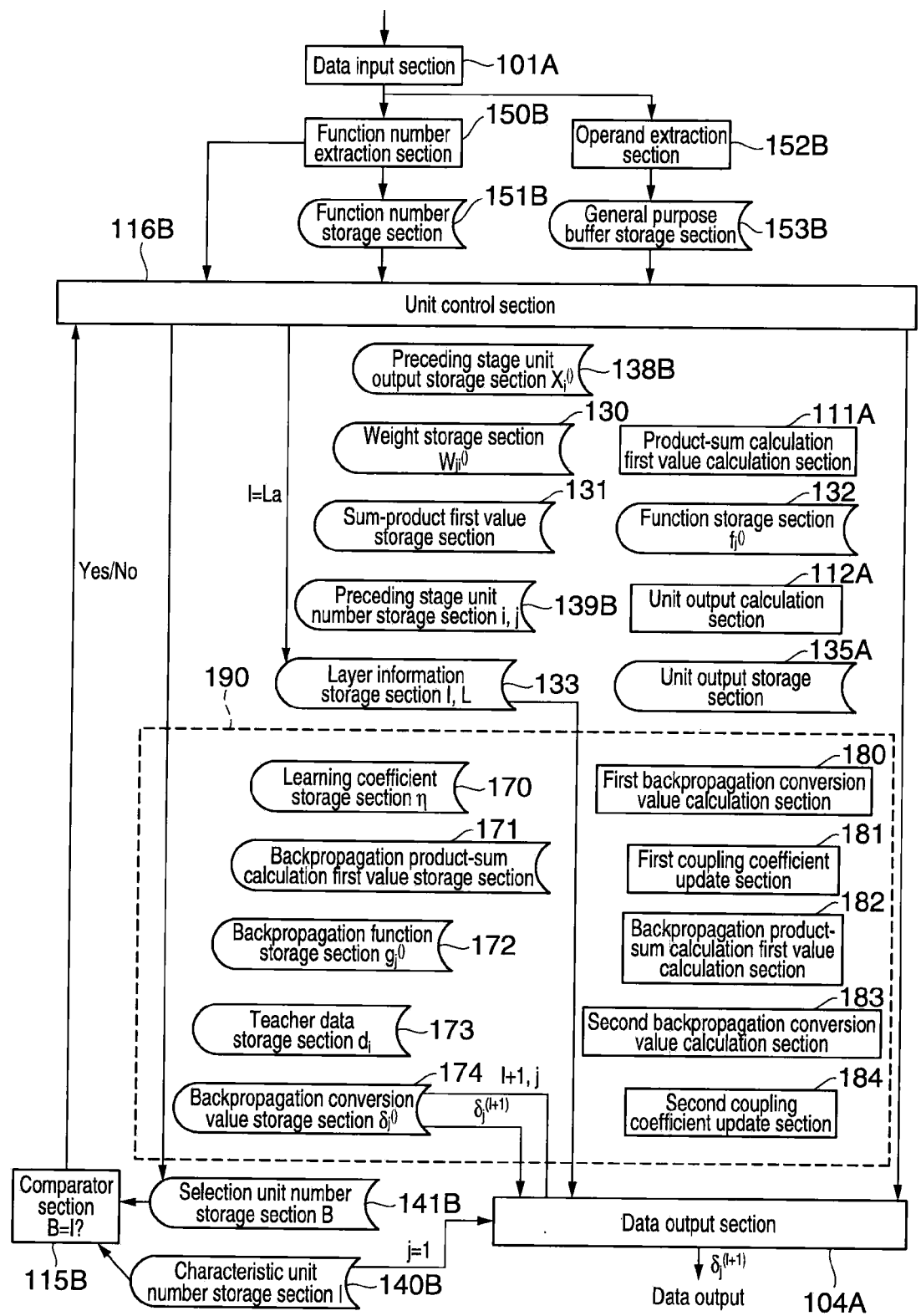
FIG. 50 is an operation diagram for describing operations of the unit having the structure shown in FIG. 40 when the value of control code A is 119.

Next, referring to the protocol table in FIG. 41 and FIG. 50, the case in which the value of control code A is "119" is described. When the value of control code A included in control data is "119" indicating to "output second backpropagation conversion value," the control data includes selection unit number B and layer index La. In all units that receive control data with the value of control code A being "119" indicating to "output second backpropagation conversion value," when the selection unit number B included in the control data matches the characteristic unit number I stored in the characteristic unit number storage section 140B of own unit, the unit control section 116b of each unit, based on the selection unit number B and the layer index La included in the control data, outputs the second backpropagation conversion value readout from the backpropagation conversion value storage section 174 to the distribution control section 8 through the data output section 104A. In this case, it is noted that the unit control section 116b of each unit reads the second backpropagation conversion value corresponding to the characteristic unit number I stored in the characteristic unit number storage section 140B of own unit, in which the suffix j in the second backpropagation conversion value $\delta_{pj}$ readout from the backpropagation conversion value storage section 174 corresponds to the characteristic unit number I.

Selection Process 120

Figure 51:
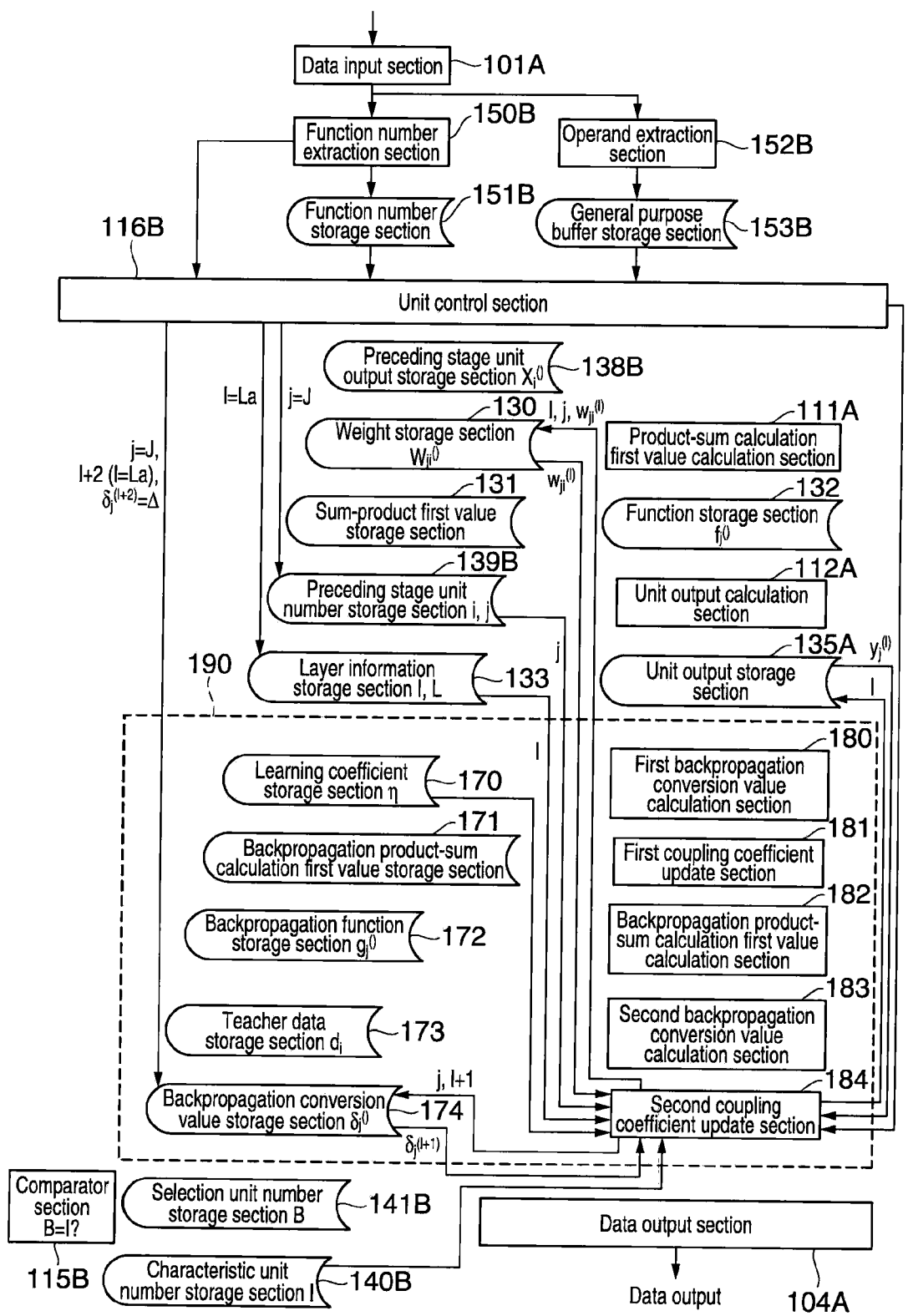
FIG. 51 is an operation diagram for describing operations of the unit having the structure shown in FIG. 40 when the value of control code A is 120, and the value of layer information L is not 1.
Figure 52:
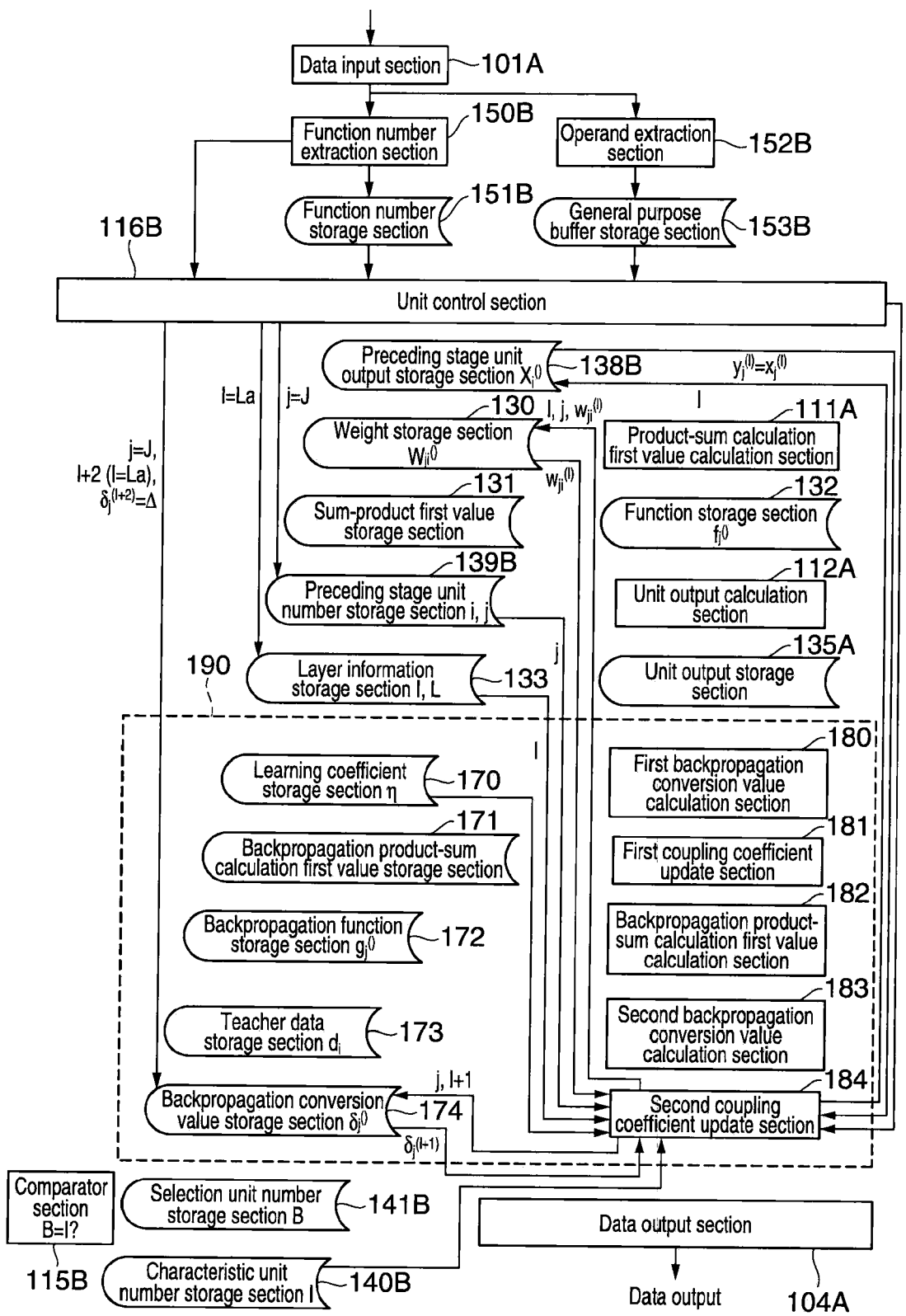
FIG. 52 is an operation diagram for describing operations of the unit having the structure shown in FIG. 40 when the value of control code A is 120, and the value of layer information L is 1.

Next, referring to the protocol table in FIG. 41, FIG. 51 and FIG. 52, the case in which the value of control code A is "120" is described. When the value of control code A included in control data is "120" indicating to "correct coupling coefficient," the control data includes backpropagation conversion value Δ, unit information J and layer index La. In all units that receive control data with the value of control code A being "120" indicating to "correct coupling coefficient," the second coupling coefficient update section 184 of each of the units updates the coupling weight stored in the weight storage section 130 corresponding to the unit information J and the layer index La included in the control data based on the backpropagation conversion value Δ, thereby correcting the coupling weight. The backpropagation conversion value Δ is the second backpropagation conversion value (the term $\delta_{pj}^{(l+2)}$ in Formula 7) described above in conjunction with the selection process 119.

It is noted that, when the value of the layer index La inputted is not 1, the second coupling coefficient update section 184 reads the output value (the term $x_{pj}^{(1)}$ in Formula 8) from the unit output storage section 135A, as shown in FIG. 51, and updates the coupling weight stored in the weight storage section 130 based on the readout output value. When the value of the layer index La inputted is 1, the second coupling coefficient update section 184 reads the output value (the term $x_{pj}^{(1)}$ in Formula 8) from the preceding unit output storage section 138B, as shown in FIG. 52, and updates the coupling weight stored in the weight storage section 130, based on the output value readout.

It is noted that the second coupling coefficient update section 184 reads the output value (the term $x_{pj}^{(1)}$ in Formula 8) from either the preceding unit output storage section 138B or the unit output storage section 135A depending on whether the value of the layer index La is 1 or not. Other processings executed by the unit control section 116B and the first coupling coefficient update section 181 described above in conjunction with the selection process 114 are generally the same as those executed by the unit control section 116B and the second coupling coefficient update section 184 in the selection process 120.

Next, referring to FIG. 51, the case where the value of control code A is "120" but the value of the layer index La inputted is not 1, in other words, the case of updating the coupling weight relating to the intermediate layer is concretely described. First, the unit control section 116B stores the backpropagation conversion value Δ extracted from control data, associated with the layer index La extracted from the control data and the unit information J extracted from the control data, in the backpropagation conversion value storage section 174. Also, the unit control section 116B stores the layer index La extracted from the control data in the layer information storage section 133, stores the unit information J extracted from the control data in the preceding stage unit number storage section 139B, and has the second coupling coefficient update section 184 selectively execute the processing.

Next, the second coupling coefficient update section 184 executes, based on the backpropagation conversion value Δ, the processing based on Formula 8 and Formula 9 in Step C7 described above, thereby updating and correcting the coupling weight stored in the weight storage section 130 corresponding to the unit information J and the layer index La included in the control data.

The processing by the second coupling coefficient update section 184 is now described in detail. First, based on the layer index l readout from the layer information storage section 133 and the unit information j readout from the preceding stage unit number storage section 139B, the second coupling coefficient update section 184 reads, from the unit output storage section 135A, an output value (the term $x_{pj}^{(l)}$ in Formula 8) corresponding to the layer index l and the unit information j. Also, the second coupling coefficient update section 184 reads a backpropagation conversion value (the term $\delta_{pj}^{(l+1)}$ in Formula 8) corresponding to layer information of the layer index l plus 1 and the unit information j readout from the preceding stage unit number storage section 139B, in other words, the backpropagation conversion value Δ included in the control data, from the backpropagation conversion value storage section 174. Also, the second coupling coefficient update section 184 reads a learning coefficient from the learning coefficient storage section 170.

Next, the second coupling coefficient update section 184 executes the processing according to Formula 8 by multiplying the output value readout (the term $x_{pj}^{(l)}$ in Formula 8), the backpropagation conversion value Δ readout (the term $\delta_{pj}^{(l+1)}$ in Formula 8) and the learning coefficient readout (the term η in Formula 8), and further multiplying a value −1 thereto, thereby calculating a learning coefficient update value (the term $\Delta_p w_{ji}^{(l)}$ in Formula 8). Then, the second coupling coefficient update section 184 reads a coupling weight (the term $w_{ji}^{(l)OLD}$ in Formula 9) corresponding to the layer index l, the characteristic unit number I and the unit information J from the weight storage section 130, and adds the learning coefficient update value calculated above (the term $\Delta_p w_{ji}^{(l)}$ in Formula 8) to the coupling weight readout, thereby calculating a new coupling weight ($w_{ji}^{(l) NEW}$ in Formula 8). Then, the second coupling coefficient update section 184 stores the new coupling weight calculated, associated with the layer index l, the characteristic unit number I and the unit information j, in the weight storage section 130, thereby updating the coupling weight.

Next, referring to FIG. 52, the case where the value of control code A is "120" and the value of the layer index La inputted is 1, in other words, the case of updating the coupling weight relating to the input layer is concretely described. First, the unit control section 116B stores the backpropagation conversion value Δ extracted from control data, associated with the layer index La extracted from the control data and the unit information J extracted from the control data, in the backpropagation conversion value storage section 174. Also, the unit control section 116B stores the layer index La extracted from the control data in the layer information storage section 133, stores the unit information J extracted from the control data in the preceding stage unit number storage section 139B, and has the second coupling coefficient update section 184 selectively execute the processing.

Next, the second coupling coefficient update section 184 executes, based on the backpropagation conversion value Δ, the processing based on Formula 8 and Formula 9 in Step C7 described above, thereby updating and correcting the coupling weight stored in the weight storage section 130 corresponding to the unit information J and the layer index La included in the control data.

The processing by the second coupling coefficient update section 184 is now described in detail. First, based on the layer index l readout from the layer information storage section 133 and the unit information j readout from the preceding stage unit number storage section 139B, the second coupling coefficient update section 184 reads, from the preceding unit output storage section 138B, an output value (the term $x_{pj}^{(l)}$ in Formula 8) corresponding to the layer index l and the unit information j. Also, the second coupling coefficient update section 184 reads a backpropagation conversion value (the term $\delta_{pj}^{(l+1)}$ in Formula 8) corresponding to layer information of the layer index l plus 1 and the unit information j readout from the preceding stage unit number storage section 139B, in other words, the backpropagation conversion value Δ included in the control data, from the backpropagation conversion value storage section 174. Also, the second coupling coefficient update section 184 reads a learning coefficient from the learning coefficient storage section 170.

Next, the second coupling coefficient update section 184 executes the processing according to Formula 8 by multiplying the output value readout (the term $x_{pj}^{(l)}$ in Formula 8), the backpropagation conversion value Δ readout (the term $\delta_{pj}^{(l+1)}$ in Formula 8) and the learning coefficient readout (the term η in Formula 8), and further multiplying a value −1 thereto, thereby calculating a learning coefficient update value (the term $\Delta_p w_{ji}^{(l)}$ in Formula 8). Then, the second coupling coefficient update section 184 reads a coupling weight (the term $w_{ji}^{(l)OLD}$ in Formula 9) corresponding to the layer index l, the characteristic unit number I and the unit information J from the weight storage section 130, and adds the learning coefficient update value calculated above (the term $\Delta_p w_{ji}^{(l)}$ in Formula 8) to the coupling weight readout, thereby calculating a new coupling weight ($w_{ji}^{(l) NEW}$ in Formula 8). Then, the second coupling coefficient update section 184 stores the new coupling weight calculated, associated with the layer index l, the characteristic unit number I and the unit information j, in the weight storage section 130, thereby updating the coupling weight.

It is noted that, in Selection Process 1 described above in accordance with the third embodiment, in other words, in the forward processing, in all units that receive control data with the value of control code A being "1," the unit control section 116B of each of the units stores an output value C extracted from the control code in the preceding stage unit output storage section 138B. In the case of update of a coupling weight relating to the input layer, the second coupling coefficient update section 184 uses the output value C stored in the preceding stage unit output storage section 138B, in other words, the input data, to update the coupling weight stored in the weight storage section 130.

In other words, the preceding stage unit output storage section 138B of each unit stores an input pattern that is inputted in the unit as the input layer. Then, when updating the coupling weight stored in the weight storage section 130 relating to the input layer, the second coupling coefficient update section 184 updates the coupling weight stored in the weight storage section 130 based on the input pattern readout from the preceding stage unit output storage section 138B, instead of the output value readout from the unit output storage section 135A.

Accordingly, as the input pattern is stored, the coupling weight for an output layer that is one preceding layer from the intermediate layer can be updated based on the stored input pattern, such that the hierarchical neural network can perform learning relating to the input layer without having to input an input pattern again.

Figure 53A:
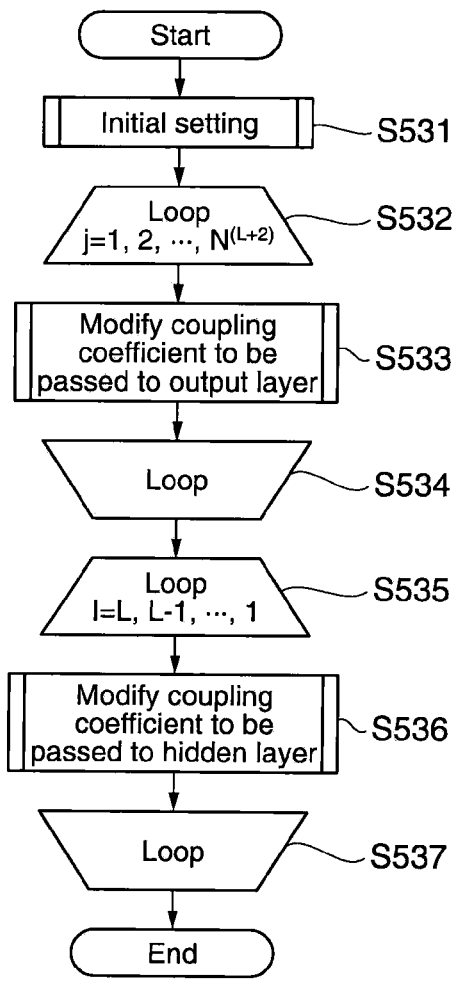
FIG. 53 is a flow chart 1 for describing operations of a distribution control section 8 in accordance with a sixth embodiment.
Figure 53B:
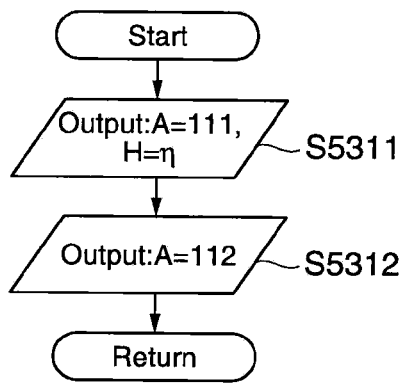
Figure 53C:
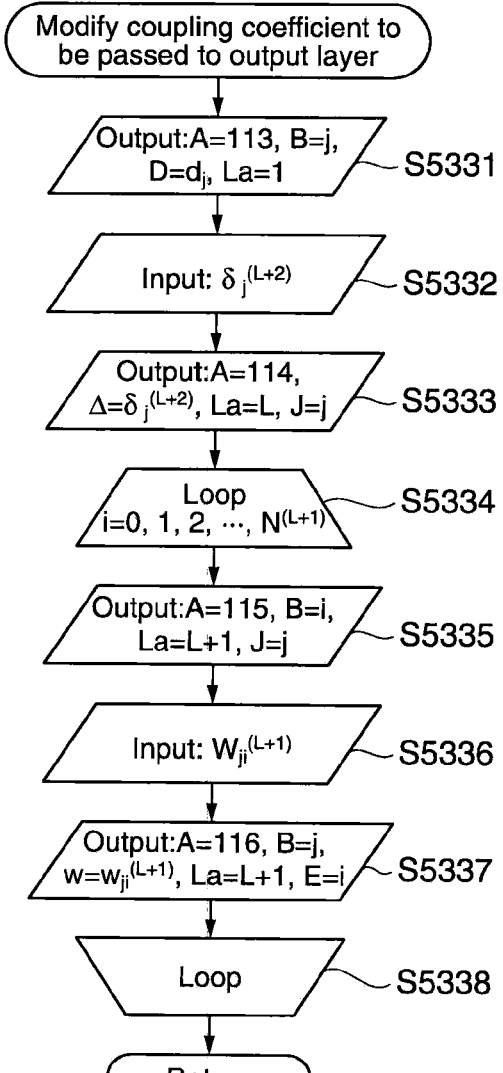
Figure 54:
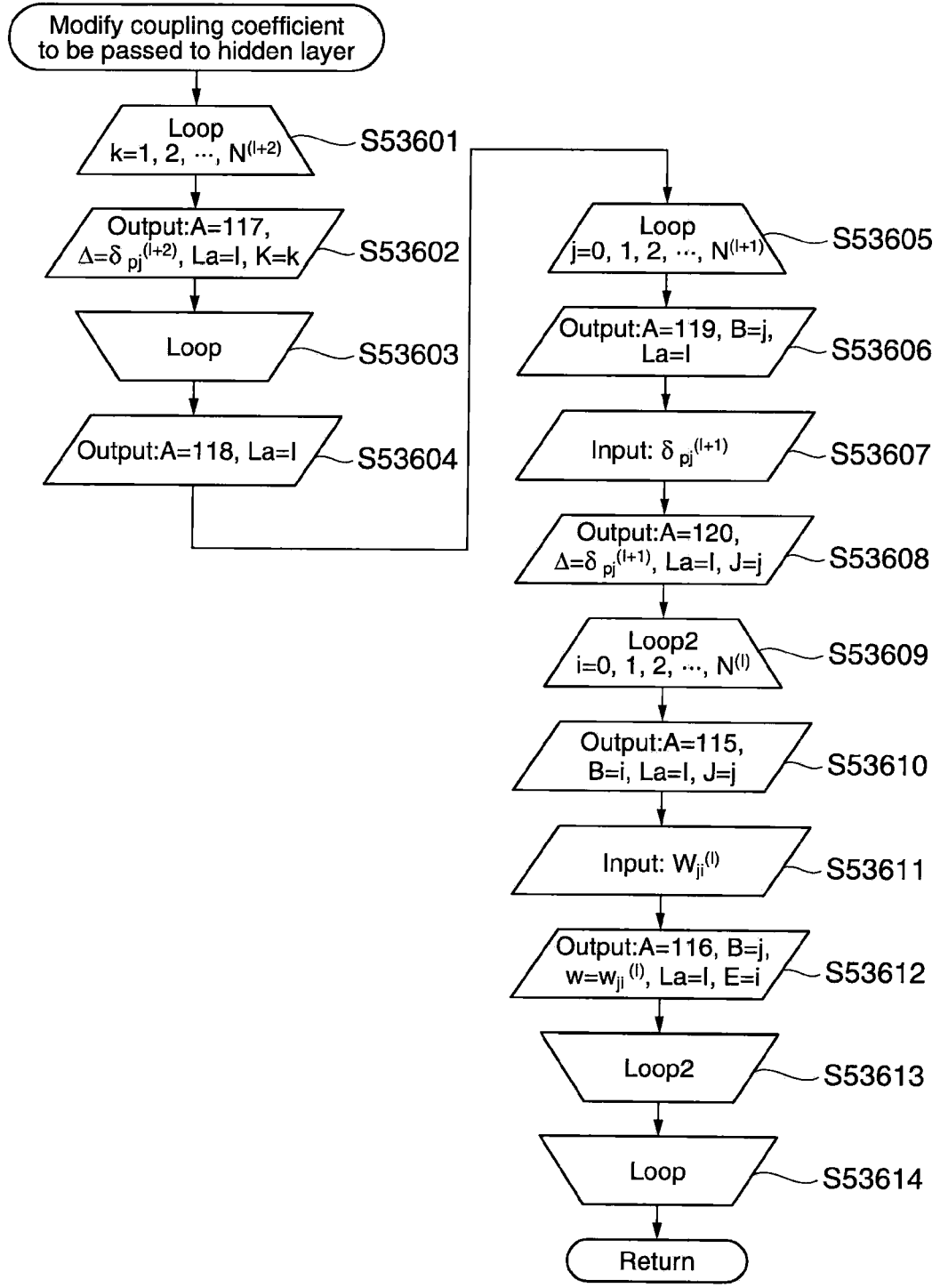
FIG. 54 is a flow chart 2 for describing operations of the distribution control section 8 in accordance with the sixth embodiment.

Operations of Distribution Control Section 8 in Accordance with Fifth Embodiment Next, referring to FIG. 53 and FIG. 54, operations of the distribution control section 8 in which the parallel processing device in accordance with the second base structure is applied to a hierarchical neural network are described. It is noted that operations of each unit according to different values of control code included in control data outputted from the distribution control section 8 have already discussed above with reference to FIGS. 40 through 52, and therefore the operations of the distribution control section 8 alone shall be described hereunder. It is noted that, in this example, the case where a parallel processing device in accordance with the second base structure is applied to the hierarchical neural network shown in FIG. 6 shall also be described.

It is noted that the processing by the distribution control section 8 shown in FIG. 53 and FIG. 54 is executed after the processing by the distribution control section 8 described above with reference to FIG. 20 and FIG. 21. In other words, after completing the forward processing from the input layer to the output layer, learning that is processing in the reverse direction from the output layer to the input layer is performed. Here, as the processing in the forward direction in FIG. 20 and FIG. 21 has already been executed, the unit output storage section 135A of each unit stores an output value that is the result of processing. Also, the description below shall be made assuming that the unit output calculation section 112A stores the output value in the unit output storage section, associated with layer information and unit identification information.

First, referring to FIG. 53A, the outline of operations of the distribution control section 8 is described. First, initial setting is performed (step S531). Then, while sequentially increasing the value of the counter variable j from 1, 2, 3, ... to $N^{(L+2)}$, the processing in the next step S533 is repeated (loop processing from step S531 through step S534). $N^{(L+2)}$ is the value of the number of nodes in a layer whose layer identification information has a value of L+2, in other words, the value of the number of nodes in the output layer L3. For example, in the hierarchical neural network shown in FIG. 6, the value of the number of nodes in the input layer L1 is 3. Also, the counter variable j is a variable used for identifying units in the (L+2) layer.

In step S533, the units in the input layer sequentially correct, based on the counter variable j, coupling weights toward the output layer.

Next, while sequentially decreasing the value of the counter value l from L, L−1, ... to 1, in other words, until the layer variable changes from the output layer sequentially toward the input layer until the input layer, the processing in the next step S536 is repeated for the number of hidden layers (loop processing from step S535 through step S537). In this step S536, coupling coefficients toward the hidden layer are corrected. The counter value l is a variable for identifying layers.

Next, referring to FIG. 53B, FIG. 53C and FIG. 54, the processing in the steps, step S531, step S533 and step 536 in FIG. 53A is described in detail.

First, referring to FIG. 53B, step S531 in FIG. 53A is described. First, control data with the value of control code A being "111" and the value of learning coefficient H being η is outputted to each of the units (step S5311). Then, control data with the value of control code A being "112" is outputted to each of the units (step S5312), and the process is returned. It is noted that the value η of the learning coefficient H may be a predetermined value, or the value may be changed according to the number of learning iterations, or the learning speed.

Next, referring to FIG. 53C, step S533 in FIG. 53A is described. First, control data with the value of control code A being "113," the value of selection unit number B being a counter variable j, and the value of layer index La being "1," and the value of teacher data D being dj is inputted in each of the units (step S5331). Next, in response to the control data outputted in step S5331, an error $\delta_j^{(L+2)}$ is inputted from each unit (step S5332).

Next, control data with the value of control code A being "114," the value of backpropagation conversion value Δ being the error $\delta_j^{(L+2)}$ inputted in step S5332, the value of layer index La being L, and the value of unit information J being the counter variable j is outputted to each of the units (step S5333).

The processing in the following steps from step S5335 through step S5337 is repeated while changing the value of the counter variable i from 0, 1, 2, ... to $N^{(L+1)}$ (loop processing from step S5334 through step S5338). The counter variable i is used as a variable for identifying units in (L+1) layer.

In step S5335, control data with the value of control code A being "115," the value of selection unit number B being the counter variable i, the value of layer index La being L+1, and the value of unit information J being the counter variable j is outputted to each of the units. Also, in step S5336, in response to the control data outputted in step S5335, a coupling weight $w_{ji}^{(L+1)}$ outputted from each of the units is inputted. In step S5337, control data with the value of control code A being "116," the value of selection unit number B being the counter variable j, the value of update coupling weight W being the coupling weight $w_{ji}^{(L+1)}$ inputted in step S5335, the value of layer index La being L+1, and the value of unit information E being the counter variable i is outputted to each of the units.

Next, referring to FIG. 54, the processing in step S536 shown in FIG. 53A is described. First, the processing in the next step S53602 is repeated while changing the value of the counter variable k from 1, 2, ... to $N^{(l+2)}$ (loop processing from step S53601 through step S53603). The counter variable k is used as a variable for identifying units in (l+2) layer. Next, in step S53602, control data with the value of control code A being "117," the value of backpropagation conversion value Δ being the error $\delta_{pj}^{(l+2)}$ inputted in step S5332, the value of layer index La being the counter variable l, and the value of unit information K being the counter variable k is inputted in each of the units. Then, control data with the value of control code A being "118" and the value of layer index La being the counter variable I is outputted to each of the units (step S53604).

Next, the processing in the following steps from step S53606 through step S53613 is repeated while changing the value of the counter variable j from 0, 1, 2, ... to $N^{(l+1)}$ (loop processing from step S53605 through step S53614). The counter variable j is used as a variable for identifying units in (l+1) layer.

Next, in step S53606, control data with the value of control code A being "119," the value of selection unit number B being a counter variable j, and the value of layer index La being l is outputted to each of the units. Next, in step S53607, an error $\delta_{pj}^{(l+1)}$ outputted from each of the units in response to the control data outputted in step S53606 is inputted. Then, control data with the value of control code A being "120," the value of backpropagation conversion value $\Delta$ being the error $\delta_{pj}^{(l+1)}$ inputted in step S53607, the value of layer index La being l, and the value of unit information J being the counter variable j is outputted to each of the units.

The processing in the following steps from step S53610 through step S53613 is repeated while changing the value of the counter variable i from 0, 1, 2, ... to $N^{(l)}$ (loop 2 processing from step S53609 through step S53613). The counter variable i is used as a variable for identifying units in (l) layer.

Next, in step S53610, control data with the value of control code A being "115," the value of selection unit number B being the counter variable i, the value of layer index La being l, and the value of unit information J being the counter variable j is outputted to each of the units. Next, in step S53611, a coupling weight $w_{ji}^{(l)}$ outputted from each of the units in response to the control data outputted in step S53610 is inputted. Then, in step S53612, control data with the value of control code A being "116," the value of selection unit number B being the counter variable j, the value of update coupling weight W being the coupling weight $w_{ji}^{(l)}$ inputted in step S53611, the value of layer index La being the counter variable l, and the value of unit information E being the counter variable i is outputted to each of the units.

As described above with reference to FIG. 53 and FIG. 54, the distribution control section 8 sequentially outputs control codes to each unit in a predetermined order, based on the number of layers in the hierarchical neural network, and the number of units in each of the layers, thereby updating the coupling coefficient stored in the weight storage section 130 of each unit according to learning data.

According to the sixth embodiment described above with reference to FIG. 40 through FIG. 54, in the parallel processing device in accordance with the second base structure which is applied to a hierarchical neural network, each of the units has the learning section 190, and the distribution control section 8 sequentially outputs control codes to each unit in a predetermined order, based on the number of layers in the hierarchical neural network, and the number of units in each of the layers, which gives effects in that the coupling weight (coupling coefficient) can be corrected by a backpropagation method, and thus neural network learning becomes possible.

It is noted that the backpropagation method described above is most effective in hierarchical neural networks without having feedback connections, but is known to be applicable to a recurrent type feedback having feedback connections through appropriate spatial development as an algorithm of a hierarchical neural network without having feedback connections. Therefore the applicability of the structure of the present embodiment is not explicitly limited to hierarchical neural networks that do not have feedback connections.

Also, the sixth embodiment is described above as to the structure that can perform learning through backpropagation in the parallel processing device in which the second base structure described in accordance with the third embodiment is applied to a hierarchical neural network. Similarly, the parallel processing device in which the first base structure described in accordance with the first embodiment is applied to a hierarchical neural network may be structured to perform learning through backpropagation.

Also, in the parallel processing device in accordance with the sixth embodiment, the case of inputting one pattern data, then inputting teacher data that is an expected value for the one pattern data, and correcting coupling coefficients once based on the teacher data is described. However, the invention is not limited to the above. For example, the distribution control section 8 may compute an error metric described above in conjunction with Step C9, and based on the computed error metric, may repeat the processing from Step C3 through Step C8 described above, in other words, may repeat the processing described above with reference to FIG. 53 and FIG. 54, thereby executing learning a plurality of times. Furthermore, the distribution control section 8 may execute, based on plural pattern data sets and corresponding plural teacher data sets, the processing from Step C1 through Step C9 described above.

Seventh Embodiment

Next, in accordance with a seventh embodiment, the parallel processing device in which the second base structure is applied to a hierarchical neural network described as the sixth embodiment has a structure in which the weight storage sections 130 of the respective units are formed from a common weight storage section that is shared by the units.

First, the outline of the seventh embodiment is described. In the forward propagation mode in which the input is forwardly propagated from the input layer to the output layer, and in the backpropagation mode (learning mode) in which the error is propagated backward from the output layer to the input layer thereby performing learning using a backpropagation method, signals flow in opposite directions at nodes corresponding to layers between the input layer and the output layer, and therefore the nodes (i.e., the units) that feed signals and that perform product sum calculation switch. However, the same coupling weights are used for computation in the forward propagation mode and the backpropagation mode.

In accordance with the sixth embodiment, identical coupling weights are stored in two different storage sections, in other words, in the weight storage sections 130 of two different units, for the forward propagation mode and the backpropagation mode.

For this reason, when the values of corresponding coupling weight stored in the two storage sections are updated in the backpropagation mode, they need to be updated such that the values of corresponding coupling weight stored in the two storage sections become identical. More specifically, the processing to match the values of coupling weight needs to be executed by the processing in Step S5334 through Step S5338 in FIG. 53C and the processing in Step S53609 through Step S53613 in FIG. 54.

In contrast, the seventh embodiment has a common storage section which stores coupling weights to be used for computation in the forward propagation mode and the backpropagation mode, and is shared by two units. Also, the common storage section includes a plurality of storage units arranged in a lattice configuration. An address bus for memory access, a data bus and a control bus are connected to the entire storage units composing the common storage section in a lattice configuration, whereby any of the storage units in the column direction or the row direction is activated according to propagation layers. Also, these storage units would not collide at the time of memory access by proper bus wiring and control method to be described below.

In this manner, in accordance with the seventh embodiment, each two units do not require to store coupling weights in duplicate, such that the time for executing the backpropagation algorithm can be shortened. More specifically, the processing in Step S5334 through Step S5338 in FIG. 53C and the processing in Step S53609 through Step S53613 in FIG. 54 become unnecessary, such that the execution time for computation can be shortened.

Figure 55:
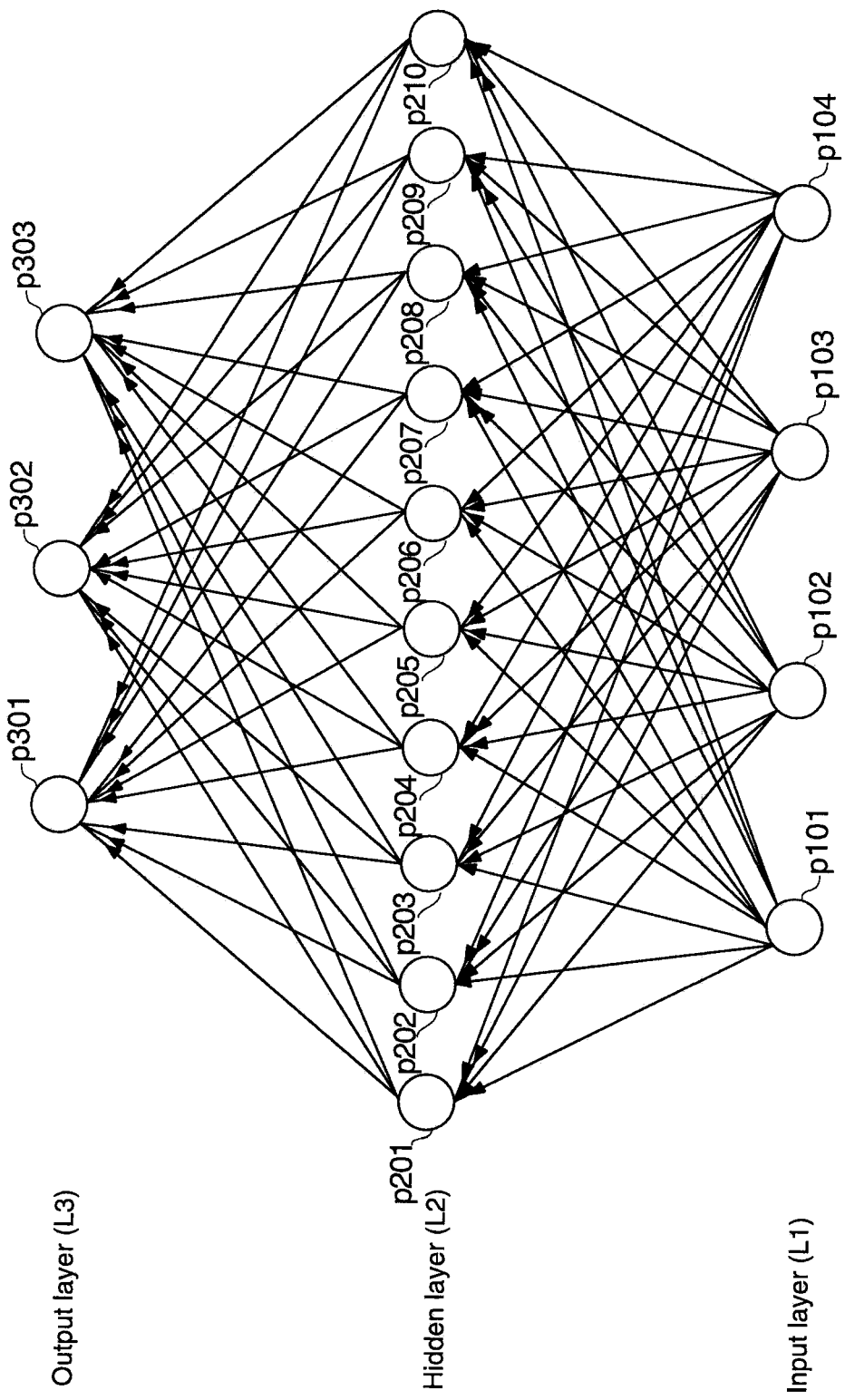
FIG. 55 is a graph for describing an example of a hierarchical neural network.
Figure 56:
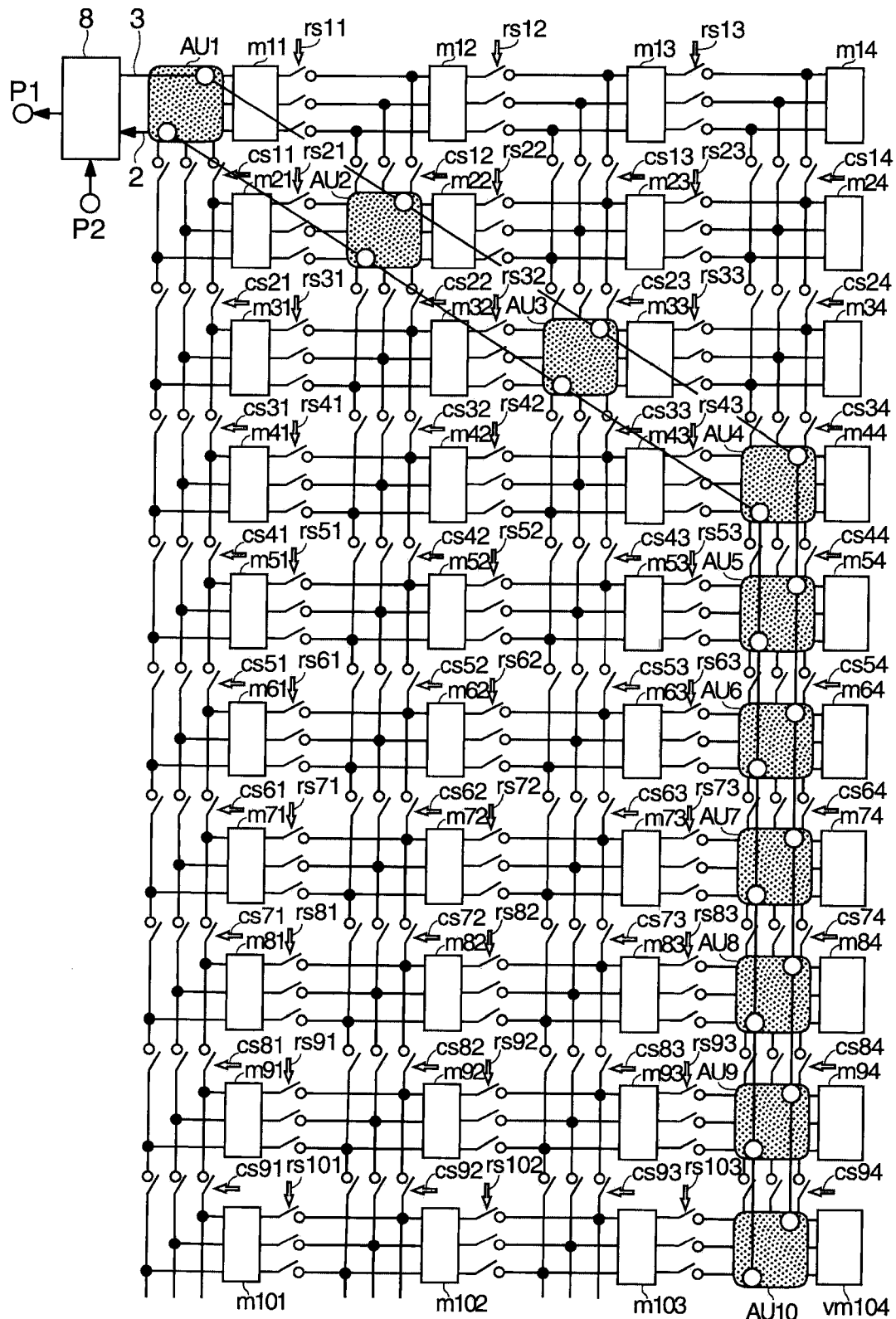
FIG. 56 is a block diagram of the structure of a parallel processing device in accordance with a seventh embodiment.

Next, referring to FIG. 56, a parallel processing device in accordance with the seventh embodiment is described. Herein below, a parallel processing device applied for computing a hierarchical neural network shown in FIG. 55 is described, wherein the hierarchical neural network has an input layer composed of four nodes p110 through p104, a hidden layer composed of ten nodes p201 through p210, and an output layer composed of three nodes p301 through p303.

In this embodiment, it is assumed that the input layer is the first layer, and layers from the input layer to the output layer are sequentially numbered such that the value indicating the layer order reads the second layer, the third layer, . . . , and the like. Also, layers having the value indicating the layer order in an odd number shall be called odd number layers, and those in an even number shall be called even number layers.

The parallel processing device has a common weight storage section that is shared by a plurality of units (AU1 through AU10), and stores in advance coupling weights in plural layers in the hierarchical neural network. The common weight storage section includes, as shown in FIG. 56, a plurality of storage units m11, m12, m13, m14, m21, m22, . . . m103 and m104, a plurality of row switches rs11, rs12, rs13, . . . rs103 to be described below, and a plurality of column switches cs11, cs12, cs13, . . . cs94 to be described below.

Also, the common weight storage section stores the coupling weights associated with layer information for identifying hierarchical layers in the hierarchical neural network, output node information for identifying nodes that outputs an output value in the hierarchical neural network, and input node information for identifying nodes that inputs an output value in the hierarchical neural network.

Also, the common weight storage section includes a plurality of storage units (the storage units m11, m12, m13, m14, m21, m22 . . . m103 and m104 in FIG. 56), each of which stores coupling weights corresponding to one value of input node information and one value of output node information for each different value of the layer information.

For example, as shown in FIG. 59, the storage unit m12 stores coupling coefficients corresponding to two layers, a coupling weight $W^{(2)}_{12}$ and a coupling weight $W^{(3)}_{21}$. FIG. 59 shows a table of coupling weights stored in each of the storage units, corresponding to the plural storage units shown in FIG. 56. In the table shown in FIG. 59, for example, coupling coefficients indicated in a frame at the number 2 in the row direction and the number 1 in the column direction are stored in the storage unit m12. It is noted that, in the table shown in FIG. 59, coupling weights stored corresponding to the second layer and coupling weights stored corresponding to the third layer shown in FIG. 57 are summarized.

It is noted that the hierarchical neural network shown in FIG. 55 includes four nodes at the input layer, ten nodes at the hidden layer and three nodes at the output layer, and stores the coupling weights corresponding to the number of nodes in these layers. For this reason, there may be cases where corresponding coupling weights become unnecessary, as indicated in the forth column in the table shown in FIG. 58.

Also, as shown in FIG. 59, each of the storage units stores coupling weights in which one value of input node information and one value of output node information are alternated in the order of layer information. For example, in the table of FIG. 59 to be described below, coupling weights stored in the storage unit m12 are a coupling weight $W^{(2)}_{12}$ and a coupling weight $W^{(3)}_{21}$, where the values for input node information and output node information, 1 and 2, are alternated in the order defined by the layer information.

Also, each of the plural storage units is shared by each two of the plural units, based on input node information and output node information of coupling weights stored in the storage unit and nodes computed by the unit in the hierarchical neural network.

For example, the storage unit m12 stores the coupling weight $W^{(2)}_{12}$ and the coupling weight $W^{(3)}_{21}$, where the value of input node information is 1 or 2, and the value of output node information is 1 or 2. For example, based on unit characteristic information, nodes that are computed by each unit in the hierarchical neural network are predetermined. Therefore, for example, the unit AU1 performs computation of the hierarchical neural network as the first node in the entire layers, and the unit AU2 performs computation of the hierarchical neural network as the second node in the entire layers.

In this case, the storage unit m12 is a unit, in which the value of input node information or output node information (1 or 2) matches the number of node (unit character information) to be computed by a unit among the plural units in the hierarchical neural network, and is shared by two units, the unit AU1 and the unit AU2. It is noted that, as described below, the storage unit m12 is connectable to the unit AU1 through the row switch rs11, and connectable to the unit AU2 through the column switch cs12, thereby being shared by the unit AU1 and the unit AU2.

It is noted that two units that share a storage unit that stores coupling weights whose values of input node information and the value of output node information are identical are the same unit.

Also, for example, the storage unit m11 stores a coupling weight $W^{(2)}_{11}$ and the coupling weight $W^{(3)}_{11}$, where the value of input node information is 1 only, and the value of output node information is 1 only, and thus the value of input node information and the value of output node information of the coupling weights stored are identical.

In this case, the storage unit m11 is a unit, in which the value of input node information and output node information (1 only) matches the number of node (unit character information) to be computed by a unit among the plural units in the hierarchical neural network, and is shared solely by the unit AU1. Therefore, because the storage unit m11 is shared only by the unit AU1, the storage unit m11 and the unit AU1 do not need to be connected through a raw switch or a column switch, and may be connected directly to each other. Alternatively, the storage unit m11 may be built in the unit AU1.

Also, for example, as shown in FIG. 56, when each two units that shares a storage unit are identical, such as, the unit AU1 and the storage unit m11, the unit AU2 and the storage unit m22, the unit AU3 and the storage unit m33, and the unit AU4 and the storage unit m44, in the storage units arranged in a lattice configuration, those of the storage units and units that are arranged diagonally can be matched with each other. Therefore, corresponding units and storage units can be more readily wired, and the number of row switches and column switches can be reduced. Also, when the storage unit m11 is built in the unit AU1, the number of storage units, namely the storage unit m11, can be reduced.

Also, in the common weight storage section, the plural storage units are arranged in a row direction and a column direction in a lattice configuration, based on input node information and output node information of coupling weights stored in the storage units.

For example, the storage units are arranged in a lattice as shown in FIG. 56 in a manner that, of the coupling weights stored in the storage units shown in FIG. 59, the values of input node information and the values of output node information in the second layer correspond to the arranged positions in the row direction and the arranged positions in the column direction in the lattice, respectively.

Also, the common weight storage section includes row switches, each of which is capable of connecting a storage unit to one of two units sharing the storage in the row direction, and column switches, each of which is capable of connecting the storage unit to the other of the two units sharing the storage in the column direction.

For example, the storage unit m101 is shared by the unit AU10 and the unit AU1, and the storage unit m101 can be connected to the unit AU10 in the row direction, which is one of the two units that share the storage unit m101, through the row switches rs101, rs102 and rs103, also, the storage unit m101 can be connected to the unit AU1 in the column direction, which is the other of the two units that share the storage unit m101, through the column switches cs91, cs81, cs71, cs61, cs61, cs41, cs31, cs21 and cs11.

Also, the common weight storage section includes a switch control section that controls the row switches and the column switches into a connected state or an unconnected state, based on the hierarchical layers of computation in the hierarchical neural network. Also, the switch control section controls the row switches and the column switches into a row active state or a column active state to be described below, based on the hierarchical layers of computation in the hierarchical neural network.

The row active state is a state in which, of the plural storage units arranged in rows and columns in a lattice, plural ones of the storage units arranged in one of the rows are controlled to output coupling weights for a hierarchical layer, and the column switches are controlled to be in a connected state and the row switches are controlled to be in an unconnected state.

The column active state is a state in which, of the plural storage units arranged in rows and columns in a lattice, plural ones of the storage units arranged in one of the columns are controlled to output coupling weights for a hierarchical layer, and the column switches are controlled to be in a unconnected state and the row switches are controlled to be in a connected state.

Also, the switch control section controls the storage units, the column switches and the row switches to be in a row active state, based on computation in the hierarchical neural network, when units in an odd number layer are on the output side, and units in an even number layer are on the input side. Further, the switch control section controls the storage units, the column switches and the row switches to be in a column active state, when units in an even number layer are on the output side, and units in an odd number layer are on the input side.

It is noted that the switch control section may execute the control described above, based on control data inputted from the distribution control section 8. Also, the switch control section may be built in the distribution control section 8.

As the switch control section controls the row switches and the column switches, and outputs of the storage units, as described above, input and output of coupling weights can be performed without colliding among the storage units and the units.

Figure 60:
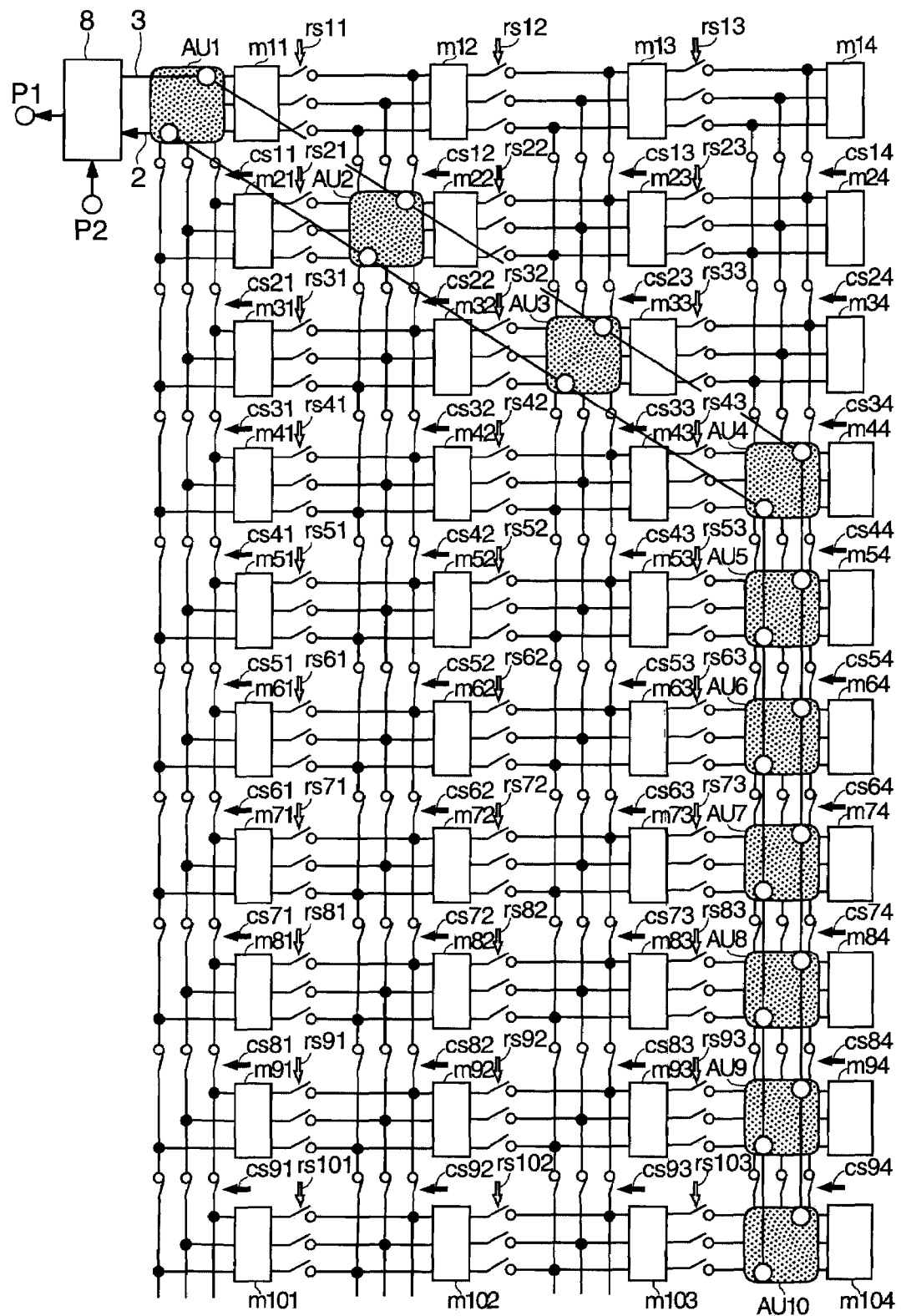
FIG. 60 is a diagram for describing a row active state in the parallel processing device shown in FIG. 56.
Figure 61:
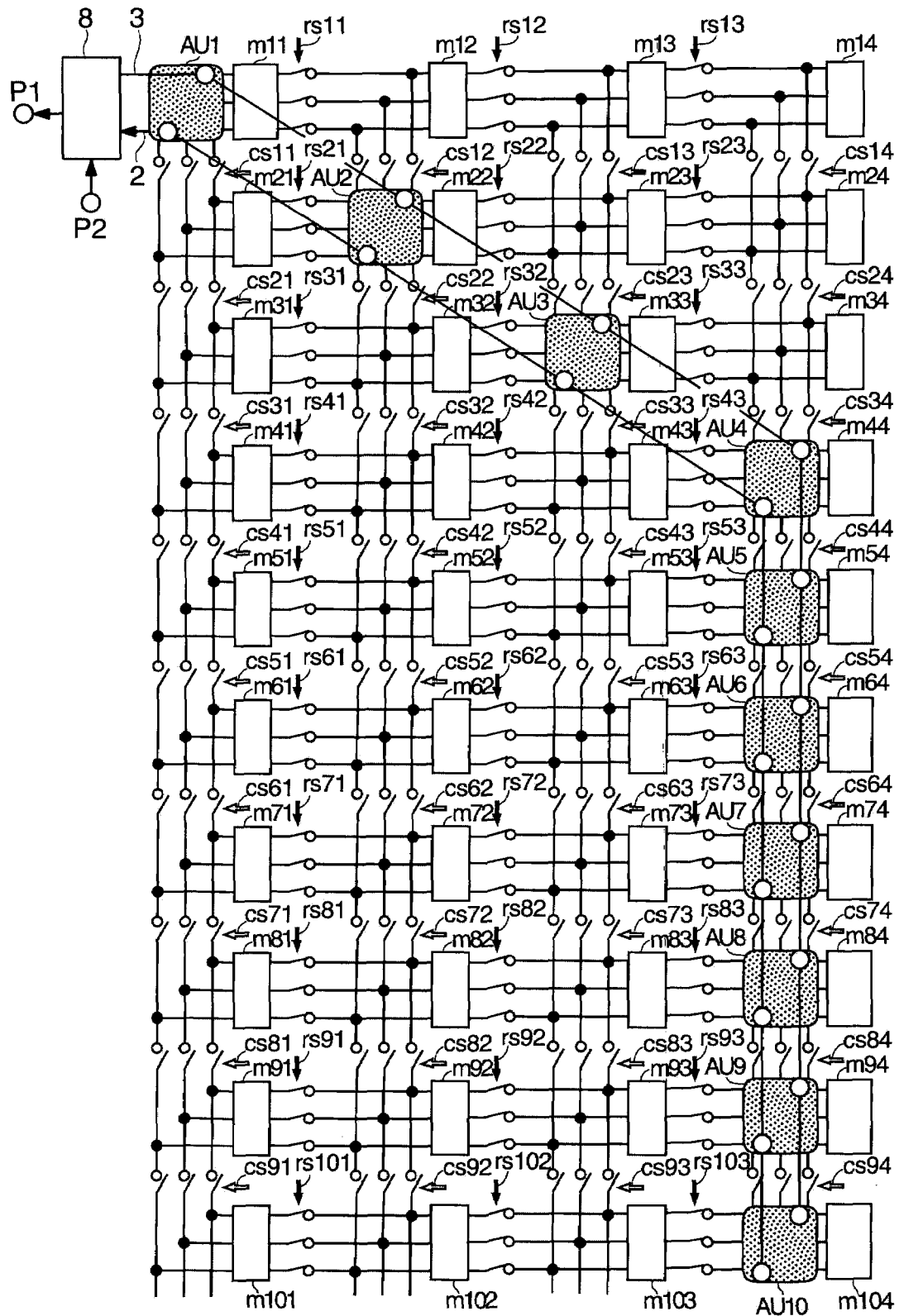
FIG. 61 is a diagram for describing a column active state in the parallel processing device shown in FIG. 56.

Next, with reference to FIG. 60 and FIG. 61, connection states of the row switches and the column switches in the row active state and the column active state described above are now described. FIG. 60 shows the connection state of the row switches and the column switches in the row active state. In this case, the entire row switches rs11, . . . rs103 are placed in the unconnected state, and the entire column switches cs11, . . . cs94 are placed in the connected state. It is noted that, in the following figures, when the row switches or the column switches are in the connected state, arrows near the switches are indicated in black, and when they are in the unconnected state, arrows near the switches are indicated in white.

FIG. 61 shows the connection state of the row switches and the column switches in the column active state. In this case, the entire row switches rs11, . . . rs103 are placed in the connected state, and the entire column switches cs11, . . . cs94 are placed in the unconnected state.

Figure 62:
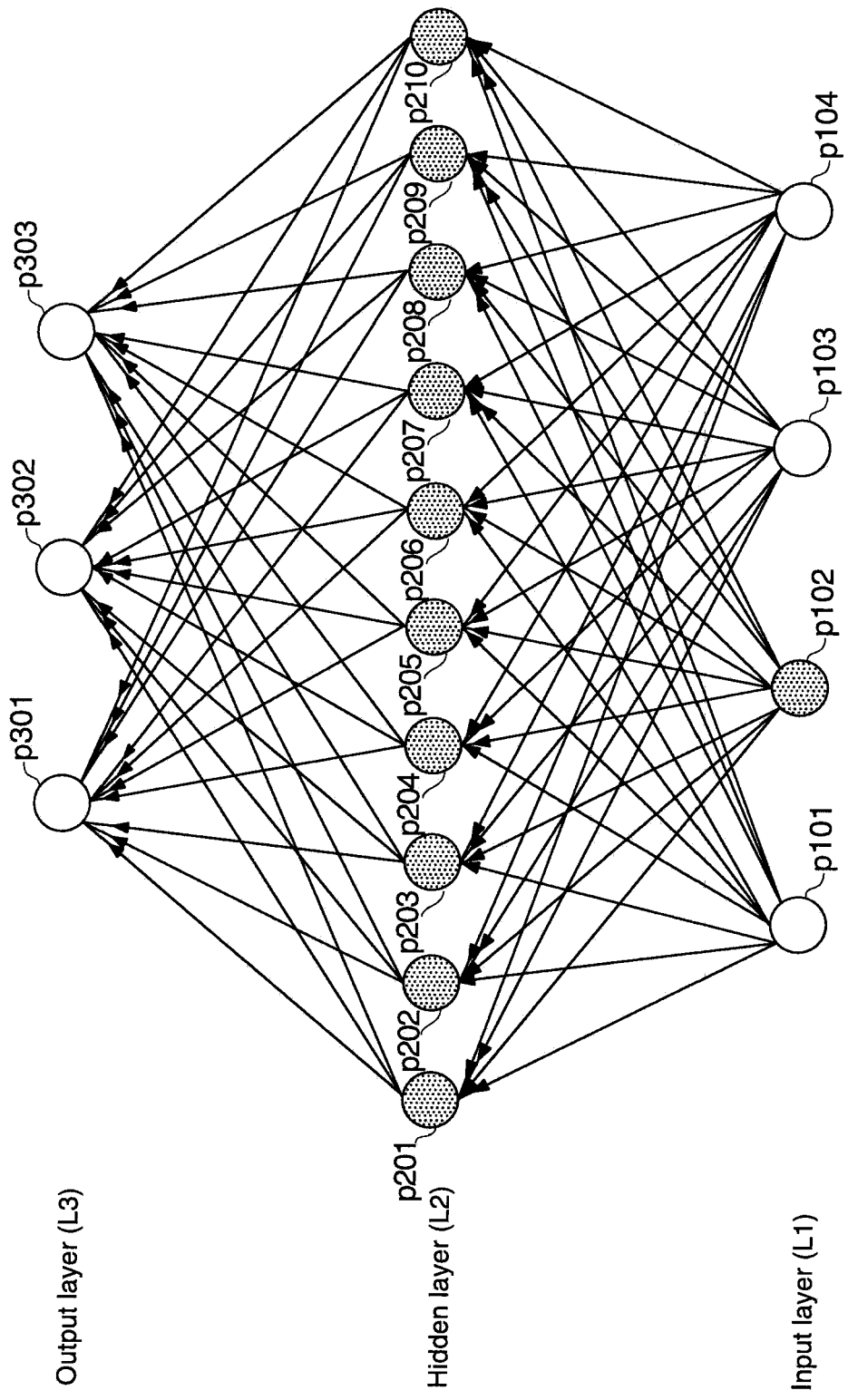
FIG. 62 is a diagram 1 of an example of a state of nodes in a forward direction in the hierarchical neural network shown in FIG. 55.
Figure 63:
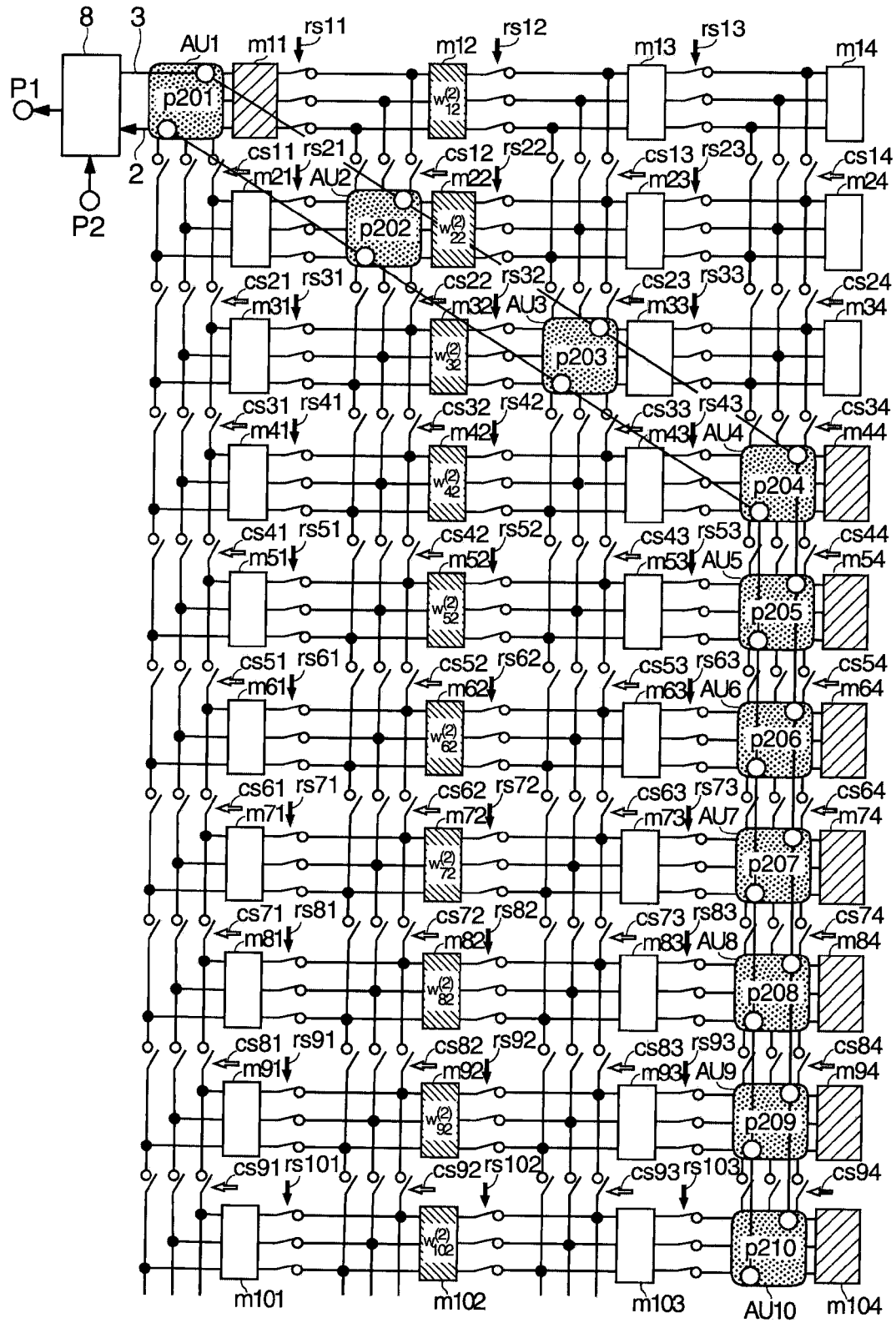
FIG. 63 shows a state of operations of the parallel processing device shown in FIG. 56 in the state of nodes shown in FIG. 62.
Figure 64:
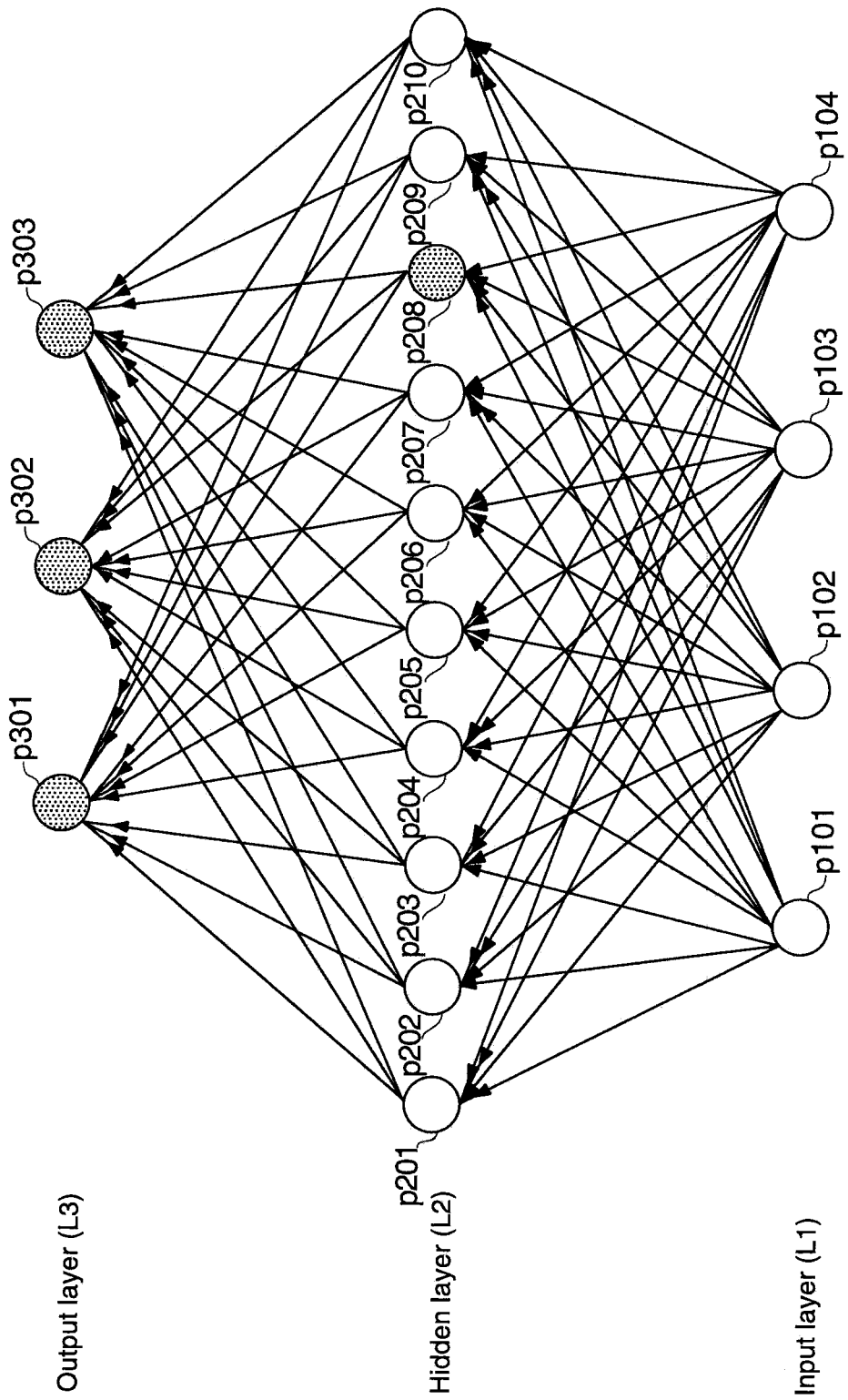
FIG. 64 is a diagram 2 of an example of a state of nodes in a forward direction in the hierarchical neural network shown in FIG. 55.
Figure 65:
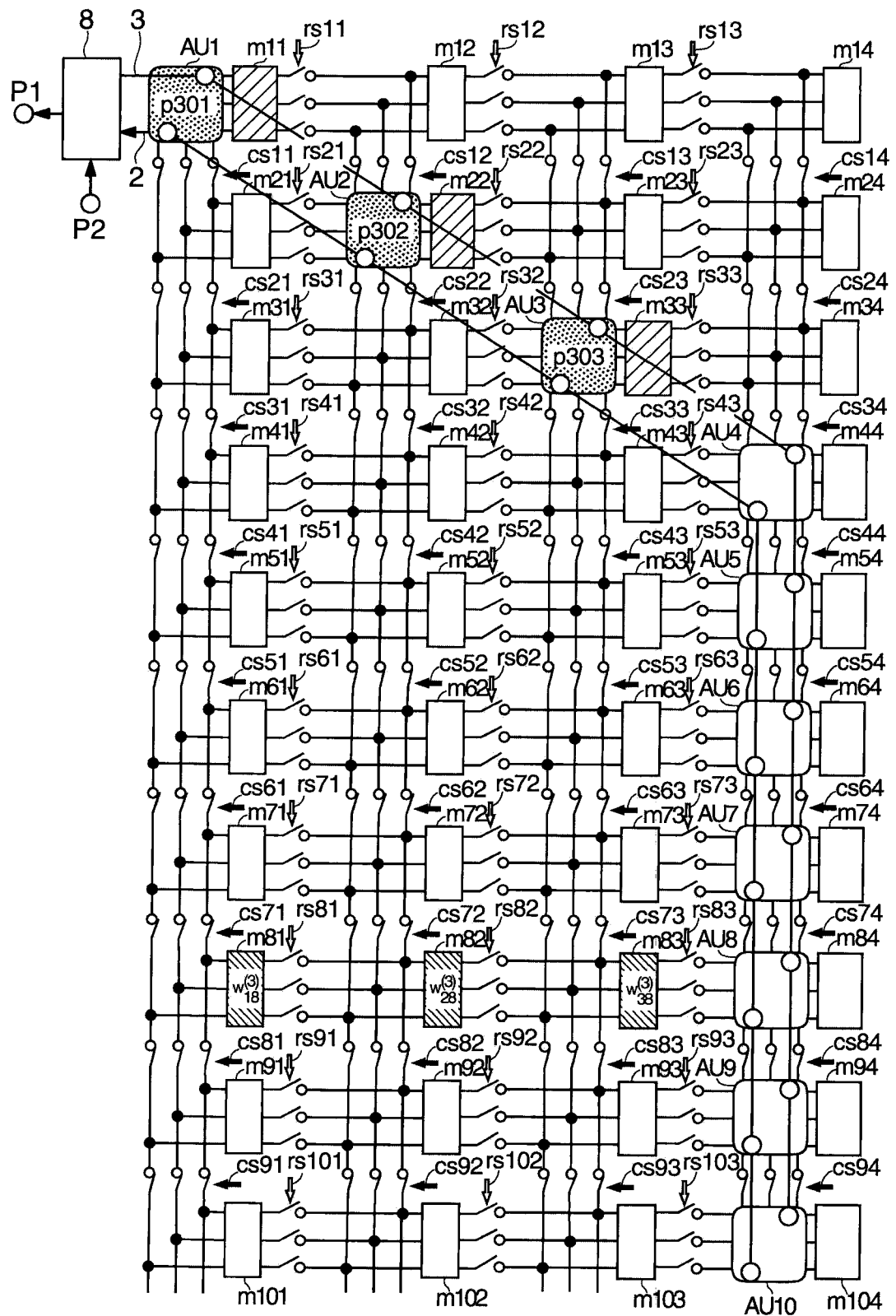
FIG. 65 shows a state of operations of the parallel processing device shown in FIG. 56 in the state of nodes shown in FIG. 64.
Figure 66:
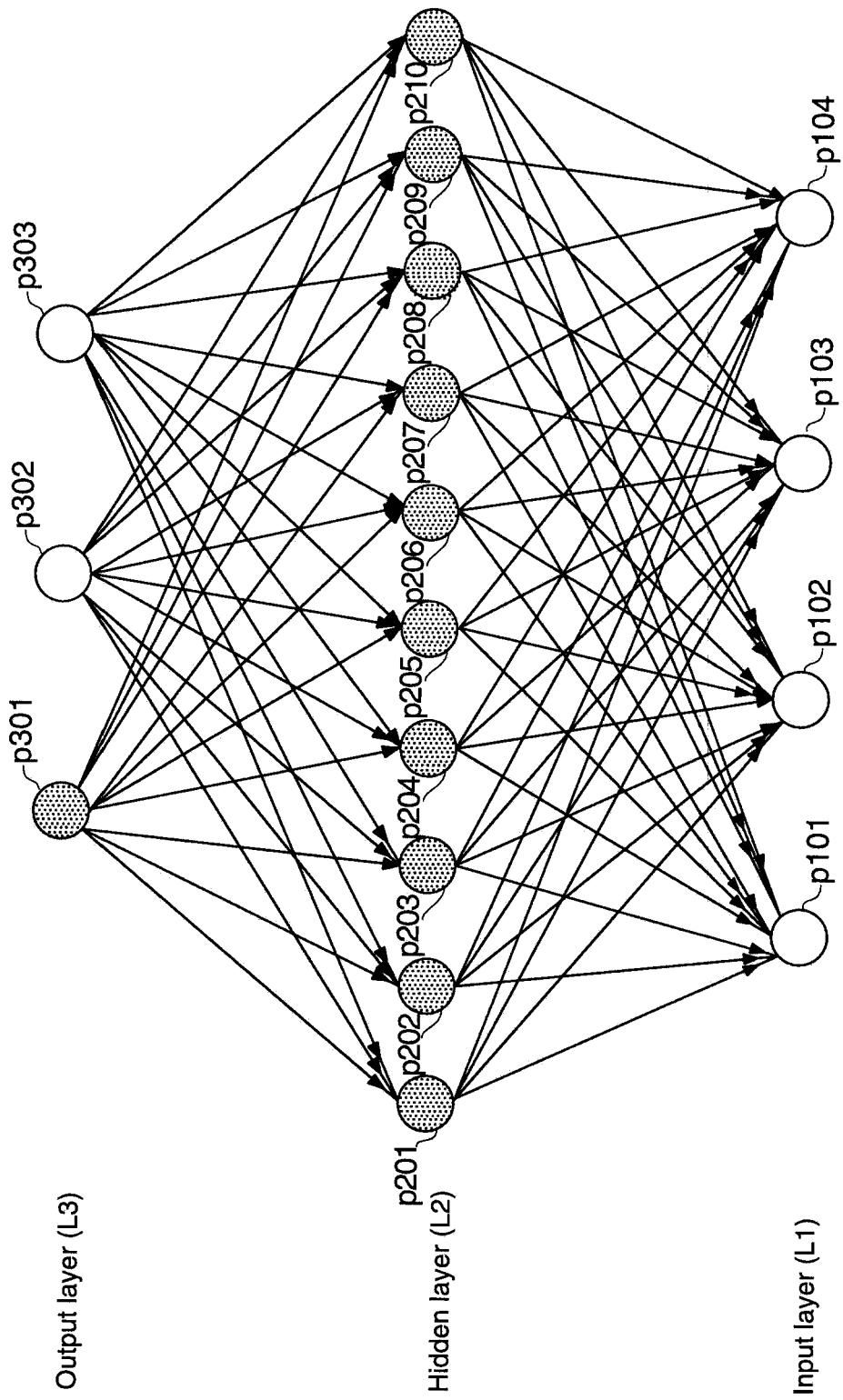
FIG. 66 is a diagram 1 of an example of a state of nodes in a backward direction in the hierarchical neural network shown in FIG. 55.
Figure 67:
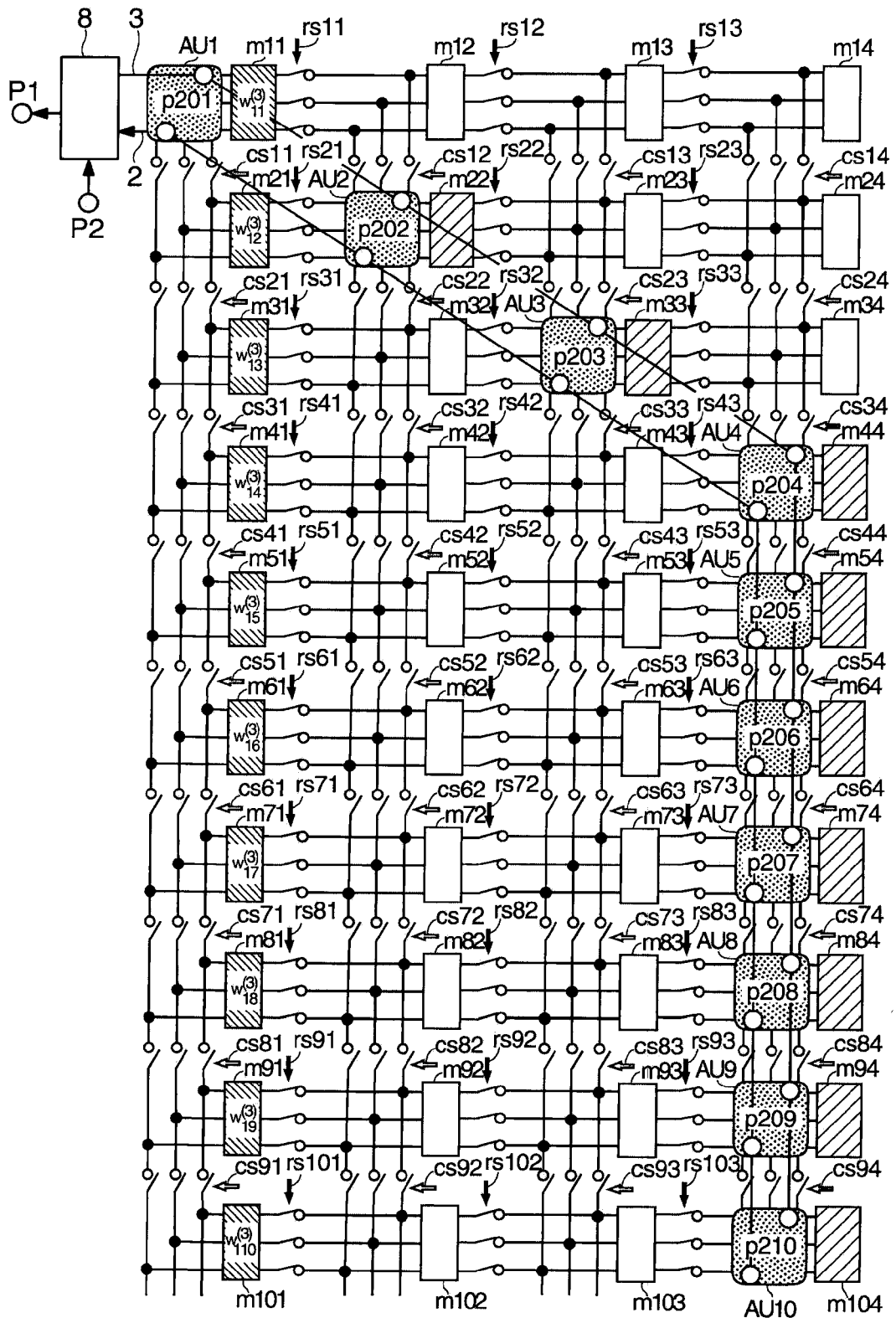
FIG. 67 shows a state of operations of the parallel processing device shown in FIG. 56 in the state of nodes shown in FIG. 66.
Figure 68:
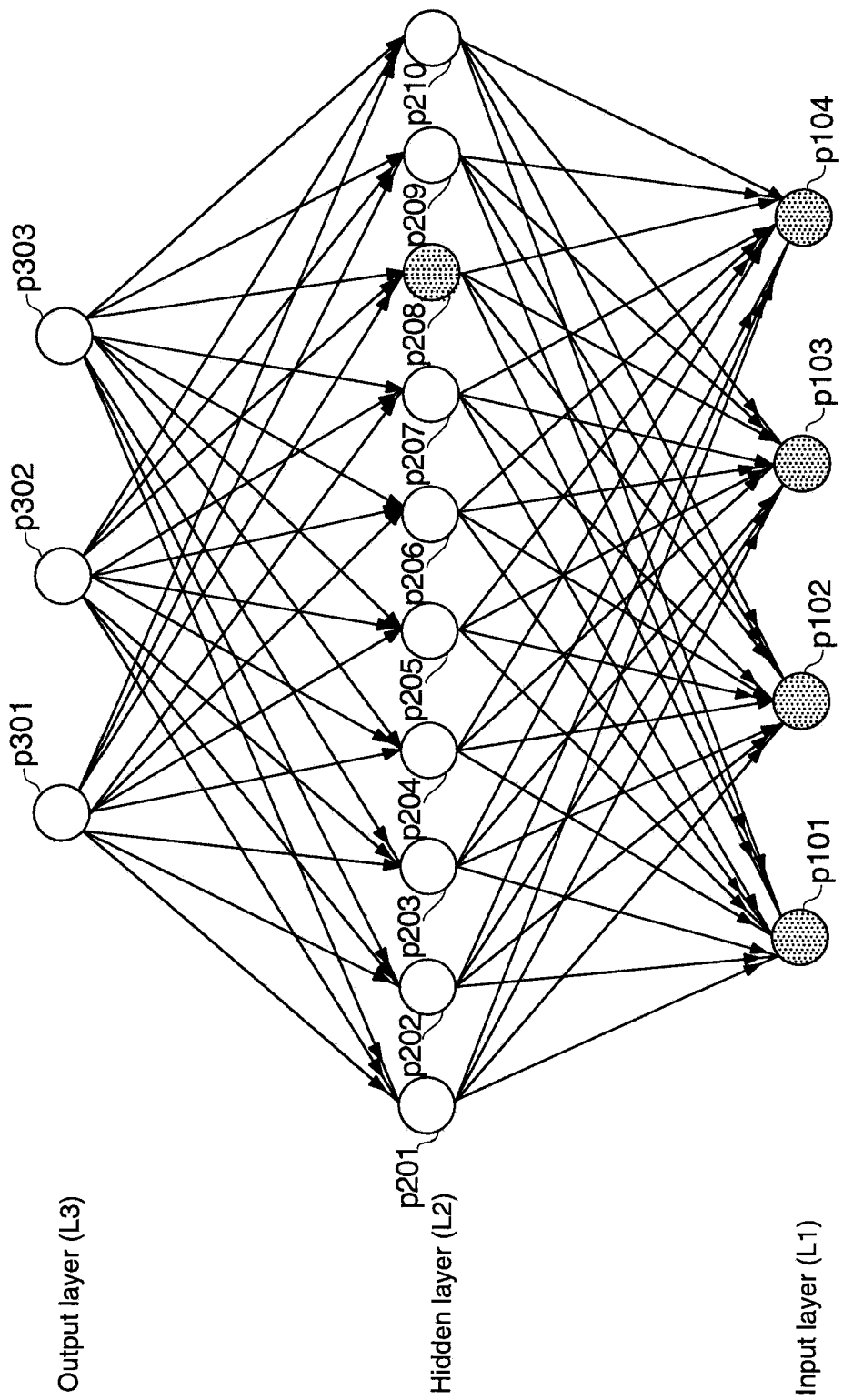
FIG. 68 is a diagram 2 of an example of a state of nodes in a backward direction in the hierarchical neural network shown in FIG. 55.
Figure 69:
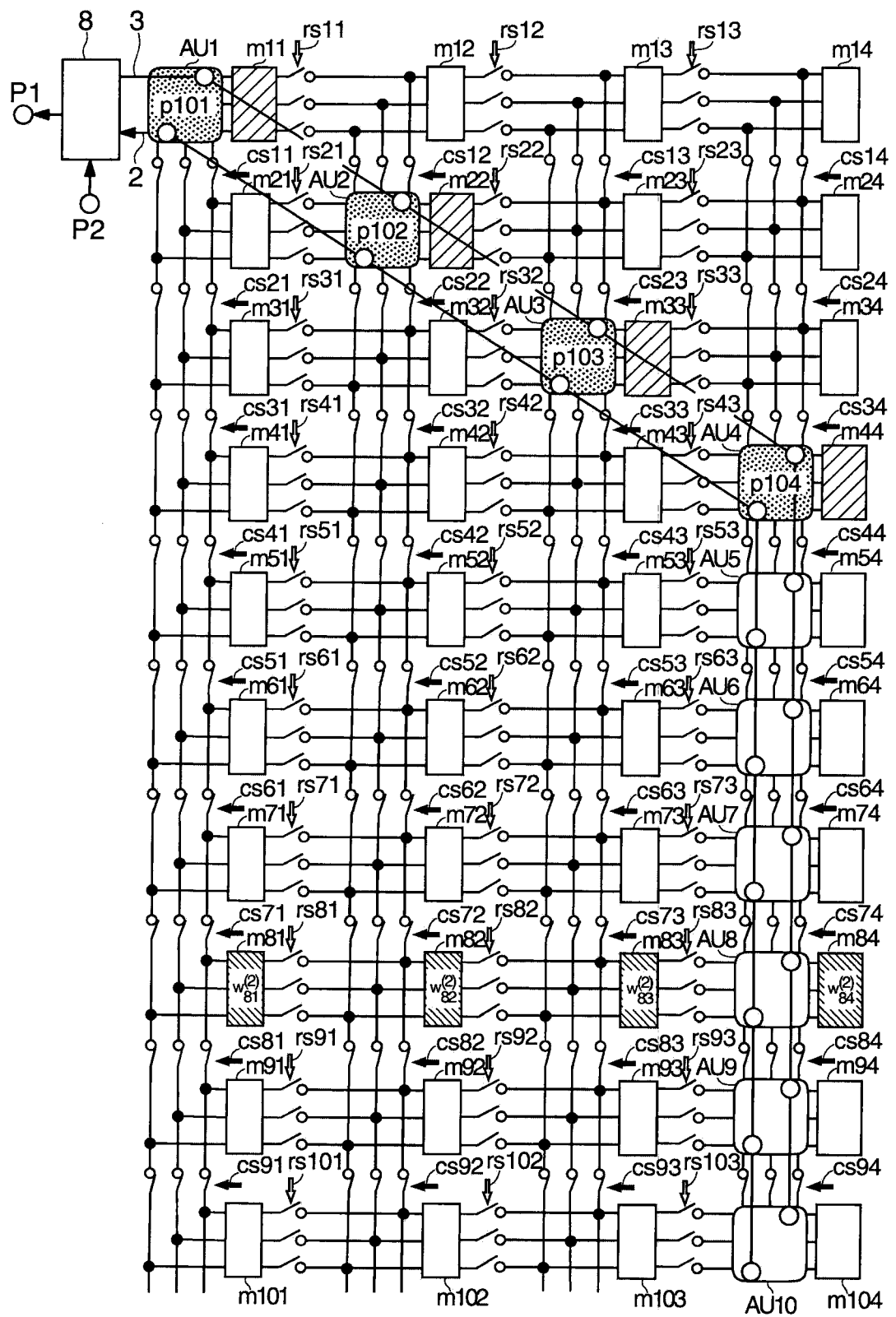
FIG. 69 shows a state of operations of the parallel processing device shown in FIG. 56 in the state of nodes shown in FIG. 68.

Next, referring to FIG. 62 through FIG. 69, the row active state and the column active state are described, based on computation in the hierarchical neural network. Here, FIG. 63 shows an operation state of the parallel processing device, in particular, an operation state of the common weight storage section when the nodes are in the state shown in FIG. 62. Similarly, FIG. 65 shows an operation state of the parallel processing device, in particular, an operation state of the common weight storage section when the nodes are in the state shown in FIG. 64. Similarly, FIG. 67 shows an operation state of the parallel processing device, in particular, an operation state of the common weight storage section when the nodes are in the state shown in FIG. 66. Similarly, FIG. 69 shows an operation state of the parallel processing device, in particular, an operation state of the common weight storage section when the nodes are in the state shown in FIG. 68.

It is noted that, in FIG. 62, FIG. 64, FIG. 66 and FIG. 68, output nodes and input nodes are colored in gray. Also, in FIG. 63, FIG. 65, FIG. 67 and FIG. 69, units that are executing computation as nodes are colored in gray, and the units are appended with codes (p201, etc.) of the corresponding nodes. Also, in the same figure, storage units that are outputting coupling weights are colored, and codes ($W^{(2)}_{12}$, etc.) of the coupling weights outputted are shown in the figure.

Forward Direction: Input from Odd Number Layer Side to Even Number Layer Side

First, referring to FIG. 62 and FIG. 63, description is made as to an operation state of the parallel processing device in which the nodes in the odd number layer in the forward direction are on the output side and the nodes in the even number layer are on the input side. As an example, a case shown in FIG. 62, in which the node p102 in the input layer (L1) is outputting an output value to all of the nodes (p201-p210) in the hidden layer (L2) is described.

In this case, the nodes in the odd number layer are on the output side, and the nodes in the even number layer are on the input side, such that, as shown in FIG. 63, the switch control section controls the storage units, the column switches and the row switches to be in the column active state. Also, the unit AU1 functions as the node p201, the unit AU2 functions as the node p202, . . . and the unit AU10 functions as the node p210. In this case, the distribution control section 8 functions as the output node p102.

Also, in response to output from the node p102 in the input layer (L1), the storage unit m12 that is a storage unit in the second column outputs a coupling coefficient $W^{(2)}_{12}$, the storage unit m22 outputs a coupling coefficient $W^{(2)}_{22}$, the storage unit m32 outputs a coupling coefficient $W^{(2)}_{32}$, the storage unit m42 outputs a coupling coefficient $W^{(2)}_{42}$, the storage unit m52 outputs a coupling coefficient $W^{(2)}_{52}$, . . . and the storage unit m102 outputs a coupling coefficient $W^{(2)}_{102}$.

Also, in the column active state, the entire row switches are in the connected state, such that the coupling coefficient $W^{(2)}_{12}$ outputted from the storage unit m12 is inputted in the unit AU1 through the row switch rs11. Similarly, the coupling coefficients outputted from the other storage units are inputted in the corresponding units through the row switches.

According to the above, each of the units can execute computation in the forward direction based on the inputted coupling coefficient, like the sixth embodiment.

Forward Direction: Input from Even Number Layer Side to Odd Number Layer Side

First, referring to FIG. 64 and FIG. 65, description is made as to an operation state of the parallel processing device in which the nodes in the even number layer in the forward direction are on the output side and the nodes in the odd number layer are on the input side. As an example, a case shown in FIG. 64, in which the node p208 in the hidden layer (L2) is outputting an output value to all of the nodes (p301-p303) in the output layer (L3) is described.

In this case, the nodes in the even number layer are on the output side, and the nodes in the odd number layer are on the input side, such that, as shown in FIG. 65, the switch control section controls the storage units, the column switches and the row switches to be in the row active state. Also, the unit AU1 functions as the node p301, the unit AU2 functions as the node p302, and the unit AU3 functions as the node p303. In this case, the distribution control section 8 functions as the output node p208.

Also, in response to output from the node p208 in the hidden layer (L2), the storage unit m81 that is a storage unit in the eighth row outputs a coupling coefficient $W^{(3)}_{18}$, the storage unit m82 outputs a coupling coefficient $W^{(3)}_{28}$, and the storage unit m83 outputs a coupling coefficient $W^{(3)}_{38}$.

Also, in the row active state, the entire column switches are in the connected state, such that the coupling coefficient $W^{(3)}_{18}$ outputted from the storage unit m81 is inputted in the unit AU1 through the column switch cs71, the column switch cs61, the column switch cs61, . . . and the column switch cs11. Similarly, the coupling coefficients outputted from the other storage units are inputted in the corresponding units through the column switches.

According to the above, each of the units can execute computation in the forward direction based on the inputted coupling coefficient, like the sixth embodiment.

Backward Direction: Input Form Odd Number Layer Side to Even Number Layer Side

Next, referring to FIG. 66 and FIG. 67, description is made as to an operation state of the parallel processing device in which the nodes in the odd number layer in the backward direction are on the output side and the nodes in the even number layer are on the input side. As an example, a case shown in FIG. 66, in which the node p301 in the output layer (L3) is outputting an output value to all of the nodes (p201-p210) in the hidden layer (L2) is described.

In this case, the nodes in the odd number layer are on the output side, and the nodes in the even number layer are on the input side, such that, as shown in FIG. 67, the switch control section controls the storage units, the column switches and the row switches to be in the column active state. Also, the unit AU1 functions as the node p201, the unit AU2 functions as the node p202, . . . and the unit AU10 functions as the node p210. In this case, the distribution control section 8 functions as the output node p301.

Also, in response to output from the node p301 in the output layer (L3), the storage unit m11 that is a storage unit in the first column outputs a coupling coefficient $W^{(3)}_{11}$, the storage unit m21 outputs a coupling coefficient $W^{(3)}_{12}$, the storage unit m31 outputs a coupling coefficient $W^{(3)}_{13}$, the storage unit m41 outputs a coupling coefficient $W^{(3)}_{14}$, the storage unit m51 outputs a coupling coefficient $W^{(3)}_{15}$, . . . and the storage unit m101 outputs a coupling coefficient $W^{(3)}_{110}$.

Also, in the column active state, the entire row switches are in the connected state, such that the coupling coefficient $W^{(3)}_{11}$ outputted from the storage unit m11 is inputted in the unit AU1. Also, the coupling coefficient $W^{(3)}_{12}$ outputted from the storage unit m21 is inputted in the unit AU2 through the row switch rs21. Similarly, the coupling coefficients outputted from the other storage units are inputted in the corresponding units through the row switches.

According to the above, each of the units can execute computation in the backward direction based on the inputted coupling coefficient, like the sixth embodiment.

Backward Direction: Input from Even Number Layer Side to Odd Number Layer Side

First, referring to FIG. 68 and FIG. 69, description is made as to an operation state of the parallel processing device in which the nodes in the even number layer in the backward direction are on the output side and the nodes in the odd number layer are on the input side. As an example, a case shown in FIG. 68, in which the node p208 in the hidden layer (L2) is outputting an output value to all of the nodes (p101-p104) in the input layer (L1) is described.

In this case, the nodes in the even number layer are on the output side, and the nodes in the odd number layer are on the input side, such that, as shown in FIG. 69, the switch control section controls the storage units, the column switches and the row switches to be in the row active state. Also, the unit AU1 functions as the node p101, the unit AU2 functions as the node p102, the unit AU3 functions as the node p103, and the unit AU4 functions as the node p104. In this case, the distribution control section 8 functions as the output node p208.

Also, in response to output from the node p208 in the hidden layer (L2), the storage unit m81 that is a storage unit in the eighth row outputs a coupling coefficient $W^{(2)}_{81}$, the storage unit m82 outputs a coupling coefficient $W^{(2)}_{82}$, the storage unit m83 outputs a coupling coefficient $W^{(2)}_{83}$, and the storage unit m84 outputs a coupling coefficient $W^{(2)}_{84}$.

Also, in the row active state, the entire column switches are in the connected state, such that the coupling coefficient $W^{(2)}_{81}$ outputted from the storage unit m81 is inputted in the unit AU1 through the column switch cs71, the column switch cs61, the column switch cs61, . . . and the column switch cs11. Similarly, the coupling coefficients outputted from the other storage units are inputted in the corresponding units through the column switches.

According to the above, each of the units can execute computation in the backward direction based on the inputted coupling coefficient, like the sixth embodiment.

Figure 71:
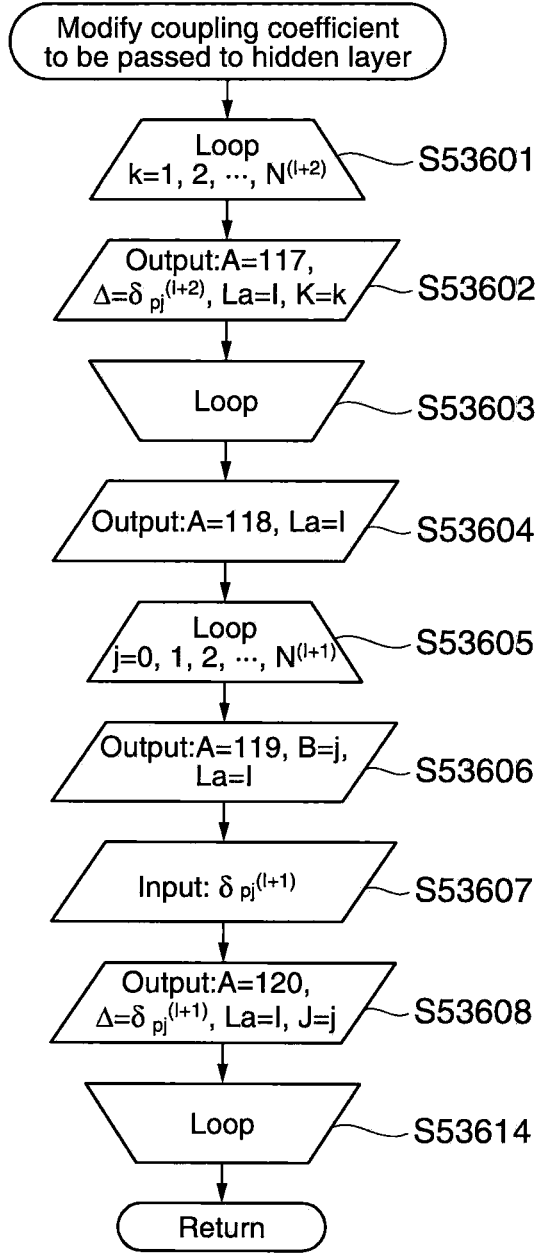
FIG. 71 is a flow chart 2 for describing operations of the distribution control section 8 in accordance with the seventh embodiment.

Operations of Distribution Control Section 8 in Accordance with Seventh Embodiment Next, referring to FIG. 70 and FIG. 71, operations of the distribution control section 8 in accordance with a seventh embodiment are described. Flow charts shown in FIGS. 70A-70C generally correspond to the flow charts shown in FIGS. 53A-53C, but do not have the processing from step S5334 through step S5338 in FIG. 53C, but other part of the processing is the same. Also, a flow chart shown in FIG. 71 corresponds to the flow chart shown in FIG. 54, but does not have the processing from step S53609 through step S53613, but other part of the processing is the same.

The distribution control section 8 in accordance with the seventh embodiment to be described with reference to FIGS. 70A-70C and FIG. 71 operates in a similar manner as the distribution control section 8 in accordance with the sixth embodiment described with reference to FIGS. 53A-53C and FIG. 54, whereby computation of a hierarchical network can be executed.

In this manner, like the sixth embodiment, the unit processing section 15 in accordance with the seventh embodiment executes, based on control information from the distribution control section 8 and coupling weights stored in the common storage section, computation in the forward direction that is a direction from the input layer to the output layer in the hierarchical neural network, and computation in the backward direction that is a direction from the output layer to the input layer, whereby the coupling weights can be updated.

It is noted that, in the forward direction, an input pattern is inputted from the distribution control section 8, and the unit processing section 15 calculates and outputs output values based on coupling weights stored in the common weight storage section for the input pattern inputted. Also, in the backward direction, teacher data for the input pattern previously inputted is inputted from the distribution control section 8, and based on the teacher data inputted, the unit processing section 8 updates the values of coupling weights stored in the common storage section in a way errors between the output values outputted and the teacher data inputted become smaller.

Also, in contrast to the distribution control section 8 in accordance with the sixth embodiment, the distribution control section 8 in accordance with the seventh embodiment does not need to execute the processing in step S5334 through step S5338 shown in FIG. 53C, and the processing in step S53609 through step S53613 in FIG. 54, whereby the number of steps for the entire processing can be reduced.

As described above, in accordance with the seventh embodiment, coupling weights to be used for computation among the layers are stored for the forward propagation mode and the backpropagation mode, as contrasted with the sixth embodiment, and a common storage section that allows each two units to share a storage section is provided, such that the values of corresponding coupling weights that would otherwise be stored in storage sections of two units do not need to be updated in a way to be identical, and therefore the processing in step S5334 through step S5338 in FIG. 53C and the processing in step S53609 through step S53613 in FIG. 54 become unnecessary.

Next, the number of required storage units is described. When a hierarchical neural network has a three-layer structure, for example, as shown in FIG. 55, the hierarchical neural network has nodes in a number corresponding to each layer, as indicated below. The following description shall be made as to a case where the input layer is defined as the first layer, and layers from the input layer to the output layer are sequentially numbered.

Input layer (first layer): four nodes (input terminals)
Hidden layer (second layer): ten nodes
Output layer (third layer): three nodes In general, a hierarchical neural network with an n-layer structure has the following numbers of nodes. It is noted that n is a natural number.

Input layer (first layer): N1 nodes (input terminal)
Hidden layer 1 (second layer): N2 nodes
Hidden layer 2 (third layer): N3 nodes
Hidden layer n-2 ((n-1)-th layer): Nn-1 nodes
Output layer (n-th layer): Nn nodes The numbers of storage units required in the row direction and the column direction from a layer to the next layer are as follows.

(1) From the first layer to the second layer: N1 storage units in the row direction, and N2 storage units in the column direction.

(2) From the second layer to the third layer: N2 storage units in the column direction, and N3 storage units in the row direction.

(3) From the third layer to the fourth layer: N3 storage units in the row direction, and N4 storage units in the column direction.

(4) From (n-2)-th layer to (n-1)-th layer: When the value of (n-2) is an even number, Nn-2 storage units in the column direction, and Nn-1 storage units in the row direction. Conversely, when the value of (n-2) is an odd number, Nn-2 storage units in the row direction, and Nn-1 storage units in the column direction.

(5) From (n-1)-th layer to n-th layer: When the value of (n-1) is an even number, Nn-1 storage units in the column direction, and Nn storage units in the row direction. Conversely, when the value of (n-1) is an odd number, Nn-1 storage units in the row direction, and Nn storage units in the column direction.

As is clear from the above, the numbers of storage units required in the column direction and the row direction are at least the maximum value of the number of storage units required in an even number layer whose layer number is an even number, and the maximum value of the number of storage units required in an odd number layer whose layer number is an odd number, respectively.

As described above, when the input layer in a hierarchical neural network is defined as the first layer, and layers from the input layer to the output layer are sequentially numbered, the common weight storage section has, as storage units in one of the row direction and the column direction, storage units at least in a number equal to the maximum value of the number of nodes in an even number layer in the hierarchical neural network. Also, the common weight storage section has, as storage units in the other of the row direction and the column direction, storage units at least in a number equal to the maximum value of the number of nodes in an odd number layer in the hierarchical neural network.

Accordingly, for example, by reducing the number of storage units required in the common weight storage section to a minimum according to hierarchical layers of a hierarchical neural network and the number of nodes in each of the layers, the number of storage units can be reduced.

Also, the parallel processing device has, as its units, units in a number equal to at least the maximum number of nodes per layer among the entire layers in a hierarchical neural network. Accordingly, for example, by reducing the number of required units to a minimum according to hierarchical layers of a hierarchical neural network and the number of nodes in each of the layers, the number of units can be reduced.

It is noted that each of the storage sections having the structure shown in each of the figures in accordance with the embodiments described above may be formed from a hard disk device, a magneto-optical disk device, a nonvolatile memory such as a flash memory, a readable storage medium such as a CR-ROM, a volatile memory such as a RAM (Random Access Memory), or a combination of the foregoing devices. It is noted that the unit calculation section shown in FIG. 2 and FIG. 15, or the distribution control section 8 in FIG. 16 may be realized by dedicated hardware, or may be realized by a memory and a microprocessor.

Embodiments of the invention are described above in detail with reference to the accompanying drawings, but concrete structures thereof are not limited to the embodiments described above, and include designs that do not depart from the subject matter of the invention.

What is claimed is:

1. A parallel processing device that computes a hierarchical neural network, comprising:
   a plurality of units, each of the plurality of units outputting an output value, the each of the plurality of units being identified by a characteristic unit number; the plurality of units being chained through a daisy chain control bus having a daisy chain order;
   a control section that outputs control data to the plurality of units, the control data including an input value and a selection unit number; and
   a storage section that stores a plurality of coupling weights, each of the plurality of coupling weights associating with layer information,
   the each of the plurality of units including:
   a data input section that receives the control data from the control section;
   a unit number match judgment section that judges whether the selection unit number matches the characteristic unit number;
   a unit processing section that computes the output value; and
   a data output section that outputs the output value to the control section when the unit number judgment section judges that the selection unit number matches the characteristic unit number;
   a token input section in communication with a token output section of a preceding unit of the plurality of units in the daisy chain order of the daisy chain control bus;
   a token output section in communication with a token input section of a next succeeding unit of the plurality of units in the daisy chain order of the daisy chain control bus; and
   a data output flag storage section in communication with the token output section and the data output section and having a data output flag indicating one of data having been outputted or data having been unoutputted;
   wherein in response to input of a token in the token input section, the data output section sets the data output flag of the data output flag storage section to data having been outputted; and
   wherein in response to the input value in the data input section, the token output section reads the data output flag from the data output flag storage section and outputs a token when the data output flag in the data output flag storage section is set to data having been outputted and, while outputting the token, the token output section resets the data output flag of the data output flag storage section to data having been unoutputted.

2. The parallel processing device that computes a hierarchical neural network according to claim 1,
   the unit processing section multiplying one of the each of the plurality of coupling weights and the input value.

3. The parallel processing device that computes a hierarchical neural network according to claim 1, further comprising:
   a unit input bus that inputs the control data to the plurality of units; and
   a unit output bus that outputs the output value to the control section.

4. The parallel processing device that computes a hierarchical neural network according to claim 1,
   the unit processing section computing the output value in a direction from an input layer to an output layer of the hierarchical neural network,
   the unit processing section computing a new coupling weight in a direction from the output layer to the input layer.

* * * * *